US008531368B2

(12) United States Patent
Morisue et al.

(10) Patent No.: US 8,531,368 B2
(45) Date of Patent: Sep. 10, 2013

(54) TRANSMISSIVE LIQUID CRYSTAL DISPLAY DEVICE HAVING COLOR SATURATION CONVERSION SECTION

(75) Inventors: Takashi Morisue, Nara (JP); Tsuyoshi Muramatsu, Nara (JP); Atsushi Aoki, Nara (JP); Hiroshi Tanaka, Soraku (JP)

(73) Assignee: Sharp Kabushiki Kaisha, Osaka (JP)

( * ) Notice: Subject to any disclaimer, the term of this patent is extended or adjusted under 35 U.S.C. 154(b) by 1070 days.

(21) Appl. No.: 12/238,029

(22) Filed: Sep. 25, 2008

(65) Prior Publication Data

US 2009/0160747 A1 Jun. 25, 2009

(30) Foreign Application Priority Data

Sep. 27, 2007 (JP) .................................. 2007-252699

(51) Int. Cl.
*G09G 3/36* (2006.01)
(52) U.S. Cl.
USPC ........................................................... 345/88
(58) Field of Classification Search
USPC ........................................................... 345/88
See application file for complete search history.

(56) References Cited

U.S. PATENT DOCUMENTS

| | | | |
|---|---|---|---|
| 6,965,389 | B1 | 11/2005 | Masuji et al. |
| 7,277,075 | B1 | 10/2007 | Hirano et al. |
| 2003/0222884 | A1 | 12/2003 | Ikeda et al. |
| 2005/0140622 | A1 | 6/2005 | Lee et al. |
| 2005/0285828 | A1 | 12/2005 | Inoue et al. |
| 2006/0274026 | A1 | 12/2006 | Kerofsky |
| 2007/0064162 | A1 | 3/2007 | Yamamoto et al. |
| 2008/0088649 | A1 | 4/2008 | Ikeno et al. |
| 2008/0150863 | A1* | 6/2008 | Morisue et al. ................. 345/88 |
| 2008/0180384 | A1* | 7/2008 | Aoki et al. ..................... 345/102 |
| 2008/0198180 | A1 | 8/2008 | Lagendijk |
| 2009/0046046 | A1 | 2/2009 | Mamba et al. |
| 2009/0273607 | A1 | 11/2009 | Ueki et al. |

FOREIGN PATENT DOCUMENTS

| | | |
|---|---|---|
| JP | 1-222967 A | 6/1989 |
| JP | 11-065531 | 3/1999 |
| JP | 2001-119715 A | 4/2001 |
| JP | 2001-147666 A | 5/2001 |
| JP | 2004-54250 A | 2/2004 |
| JP | 2005-196175 A | 7/2005 |
| JP | 2006 133711 A | 5/2006 |

(Continued)

OTHER PUBLICATIONS

U.S. Appl. No. 12/238,113, filed Sep. 25, 2008 entitled "Transmissive Liquid Crystal Display Device".
Office Action mailed Mar. 29, 2012 in U.S. Appl. No. 12/238,113.

*Primary Examiner* — William Boddie
*Assistant Examiner* — Andrew Schnirel
(74) *Attorney, Agent, or Firm* — Nixon & Vanderhye P.C.

(57) ABSTRACT

In a transmissive liquid crystal display device including a liquid crystal panel and a backlight, the liquid crystal panel has pixels each divided into four subpixels, namely red (R), green (G), blue (B), and white (W) subpixels. Further, the backlight is a white backlight whose light emission luminance is controllable. Furthermore, a color-saturation conversion section performs a color-saturation reduction process on a first input RGB input signal serving as an original input signal, and then a gamma-correction section performs a gamma-correction process on the first RGB input signal. An output signal generation section calculates transmittances and a backlight value in accordance with gamma-corrected RGB input signal obtained after the gamma-correction process has been performed by the gamma-correction section.

38 Claims, 40 Drawing Sheets

(56) References Cited

FOREIGN PATENT DOCUMENTS

| | | |
|---|---|---|
| JP | 2007-3848 A | 1/2007 |
| JP | 2007-10753 A | 1/2007 |
| JP | 2008-122940 A | 5/2008 |
| JP | 2008-176247 A | 7/2008 |
| JP | 2009-500654 A | 1/2009 |
| JP | 2009-47775 A | 3/2009 |
| WO | 01/37249 A2 | 5/2001 |
| WO | 2007/004194 A2 | 1/2007 |
| WO | 2007/039957 A1 | 4/2007 |

* cited by examiner

FIG. 5 (a)

INPUT SIGNALS (Rsi, Gsi, Bsi)

| A : (200, 200, 190) | B : (180, 100, 80) |
|---|---|
| C : (130, 150, 70) | D : (100, 120, 80) |

FIG. 5 (b)

TRANSMISSION AMOUNTS (Rtsi, Gtsi, Bsti, Wtsi)

| A : (100, 100, 90, 100) | B : (100, 20, 0, 80) |
|---|---|
| C : (60, 80, 0, 70) | D : (40, 60, 20, 60) |

FIG. 5 (c)

BACKLIGHT VALUE FOR EACH PIXEL

| A : 100 | B : 100 |
|---|---|
| C : 80 | D : 60 |

⟹ BACKLIGHT VALUE : 100

FIG. 5 (d)

TRANSMITTANCES (rsi, gsi, bsi, wsi)

| A : (1.0, 1.0, 0.9, 1.0) | B : (1.0, 0.2, 0.0, 0.8) |
|---|---|
| C : (0.6, 0.8, 0.0, 0.7) | D : (0.4, 0.6, 0.2, 0.6) |

FIG. 5 (e)

DISPLAY LUMINANCES

| A : (200, 200, 190) | B : (180, 100, 80) |
|---|---|
| C : (130, 150, 70) | D : (100, 120, 80) |

TRANSMISSIVE LIQUID CRYSTAL DISPLAY DEVICE HAVING COLOR SATURATION CONVERSION SECTION

This Nonprovisional application claims priority under U.S.C. §119(a) on Patent Application No. 252699/2007 filed in Japan on Sep. 27, 2007, the entire contents of which are hereby incorporated by reference.

FIELD OF THE INVENTION

The present invention relates to a transmissive liquid crystal display device constituted by a backlight and a liquid crystal panel.

BACKGROUND OF THE INVENTION

There are various types of color displays that have been in practical use. Thin displays are classified broadly into self-luminous displays, such as PDPs (plasma display panels), and nonluminous displays typified by LCDs (liquid crystal displays). Known as an LCD, which is a nonluminous display, is a transmissive LCD having a backlight disposed on the rear of a liquid crystal panel.

FIG. 41 is a cross-sectional view of a typical structure of a transmissive LCD. The transmissive LCD has a backlight 210 disposed on the rear of a liquid crystal panel 200. The liquid crystal panel 200 is arranged such that a liquid crystal layer 203 is disposed between a pair of transparent substrates 201 and 202, and that polarizers 204 and 205 are provided on the outer sides of the transparent substrates 201 and 202, respectively. Further, a color filter 206 is provided in the liquid crystal panel 200, so that color displays become available.

Although not shown, an electrode layer and an alignment layer are provided inside of the transparent substrates 201 and 202. The amount of light that is transmitted through the liquid crystal panel 200 is controlled for each pixel by controlling the application of voltage to the liquid crystal layer 203. That is, the transmissive LCD controls emitted light from the backlight 210 in such a manner that the amount of light that is transmitted through is controlled at the liquid crystal panel 200, thereby controlling displays.

The backlight 210 emits light that contains wavelengths of three colors RGB necessary for color displays. In combination with the color filter 206, the respective transmittances of red, green, and blue light are adjusted, so that the luminance and hue of each pixel can be arbitrarily set. Used commonly as such a backlight 210 is a white light source such as electroluminescence (EL), a cold-cathode fluorescent lamp (CCFL), or a light-emitting diode (LED).

As shown in FIG. 42, the liquid crystal panel 200 has a plurality of pixels, arranged in a matrix manner, each of which is usually constituted by three subpixels. The subpixels are arranged so as to correspond to red (R), green (G), and blue (B) filter layers of the color filter 206, respectively. Hereinafter, the subpixels will be referred to as R, G, and B subpixels, respectively.

Each of the R, G, and B subpixels selectively transmits, from among the white light emitted from the backlight 210, light falling within the corresponding wavelength band (i.e., red, green, or blue), and absorbs light falling within the other wavelength bands.

In the transmissive LCD thus arranged, the light emitted from the backlight 210 is controlled in such a manner that the amount of light that is transmitted through is controlled at each pixel of the liquid crystal panel 200. This naturally causes some of the light to be absorbed by the liquid crystal panel 200. Further, also in the color filter 206, each of the R, G, and B subpixels absorbs, from among the white light emitted from the backlight 210, light falling outside the corresponding wavelength band. Thus, in an ordinary transmissive LCD, a liquid crystal panel and a color filter absorb so large an amount of light as to reduce the efficiency of use of light emitted from a backlight. Accordingly, the ordinary transmissive LCD suffers from an increase in amount of electricity that is used by the backlight.

Known as a technique for reducing the amount of electricity that is used by a transmissive LCD is a method that involves the use of an active backlight capable of adjusting its light emission luminance in accordance with a displayed image (e.g., Japanese Unexamined Patent Application Publication No. 65531/11999 (Tokukaihei 11-65531 (published on Mar. 9, 1999); hereinafter referred to as "Patent Document 1").

That is, Patent Document 1 discloses a technique for, by using a luminance-adjustable active backlight to perform display control (luminance control) of an LCD by controlling the transmittance of a liquid crystal panel and the luminance of the active backlight, reducing the amount of electricity that is used by the backlight.

In Patent Document 1, the luminance of the backlight is controlled so as to be identical to the maximum luminance value of an input image (input signal). Further, the transmittance of the liquid crystal panel is adjusted in accordance with the current luminance of the backlight.

At this time, the transmittance of a subpixel, i.e., the maximum value of the input signal becomes 100%. Further, the transmittances of other subpixels are calculated from the backlight value to be not more than 100% each. This makes it possible to darken the backlight when the image is entirely dark, thereby enabling a reduction in the amount of electricity that is used by the backlight.

Thus, in Patent Document 1, the brightness of the backlight is minimized on the basis of the input signal RGB of the input image, and the transmittance of the liquid crystals is increased to the extent that the backlight is darkened. This makes it possible to reduce the amount of light that is absorbed by the liquid crystal panel, thereby enabling a reduction in the amount of electricity that is used by the backlight.

With the foregoing conventional arrangement, the amount of electricity that is used by the backlight can be reduced by reducing the amount of light that is absorbed by the liquid crystal panel. However, the amount of light that is absorbed by the color filter cannot be reduced. If the amount of light that is absorbed by the color filter can be reduced, the amount of electricity that is used can be further reduced.

SUMMARY OF THE INVENTION

It is an object of the present invention to provide a transmissive liquid crystal display device capable of achieving a further reduction in power consumption by reducing the amount of light that is absorbed by a color filter as well as a liquid crystal panel.

In order to solve the foregoing problems, a transmissive liquid crystal device according to the present invention includes: a liquid crystal panel whose pixels are each divided into four subpixels, namely red (R), green (G), blue (B), and white (W) subpixels; a white active backlight whose light emission luminance is controllable; a color-saturation conversion section that performs a color-saturation reduction process on pixel data high in luminance and color saturation, from among pixel data contained in a first input RGB signal serving as an input image, and thereby converts the first input RGB signal into a second input RGB signal; a gamma-correction section that converts the second input RGB signal into a third input RGB signal by performing a gamma-correction process on the second input RGB signal; an output signal generation section that generates, from the third input RGB signal, respective transmittance signals of the R, G, B, and W subpixels of each pixel of the liquid crystal panel and calculates a backlight value of the active backlight; a liquid crystal panel control section that drives and controls the liquid crystal panel in accordance with the transmittance signals generated by the output signal generation section; and a backlight control section that controls the light emission luminance of the backlight in accordance with the backlight value calculated by the output signal generation section.

Alternatively, in order to solve the foregoing problems, another transmissive liquid crystal device according to the present invention includes: a liquid crystal panel whose pixels are each divided into four subpixels, namely red (R), green (G), blue (B), and white (W) subpixels; a white active backlight whose light emission luminance is controllable; a color-saturation conversion and gamma-correction section that performs a color-saturation reduction process and a gamma-correction process in this order on pixel data high in luminance and color saturation, from among pixel data contained in a first input RGB signal serving as an input image, and performs a gamma-correction process on pixel data low in at least either luminance or color saturation, and thereby converts the first input RGB signal into a third input RGB signal; an output signal generation section that generates, from the third input RGB signal, respective transmittance signals of the R, G, B, and W subpixels of each pixel of the liquid crystal panel and calculates a backlight value of the active backlight; a liquid crystal panel control section that drives and controls the liquid crystal panel in accordance with the transmittance signals generated by the output signal generation section; and a backlight control section that controls the light emission luminance of the backlight in accordance with the backlight value calculated by the output signal generation section.

According to the foregoing arrangement, the use of a liquid crystal panel whose pixels are each divided into four subpixels, namely R, G, B, and W subpixels, makes it possible to transfer a part of each of the R, G, and B components to the subpixel W, which suffers no loss (or little loss) of light due to absorption by a filter. This makes it possible to reduce the amount of light that is absorbed by the color filter and to reduce the backlight value accordingly, thereby enabling a reduction in the amount of electricity that is used by the transmissive liquid crystal display device.

Furthermore, the backlight value can be more surely reduced by calculating the backlight value and the RGBW transmittances after performing the color-saturation reduction process on the first input RGB signal, which is an original input.

Further, as for the color-saturation reduction process and the gamma-correction process, the gamma-correction process is performed after the color-saturation reduction process. In cases where the color-saturation reduction process and the gamma-correction process are performed in an inverse order, there is a difference in luminance between before the processes and after the processes. However, since the gamma-correction process is performed after the color-saturation reduction process, the luminance after the processes stays the same as the luminance before the processes.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 5(a) through 5(e) show how a backlight luminance value and the transmittances of subpixels are determined in the liquid crystal display device.

DESCRIPTION OF THE EMBODIMENTS

Figure 1:
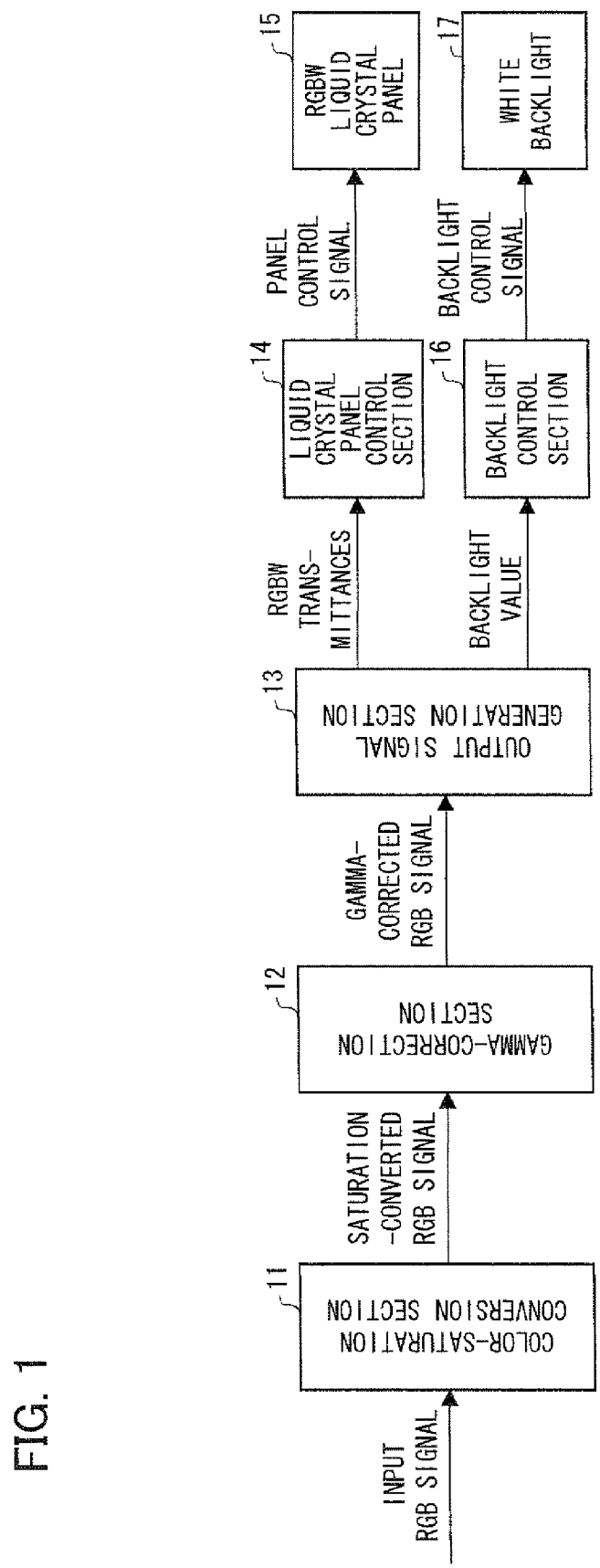
FIG. 1 is a block diagram showing an arrangement of a main part of a liquid crystal display device according to an embodiment of the present invention.

An embodiment of the present invention will be described below with reference to the drawings. First, a schematic arrangement of a liquid crystal display device according to the present embodiment (hereinafter referred to as a "present liquid crystal display device") will be described with reference to FIG. 1.

The present liquid crystal display device includes a color-saturation conversion section 11, a gamma-correction section 12, an output signal generation section 13, a liquid crystal panel control section 14, an RGBW liquid crystal panel (hereinafter referred to simply as "liquid crystal panel") 15, a backlight control section 16, and a white backlight (hereinafter referred to simply as "backlight") 17.

Figure 2:
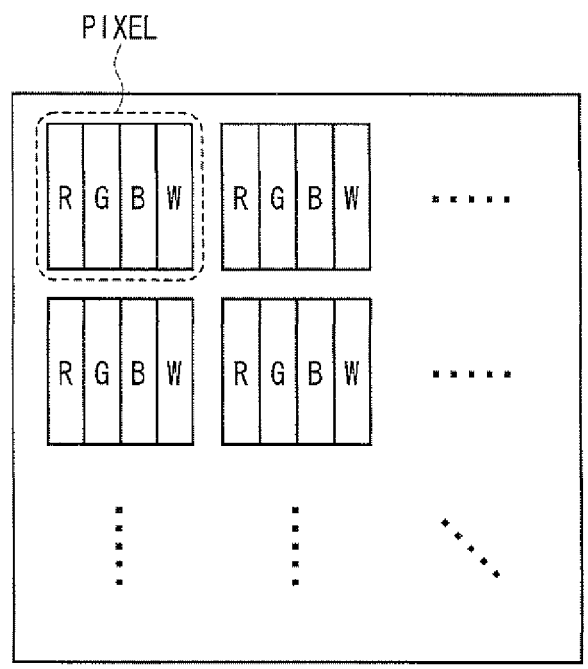
FIGS. 2(a) and 2(b) show example arrangements of subpixels in the transmissive liquid crystal display device.
Figure 2:
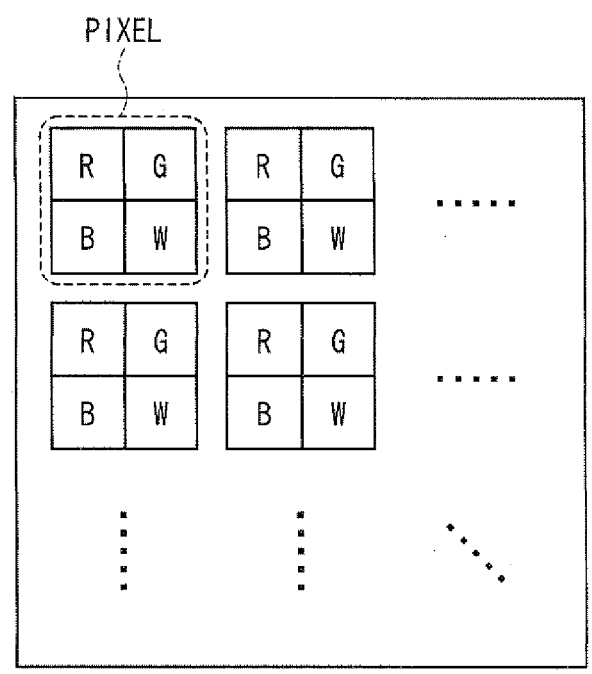

The liquid crystal panel 15 is constituted by Np pixels arranged in a matrix manner. As shown in FIGS. 2(a) and 2(b), each of the pixels is constituted by four subpixels, namely R (red), G (green), B (blue), and W (white) subpixels. It should be noted that the shapes and arrangement of the R, G, B, and W subpixels in each pixel are not particularly limited. Further, the backlight 17 is an active backlight, capable of adjusting the brightness of light that it emits, which employs a white light source such as a cold-cathode fluorescent lamp (CCFL) or a white light-emitting diode (white LED).

The R, G, and B subpixels in each pixel of the liquid crystal panel 15 are arranged so as to correspond to R, G, and B filter layers of a color filter (not shown), respectively. Therefore, each of the R, G, and B subpixels selectively transmits, from among the white light emitted from the backlight 17, light falling within the corresponding wavelength band, and absorbs light falling within the other wavelength bands. Further, the W subpixel basically has no corresponding absorption filter layer in the color filter. That is, the light transmitted through the W subpixel is not absorbed by the color filter at all, and is emitted from the liquid crystal panel 15 as white light. It should be noted, however, that the W subpixel may have a filter layer that absorbs the light from the backlight less than the R, G, and B color filters do.

The present liquid crystal display device receives an RGB signal, which carries information on an image to be displayed, from an external device such as a personal computer or a television tuner, and processes the RGB signal as an input RGB signal (R[i], G[i], B[i]) (i=1, 2, Np).

The color-saturation conversion section 11 performs a color-saturation conversion process on the input RGB signal (first input RGB signal), and then outputs, to the subsequent gamma-correction section 12, a saturation-converted RGB signal (second input RGB signal) finished with the color-saturation conversion process. The gamma-correction section 12 performs a gamma-correction process on the saturation-converted RGB signal, and then outputs, to the subsequent output signal generation section 13, a gamma-corrected RGB signal (third input RGB signal) finished with the gamma-correction conversion process.

The output signal generation section 13 calculates a backlight value of the backlight 17 and the respective transmittances of the R, G, B, and W subpixels in each pixel of the liquid crystal panel 15 from the gamma-corrected RGB signal, and then outputs the backlight value and the transmittances. That is, the output signal generation section 13 calculates the backlight value from the gamma-corrected RGB signal, and converts the gamma-corrected RGB signal into a transmittance signal compatible with the backlight.

The backlight value thus calculated is outputted to the backlight control section 16, and the backlight control section 16 adjusts the luminance of the backlight 17 in accordance with the backlight value. The backlight 17 employs a white light source such as a CCFL and a white LED, and can be controlled by the backlight control section 16 so as to have brightness proportional to the backlight value. How the brightness of the backlight 17 is controlled varies depending on the type of light source that is used. For example, the brightness of the backlight 17 can be controlled by applying voltage proportional to the backlight value or by passing an electrical current proportional to the backlight value. In cases where the backlight is an LED, the brightness can also be controlled by changing the duty ratio with pulse width modulation (PWM). In cases where the brightness of the backlight's light source has nonlinear characteristics, it is also possible to use a look-up table to calculate, from the backlight value, voltage, an electrical current, or the like that is to be applied to the light source, and then control the brightness of the backlight so that the brightness reaches a desired level.

The transmittance signal obtained at the output signal generation section 13 is outputted to the liquid crystal panel control section 14. Based on the transmittance signal, the liquid crystal panel control section 14 controls the transmittance of each subpixel of the liquid crystal panel 15 so that the transmittance reaches a desired level. The liquid crystal panel control section 14 includes a scanning line driving circuit, a signal line driving circuit, and the like. The liquid crystal panel control section 14 generates a scan signal and a data signal, and drives the liquid crystal panel 15 with use of panel control signals such as the scan signal and the data signal. The transmittance signal is used for the signal line driving circuit to generate the data signal. The transmittance of the liquid crystal panel 15 can be controlled, for example, by (i) a method for controlling the transmittance of a liquid crystal panel by applying voltage proportional to the transmittance of a subpixel, or (ii) a method for, in order to linearize nonlinear characteristics, looking up voltage to be applied to a liquid crystal panel in a look-up table on the basis of the transmittance of a subpixel, and for controlling the liquid crystal panel so that the liquid crystal panel has a desired transmittance.

In the liquid crystal display device of the present invention, the input signal is not limited to such an RGB signal as described above. The input signal may be a color signal such as a YUV signal. In cases where a color signal other than an RGB signal is inputted, the color signal may be converted into an RGB signal and then supplied to the output signal generation section 13. Alternatively, the output signal generation section 13 may be arranged so as be able to convert a color input signal other than an RGB signal into an RGBW signal.

In the present liquid crystal display device, the display luminance of each subpixel of the liquid crystal panel 15 is represented by the product of the brightness of (luminance of light emitted by) the backlight and the transmittance of the subpixel. The following fully describes the display principles of the present liquid crystal device and the effect of reduction in the amount of electricity that is used by the present liquid crystal display device. In the present liquid crystal display device, the output signal generation section 13 calculates a backlight value and the transmittance of a subpixel. Therefore, the following process for calculating a backlight value and the transmittance of a subpixel is a process that is to be performed on the gamma-corrected RGB signal inputted from the gamma-correction section 12 to the output signal generation section 13. In the following description, the gamma-corrected RGB signal outputted from the gamma-correction section 12 is expressed as (Rsi, Gsi, Bsi), the transmittance signal obtained at the output signal generation section 13 is expressed as (rsi, gsi, bsi), and the backlight value calculated by the output signal generation section 13 is expressed as Wbs.

In the present liquid crystal display device, a backlight value and the transmittance of a subpixel are determined in the following manner. First, a minimum necessary backlight value is calculated for every pixel falling within a display area corresponding to the backlight. How the backlight value is calculated varies between the following two ways, depending on the content of data to be displayed by a pixel. Specifically, how the backlight value is calculated varies depending on the relationship between the maximum luminance (i.e., max (Rsi, Gsi, Bsi)) and minimum luminance (i.e., min (Rsi, Gsi, Bsi)) of subpixels in a target pixel.

Figure 3:
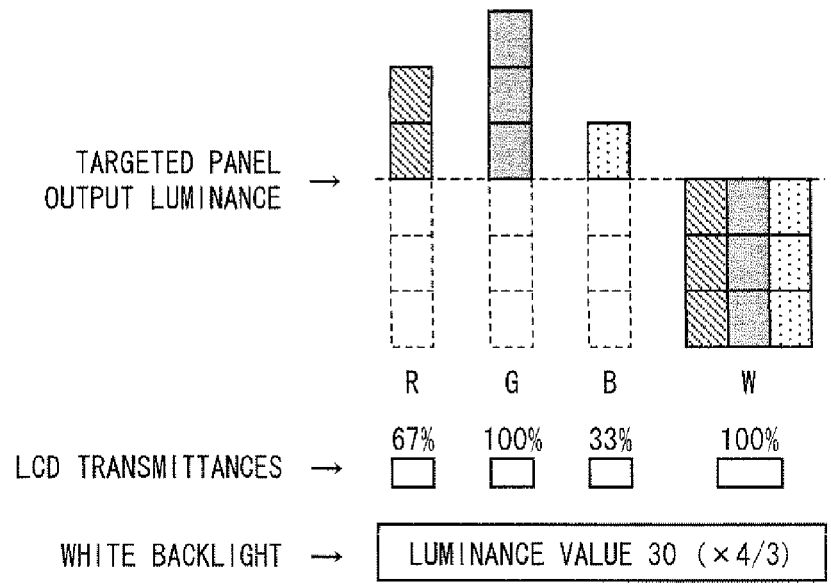
FIG. 3(a) shows how a backlight luminance value is calculated in the liquid crystal display device.
FIG. 3(b) shows, for comparison, how a backlight luminance value is calculated in Patent Document 1.
Figure 3:
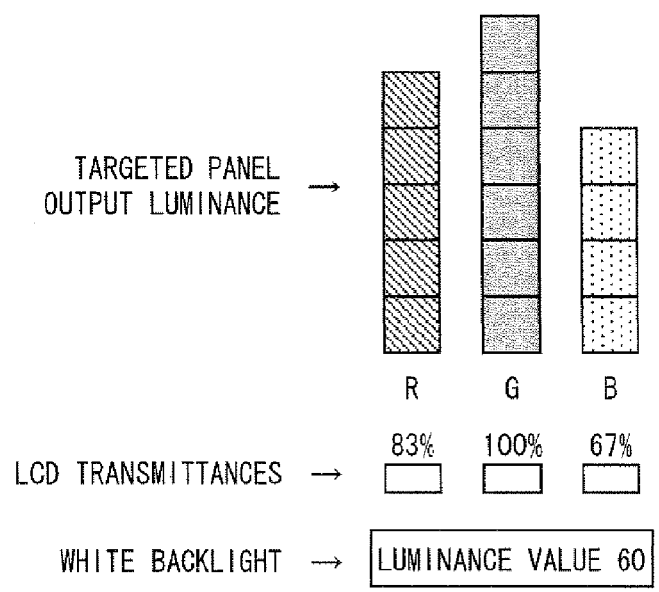

First, the following describes, with reference to FIGS. 3(a) and 3(b), how a backlight value is calculated for a pixel where min (Rsi, Gsi, Bsi)≧max (Rsi, Gsi, Bsi)/2. FIG. 3(a) shows how a backlight value is calculated in the present liquid crystal display device. FIG. 3(b) shows, for comparison, how a backlight value is calculated in Patent Document 1.

Let it be assumed that the target panel-output luminance of a target pixel is (R, G, B)=(50, 60, 40) in FIGS. 3(a) and 3(b). In this case, the luminance value 60 of G is max (Rsi, Gsi, Bsi), and the luminance value 40 of B is min (Rsi, Gsi, Bsi). Therefore, the following relationship is satisfied:

$$\min(Rsi, Gsi, Bsi) \geqq \max(Rsi, Gsi, Bsi)/2.$$

According to the display method of Patent Document 1, as shown in FIG. 3(b), the backlight luminance value is set to max (Rsi, Gsi, Bsi)=60, and the transmittance of each subpixel is determined according to the backlight value. That is, the transmittances of the R, G, and B subpixels are set to 83% (=50/60), 100% (=60/60), and 67% (=40/60), respectively.

Meanwhile, in the present liquid crystal display device, each of the R, G, and B components of the input signal (Rsi, Gsi, Bsi) is transferred to the luminance value of the W component in an amount corresponding to max (Rsi, Gsi, Bsi)/2. As a result, the input signal (R, G, B) (50, 60, 40), which is expressed as an RGB signal, is converted into an output signal (R, G, B, W)=(20, 30, 10, 30), which is expressed as an RGBW signal. Further, the backlight luminance value is set to max (Rsi, Gsi, Bsi)/2=30 for the target pixel. Further, the respective transmittances of the R, G, B, and W subpixels are determined in accordance with the backlight value Specifically, the transmittances of the R, G, B, and W subpixels are set to 67% (=20/30), 100% (=30/30), 33% (=10/30), and 100% (=30/30), respectively. It should be noted, however, that the transmittances shown in FIG. 3(a) are examples of transmittances that are obtained in cases where the backlight value calculated for the target pixel is the greatest of those backlight values calculated for all the pixels and is adopted as the luminance value of the backlight.

Further, in order to make a comparison between the aforementioned backlight value calculated in the present liquid crystal display device and the backlight value calculated according to the method of Patent Document 1, it is necessary to also consider an area ratio of subpixels. That is, whereas a single pixel is divided into three subpixels in Patent Document 1, a single pixel is divided into four subpixels in the present liquid crystal display device. For this reason, the area of each subpixel in the present liquid crystal display device is only ¾ of the area of each subpixel in Patent Document 1. In order to make up for such a reduction in the area of a subpixel, the present liquid crystal display device multiplies the backlight luminance value by 4/3, thereby making it possible to make a commensurate comparison between the backlight value calculated in the present liquid crystal display device and the backlight value calculated in Patent Document 1.

As a result, making a correction to the backlight value of FIG. 3(a) in order to make it commensurate with the backlight value of FIG. 3(b) yields (4/3)×60/2=40. In the example of FIG. 3(b) where a similar display is performed, the backlight value is 60. From this, it is obvious that the present invention brings about an effect of reduction in the amount of electricity that is used by the target pixel.

Figure 4:
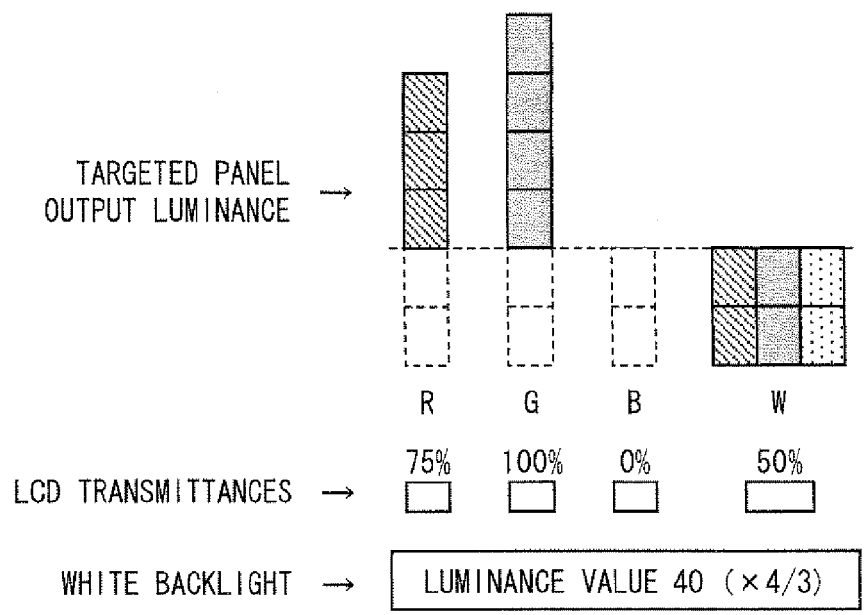
FIG. 4(a) shows how a backlight luminance value is calculated in the liquid crystal display device.
FIG. 4(b) shows, for comparisons how a backlight luminance value is calculated in Patent Document 1.
Figure 4:
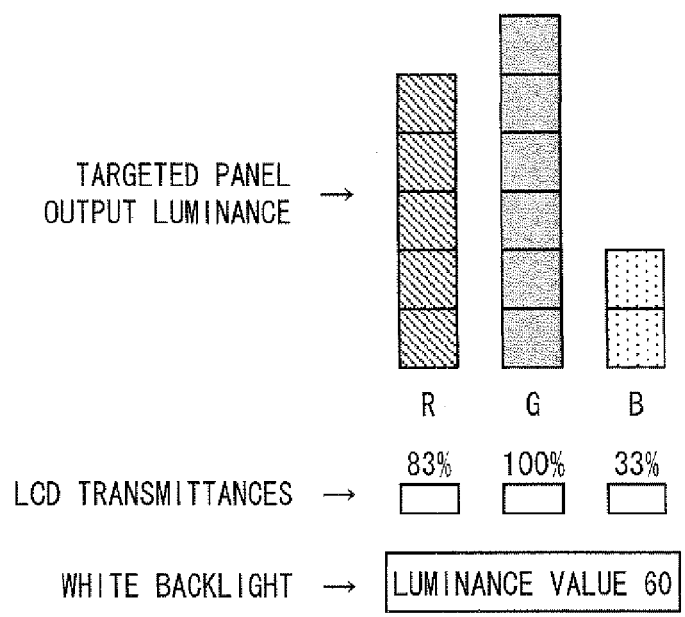

Next, the following describes, with reference to FIGS. 4(a) and 4(b), how a backlight value is calculated for a pixel where min (Rsi, Gsi, Bsi)<max (Rsi, Gsi, Bsi)/2. FIG. 4(a) shows how a backlight value is calculated in the present liquid crystal display device. FIG. 4(b) shows, for comparison, how a backlight value is calculated in Patent Document 1.

Let it be assumed that the target panel-output luminance of a target pixel is (R, G, B)=(50, 60, 20) in FIGS. 4(a) and 4(b). In this case, the luminance value 60 of G is max (Rsi, Gsi, Bsi), and the luminance value 20 of B is min (Rsi, Gsi, Bsi). Therefore, the following relationship is satisfied:

$$\min(Rsi,Gsi,Bsi) < \max(Rsi,Gsi,Bsi)/2.$$

According to the display method of Patent Document 1, as shown in FIG. 4(b), the backlight luminance value is set to max (Rsi, Gsi, Bsi)=60, and the transmittance of each subpixel is determined in accordance with the backlight value. That, the transmittances of the R, G, and B subpixels are set to 83% (=50/60), 100% (=60/60), and 33% (=20/60), respectively.

Meanwhile, in the present liquid crystal display device, each of the R, G, and B components of the input signal (Rsi, Gsi, Bsi) is transferred to the luminance value of the W component in an amount corresponding to min (Rsi, Gsi, Bsi). As a result, the input signal (R, G, B)=(50, 60, 20), which is expressed as an RGB signal, is converted into an output signal (R, G, B, W)=(30, 40, 0, 20), which is expressed as an RGBW signal. Further, the backlight luminance value is set to (max (Rsi, Gsi, Bsi)–min (Rsi, Gsi, Bsi))=40 for the target pixel. Further, the respective transmittances of the R, G, B, and W subpixels are determined in accordance with the backlight value. Specifically, the transmittances of the R, G, B, and W subpixels are set to 75% (=30/40), 100% (=40/40), 0% (=0/40), and 50% (=20/40), respectively.

It should be noted, however, that the transmittances shown in FIG. 4(a) are examples of transmittances that are obtained in cases where the backlight value calculated for the target pixel is the greatest of those backlight values calculated for all the pixels and is adopted as the luminance value of the backlight. Further, also in the example of FIG. 4(a), the backlight value is multiplied by 4/3, so that it becomes possible to make a commensurate comparison between the backlight value calculated in the present liquid crystal display device and the backlight value calculated in Patent Document 1.

As a result, in the example of FIG. 4(a), the backlight value is (4/3)×(60−20)=53.3. In the example of FIG. 4(b) where a similar display is performed, the backlight value is 60. From this, it is obvious that the present invention brings about an effect of reduction in the amount of electricity that is used by the target pixel.

FIGS. 3(a), 3(b), 4(a), and 4(b) show how a minimum necessary backlight value is calculated for each pixel. Minimum necessary backlight values are calculated according to the above-described method for all the pixels falling within a display area corresponding to the backlight. The value greatest of all those backlight values thus calculated is set as the luminance value of the backlight.

The following describes, with reference to FIGS. 5(a) through 5(e), how a backlight value and the transmittances of subpixels are determined in the present liquid crystal display device according to the method described above.

FIG. 5(a) shows input signals (Rsi, Gsi, Bsi) inputted to a display area corresponding to a single backlight. For convenience of explanation, let it be assumed that the display area is constituted by four pixels A to D.

FIG. 5(b) shows results obtained for the pixels A to D by converting the input signals (Rsi, Gsi, Bsi) into output signals (Rtsi, Gtsi, Btsi, Wtsi), which are expressed as RGBW signals. Further, FIG. 5(c) shows backlight values respectively calculated for the pixels. With this, the value greatest of those backlight values respectively calculated for the pixels, i.e., 100 is set as the backlight value.

The respective transmittances (rsi, gsi, bsi, wsi) of the pixels with respect to the backlight value of 100 thus calculated are calculated from the values of the output signals (Rtsi, Gtsi, Btsi, Wtsi) shown in FIG. 5(b). The results are shown in FIG. 5(d). Moreover, the respective final display luminances of the pixels are shown in FIG. 5(e). From this, it can be confirmed that the respective final display luminances of the pixels are identical to the luminance values of the input signals (Rsi, Gsi, Bsi) shown in FIG. 5(a).

Thus, according to the aforementioned process for calculating a backlight value and the transmittances of subpixels in the output signal generation section 13, the amount of electricity that is used by the backlight 17 can be reduced by suppressing the absorption of light by the color filer by causing the W subpixel to bear part of the amount of light of the white component. For this reason, the transferability of the amount of light of the white component to the W subpixel in display image data is a prerequisite for bringing about the effect of reduction in the amount of electricity that is used by the backlight.

That is, according to the aforementioned process for calculating a backlight value and the transmittances of subpixels in the output signal generation section 13, the larger the amount of white-component light that is transferred to the W subpixel of every pixel falling within a display area corresponding to the backlight (i.e., the lower the color saturation), the greater the effect of reduction in the amount of electricity that is used by the backlight. Meanwhile, if the display area corresponding to the backlight contains a pixel where the amount of white-component light that is transferred to its W subpixel is small (i.e., the color saturation is high), the effect of reduction in the amount of electricity that is used by the backlight becomes small. If the luminance is higher, there may be even an increase in power consumption in comparison with the display method of Patent Document 1.

The following describes an example of how backlight values are set for two pixels identical in luminance to each other but different in color saturation from each other.

First, the backlight value for a pixel A (Luminance=208; Color Saturation=0.533) where (R, G, B)=(176, 240, 112) is calculated in the following manner.

In the pixel A, the amount of light that is transferred to the W subpixel is (112). Then, the amount of light that is transferred to the W subpixel is subtracted from each of the amounts of light of the R, G, and B subpixels, so that the respective amounts of light of the R, G, and B subpixels become (64, 128, 0). As a result, the backlight value for the pixel A is (128).

Meanwhile, the backlight value for a pixel B (Luminance=208; Color Saturation=0.75) where (R, G, B)=(160, 256, 64) is calculated in the following manner.

In the pixel B, the amount of light that is transferred to the W subpixel is (64). Then, the amount of light that is transferred to the W subpixel is subtracted from each of the amounts of light of the R, G, and B subpixels, so that the respective amounts of light of the R, G, and B subpixels become (96, 192, 0). As a result, the backlight value for the pixel B is (192).

Thus, a comparison between the pixels A and B shows that although the pixels A and B are identical in luminance to each other, the pixel B, which is higher in color saturation than the pixel A, has a greater backlight value set therefor than the pixel A. This shows that the effect of reduction in the amount of electricity that is used by the backlight is small.

The output signal generation section 13 can also calculate a backlight value and the transmittances of subpixels by performing the above-described process on the original image data (i.e. the first input RGB signal) originally inputted to the present liquid crystal display device. However, in this case, the effect of reduction in power consumption is not necessarily achieved with every image for the aforementioned reason (It should be noted that, in reality, the effect of reduction in power consumption is often achieved with normal gradation-display screens considered to be most likely to be displayed).

For this reason, in the present liquid crystal display device, the color-saturation conversion section 11 is disposed in front of the output signal generation section 13 so as to perform a color-saturation conversion process of converting the first input RGB signal into a saturation-converted RGB signal. This makes it possible to more surely obtain, in the process performed by the output signal generation section 13, a greater effect of reducing the amount of electricity that is used by the backlight.

Further, in the present liquid crystal display device, the gamma-correction section 12 is disposed between the color-saturation conversion section 11 and the output signal generation section 13 so as to perform a gamma-correction process of converting the saturation-converted RGB signal into a gamma-corrected RGB signal. In an ordinary liquid crystal display device, an input RGB signal on which gamma correction has been performed is outputted to a liquid crystal panel. However, in the present invention, the color-saturation conversion process and the gamma-correction process exert an influence on each other. Therefore, the present embodiment is characterized so that the color-saturation conversion process and the gamma-correction process are both suitably performed.

The following fully describes, with reference to each of Embodiments 1 to 13, a color-saturation reduction process and a gamma-correction process that are performed in a liquid crystal display device of the present invention.

Embodiment 1

Figure 6:
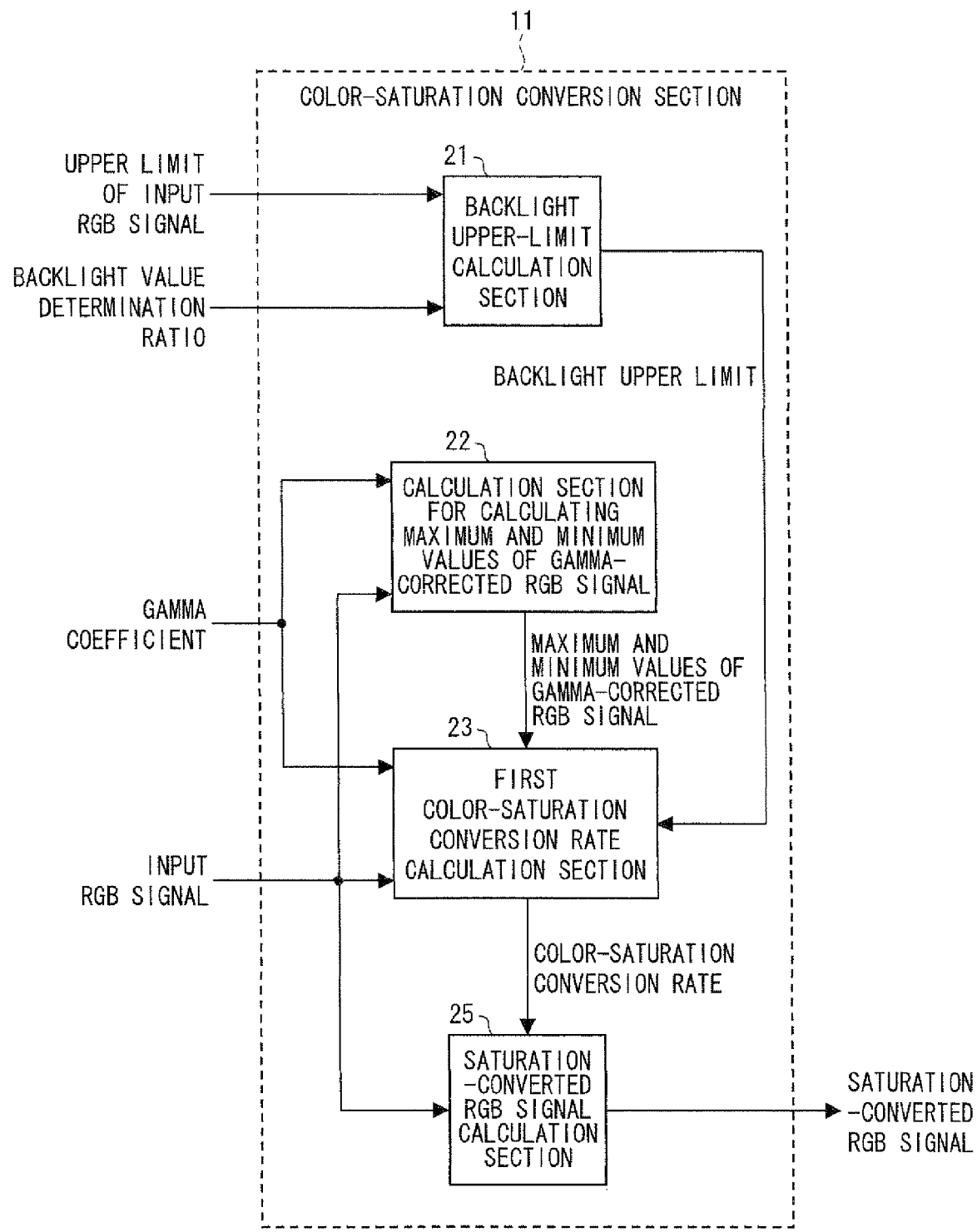
FIG. 6 is a block diagram showing an example arrangement of a color-saturation conversion section in Embodiment 1 of the liquid crystal display device.
Figure 7:
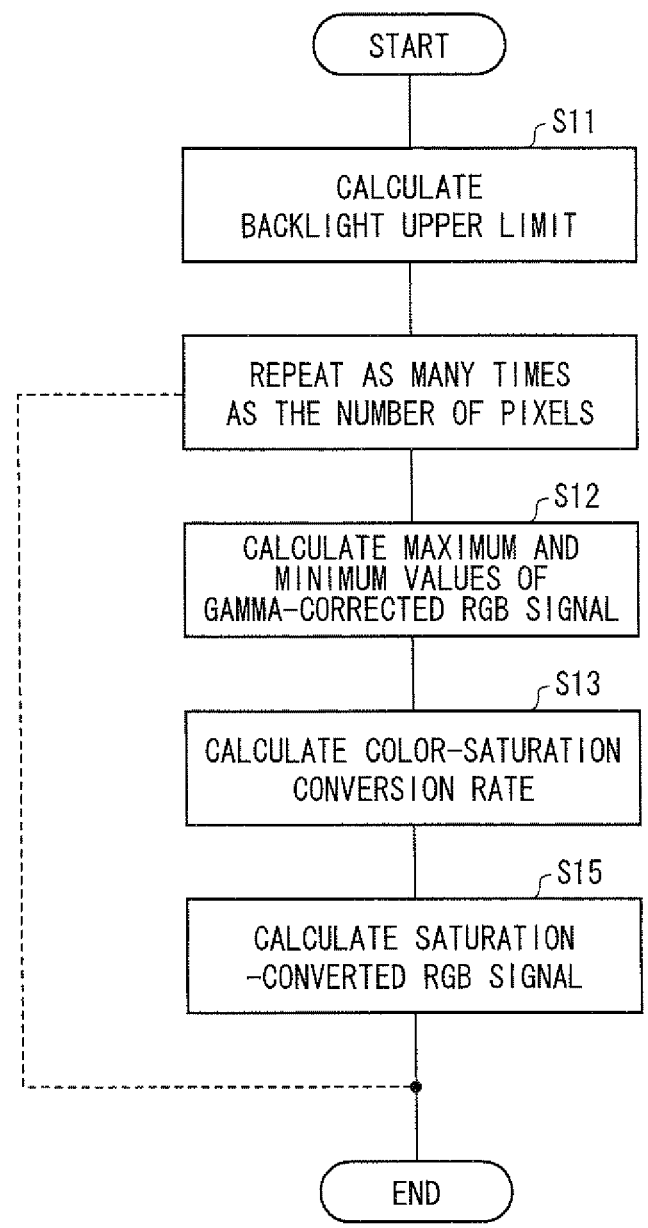
FIG. 7 is a flow chart showing a sequence of operations that are performed by the color-saturation conversion section of FIG. 6.

FIG. 6 shows an arrangement of a color-saturation conversion section 11 of a liquid crystal display device according to Embodiment 1. The color-saturation conversion section 11 includes a backlight upper-limit calculation section 21, a calculation section 22 for calculating the maximum and minimum values of a gamma-corrected RGB signal, a first color-saturation conversion rate calculation section 23, and a saturation-converted RGB signal calculation section 25. Further, FIG. 7 is a flow chart that explains the operation of the color-saturation conversion section 11.

First, the backlight upper-limit calculation section 21 calculates a backlight upper limit according to Formula (1) below (S11). The color-saturation conversion section 11 performs a color-saturation reduction process only on a pixel low in amount of light that is directly transferred to its W subpixel (i.e., high in color saturation) and high in luminance, but does not perform a color-saturation reduction process on a pixel low in at least either color saturation or luminance. The reason for this is as follows: The backlight value for a pixel low in color saturation can be greatly reduced by transferring a large amount of light to its W subpixel even if the pixel is high in luminance, and a pixel low in luminance does not require a high backlight value for a display in the first place. The backlight upper limit is used in determining a pixel on which to perform a color-saturation reduction process. The following fully describes a procedure for calculating a backlight upper limit.

First, let it be assumed that no color-saturation reduction process is performed on image data (i.e., an input RGB signal) and a maximum backlight value is obtained. This is a case where there exists a pixel where the color saturation is 1 (the amount of light cannot be transferred to the W subpixel) and at least one of the RGB values is MAX (indicative of the upper limit of the input RGB signal). Further, at this time, the backlight value also becomes MAX.

Next, let it be assumed that a color-saturation reduction process is performed on image data (i.e., an input RGB signal) and a maximum backlight value is obtained. It should be noted here that the color-saturation reduction process is a process by which the color saturation of a processing pixel is minimized without causing a difference in luminance of the pixel between before and after the process. In this case, a maximum backlight value is obtained when there exists a pixel where the color saturation is 0 (the backlight value is irreducible because the color saturation cannot be reduced any further) and all the RGB values are MAX. In the pixel, half the amount of light of each of the KGB values is transferred to the W subpixel (provided the area of each of the R, G, and B subpixels is equal to the area of the W subpixel). Therefore, at this time, the backlight value becomes MAX/2.

Therefore, the backlight upper limit MAXw falls within a range of MAX/2 to MAX. The backlight upper limit MAXw can be represented by Formula (1) as follows:

$$\text{MAX}w = \text{MAX} \times B1 \text{ Ratio} \qquad (1)$$

where B1 Ratio falls within a range of 0.5 to 1.0.

MAX here denotes the upper limit of the input RGB signal. MAX may not take on a single value, but may take on a plurality of values. That is, the lower limit of MAX is the maximum value (MAXi) of all the RGB values of the input RGB signal. The reason for this is that it is impossible to guarantee a desired backlight value when MAX is smaller than MAXi. On the other hand, the upper limit of MAX is the maximum value (MAXs) on which the input RGB signal can take, The reason for this is that there is no need for a backlight value greater than MAXs.

MAXs is expressed as follows:

$$\text{MAX}s = 2^{Bw} - 1$$

where Bw is the bit width of the input RGB signal. For example, if Bw is 8, MAXs is calculated as $2^8 - 1 = 255$. Therefore, the effective range of MAX is expressed as follows:

$$\text{MAX}i \leq \text{MAX} \leq \text{MAX}s.$$

Basically, MAX may take on any value as long as the value satisfies MAXi≤MAX≤MAXs. If MAX=MAXi, the backlight value can be minimized. However, this makes it necessary to calculate MAX for each image. On the other hand, if MAX=MAXs, the backlight upper limit (MAXw) becomes higher than MAXi; however, MAX becomes a value that remains constant regardless of images. This makes it unnecessary to calculate MAX for each image.

Further, in Formula (1), B1 Ratio is a constant that denotes the degree of a color-saturation reduction process. That is, a B1 Ratio of 1 corresponds to a case where no color-saturation reduction process is performed, and a B1 Ratio of 0.5 corresponds to a case where such a process is performed as to minimize the color saturation. In the color-saturation reduction process, the more the color saturation is reduced, the greater the effect of reduction in the amount of electricity that is used by the backlight. However, this naturally causes an increase in deterioration in image quality due to the reduction in color saturation. For this reason, in consideration of a balance between the effect of reduction in power consumption and the deterioration in image quality, it is only necessary to arbitrarily set B1 Ratio within a range of 0.5 to 1 in accordance with a required level of color-saturation reduction.

Once the backlight upper limit MAXw is thus determined, it is judged for each pixel, in Steps S12 to S15, according to the following procedure whether or not a color-saturation reduction process is performed.

First, the calculation section 22 uses Formulae (2) and (3) below to calculate, from the input RGB signal and a gamma coefficient, the maximum and minimum values maxRGBg and minRGBg of an RGB signal that is obtained after gamma correction in a target pixel (to be processed) and then outputs the maximum and minimum values maxRGBg and minRGBg (S12):

$$\text{max}RGBg = fg(\text{max}RGB, \gamma) \tag{2}$$

$$\text{min}RGBg = fg(\text{min}RGB, \gamma) \tag{3}$$

where maxRGB=max (R[i], G[i], B[i]), minRGB=min (R[i], G[i], B[i]), max (A, B, . . . )=the maximum value of A, B, . . . , min (A, B, . . . ) the minimum value of A, B, . . . , γ=the gamma coefficient (>0), and fg(x,g)=a gamma-correction function (e.g., fg(x,g)=(x/MAX)$^g$×MAX).

Next, the first color-saturation conversion rate calculation section 23 judges whether or not the luminance and color saturation of the target pixel are both high, and calculates a color-saturation conversion rate α in accordance with a result of the judgment (S13). In this judgment process, it is confirmed whether or not the maximum and minimum values maxRGBg and minRGBg calculated for the gamma-corrected RGB signal according to Formulae (2) and (3) satisfy Formula (4):

$$MAXw \leq \text{max}RGBg - \text{min}RGBg. \tag{4}$$

See below for how to derive Formula (4).

In cases where Formula (4) is satisfied, it is deemed that the luminance and the color saturation are both high. In this case, the color-saturation conversion rate α is calculated to satisfy Formula (5):

$$fg\left(\frac{a \times \text{max}RGB + }{(1-a) \times Y[i]}, \gamma\right) - fg\left(\frac{a \times \text{min}RGB + }{(1-a) \times Y[i]}, \gamma\right) = MAXw \tag{5}$$

where Y[i]=the luminance of the input RGB signal (R[i], G[i], B[i]) (e.g., Y[i]=(2×R[i]+5×G[i]+B[i])/8). See below for how to derive Formula (5).

In cases where Formula (4) is not satisfied, it is deemed that at least either the luminance or the color saturation is low. In this case, α=1.

Next, the saturation-converted RGB signal calculation section 25 calculates a saturation-converted RGB signal (Rs[i], Gs[i], Bs[i]) according to Formulae (6) to (8) (S15):

$$Rs[i] = \alpha \times R[i] + (1-\alpha) \times Y[i] \tag{6}$$

$$Gs[i] = \alpha \times G[i] + (1-\alpha) \times Y[i] \tag{7}$$

$$Bs[i] = \alpha \times B[i] + (1-\alpha) \times Y[i]. \tag{8}$$

See below for how to derive Formulae (6) to (8).

The following explains how to derive a calculating formula in each step.

First, the following explains how to derive Formula (4), which serves as a condition for judging whether or not to perform a color-saturation conversion process.

As shown below, an algorithm up to the calculation of a backlight value that is obtained in cases where no color-saturation conversion is performed is a sequence of a step of performing a gamma-correction process, a step of calculating a transmission amount of a W subpixel, a step of calculating transmission amounts of RGB subpixels, and a step of calculating a backlight value, the steps being arranged in the order named.

According to the gamma-correction process, an RGB signal (Rg[i], Gg[i], Bg[i]) that is obtained after gamma correction in cases where no color-saturation conversion process is performed on the input RGB signal (R[i], G[i], B[i]) is given by Formulae (101) to (103):

$$Rg[i] = fg(R[i], \gamma) \tag{101}$$

$$Gg[i] = fg(G[i], \gamma) \tag{102}$$

$$Bg[i] = fg(B[i], \gamma). \tag{103}$$

For the gamma-corrected RGB signal (Rg[i], Gg[i], Bg[i]), the transmission amount Wtg[i] of the W subpixel is given by Formula (104):

$$Wtg[i] = \min(\text{max}RGBg/2, \text{min}RGBg) \tag{104}$$

where maxRGBg=max(Rg[i], Gg[i], Bg[i]), and minRGBg=min(Rg[i], Gg[i], Bg[i]).

For the gamma-corrected RGB signal (Rg[i], Gg[i], Bg[i]) and the transmission amount Wtg[i] of the W subpixel, the transmission amounts (Rtg[i], Gtg[i], Btg[i]) of the RGB subpixels are given by Formulae (105) to (107):

$$Rtg[i] = Rg[i] - Wtg[i] \tag{105}$$

$$Gtg[i] = Gg[i] - Wtg[i] \tag{106}$$

$$Btg[i] = Bg[i] - Wtg[i]. \tag{107}$$

Then, the backlight value Wbg is given by Formula (108):

$$Wbg = \max(Rtg[1], Gtg[1], Btg[1], Wtg[1], \ldots Rtg[Np], Gtg[Np], Btg[Np], Wtg[Np]). \tag{108}$$

In Formulae (104) to (107), each of the RGBW transmission amounts does not take on a value that falls short of 0. Next, from Formula (104), a condition in which the W transmission amount does not exceed MAXw is given as Formula (109):

$$\min(\text{max}RGBg/2, \text{min}RGBg) \leq MAXw. \tag{109}$$

Furthermore, form Formulae (105) to (107), a condition in which each of the RGB transmission amounts does not exceed MAXw is given as Formulae (110) to (112):

$$Rtg[i] \leq MAXw \tag{110}$$

$$Gtg[i] \leq MAXw \tag{111}$$

$Btg[i] \leq MAXw$. (112)

From Formulae (104) to (107) and Formulae (110) to (112), the condition in which each of the RGB transmission amounts does not exceed MAXw is given as Formula (113):

$\max(Rtg[i], Gtg[i], Btg[i]) \leq MAXw$ $\max RGBg - Wtg[i] \leq MAXw$ $\therefore \max RGBg - \min(\max RGBg/2, \min RGBg) \leq MAXw$ (113)

where, if (A) $\max RGBg/2 \leq \min RGBg$, the condition in which the W transmission amount does not exceed MAXw is calculated from Formula (109) as follows:

$\max RGBg/2 \leq MAXw$. (114)

Further, since MAXw falls within a range of $MAX/2 \leq MAXw \leq MAX$, $\max RGBg/2 \leq MAX/2 \leq MAXw$, so that Formula (114) always holds.

Next, the condition in which the RGB transmission amounts do not exceed MAXw is calculated from Formula (113) as follows:

$\max RGBg - \max RGBg/2 \leq MAXw$ $\therefore \max RGBg/2 \leq MAXw$.

This formula is identical to Formula (114), and therefore always holds.

Meanwhile, if (B) $\min RGBg < \max RGBg/2$, the condition in which the W transmission amount does not exceed MAXw is calculated from Formula (109) as follows:

$\min RGBg \leq MAXw$. (115)

In this case, since $MAX/2 \leq MAXw \leq MAX$ and $\min RGBg < \max RGBg/2$, $\min RGBg < \max RGBg/2 \leq MAX/2 \leq MAXw$, so that Formula (115) always holds.

Next, the condition in which the RGB transmission amounts do not exceed MAXw is calculated from Formula (113) as follows:

$\max RGBg - \min RGBg \leq MAXw$. (116)

Since Formula (116) does not always hold, a condition in which none of the RGBW transmission amounts exceeds MAXw is given as Formula (116) if (B) $\min RGBg < \max RGBg/2$.

On the other hand, a condition in which at least one of the RGBW transmission amounts exceeds MAXw is given as Formula (4) if (B) $\min RGBg < \max RGBg/2$.

In cases where Formula (4) holds, it is found from $MAX/2 \leq MAXw \leq MAX$ that:

$\max RGBg/2 \leq MAX/2 \leq MAXw < \max RGBg - \min RGBg$ $\max RGBg/2 < \max RGBg - \min RGBg$ $\therefore \min RGBg < \max RGBg/2$.

That is, (B) $\min RGBg < \max RGBg/2$ always holds.

Therefore, the condition in which at least one of the RGBW transmission amounts exceeds MAXw is unconditionally given as Formula (4).

That is, in cases where R[i], G[i], and B[i] satisfy Formula (4), a color-saturation conversion process is performed to prevent the backlight value from exceeding MAXw.

The following explains how to derive Formulae (5) to (8) for calculation in color-saturation conversion.

First, formulae for converting an RGB signal so that the luminance and the hue are constant and only the color saturation is reduced are written as Formulae (6) to (8) above where Formula (117) is satisfied as follows:

$0 \leq \alpha < 1$. (117)

It should be noted, however, that $\alpha = 1$ only when no color-saturation conversion is performed.

It is proved as below that Formulae (6) to (8) do not cause a difference in luminance and hue of the RGB signal between before and after the color-saturation conversion process.

First, let it be assumed that the luminance is calculated according to the formula $(2 \times R + 5 \times G + B)/8$ when the RGB values are (R, G, B). In this case, the luminance Ys[i] after the color-saturation conversion is given by Formula (118):

$Ys[i] = (2 \times Rs[i] + 5 \times Gs[i] + Bs[i])/8$. (118)

Substituting Formulae (6) to (8) in Formula (118) yields Formula (119):

$$Ys[i] = a \times \frac{(2 \times R[i] + 5 \times G[i] + B[i])}{8} + (1-a) \times Y[i] \qquad (119)$$
$$= a \times Y[i] + (1-a) \times Y[i]$$
$$= Y[i].$$

From Formula (119), it is found that there is no difference in luminance value between before and after the color-saturation conversion.

Meanwhile, for the hue, let it be assumed that the R value is at maximum. First, when the R value is at maximum, the hue H[i] before the color-saturation conversion is given by Formula (120):

$H[i] = (Cb - Cg) \times 60$ (120)

where
$Cb = (\max RGB - B[i])/(\max RGB - \min RGB)$, and
$Cg = (\max RGB - G[i])/(\max RGB - \min RGB)$.

Next, the hue Hs[i] after the color-saturation conversion is given by Formula (121):

$Hs[i] = (Cbs - Cgs) \times 60$ (121)

where
$Cbs = (\max RGBs - Bs[i])/(\max RGBs - \min RGBs)$,
$Cgs = (\max RGBs - Gs[i])/(\max RGBs - \min RGBs)$,
$\min RGBs = \min RGB$ after the color-saturation conversion, and
$\max RGBs = \max RGB$ after the color-saturation conversion.

Transforming Formula (121) and substituting Formulae (6) to (8) in Formula (121) thus transformed yield Formula (122):

$$Hs[i] = \left[\frac{\{(\max RGBs - Bs[i]) - (\max RGBs - Gs[i])\}}{(\max RGBs - \min RGBs)}\right] \times 60 \qquad (122)$$
$$= \left\{\frac{(Gs[i] - Bs[i])}{(\max RGBs - \min RGBs)}\right\} \times 60$$
$$= \left[\frac{a \times (G[i] - B[i])}{\{a \times (\max RGB - \min RGB)\}}\right] \times 60$$
$$= \left\{\frac{(G[i] - B[i])}{(\max RGB - \min RGB)}\right\} \times 60$$
$$= \left[\frac{\{(\max RGB - B[i]) - (\max RGB - G[i])\}}{(\max RGB - \min RGB)}\right] \times 60$$
$$= (Cb - Cg) \times 60$$
$$= H[i].$$

From Formula (122), it is found that there is no difference in hue between before and after the color-saturation conversion. The same applies to a case where the G or B value is at maximum.

Next, when Formulae (6) to (8) are calculating formulae for color-saturation conversion, such a relational expression of α is derived that the backlight value is MAXw.

If all those pixels which satisfy Formula (4) are subjected to color-saturation conversion so as to satisfy Formula (123)

$$MAXw = maxRGBsg - minRGBsg, \quad (123)$$

the backlight value is necessarily not more than MAXw.

From Formulae (6) to (8) and Formula (123), Formula (5) is derived. Solving Formula (5) derives such a value of α that the backlight value becomes MAXw. However, the formula is a nonlinear equation, and therefore cannot by easily solved. Accordingly, it is conceivable that Formula (5) may be solved with use of an approximation method. The solving method will be fully described below in each of Embodiments 4 to 13.

Finally, in the case of a pixel that does not satisfy Formula (4), setting α to 1 in Formulae (6) to (8) causes the RGB values (R[i], G[i], B[i]) before the color-saturation conversion and the RGB values (Rs[i], Gs[i], Bs[i]) after the color-saturation conversion to be equal, with the same result as in the case where no color-saturation conversion is performed.

The color-saturation conversion process causes the input image to deteriorate in image quality in terms of the vividness of colors. However, ordinary images do not have so many portions high in luminance and color saturation. Thus, in many cases, only limited portions of the images decrease in color saturation. Further, humans have such a visual property as not to be as sensitive to a change in color as a change in brightness. Thus, in many cases, such deterioration in image quality is hard for humans to recognize. On the other hand, humans have such a visual property as to be more sensitive to a change in brightness than to a change in color. Therefore, a reduction in luminance is recognized as great deterioration in image quality. Therefore, it is important in the color-saturation conversion process to maintain the luminance so that there is no difference in luminance between before and after the conversion.

The saturation-converted RGB signal calculated by the color-saturation conversion section 11 is then subjected to gamma correction by the gamma-correction section 12, and the gamma-correction section 12 outputs a gamma-corrected RGB signal. The gamma-correction process in the gamma-correction section 12 is identical to gamma correction that is performed in an ordinary display device. Generally, an output signal (the gamma-corrected RGB signal here) corresponding to an input signal (saturation-converted RGB signal here) is read out from an LUT (look-up table), or is calculated according to a conversion formula. Further, the LUT or the conversion formula for use in the gamma-correction process of the present embodiment can be identical to that for use in gamma correction that is performed in an ordinary display device.

However, in the present embodiment, it is important to perform a gamma-correction process after performing a color-saturation conversion process. That is, the present embodiment is characterized in one aspect by disposing the gamma-correction section 12 behind the color-saturation conversion section 11. The reason for this will be described below.

Figure 8:
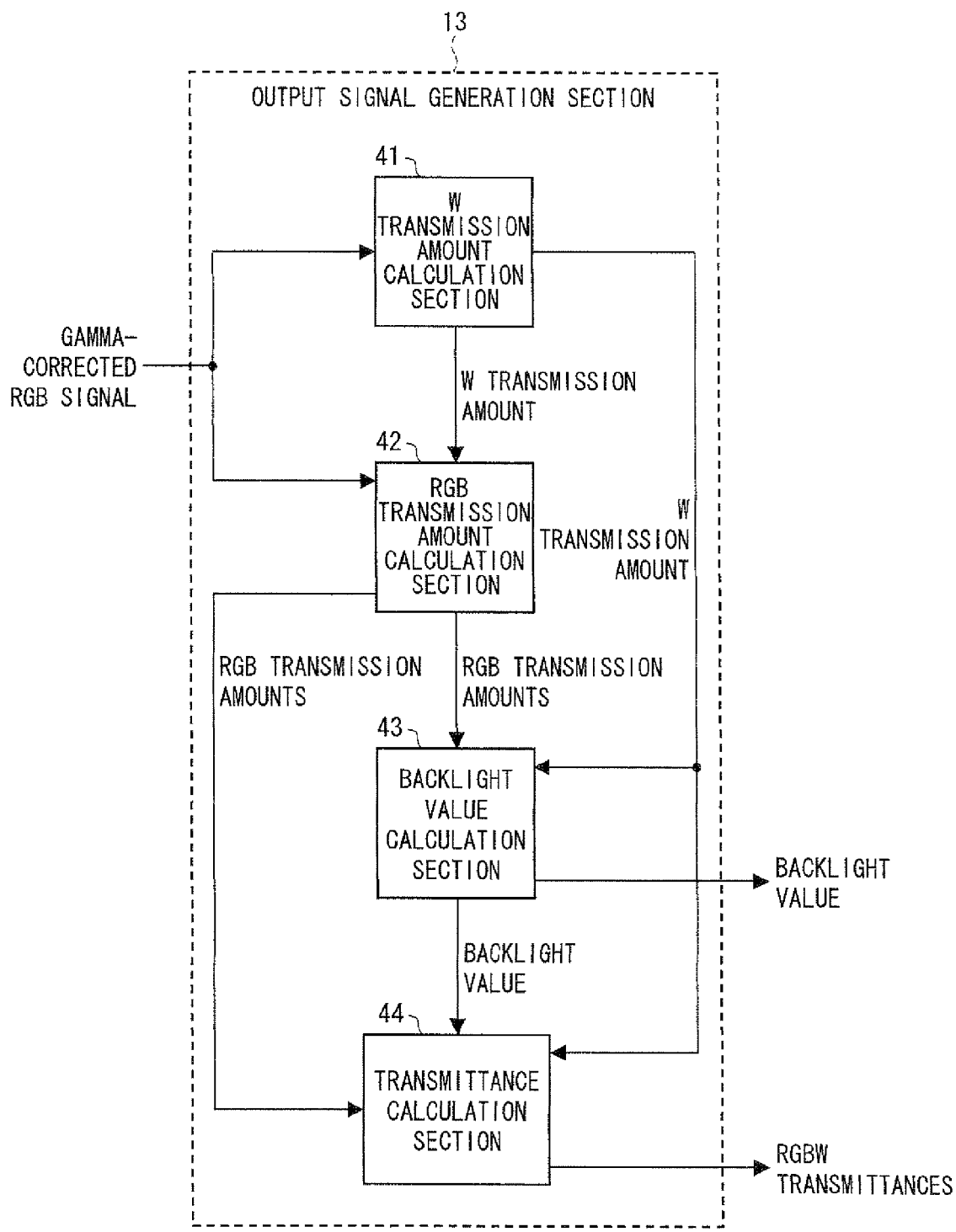
FIG. 8 is a block diagram showing an example arrangement of an output signal generation section of the liquid crystal display device.
Figure 9:
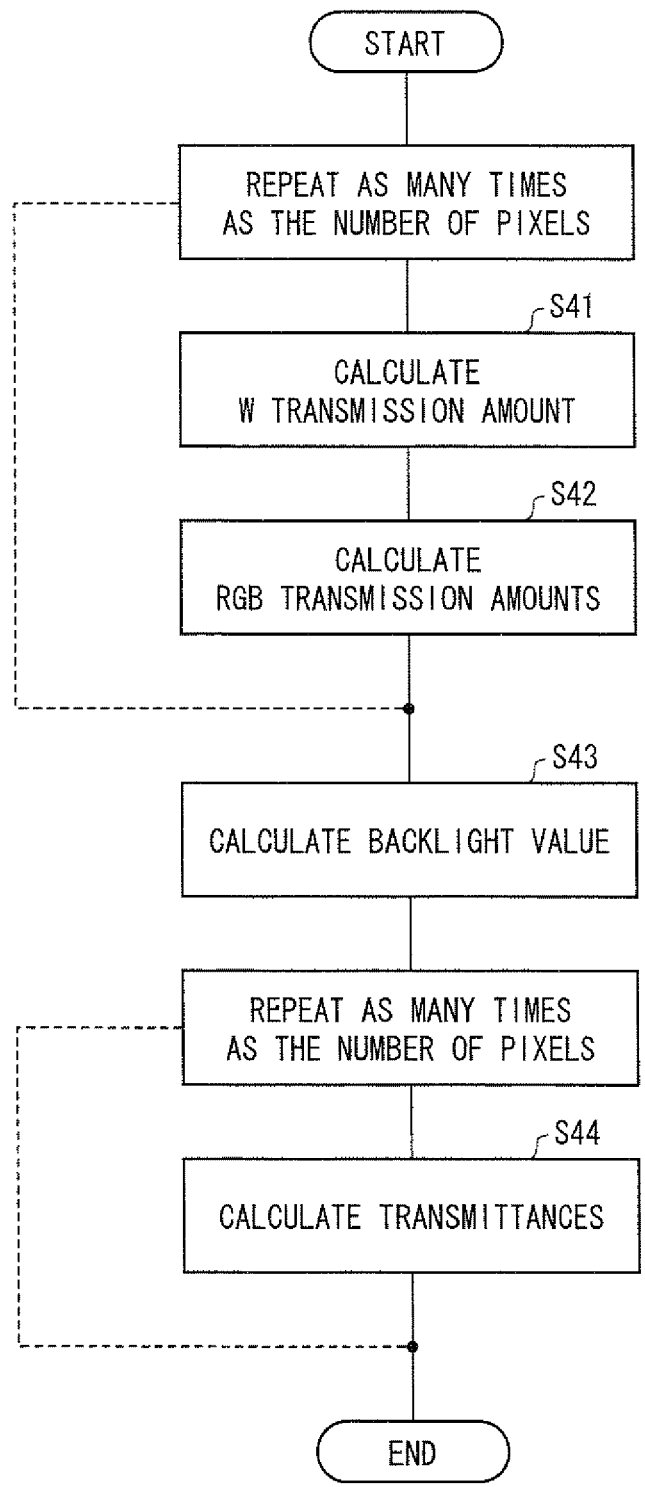
FIG. 9 is a flow chart showing a sequence of operations that are performed by the output signal generation section.

FIG. 8 shows an arrangement of an output signal generation section 13 of the liquid crystal display device according to Embodiment 1. The output signal generation section 13 includes a W transmission amount calculation section 41, an RGB transmission amount calculation section 42, a backlight value calculation section 43, and a transmittance calculation section 44. Further, FIG. 9 is a flow chart that explains the operation of the output signal generating section 13.

First, the W transmission amount calculation section 41 calculates the W transmission amount Wtsg[i] of a target pixel from a gamma-corrected RGB signal according to Formula (55) (S41):

$$Wtsg[i] = min(maxRGBsg/2, minRGBsg). \quad (55)$$

Next, the RGB transmission amount calculation section 42 calculates the RGB transmission amounts (Rtsg[i], Gtsg[i], Btsg[i]) of the target pixel from the gamma-corrected RGB signal and the W transmission amount according to Formulae (56) to (58) (S42):

$$Rtsg[i] = Rsg[i] - Wtsg[i] \quad (56)$$

$$Gtsg[i] = Gsg[i] - Wtsg[i] \quad (57)$$

$$Btsg[i] = Bsg[i] - Wtsg[i]. \quad (58)$$

Steps S41 and S42 are repeated as many times as the number of pixels of the input RGB signal.

The backlight value calculation section 43 calculates a backlight value Wbsg from the RGBW transmission amounts of each pixel according to Formula (59) (S43):

$$Wbsg = max(Rtsg[1], Gtsg[1], Btsg[1], Wtsg[1], \ldots Rtsg[Np], Gtsg[Np], Btsg[Np], Wtsg[Np]) \quad (59)$$

Next, the transmittance calculation section 44 calculates the RGBW transmittances of the target pixel from the RGBW transmission amounts and the backlight value according to Formulae (60) to (63) (S44):

$$rsg[i] = Rtsg[i]/Wbsg \quad (60)$$

$$gsg[i] = Gtsg[i]/Wbsg \quad (61)$$

$$bsg[i] = Btsg[i]/Wbsg \quad (62)$$

$$Wsg[i] = Wtsg[i]/Wbsg \quad (63)$$

where rsg[i]=gsg[i]=bsg[i]=wsg[i]=0 if Wbsg=0. Step S44 is repeated as many times as the number of pixels of the input RGB signal.

The following shows an example of calculation of a backlight value according to Embodiment 1. For convenience of explanation, the following shows an example where an image constituted by a single pixel is inputted and the input image has pixel values (R[1], G[1], B[1])=(159, 255, 63). It should be noted that the following explanation assumes that MAX=255, γ=2, and B1 Ratio=0.5.

First, in cases where no color-saturation conversion process is performed, a backlight value is calculated in the following manner. Performing gamma correction on the pixel values of the input image yields gamma-corrected pixel values (Rg[1], Gg[1], Bg[1]) as follows:

$$Rg[1] = \left(\frac{R[1]}{MAX}\right)^\gamma \times MAX$$
$$= \left(\frac{159}{255}\right)^2 \times 255$$
$$= 99$$

$$Gg[1] = \left(\frac{G[1]}{MAX}\right)^\gamma \times MAX$$
$$= \left(\frac{255}{255}\right)^2 \times 255$$
$$= 255$$

-continued $$Bg[1] = \left(\frac{B[1]}{MAX}\right)^\gamma \times MAX$$
$$= \left(\frac{63}{255}\right)^2 \times 255$$
$$= 16.$$

Based on the gamma-corrected pixel values, the W transmission amount Wtg[1] is calculated as:

$$Wtg[1] = \min\left(\frac{maxRGBg}{2}, minRGBg\right)$$
$$= \min\left(\frac{255}{2}, 16\right)$$
$$= 16.$$

Further, at this time, the RGB transmission amounts (Rtg[1], Gtg[1], Btg[1]) are given by:

Rtg[1]=Rg[1]−Wtg[1]=99−16=83

Gtg[1]=Gg[1]−Wtg[1]=255−16=239

Btg[1]=Bg[1]−Wtg[1]=16−16=0.

From the RGBW transmission amounts, a backlight value Wbg is calculated as:

$$Wbg = \max(Rtg[1], Gtg[1], Btg[1], Wtg[1])$$
$$= \max(83, 239, 0, 16)$$
$$= 239.$$

That is, the backlight value obtained in cases where no color-saturation conversion process is performed is 239.

On the other hand, in cases where a color-saturation conversion process is performed, a backlight value is calculated in the following manner. According to the calculating procedure described above in the present embodiment, the backlight upper limit MAXw is calculated from Formula (1) as follows:

MAXw=MAX×B1 Ratio=255×0.5=127.5.

From Formulae (2) and (3), the maximum and minimum values of the gamma-corrected RGB signal are given by:

$$maxRGBg = \left(\frac{maxRGB}{MAX}\right)^\gamma \times MAX$$
$$= \left(\frac{255}{255}\right)^2 \times 255$$
$$= 255$$

$$minRGBg = \left(\frac{minRGB}{MAX}\right)^\gamma \times MAX$$
$$= \left(\frac{63}{255}\right)^2 \times 255$$
$$= 16.$$

Since the target pixel satisfies Formula (4), color-saturation conversion is performed. At this time, a color-saturation conversion rate α is calculated in the following manner. First, the luminance Y[1] corresponding to the input pixel values is calculated as:

$$Y[1] = \frac{(2 \times R[1] + 5 \times G[1] + B[1])}{8}$$
$$= \frac{(2 \times 159 + 5 \times 255 + 63)}{8}$$
$$= 207.$$

Substituting MAX=255, γ=2, maxRGB=255, minRGB=63, Y[1]=207, and MAXw=127.5 in Formula (5) yields:

fg(α×255+(1−α)×207,2)−fg(α×63+(1−α)×207,2)
=127.5.

Solving this formula yields a color-saturation conversion rate α as follows:

$$\{(a \times 255 + (1-a) \times 207)/255\}^2 \times 255 -$$
$$\{(a \times 63 + (1-a) \times 207)/255\}^2 \times 255 = 127.5$$
$$\{(a \times 255 + (1-a) \times 207)\}^2 - \{(a \times 63 + (1-a) \times 207)\}^2 = 32512.5$$
$$(48 \times a + 207)^2 - (-144 \times a + 207)^2 = 32512.5$$
$$2304 \times a^2 + 19872 \times a + 42849 -$$
$$20736 \times a^2 + 59616 \times a - 42849 = 32512.5$$
$$-18432 \times a^2 + 2 \times 39744 \times a - 32512.5 = 0.$$

Applying the formula for the solution of a quadratic equation to this formula yields:

$$\alpha = \sqrt{-39744 \pm \sqrt{\left\{\begin{array}{c}(-39744)^2 - (-18432) \times \\ (-32512.5))\end{array}\right\}} \Big/ \{-18432\}}.$$

Therefore, α=0.457575 or α=3.854925.

Since 0≤α<1, α=0.457575.

Once the color-saturation conversion rate α is determined, a saturation-converted RGB signal (Rs[1], Gs[1], Bs[1]) is calculated according to Formulae (6) to (8) as follows:

Rs[1] =
 a × R[1] + (1 − a) × Y[1] = 0.457575 × 159 + (1 − 0.457575) × 207 = 185

Gs[1] = a × G[1] + (1 − a) × Y[1] =
 0.457575 × 255 + (1 − 0.457575) × 207 = 229

Bs[1] = a × B[1] + (1 − a) × Y[1] =
 0.457575 × 63 + (1 − 0.457575) × 207 = 141.

Performing gamma correction on the saturation-converted RGB signal yields a gamma-corrected RGB signal (Rsg[1], Gsg[1], Bsg[1]) as follows:

$$Rsg[1] = (Rs[1]/MAX)^\gamma \times MAX = (185/255)^2 \times 255 = 134$$
$$Gsg[1] = (Gs[1]/MAX)^\gamma \times MAX = (229/255)^2 \times 255 = 206$$
$$Bsg[1] = (Bs[1]/MAX)^\gamma \times MAX = (141/255)^2 \times 255 = 78.$$

Based on the gamma-corrected RGB signal, the W transmission amount Wtsg[1] is calculated as:

$$Wtsg[1] = \min(\max RGBsg/2, \min RGBsg)$$
$$= \min(206/2, 78) = 78.$$

Further, at this time, the RGB transmission amounts (Rtsg [1], Gtsg[1], Btsg[1]) are given by:

$$Rtsg[1]=Rsg[1]-Wtsg[1]=134-78=56$$

$$Gtsg[1]=Gsg[1]-Wtsg[1]=206-78=128$$

$$Btsg[1]=Bsg[1]-Wtsg[1]=78-78=0.$$

From the RGBW transmission amounts, a backlight value Wbsg is calculated as:

$$Wbsg = \max(Rtsg[1], Gtsg[1], Btsg[1], Wtsg[1])$$
$$= \max(56, 128, 0, 78) = 128.$$

That is, the backlight value obtained in cases where the color-saturation conversion process is 128.

Thus, the above example shows that the color-saturation conversion process can reduce the backlight value from 239 to 128 (reduction of approximately 46%).

As described above, according to the process of the present embodiment, the gamma-correction section 12 is disposed behind the color-saturation conversion section 11 so that a gamma-correction process is performed after a color-saturation conversion process is performed. The reason for this is as follows: Although performing color-saturation conversion after gamma correction causes no difference in luminance between before and after the color-saturation conversion, there is a change in luminance when a human eye performs inverse gamma correction on light (an image) outputted from the display. The human-eye inverse gamma correction will be described below more in detail.

For example, in cases where a human observes a lamp of certain brightness and then observes the same lamp with its luminance value halved (physically), the eyes of the human do not recognize that the light obtained by halving the luminance value of the lamp is half as bright, but actually recognize the light as more than half as bright. That is, the visual property of a human (property of recognizing brightness) is nonlinear, and a graph whose abscissa represents the physical quantity of brightness and whose ordinate represents the quantity of light perceived by a human is an upwardly convex graph (i.e., a gamma curve) that is monotonically increasing but is not linear.

For this reason, the display device performs gamma correction (downwardly convex, monotonically increasing graph) on input image data so that the physical quantity of the luminance value of the gamma-corrected image data and the quantity of light perceived by a human are linear. In other words, the display device performs gamma correction and the human perception performs correction (inverse gamma correction) opposite to the gamma correction performed by the display. As a result, the gamma correction and the inverse gamma correction cancel each other out, and the characteristic of brightness finally perceived by a human becomes linear with respect to the physical quantity of the luminance value of the gamma-corrected image data.

Although performing gamma correction after color-saturation conversion as in the process according to the present embodiment causes a temporal change in luminance at the time of the gamma correction, a human eye performs inverse gamma correction, so that the change in luminance is cancelled. Finally, the luminance is retained.

For example, in the aforementioned example of calculation of a backlight value (where gamma correction is performed after color-saturation conversion), the luminance value Ys[1] (=Y[1]) before the gamma correction (after the color-saturation conversion) is 207, and the luminance value Ysg[1] after the gamma correction is given by:

$$Ysg[1] = (2 \times Rsg[1] + 5 \times Gsg[1] + Bsg[1])/8$$
$$= (2 \times 134 + 5 \times 206 + 78)/8$$
$$= 172.$$

The gamma correction causes a temporal change in luminance.

The RGB corresponding values of the amount of light that is outputted from (transmitted through) the display are identical to Rsg[1], Gsg[1], and Bsg[1], respectively. On the other hand, performing inverse gamma correction with a human eye yields RGB values (Rsgi[1], Gsgi[1], Bsgi[1]) as follows:

$$Rsgi[1] = (Rsg[1]/\text{MAX})^{1/\gamma} \times \text{MAX} = (134/255)^{1/2} \times 255 = 185$$
$$Gsgi[1] = (Gsg[1]/\text{MAX})^{1/\gamma} \times \text{MAX} = (206/255)^{1/2} \times 255 = 229$$
$$Bsgi[1] = (Bsg[1]/\text{MAX})^{1/\gamma} \times \text{MAX} = (78/255)^{1/2} \times 255 = 141.$$

Therefore, the RGB values that are obtained in cases where inverse gamma correction is performed with a human eye correspond to the following luminance Ysgi[1]:

$$Ysgi[1] = (2 \times Rsgi[1] + 5 \times Gsgi[1] + Bsgi[1])/8$$
$$= (2 \times 185 + 5 \times 229 + 141)/8$$
$$= 207.$$

This shows that the luminance is retained.

Meanwhile, a case where color-saturation conversion is preformed after gamma correction is as follows.

First, performing gamma correction on the pixel value (R[1], G[1], B[1]) of the input image yields pixel values (Rg[1], Gg[1], Bg[1])=(99, 255, 16).

Next, such a relational expression of a that a backlight value that is obtained in cases where color-saturation conversion is preformed after gamma correction is not more than MAXw is represented by Formula (124) as follows:

$$\text{MAX}w=\max RGBgs-\min RGBgs \quad (124)$$

where $$\max RGBgs=\alpha \times \max RGBg+(1-\alpha)\times Yg[1], \text{ and}$$

$$\min RGBgs=\alpha \times \min RGBg+(1-\alpha)\times Yg[1].$$

Transforming Formula (124) yields:

$$\{\alpha \times \max RGBg+(1-\alpha)\times Yg[1]\}-\{\alpha \times \min RGBg+(1-\alpha)\times Yg[1]\}=\text{MAX}w$$

$$\therefore =\text{MAX}w/(\max RGBg-\min RGBg). \quad (125)$$

At this time, α is calculated from Formula (125) as follows:

$$a = \text{MAX}w/(\text{max}RGBg - \text{min}RGBg)$$
$$= 127.5/(255-16)$$
$$= 0.533473.$$

Performing color-saturation conversion yields pixel values (Rgs[1], Ggs[1], Bgs[1]) as follows:

$$Rgs[1] = a \times Rg[1] + (1-a) \times Yg[1] =$$
$$0.533473 \times 99 + (1-0.533473) \times 186.125 = 140$$
$$Ggs[1] = a \times Gg[1] + (1-a) \times Yg[1] =$$
$$0.533473 \times 223 + (1-0.533473) \times 186.125 = 223$$
$$Bgs[1] = a \times Bg[1] + (1-a) \times Yg[1] =$$
$$0.533473 \times 95 + (1-0.533473) \times 186.125 = 95.$$

The RGB corresponding values of the amounts of light that is outputted from (transmitted through) the display are identical to Rgs[1], Ggs[1], and Bgs[1], respectively. On the other hand, performing inverse gamma correction with a human eye yields RGB values (Rgs[i], Ggs[i], Bgs[i]) as follows:

$$Rgsi[1] = (Rgs[1]/\text{MAX})^{1/\gamma} \times \text{MAX} = (140/255)^{1/2} \times 255 = 189$$
$$Ggsi[1] = (Ggs[1]/\text{MAX})^{1/\gamma} \times \text{MAX} = (223/255)^{1/2} \times 255 = 238$$
$$Bgsi[1] = (Bgs[1]/\text{MAX})^{1/\gamma} \times \text{MAX} = (95/255)^{1/2} \times 255 = 156.$$

Therefore, the luminance Ygsi[1] is given by:

$$Ygsi[1] = (2 \times Rgsi[1] + 5 \times Ggsi[1] + Bgsi[1])/8$$
$$= (2 \times 189 + 5 \times 238 + 156)/8$$
$$= 215.5.$$

That is, the original luminance Y[1]=207 is not retained. Therefore, in order to retain the luminance, it is necessary to perform gamma correction after performing color-saturation conversion.

Embodiment 2

Embodiment 1 uses Formula (4) to judge for each target pixel whether or not it is necessary to reduce the color saturation. In this case, it is possible to perform a color-saturation conversion (color-saturation reduction) process only on a pixel that satisfies Formula (4), i.e., a pixel whose color saturation needs to be reduced, and to skip a color-saturation conversion process for a pixel that does not satisfy Formula (4), i.e., a pixel whose color saturation does not need to be reduced.

However, in consideration of realization of the color-saturation conversion section 11 by hardware, the hardware can be better simplified without such a skip process. Embodiment 2 describes a modified example where a color-saturation conversion process is performed on every pixel within an input image. It should be noted that processing sections identical to those of Embodiment 1 are given the same reference numerals as those of Embodiment 1 and will not be described below in detail.

In a process according to Embodiment 2, for a pixel that does not satisfy Formula (4), a deviates from a range of 0 to 1, depending on how α is calculated. In view of this, a limiter process is performed so that α is 0 or 1, with the same result as in the case where no color-saturation conversion is performed.

Figure 10:
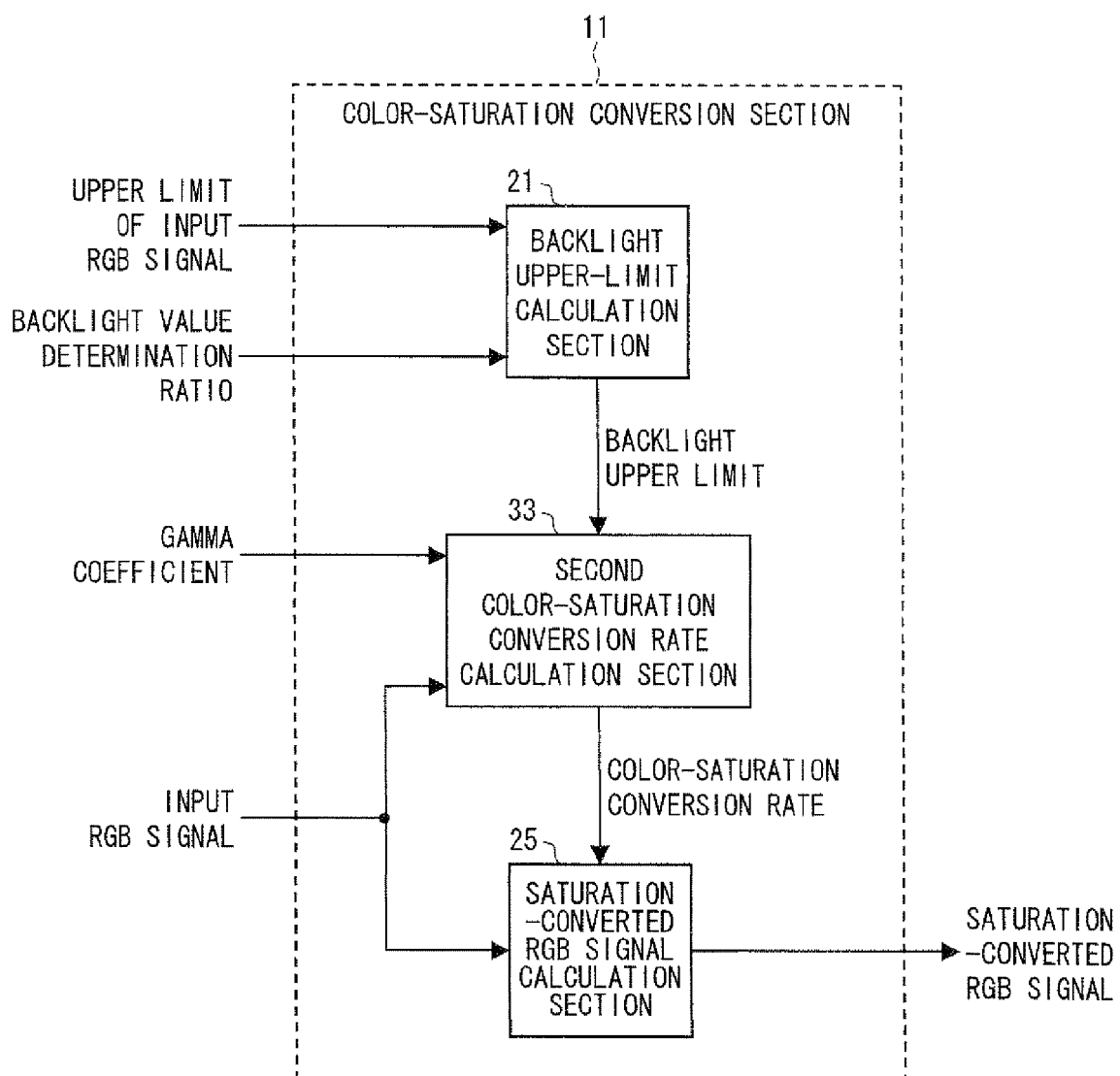
FIG. 10 is a block diagram showing an example arrangement of a color-saturation conversion section in Embodiment 2 of the liquid crystal display device.
Figure 11:
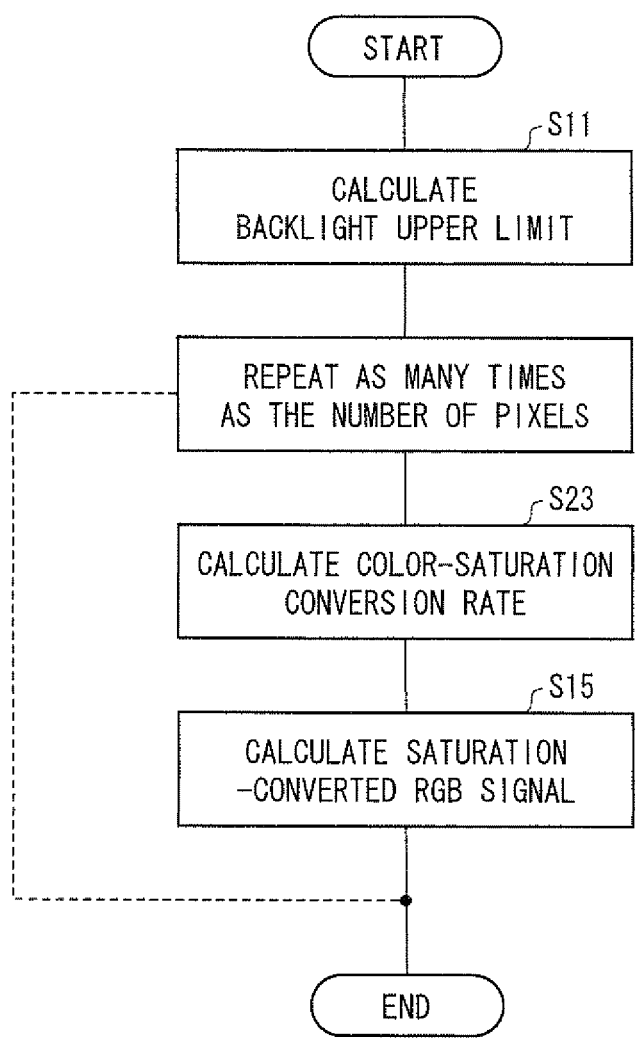
FIG. 11 is a flow chart showing a sequence of operations that are performed by the color-saturation conversion section of FIG. 10.

FIG. 10 shows an arrangement of a color-saturation conversion section 11 of a liquid crystal display device according to Embodiment 2. The color-saturation conversion section 11 includes a backlight upper-limit calculation section 21, a second color-saturation conversion rate calculation section 33, and a saturation-converted RGB signal calculation section 25. Further, FIG. 11 is a flow chart that explains the operation of the color-saturation conversion section 11.

First, the backlight upper-limit calculation section 21 calculates a backlight upper limit according to Formula (1) (S11).

Next, the second color-saturation conversion rate calculation section 33 calculates, from the input KGB signal, the gamma coefficient, and the backlight upper limit, a color-saturation conversion rate α that satisfies Formula (5) (S23). How to calculate a color-saturation conversion rate α will be fully described below in each of Embodiments 4 to 13.

Next, the saturation-converted RGB signal calculation section 25 calculates a saturation-converted RGB signal according to Formulae (6) to (8) (S15). Steps S23 and S15 are repeated as many times as the number of pixels of the input RGB signal.

Figure 12:
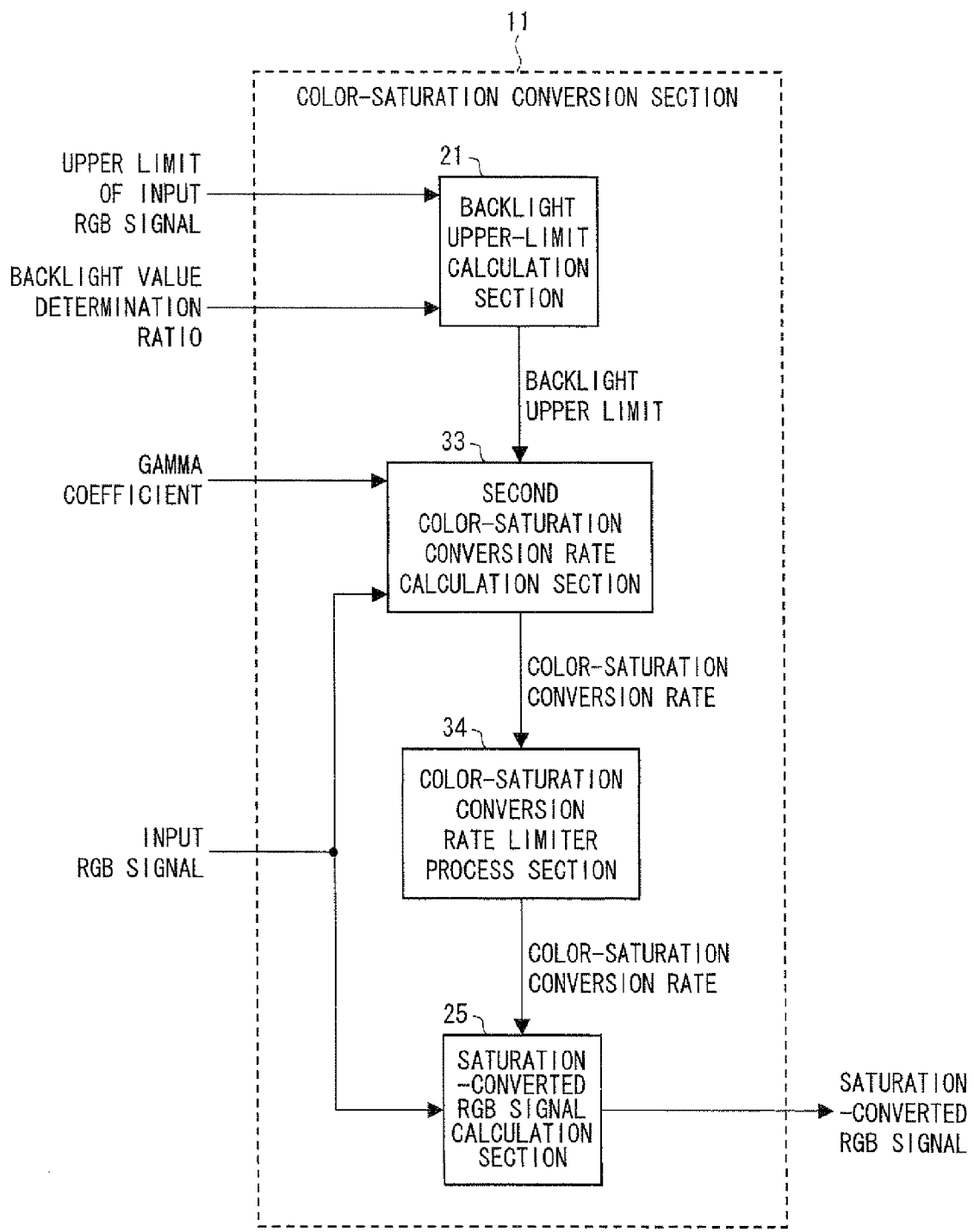
FIG. 12 is a block diagram showing another example arrangement of the color-saturation conversion section in Embodiment 2 of the liquid crystal display device.

FIG. 12 shows another arrangement of the color-saturation conversion section 11 of the liquid crystal display device according to Embodiment 2. The color-saturation conversions section 11 of FIG. 12 is arranged such that a color-saturation conversion rate limiter process section 34 is added so as to be positioned in front of the saturation-converted RGB signal calculation section 25 and behind the second color-saturation conversion rate calculation section 33. The color-saturation conversion rate limiter process section 34 performs a limiter process so that a color-saturation conversion rate α calculated by the second color-saturation conversion rate calculation section 33 falls within a range of not less than 0 to not more than 1.

Figure 13:
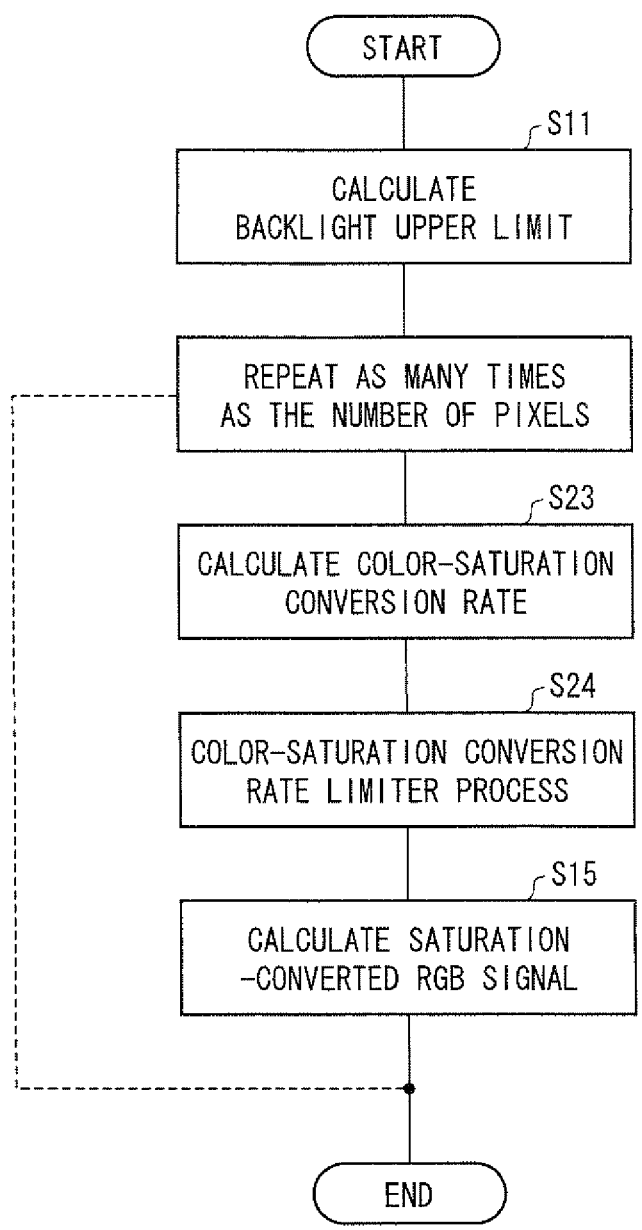
FIG. 13 is a flow chart showing a sequence of operations that are performed by the color-saturation conversion section of FIG. 12.

FIG. 13 is a flow chart for explaining the operation of the color-saturation conversion section 11 of FIG. 12. The flow chart of FIG. 13 is obtained by adding a color-saturation conversion rate limiter process S24 to the flow chart of FIG. 11 so that Step S24 immediately follows Step S23.

According to the flow chart of FIG. 13, after the calculation of a color-saturation conversion rate α by the second color-saturation conversion rate calculation section 33 (S23), the color-saturation conversion rate limiter process section 34 makes such a correction that α=0 when α<0 or α=1 when 1<α (S24).

However, in cases where it is obvious in the color-saturation conversion process (S23) that α is not less than 0, it is possible to omit a process of judging whether α<0 and the limiter process. Similarly, in cases where it is obvious in the color-saturation conversion process (S23) that α is not greater than 1, it is possible to omit a process of judging whether 1<α and the limiter process.

The following shows an example of calculation of a backlight value according to Embodiment 2. For convenience of explanation, the following shows an example where an image constituted by a single pixel is inputted and the input image has pixel values (R[1], G[1], B[1])=(159, 255, 63) (first example of calculation). That is, the following shows an example where the same pixel values are used as in the example of calculation of a backlight value according to Embodiment 1. It should be noted that the following explanation assumes that a color-saturation conversion rate limiter process is performed, and that MAX=255, γ=2, and B1 Ratio=0.5.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner.

First, the calculation of a backlight upper limit is performed in the same manner as in the example explained in Embodiment 1. Accordingly, the backlight upper limit MAXw is set as MAXw 127.5.

Since Embodiment 2 does not judge whether or not it is necessary to reduce the color saturation, Embodiment 2 calculates a color-saturation conversion rate α for every pixel. In this example, the color-saturation conversion rate α is calculated in the same manner as in the example explained in Embodiment 1. Therefore, α=0.457575 or α=3.854925. However, the present example of calculation adopts the smaller value. Therefore, α=0.457575.

In this case, since $0 \leq \alpha \leq 1$, α after the limiter process is calculated as α=0.457575. The subsequent procedure up to the calculation of a backlight value is the same as in the example explained in Embodiment 1. Accordingly, the backlight value is 128. That is, the color-saturation conversion process can reduce the backlight value from 239 to 128 (reduction of approximately 46%).

The example of calculation thus explained is an example where the second color-saturation conversion rate calculation section 33 calculates a color-saturation conversion rate α as $0 \leq \alpha \leq 1$. The following shows an example (second example of calculation) where the second color-saturation conversion rate calculation section 33 does not calculate a color-saturation conversion rate α as $0 \leq \alpha \leq 1$. For convenience of explanation, the following shows an example where an image constituted by a single pixel is inputted and the input image has pixel values (R[1], G[1], B[1])=(159, 187, 85). It should be noted that the following explanation assumes that a color-saturation conversion rate limiter process is performed, and that MAX=255, γ=2, and B1 Ratio=0.5.

First, in cases where no color-saturation conversion process is performed, a backlight value is calculated in the following manner. Performing gamma correction on the pixels values of the input image yields gamma-corrected pixel values (Rg[1], Gg[1], Bg[1]) as follows:

$$Rg[1] = (R[1]/MAX)^\gamma \times MAX = (159/255)^2 \times 255 = 99$$

$$Gg[1] = (G[1]/MAX)^\gamma \times MAX = (187/255)^2 \times 255 = 137$$

$$Bg[1] = (B[1]/MAX)^\gamma \times MAX = (85/255)^2 \times 255 = 28.$$

Based on the gamma-corrected pixel values, the W transmission amount Wtg[1] is calculated as:

$$Wtg[1] = \min(maxRGBg/2, minRGBg)$$

-continued
$$= \min(137/2, 28) = 28.$$

Further, at this time, the RGB transmission amounts (Rtg[1], Gtg[1], Btg[1]) are given by:

$$Rtg[1] = Rg[1] - Wtg[1] = 99 - 28 = 71$$

$$Gtg[1] = Gg[1] - Wtg[1] = 137 - 28 = 109$$

$$Btg[1] = Bg[1] - Wtg[1] = 28 - 28 = 0.$$

From the RGBW transmission amounts, a backlight value Wbg is calculated as:

$$Wbg = \max(Rtg[1], Gtg[1], Btg[1], Wtg[1])$$
$$= \max(17, 109, 0, 28) = 109.$$

That is, the backlight value obtained in cases where no color-saturation conversion process is performed is 109.

On the other hand, in cases where a color-saturation conversion process is performed, a backlight value is calculated in the following manner. First, a backlight upper limit is calculated. This calculation is performed in the same manner as in the example explained in Embodiment 1. Accordingly, the backlight upper limit MAXw is calculated as MAXw=127.5.

Since Embodiment 2 does not judge whether or not it is necessary to reduce the color saturation, Embodiment 2 calculates a color-saturation conversion rate α for every pixel. At this time, the color-saturation conversion rate α is calculated in the following manner. First, the luminance Y[1] corresponding to the input pixel values is calculated as:

$$Y[1] = (2 \times R[1] + 5 \times G[1] + B[1])/8$$
$$= ((2 \times 159 + 5 \times 187 + 85)/8$$
$$= 167.25.$$

Substituting MAX=255, γ=2, maxRGB=187, minRGB 85, Y[1]=167.25, and MAXw=127.5 in Formula (5) yields:

$$fg(\alpha \times 187 + (1-\alpha) \times 167.25, 2) - fg(\alpha \times 85 + (1-\alpha) \times 167.25, 2) = 127.5.$$

Solving this formula yields a color-saturation conversion rate α as follows:

$$\{(\alpha \times 187 + (1-\alpha) \times 167.25)/255\}^2 \times 255 -$$
$$\{(\alpha \times 85 + (1-\alpha) \times 167.25)/255\}^2 \times 255 = 127.5$$
$$\{(\alpha \times 187 + (1-\alpha) \times 167.25)\}^2 - \{(\alpha \times 85 + (1-\alpha) \times 167.25)\}^2 = 32512.5$$
$$(19.75 \times \alpha + 167.25)^2 - (-82.25 \times \alpha + 167.25)^2 = 32512.5$$
$$390.06 \times \alpha^2 + 6606.4 \times \alpha + 27973 -$$
$$6765.1 \times \alpha^2 + 27512 \times \alpha - 27973 = 32512.5$$
$$-6375.0 \times \alpha^2 + 2 \times 17059 \times \alpha - 32512.5 = 0.$$

Applying the formula for the solution of a quadratic equation to this formula yields:

$$\alpha = -17059 \pm \sqrt{\{(-17059)^2 - (-6375.0) \times (-32512.5)\}} / (-6375.0)$$

Therefore, α=1.240458 or α=4.11139. The present example of calculation adopts the smaller value. Therefore, α=1.240458. In this example, since α exceeds 1, a limiter process is performed so that α=1.

Thus, in cases where α=1, there are no differences in RGB values between before and after color-saturation conversion according to Formulae (6) to (8), with the same result as in the case where no color-saturation conversion (color-saturation reduction) is performed.

That is, in cases where a backlight value obtained in cases where no color-saturation conversion is performed falls short of a backlight upper limit, no color-saturation conversion is needed. Also in the present example of calculation, no color-saturation conversion is performed. Accordingly, the backlight value is 109 as in the case where no color-saturation conversion is performed.

Embodiment 3

Figure 38:
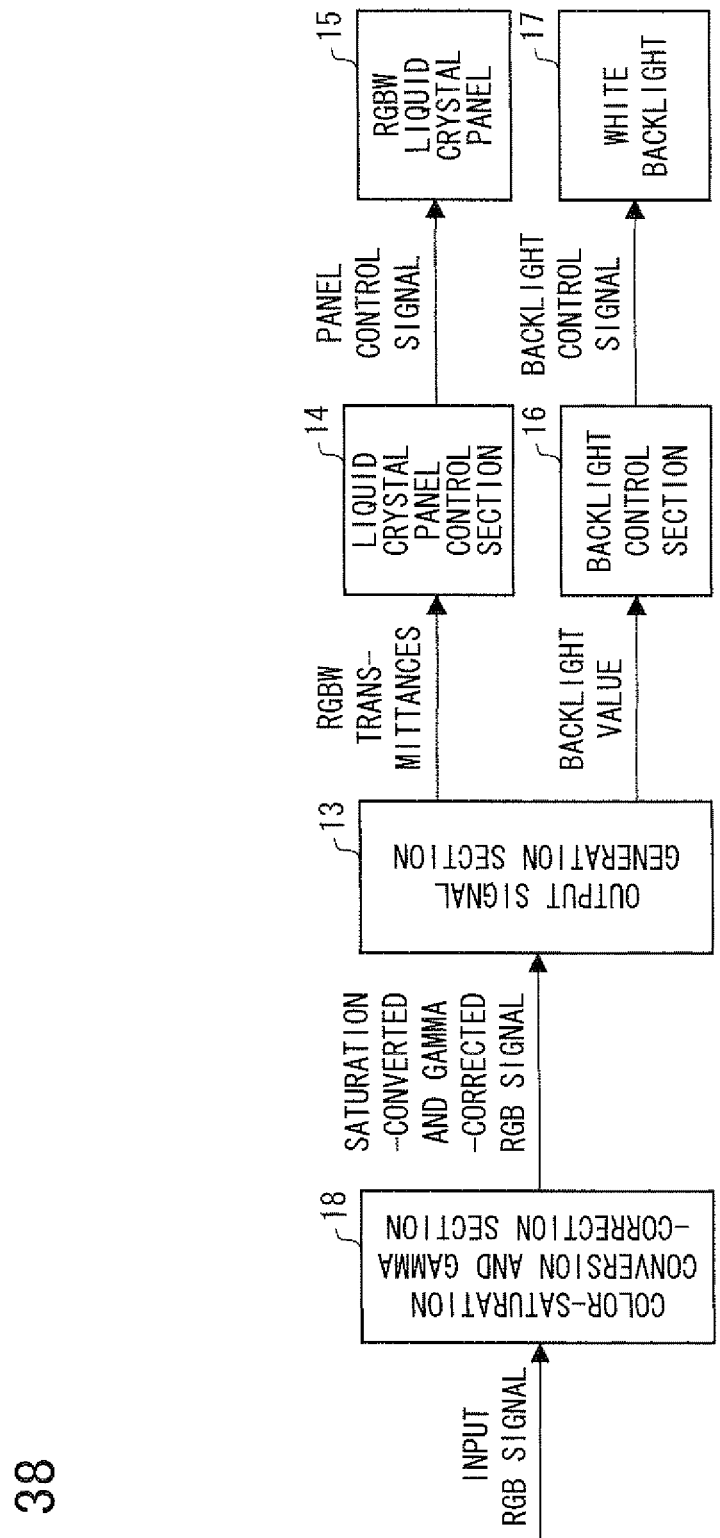
FIG. 38 is a block diagram showing an arrangement of a main part of a liquid crystal display device according to another embodiment of the present invention.

Embodiment 3 is a modified example of Embodiment 1. FIG. 38 schematically shows an arrangement of a liquid crystal display device according to Embodiment 3. That is, the present liquid crystal display device includes a color-saturation conversion and gamma-correction section (color-saturation conversion section) 18 instead of the color saturation conversion section 11 and the gamma-correction section 12 of the liquid crystal display device (see FIG. 1) according to Embodiment 1.

The color-saturation conversion and gamma-correction section 18 performs a color-saturation conversion process and a gamma-correction process on an input RGB signal (first input RGB signal), and then outputs, to the subsequent output signal generation section 13, a saturation-converted and gamma-corrected RGB signal finished with the processes. It should be noted that the saturation-converted and gamma-corrected RGB signal outputted from the color-saturation conversion and gamma-correction section 18 in Embodiment 3 correspond to the gamma-corrected RGB signal (third input KGB signal) of Embodiment 1.

Figure 39:
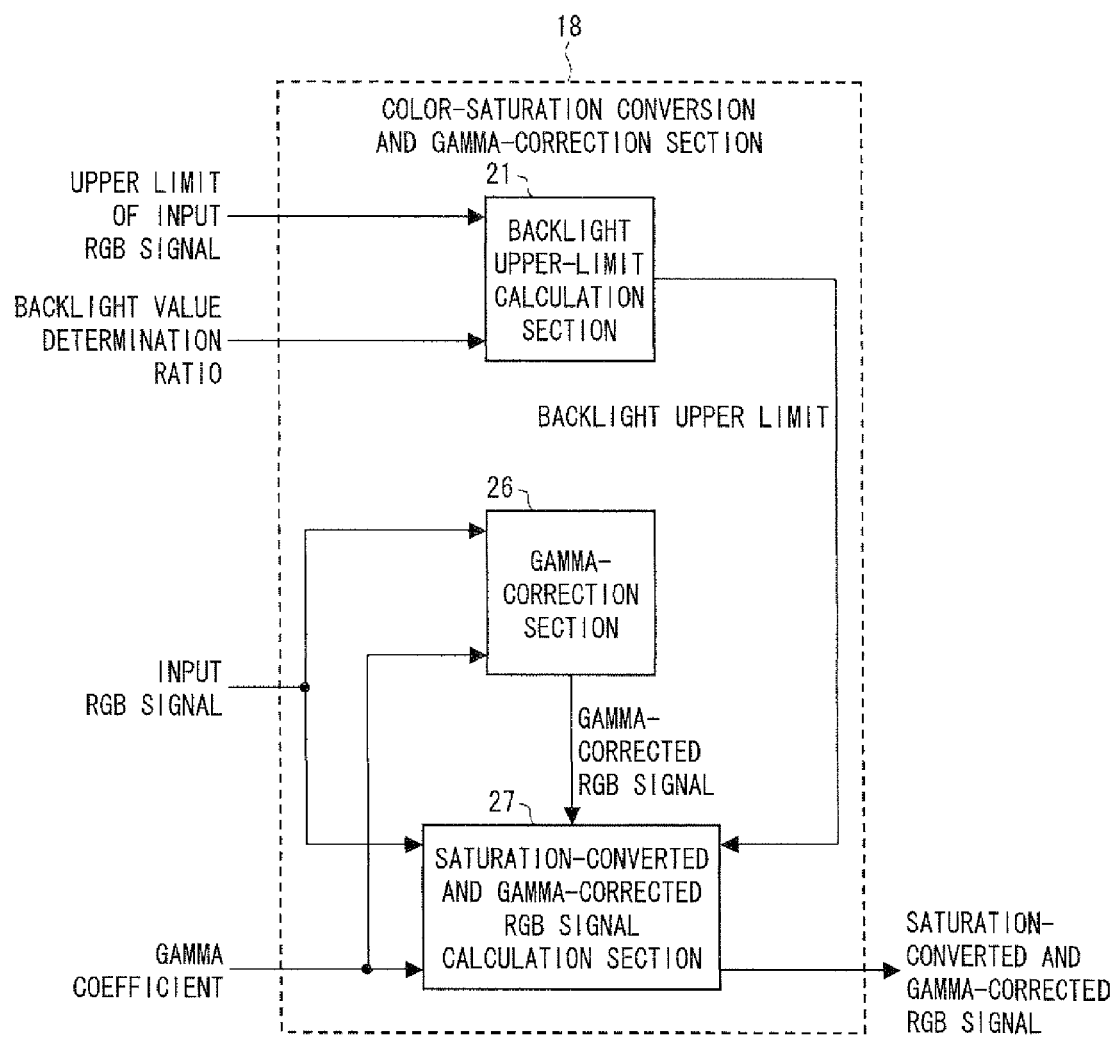
FIG. 39 is a block diagram showing an example arrangement of a color-saturation conversion and gamma-correction section in Embodiment 3 of the liquid crystal display device.

FIG. 39 shows an arrangement of the color-saturation conversion and gamma-correction section 18 of the liquid crystal display device according to Embodiment 3. The color-saturation conversion and gamma-correction section 18 includes a backlight upper-limit calculation section 21, a gamma-correction section 26, and a saturation-converted and gamma-corrected RGB signal calculation section 27.

The backlight upper-limit calculation section 21 calculates a backlight upper limit from the upper limit of the input RGB signal and the backlight value determination ratio, and then outputs the backlight upper limit. The gamma-correction section 26 calculates a gamma-corrected RGB signal from the input RGB signal and the gamma coefficient, and then outputs the gamma-corrected RGB signal. The saturation-converted and gamma-corrected RGB signal calculation section 27 calculates a saturation-converted and gamma-corrected RGB signal from the input RGB signal, the gamma coefficient, the gamma-corrected RGB signal, and the backlight upper limit, and then outputs the saturation-converted and gamma-corrected RGB signal.

Figure 40:
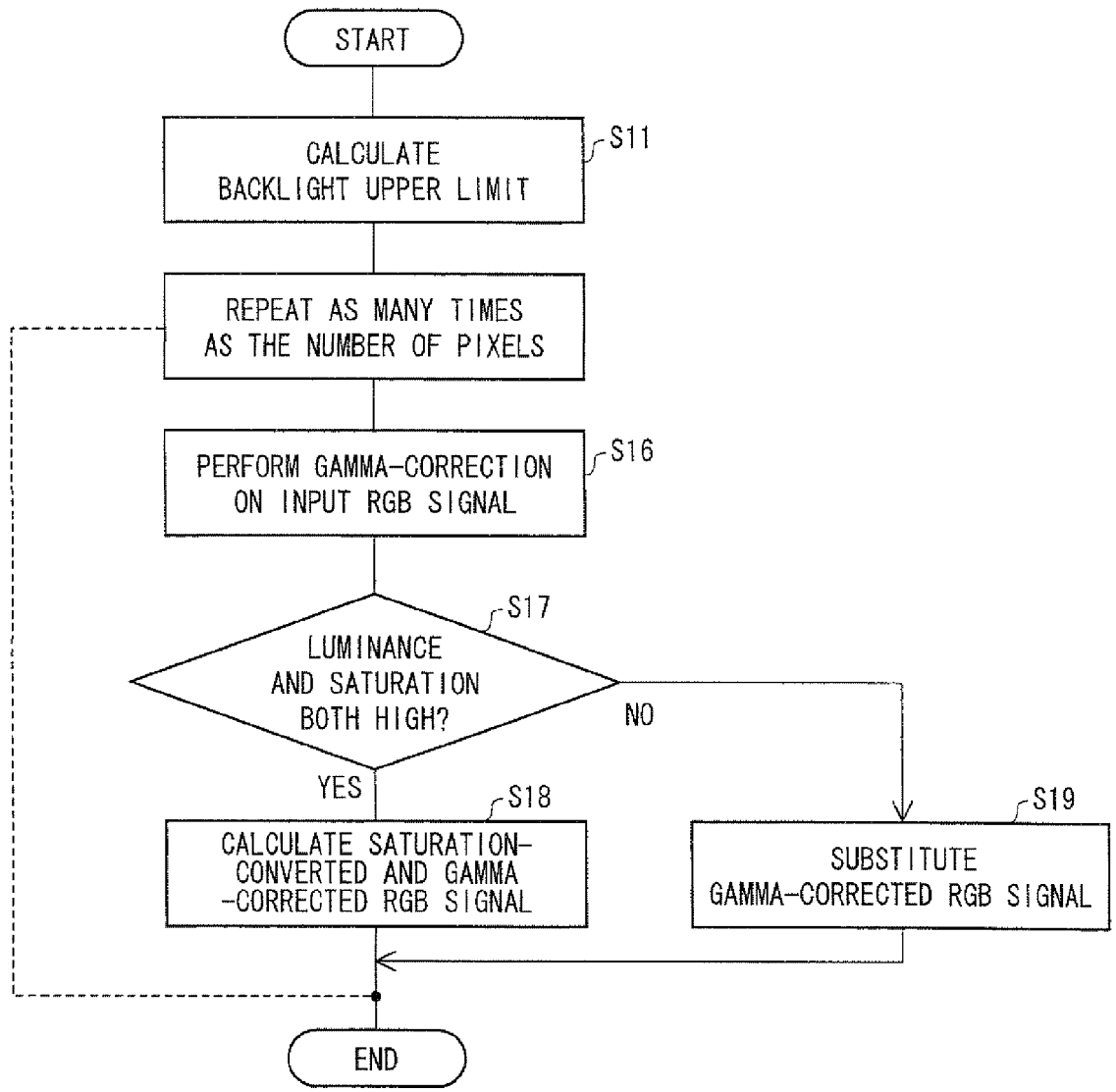
FIG. 40 is a flow chart showing a sequence of operations that are performed by the color-saturation conversion and gamma-correction section of FIG. 39.
Figure 41:
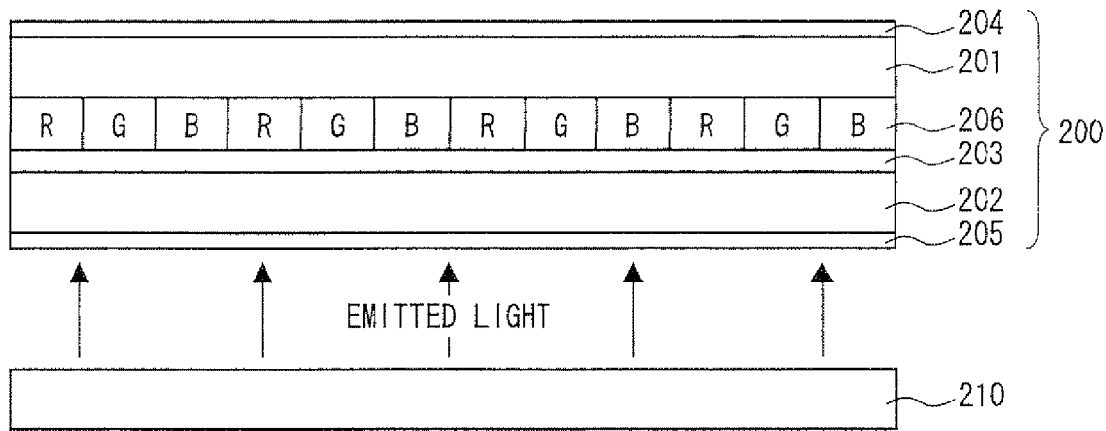
FIG. 41 is a cross-sectional view of a typical arrangement of a transmissive liquid crystal display device.
Figure 42:
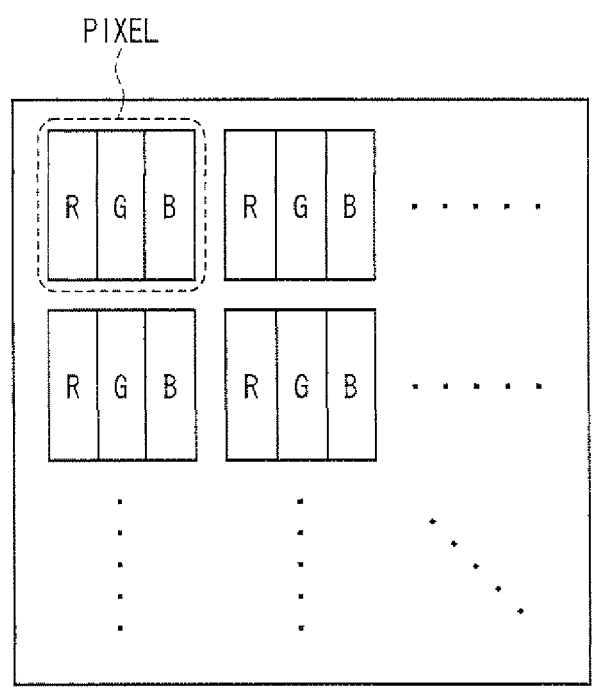
FIG. 42 shows a typical example arrangement of subpixels in the transmissive liquid crystal display device.

FIG. 40 is a flow chart for explaining the operation of the color-saturation conversion and gamma-correction section 18.

First, the backlight upper-limit calculation section 21 calculates a backlight upper limit according to Formula (1) (S11).

Once the backlight upper limit MAXw is determined, Steps S16 to S19 are repeated as many times as the number of pixels of the input RGB signal.

In Step 16, the gamma-correction section 26 calculates an RGB signal (Rg[i], Gg[i], Bg[i]) that is obtained after gamma correction in a target pixel (to be processed). The calculation of the gamma-corrected RGB signal can be performed according to Formulae (101) to (103).

Then, in Step S17, the saturation-converted and gamma-corrected RGB signal calculation section 27 judges, according to Formula (4), whether or not the luminance and color saturation of the target pixel (to be processed) are both high. It should be noted here that although Embodiment 1 calculates the maximum and minimum values maxRGBg and minRGBg of the gamma-corrected RGB signal for use in Formula (4) from Formulae (2) and (3), Embodiment 3 can calculate maxRGBg and minRGBg with use of the gamma-corrected RGB signal as follows:

max*RGBg*=max(*Rg[i],Gg[i],Bg[i]*)

min*RGBg*=min(*Rg[i],Gg[i],Bg[i]*).

In cases where the luminance and the color saturation are both high, i.e., in cases where Formula (4) is satisfied, the same saturation-converted and gamma-corrected RGB signal calculation section 27 calculates a color-saturation conversion rate α that satisfies Formula (5), and then calculates a saturation-converted and gamma-corrected RGB signal with use of a thus calculated (S18). It should be noted that the saturation-converted and gamma-corrected RGB signal is calculated by calculating a saturation-converted RGB signal (second input RGB signal) according to Formulae (6) to (8) and by further performing gamma correction on the saturation-converted RGB signal.

Alternatively, in cases where either the luminance or the color saturation is low, i.e., in cases where Formula (4) is not satisfied, the same saturation-converted and gamma-corrected RGB signal calculation section 27 uses the following formulae to cause the saturation-converted and gamma-corrected RGB signal (Rsg[i], Gsg[i], Bsg[i]) to be identical to the gamma-corrected RGB signal calculated in Step S16 (no color-saturation conversion process is performed) (S19);

*Rsg[i]=Rg[i]*

*Gsg[i]=Gg[i]*

*Bsg[i]=Bg[i]*.

In comparison with Embodiment 1, the arrangement and processing procedure of Embodiment 3 bring about a merit of simplifying a process for a pixel that does not satisfy Formula (4), i.e., for a pixel on which no color-saturation conversion is performed.

That is, in the process of judging a pixel on which to perform a color-saturation conversion process, the color-saturation conversion section 11 according to Embodiment 1 calculates, for every pixel, an RGB signal (Rg[i], Gg[i] Bg[i]) that is obtained after gamma correction in cases where no color-saturation conversion process is performed. The gamma-corrected RGB signal is calculated in the process by which the calculation section 22 calculates the maximum and minimum values of the gamma-corrected RGB signal.

Then, for a pixel on which no color-saturation conversion process is performed, the input RGB signal is directly outputted to the gamma-correction section 12, and the gamma-correction section 12 calculates a gamma-corrected RGB signal. Therefore, for a pixel on which no color-saturation conversion process is performed, the calculation section 22 and the gamma-correction section 12 perform exactly the same gamma-correction process once each.

On the other hand, for a pixel on which no color-saturation conversion process is performed, the color-saturation conversion and gamma-correction section 18 according to Embodiment 3 only causes the saturation-converted and gamma-corrected RGB signal to be identical to the gamma-corrected RGB signal calculated by the gamma-correction section 26. This makes it necessary to perform a gamma-correction process only once. Therefore, the arrangement of Embodiment 3 makes it possible to simplify hardware configurations in comparison with Embodiment 1 in judging for each pixel whether or not it is necessary to perform a color-saturation conversion process.

As stated in Embodiment 1, the color-saturation conversion process explained in each of Embodiments 1 to 3 makes it necessary that, in the process, such a value of color-saturation conversion rate α that the backlight value becomes MAXw be derived by solving Formula (5). However, Formula (5) is a nonlinear equation. Accordingly, it is conceivable that Formula (5) may be solved with use of an approximation method. Each of Embodiments 4 to 13 below explains an example of how to calculate a color-saturation conversion rate α for use in a color-saturation conversion process.

Further, each of Embodiments 4 to 13 below is an exemplification of application of the arrangement of Embodiment 1 in an example where it is judged whether or not it is necessary to perform a color-saturation conversion process. However, each of Embodiments 4 to 13 below can also be applied as a method for calculating a color-saturation conversion rate α in the arrangement of Embodiment 3.

Embodiment 4

Embodiment 4 is a first example of means for approximately calculating a color-saturation conversion rate α in the first color-saturation conversion rate calculation section 23 (S13) of Embodiment 1.

In Embodiment 1, in cases where Formula (4) is satisfied, it is necessary to calculate a color-saturation conversion rate α according to Formula (5). However, Formula (5) is a non-linear equation, and therefore cannot by easily calculated. Accordingly, in Embodiment 4, α is calculated by performing piecewise linear approximation of a gamma correction curve. It should be noted that processing sections identical to those of Embodiment 1 are given the same reference numerals as those of Embodiment 1 and will not be described below in detail.

Figure 14:
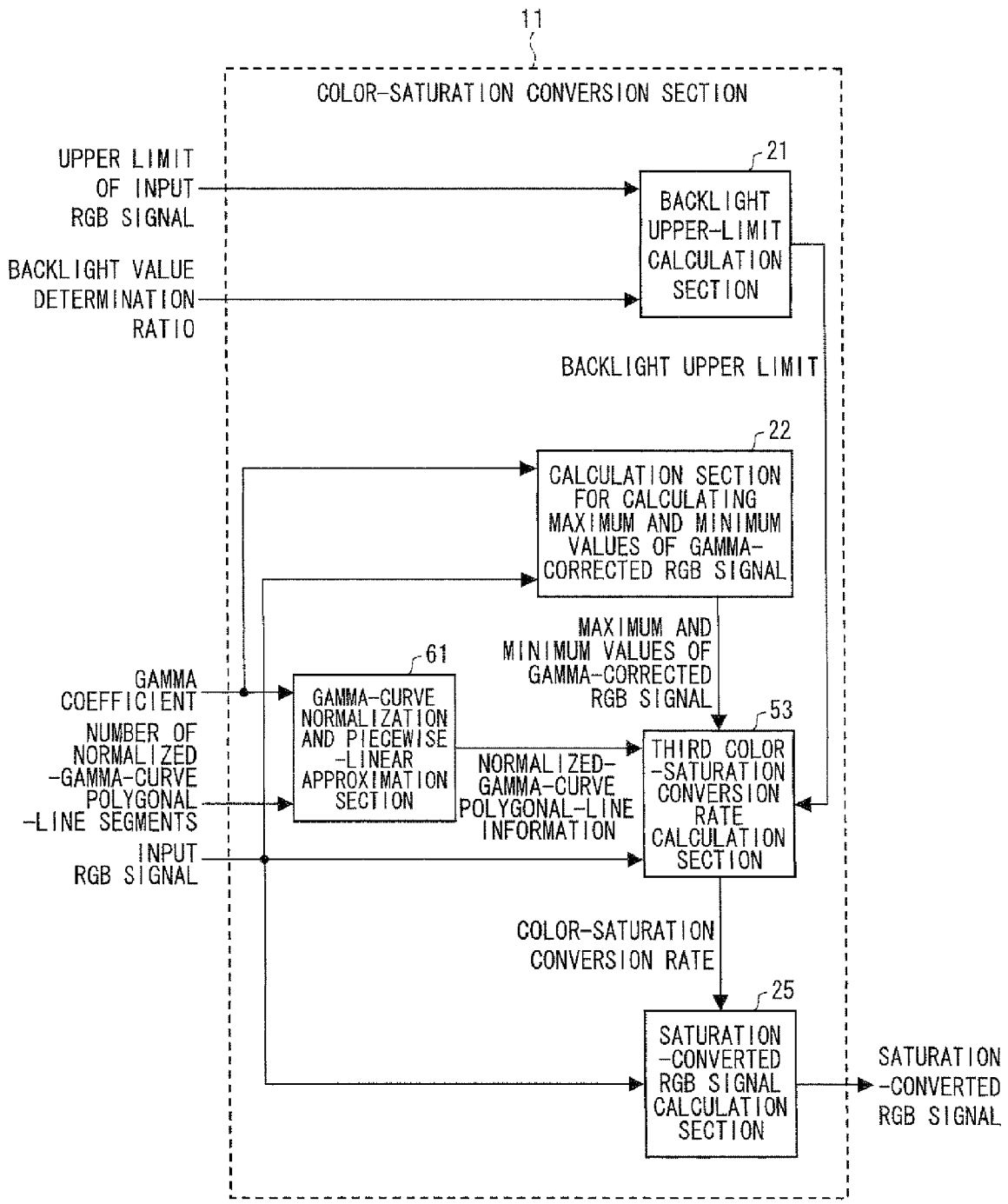
FIG. 14 is a block diagram showing an example arrangement of a color-saturation conversion section in Embodiment 4 of the liquid crystal display device.

FIG. 14 shows an arrangement of a color-saturation conversion section 11 of a liquid crystal display device according to Embodiment 4. The color-saturation conversion section 11 of FIG. 14 includes a backlight upper-limit calculation section 21, a calculation section 22 for calculating the maximum and minimum values of a gamma-corrected RGB signal, a third color-saturation conversion rate calculation section 53, a gamma-curve normalization and piecewise-linear approximation section 61, and a saturation-converted RGB signal calculation section 25.

The gamma-curve normalization and piecewise-linear approximation section 61 serves as means for calculating normalized-gamma-curve polygonal-line information from the gamma coefficient and the number of normalized-gamma-curve polygonal-line segments, and for outputting the normalized-gamma-curve polygonal-line information. The normalized-gamma-curve polygonal-line information is a tabulation of data, obtained when piecewise linear approximation of a normalized gamma curve (i.e., a gamma curve that shows an output value of 1 with an input value of 1) is performed as many times as the number of normalized-gamma-curve polygonal-line segments, which indicate the x-y coordinates of an endpoint of each segment and the slope and intercept of each segment.

Figure 15:
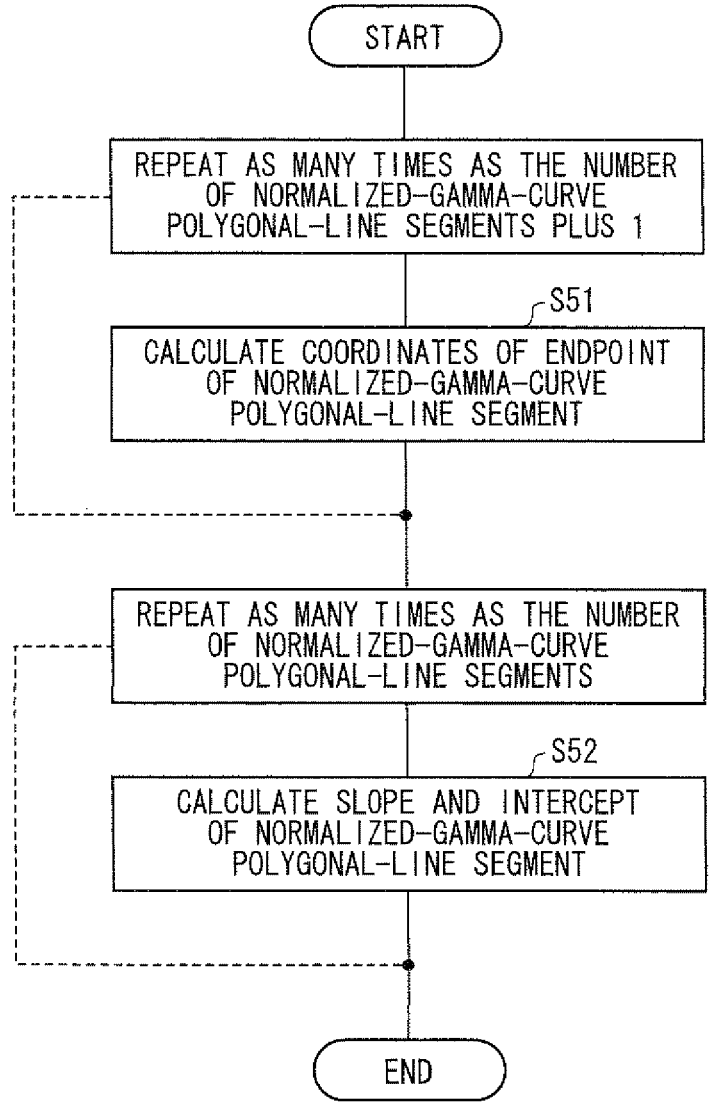
FIG. 15 is a flow chart showing a sequence of operations that are performed by a gamma-curve normalization and piecewise-linear approximation section of the color-saturation conversion section of FIG. 14.

FIG. 15 is a flow chart that explains the operation of the gamma-curve normalization and piecewise-linear approximation section 61. First, the gamma-curve normalization and piecewise-linear approximation section 61 calculates the coordinates of an endpoint of each normalized-gamma-curve polygonal-line segment according to Formulae (9) and (10) by repeating j from 0 to Ndg (S51):

$$x[j]=j/Ndg \qquad (9)$$

$$y[j]=x[j]^t \qquad (10)$$

where

Ndg=the number of normalized-gamma-curve polygonal-line segments (>0), x[j]=the x coordinate of an endpoint of a normalized-gamma-curve polygonal-line segment (0≦j≦Ndg), and y[j]=the y coordinate of an endpoint of a normalized-gamma-curve polygonal-line segment (0≦j≦Ndg). That is, Step S51 is repeated as many times as the number of normalized-gamma-curve polygonal-line segments plus 1.

Next, the gamma-curve normalization and piecewise-linear approximation section 61 calculates the slope a[j] and intercept b[j] of each normalized-gamma-curve polygonal-line segment according to Formulae (11) and (12) by repeating j from 0 to Ndg−1 (S52):

$$a[j]=(y[j+1]-y[j])/(x[j-1]-x[j]) \qquad (11)$$

$$b[j]=(x[j+1] \times y[j]-x[j] \times y[j+1])/(x[j+1]-x[j]) \qquad (12)$$

where a[j]=the slope of a normalized-gamma-curve polygonal-line segment j (0≦j<Ndg), and b[j]=the intercept of a normalized-gamma-curve polygonal-line segment j (0≦j<Ndg). That is, Step S52 is repeated as many times as the number of normalized-gamma-curve polygonal-line segments.

The third color-saturation conversion rate calculation section 53 calculates a color-saturation conversion rate α from an input RGB signal, a backlight upper limit, the maximum and minimum values of a gamma-corrected RGB signal, and normalized-gamma-curve polygonal-line information, and then outputs the color-saturation conversion rate α.

Figure 16:
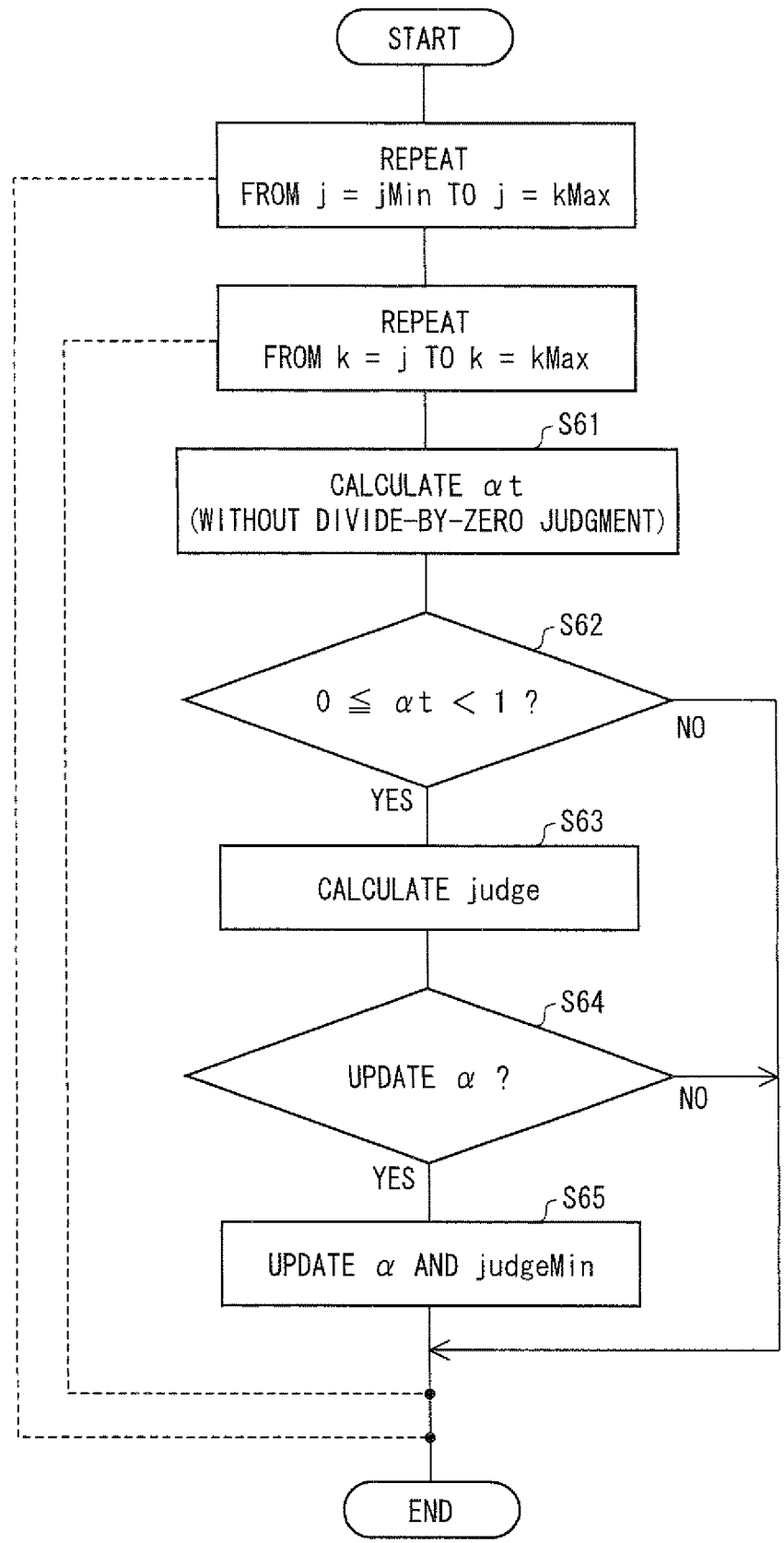
FIG. 16 is a flow chart showing a sequence of operations that are performed by a third color-saturation conversion rate calculation section of the color-saturation conversion section of FIG. 14.

FIG. 16 is a flow chart that explains the operation of the third color-saturation conversion rate calculation section 53.

According to the flow chart, Steps S61 to S65 are repeated from j=jMin to j=kMax, and further repeated from k=j to k=kMax.

It should be noted here that jMin is a normalized-gamma-curve polygonal-line segment index corresponding to min RGB, and is an array element number of x[j] that satisfies x[jMin]≦minRGB/MAX<x[jMin+1]. Meanwhile, kMax is a normalized-gamma-curve polygonal-line segment index corresponding to maxRGB, and is an array element number of x[k] that satisfies x[kMax]<maxRGB/MAX≦x[kMax+1]. Further, between jMin and kMax, the following relationship holds:

$$0 \leq j\text{Min} \leq k\text{Max} < Ndg.$$

First, in Step S61, the third color-saturation conversion rate calculation section 53 calculates an α candidate value (αt) according to Formula (13):

$$\alpha t = \{\text{MAX}w - (a[k] - a[j]) \times Y[i] - (b[k] - b[j]) \times \text{MAX}\} / \qquad (13)$$
$$\{a[k] \times (\text{maxRGB} - Y[i]) - a[j] \times (\text{minRGB} - Y[i])\}.$$

Next, the third color-saturation conversion rate calculation section 53 judges whether or not the α candidate value αt falls within a range of 0≦αt<1 (S62). If the α candidate value αt falls within the range, the third color-saturation conversion rate calculation section 53 proceeds to Step S63. If the α candidate value αt goes out of the range, the third color-saturation conversion rate calculation section 53 skips Steps S63 to S65.

In cases where the α candidate value αt falls within a range of 0≦αt<1, the third color-saturation conversion rate calculation section 53 calculates an α calculation judgment value (judge) according to Formula (14) (S63):

$$\text{judge} = |fg(\alpha t \times \text{maxRGB} + (1 - \alpha t) \times Y[i], \gamma) - \qquad (14)$$
$$fg(\alpha t \times \text{minRGB} + (1 - \alpha t) \times Y[i], \gamma) - \text{MAX}w|.$$

Next, the third color-saturation conversion rate calculation section 53 judges whether or not to update α (S64). However, in cases where the third color-saturation conversion rate calculation section 53 judges for the first time whether or not to update α or in cases where Judge<judgeMin, the third color-saturation conversion rate calculation section 53 proceeds to Step S65, and updates α and the minimum α calculation judgment value (judgeMin) according to Formulae (15) and (16):

$$\alpha = \alpha t \qquad (15)$$

$$\text{judgeMin} = \text{judge} \qquad (16)$$

where judgeMin=the minimum α calculation judgment value.

The following explains how to derive a calculating formula in each step.

In order to calculate α from Formula (5), approximation of a gamma correction function fg(x,g) is performed with a polygonal line. The approximation formula is represented by Formula (126) as follows:

$$fg(x, g) \approx (a[j] \times (x/\text{MAX}) \qquad (126)$$
$$= a[j] \times x + b[j]) \times \text{MAX} + b[j] \times \text{MAX}.$$

Solving Formula (5) to which Formula (126) has been applied yields α as follows:

$$(a[k\text{Max}s] \times (\alpha \times \text{maxRGB} + (1 - \alpha) \times Y[i]) + b[k\text{Max}s] \times \text{MAX}) -$$
$$(a[j\text{Min}s] \times (\alpha \times \text{minRGB} + (1 - \alpha) \times Y[i]) + b[j\text{Min}s] \times \text{MAX}) =$$
$$\text{MAX}w$$

$$(a[k\text{Max}s] \times (\alpha \times (\text{maxRGB} - Y[i]) + Y[i]) + b[k\text{Max}s] \times \text{MAX}) -$$
$$(a[j\text{Min}s] \times (\alpha \times \text{minRGB} - Y[i] + Y[i]) + b[j\text{Min}s] \times \text{MAX}) =$$
$$\text{MAX}w$$

$$\alpha \times a[k\text{Max}s] \times (\text{maxRGB} - Y[i]) + a[k\text{Max}s] \times Y[i] +$$
$$b[k\text{Max}s] \times \text{MAX} - \alpha \times a[j\text{Min}s] \times (\text{minRGB} - Y[i]) -$$
$$a[j\text{Min}s] \times Y[i] - b[j\text{Min}s] \times \text{MAX} = \text{MAX}w$$

$$\alpha \times (a[k\text{Max}s] \times (\text{maxRGB} - Y[i]) - a[j\text{Min}s] \times (\text{minRGB} - Y[i])) +$$
$$(a[k\text{Max}s] - a[j\text{Min}s]) \times Y[i] +$$
$$(b[k\text{Max}s] - b[j\text{Min}s]) \times \text{MAX} = \text{MAX}w$$

$$\alpha \times (a[k\text{Max}s] \times (\text{maxRGB} - Y[i]) - a[j\text{Min}s] \times (\text{minRGB} - Y[i])) =$$
$$\text{MAX}w - (a[k\text{Max}s] - a[j\text{Min}s]) \times Y[i] - (b[k\text{Max}s] - b[j\text{Min}s]) \times \text{MAX}.$$

Thus, α is given by Formula (127) as follows:

$$\alpha = \{\text{MAX}w - (a[k\text{Max}s] - a[j\text{Min}s]) \times Y[i] - \qquad (127)$$
$$(b[k\text{Max}s] - b[j\text{Min}s]) \times \text{MAX}\} /$$
$$\{a[k\text{Max}s] \times (\text{maxRGB} - Y[i]) - a[j\text{Min}s] \times (\text{minRGB} - Y[i])\}$$

where
jMins=the normalized-gamma-curve polygonal-line segment index corresponding to minRGBs, and
kMaxs=the normalized-gamma-curve polygonal-line segment index corresponding to maxRGBs.

Then, based on the magnitude relation between minRGBs and maxRGBs, Formula (128) holds as follows:

$$j\text{Min}s \leq k\text{Max}s. \qquad (128)$$

Furthermore, since the color-saturation conversion (reduction) process causes an increase in minRGB and a reduction in maxRGB, Formulae (129) and (130) hold as follows:

$$\text{minRGB} < \text{minRGB}s \qquad (129)$$

$$\text{maxRGB}s < \text{maxRGB}. \qquad (130)$$

Based on Formulae (129) and (130), Formulae (131) and (132) hold as follows:

$$j\text{Min} \leq j\text{Min}s \qquad (131)$$

$$k\text{Max}s \leq k\text{Max}. \qquad (132)$$

The values of jMins and kMaxs are unknown. Therefore, based on Formulae (128), (131), and (132), the third color-saturation conversion rate calculation section 53 calculates, according to Formula (13) derived from Formula (127), an α candidate value for every j and k that satisfies Formula (133) (S61):

$$j\text{Min} \leq j \leq k \leq k\text{Max}. \qquad (133)$$

However, the third color-saturation conversion rate calculation section 53 excludes an α candidate value that deviates from a range of 0≦αt−1 (S62). Among the α candidate values thus calculated, an α candidate value that satisfies Formula (5) becomes a desired value of α. However, since there occurs an error due to piecewise linear approximate, such an α candidate value that the α calculation judgment value of Formula (14) derived from Formula (5) is minimized is set as a desired value of α (S63 to S65).

The following shows an example of calculation a backlight value according to Embodiment 4. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255, γ=2, Ndg=16, and B1 Ratio=0.5.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner. First, normalized-gamma-curve polygonal-line information (j, x[j], y[j], a[j], b[j]) is calculated according to Formulae (9) to (12) to take on values shown below in Table 1.

TABLE 1

| i | x[j] | y[j] | a[j] | b[j] |
|---|------|------|------|------|
| 0 | 0 | 0 | 0.0625 | 0 |
| 1 | 0.0625 | 0.003906 | 0.1875 | −0.00781 |
| 2 | 0.125 | 0.015625 | 0.3125 | −0.02344 |
| 3 | 0.1875 | 0.035156 | 0.4375 | −0.04688 |
| 4 | 0.25 | 0.0625 | 0.5625 | −0.07813 |
| 5 | 0.3125 | 0.097656 | 0.6875 | −0.11719 |
| 6 | 0.375 | 0.140625 | 0.8125 | −0.16406 |
| 7 | 0.4375 | 0.191406 | 0.9375 | −0.21875 |
| 8 | 0.5 | 0.25 | 1.0625 | −0.28125 |
| 9 | 0.5625 | 0.316406 | 1.1875 | −0.35156 |
| 10 | 0.625 | 0.390625 | 1.3125 | −0.42969 |
| 11 | 0.6875 | 0.472656 | 1.4375 | −0.51563 |
| 12 | 0.75 | 0.5625 | 1.5625 | −0.60938 |
| 13 | 0.8125 | 0.660156 | 1.6875 | −0.71094 |
| 14 | 0.875 | 0.765625 | 1.8125 | −0.82031 |
| 15 | 0.9375 | 0.878906 | 1.9375 | −0.9375 |
| 16 | 1 | 1 | — | — |

The calculation of a backlight upper limit and the calculation of the maximum and minimum values of a gamma-corrected RGB signal are performed in the same manner as in the example explained in Embodiment 1. That is, the backlight upper limit MAXw is set as MAXw=127.5, and the maximum and minimum values maxRGBg and minRGBg of the gamma-corrected RGB signal are set as maxRGBg=255 and minRGBg=16, respectively.

Since the target pixel satisfies Formula (4), the target pixel is subjected to color-saturation conversion. At this time, a color-saturation conversion rate α is calculated in the following manner. First, the luminance Y[1] corresponding to the input pixel values is calculated to take on the same value of 207 as in Embodiment 1.

Further, minRGB/MAX=63/2505=0.2470558. At this time, it is found from Table 1 that jMin=3. Further, maxRGB/MAX=255/255=1. At this time, it is found from Table 1 that kMax=15.

Thus, since jMin=3 and kMax=15, the present example of calculation repeats Steps S61 to S65 of the flow chart of FIG. 16 from j=3 to j=15 and from k=j to k=15 for each value of j. The repetition of the steps yields such variations in value of j, k, αt, judge, α, and judgeMin as shown below in Table 2.

TABLE 2

| j | k | αt | judge | α | judgeMin |
|---|---|------|-------|---|----------|
| 3 | 3 | 1.517867 | — | — | — |
| 3 | 4 | 1.217708 | — | — | — |
| 3 | 5 | 0.97583 | 107.7788 | 0.97583 | 107.7788 |
| 3 | 6 | 0.781939 | 72.20267 | 0.781939 | 72.20267 |
| 3 | 7 | 0.628038 | 39.65104 | 0.628038 | 39.65104 |
| 3 | 8 | 0.507813 | 12.16406 | 0.507813 | 12.16406 |
| 3 | 9 | 0.416211 | 10.27383 | 0.416211 | 10.27383 |
| 3 | 10 | 0.349144 | 27.57701 | 0.416211 | 10.27383 |
| 3 | 11 | 0.303267 | 39.71165 | 0.416211 | 10.27383 |
| 3 | 12 | 0.275815 | 47.12364 | 0.416211 | 10.27383 |
| 3 | 13 | 0.264486 | 50.18262 | 0.416211 | 10.27383 |
| 3 | 14 | 0.267344 | 49.41094 | 0.416211 | 10.27383 |
| 3 | 15 | 0.282752 | 45.2506 | 0.416211 | 10.27383 |
| 4 | 4 | 1.180556 | 45.2506 | 0.416211 | 10.27383 |
| 4 | 5 | 0.978824 | 108.2998 | 0.416211 | 10.27383 |
| 4 | 6 | 0.813867 | 78.33281 | 0.416211 | 10.27383 |
| 4 | 7 | 0.680432 | 51.03906 | 0.416211 | 10.27383 |
| 4 | 8 | 0.574219 | 27.70313 | 0.416211 | 10.27383 |
| 4 | 9 | 0.491678 | 8.29178 | 0.491678 | 8.29178 |
| 4 | 10 | 0.42985 | 6.754883 | 0.42985 | 6.754883 |
| 4 | 11 | 0.38625 | 18.00375 | 0.42985 | 6.754883 |
| 4 | 12 | 0.358774 | 25.09255 | 0.42985 | 6.754883 |
| 4 | 13 | 0.345631 | 28.48351 | 0.42985 | 6.754883 |
| 4 | 14 | 0.345285 | 28.57282 | 0.42985 | 6.754883 |
| 4 | 15 | 0.356412 | 25.70205 | 0.42985 | 6.754883 |
| 5 | 5 | 0.965909 | 106.0526 | 0.42985 | 6.754883 |
| 5 | 6 | 0.82303 | 80.09205 | 0.42985 | 6.754883 |
| 5 | 7 | 0.705892 | 56.38574 | 0.42985 | 6.754883 |
| 5 | 8 | 0.611406 | 35.95875 | 0.42985 | 6.754883 |
| 5 | 9 | 0.536959 | 19.15926 | 0.42985 | 6.754883 |
| 5 | 10 | 0.480324 | 5.56684 | 0.480324 | 5.56684 |
| 5 | 11 | 0.439593 | 4.24135 | 0.439593 | 4.24135 |
| 5 | 12 | 0.41312 | 11.07139 | 0.439593 | 4.24135 |
| 5 | 13 | 0.399479 | 14.59063 | 0.439593 | 4.24135 |
| 5 | 14 | 0.397429 | 15.11946 | 0.439593 | 4.24135 |
| 5 | 15 | 0.405884 | 12.93823 | 0.439593 | 4.24135 |
| 6 | 6 | 0.817308 | 78.99339 | 0.439593 | 4.24135 |
| 6 | 7 | 0.713397 | 57.96181 | 0.439593 | 4.24135 |
| 6 | 8 | 0.628767 | 39.81278 | 0.439593 | 4.24135 |
| 6 | 9 | 0.561422 | 24.86234 | 0.439593 | 4.24135 |
| 6 | 10 | 0.509635 | 12.60156 | 0.439593 | 4.24135 |
| 6 | 11 | 0.4719 | 3.545111 | 0.4719 | 3.545111 |
| 6 | 12 | 0.446899 | 2.455078 | 0.446899 | 2.455078 |
| 6 | 13 | 0.433475 | 5.819602 | 0.446899 | 2.455078 |
| 6 | 14 | 0.430607 | 6.559743 | 0.446899 | 2.455078 |
| 6 | 15 | 0.437388 | 4.810045 | 0.446899 | 2.455078 |
| 7 | 7 | 0.708338 | 56.89844 | 0.446899 | 2.455078 |
| 7 | 8 | 0.632056 | 40.5431 | 0.446899 | 2.455078 |
| 7 | 9 | 0.570923 | 26.97144 | 0.446899 | 2.455078 |
| 7 | 10 | 0.523556 | 15.94247 | 0.446899 | 2.455078 |
| 7 | 11 | 0.488741 | 7.586857 | 0.446899 | 2.455078 |
| 7 | 12 | 0.465402 | 1.985491 | 0.465402 | 1.985491 |
| 7 | 13 | 0.452582 | 1.091146 | 0.452582 | 1.091146 |
| 7 | 14 | 0.44943 | 1.847762 | 0.452582 | 1.091146 |
| 7 | 15 | 0.455181 | 0.467516 | 0.455181 | 0.467516 |
| 8 | 8 | 0.625 | 38.97656 | 0.455181 | 0.467516 |
| 8 | 9 | 0.569308 | 26.61295 | 0.455181 | 0.467516 |
| 8 | 10 | 0.525933 | 16.51302 | 0.455181 | 0.467516 |
| 8 | 11 | 0.493877 | 8.819468 | 0.455181 | 0.467516 |
| 8 | 12 | 0.472245 | 3.627878 | 0.455181 | 0.467516 |
| 8 | 13 | 0.460236 | 0.745793 | 0.455181 | 0.467516 |
| 8 | 14 | 0.457129 | 0 | 0.455181 | 0 |
| 8 | 15 | 0.462271 | 1.234184 | 0.457129 | 0 |
| 9 | 9 | 0.559211 | 24.3713 | 0.457129 | 0 |
| 9 | 10 | 0.519431 | 14.95252 | 0.457129 | 0 |
| 9 | 11 | 0.489941 | 7.876 | 0.457129 | 0 |
| 9 | 12 | 0.469989 | 3.086319 | 0.457129 | 0 |
| 9 | 13 | 0.458891 | 0.422991 | 0.457129 | 0 |
| 9 | 14 | 0.456032 | 0.263263 | 0.457129 | 0 |
| 9 | 15 | 0.460849 | 0.892756 | 0.457129 | 0 |

TABLE 2-continued

| j | k | αt | judge | α | judgeMin |
|---|---|------|-------|------|---|
| 10 | 10 | 0.505952 | 11.71763 | 0.457129 | 0 |
| 10 | 11 | 0.478834 | 5.209121 | 0.457129 | 0 |
| 10 | 12 | 0.460494 | 0.807528 | 0.457129 | 0 |
| 10 | 13 | 0.450347 | 1.627604 | 0.457129 | 0 |
| 10 | 14 | 0.44786 | 2.224524 | 0.457129 | 0 |
| 10 | 15 | 0.452543 | 1.100565 | 0.457129 | 0 |
| 11 | 11 | 0.461957 | 1.168628 | 0.457129 | 0 |
| 11 | 12 | 0.445146 | 2.875831 | 0.457129 | 0 |
| 11 | 13 | 0.435954 | 5.180176 | 0.457129 | 0 |
| 11 | 14 | 0.433913 | 5.706792 | 0.457129 | 0 |
| 11 | 15 | 0.438594 | 4.499063 | 0.457129 | 0 |
| 12 | 12 | 0.425 | 8.00625 | 0.457129 | 0 |
| 12 | 13 | 0.416743 | 10.13649 | 0.457129 | 0 |
| 12 | 14 | 0.415189 | 10.53741 | 0.457129 | 0 |
| 12 | 15 | 0.419959 | 9.306899 | 0.457129 | 0 |
| 13 | 13 | 0.393519 | 16.12847 | 0.457129 | 0 |
| 13 | 14 | 0.392472 | 16.39858 | 0.457129 | 0 |
| 13 | 15 | 0.397391 | 15.12933 | 0.457129 | 0 |
| 14 | 14 | 0.366379 | 23.13039 | 0.457129 | 0 |
| 14 | 15 | 0.371491 | 21.81157 | 0.457129 | 0 |
| 15 | 15 | 0.342742 | 29.22883 | 0.457129 | 0 |

In Table 2, the final value of α is calculated as:
α=0.457129.

Once the color-saturation conversion rate α is thus calculated, the RGBW transmission amounts and the backlight value are calculated according to the same procedure as in Embodiment 1.

That is, the saturation-converted input RGB signal is calculated according to Formulae (6) to (8) as follows:

$$Rs[1] = \alpha \times R[1] + (1-\alpha) \times Y[1]$$
$$= 0.457129 \times 159 + (1-0.457129) \times 207$$
$$= 185$$

$$Gs[1] = \alpha \times G[1] + (1-\alpha) \times Y[1]$$
$$= 0.457129 \times 255 + (1-0.457129) \times 207$$
$$= 229$$

$$Bs[1] = \alpha \times B[1] + (1-\alpha) \times Y[1]$$
$$= 0.457129 \times 63 + (1-0.457129) \times 207$$
$$= 141.$$

Next, the gamma-corrected input RGB signal is calculated as follows:

$$Rsg[1] = (Rs[1]/MAX)^v \times MAX$$
$$= (185/255)^2 \times 255$$
$$= 134$$

$$Gsg[1] = (Gs[1]/MAX)^v \times MAX$$
$$= (229/255)^2 \times 255$$
$$= 206$$

$$Bsg[1] = (Bs[1]/MAX)^v \times MAX$$
$$= (141/255)^2 \times 255$$
$$= 78.$$

Next, the W transmission amount is calculated according to Formula (55) as follows:

$$Wtsg[1] = \min(\max RGBsg/2, \min RGBsg)$$
$$= \min(206/2, 78)$$
$$= 78.$$

Next, the RGB transmission amounts are calculated according to Formulae (56) to (58) as follows:

$$Rtsg[1]=Rsg[1]-Wtsg[1]=134-78=56$$

$$Gtsg[1]=Gsg[1]-Wtsg[1]=206-78=128$$

$$Btsg[1]=Bsg[1]-Wtsg[1]=78-78=0$$

Finally, the backlight value is calculated according to Formula (59) as follows:

$$Wbsg = \max(Rtsg[1], Gtsg[1], Btsg[1], Wtsg[1])$$
$$= \max(56, 128, 0, 56)$$
$$= 128.$$

That is, the backlight value obtained in cases where the color-saturation conversion process is performed is 128. Thus, the above example shows that the color-saturation conversion process can reduce the backlight value from 239 to 128 (reduction of approximately 46%).

Embodiment 5

Embodiment 5 is a first example of means for approximately calculating a color-saturation conversion rate α in the second color-saturation conversion rate calculation section 33 of Embodiment 2, and makes such a change to Embodiment 4 as to perform a color-saturation conversion on every pixel within the input image. It should be noted that processing sections identical to those of Embodiments 2 and 3 are given the same reference numerals as those of Embodiments 2 and 3 and will not be described below in detail.

Figure 17:
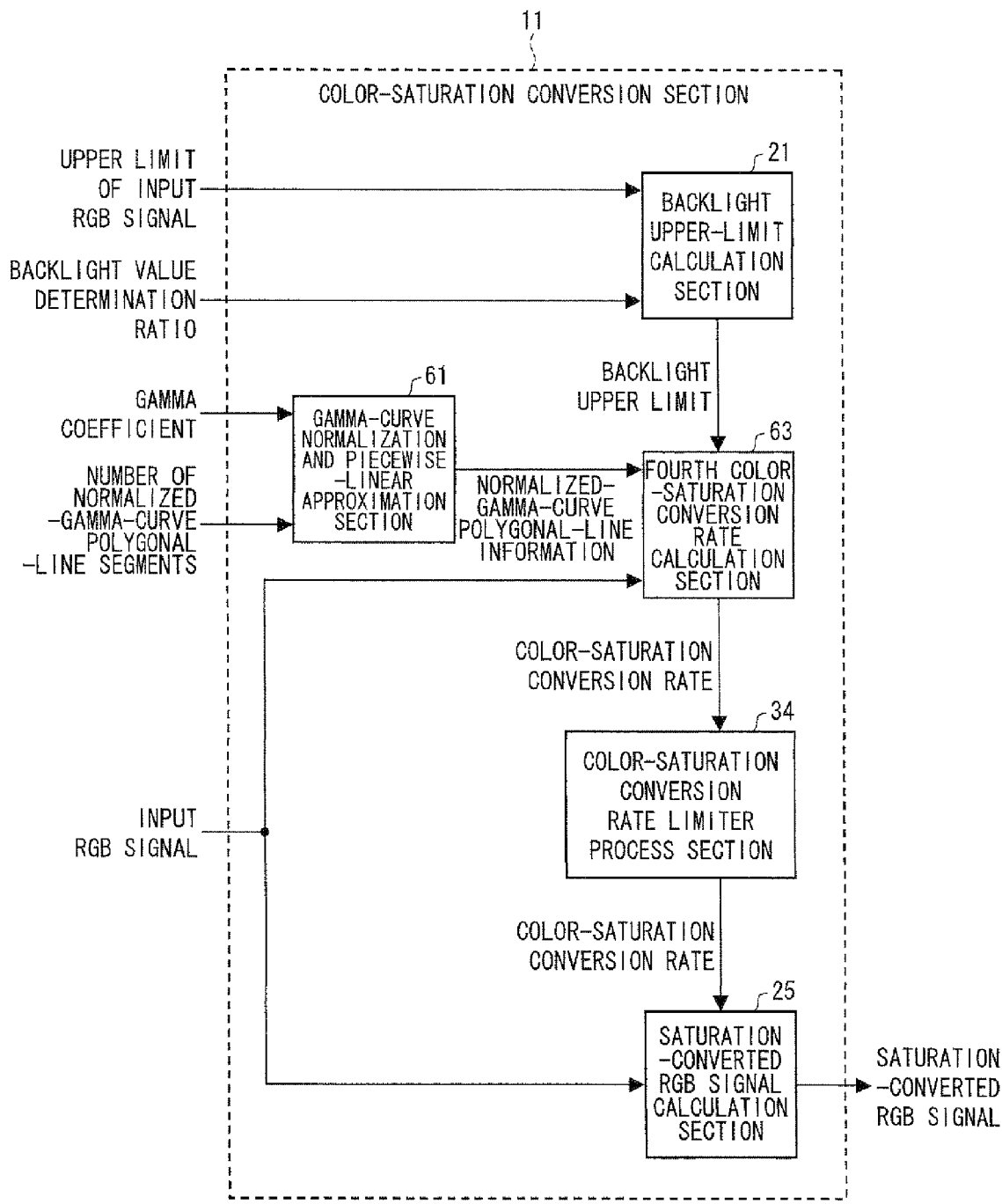
FIG. 17 is a block diagram showing an example arrangement of a color-saturation conversion section in Embodiment 5 of the liquid crystal display device.

FIG. 17 shows another arrangement of the color-saturation conversion section 11 of a liquid crystal display device according to Embodiment 5. The color-saturation conversion section 11 of FIG. 17 includes a backlight upper-limit calculation section 21, a fourth color-saturation conversion rate calculation section 63, a gamma-curve normalization and piecewise-linear approximation section 61, a color-saturation conversion rate limiter process section 34, and a saturation-converted RGB signal calculation section 25. It should be noted, in the present embodiment, that since the color-saturation conversion rate α may exceed 1, the color-saturation conversion rate limiter process section 34 is mounted.

The fourth color-saturation conversion rate calculation section 63 calculates a color-saturation conversion rate α on the basis of an input RGB signal, a backlight upper limit, and normalized-gamma-curve polygonal-line information inputted from the gamma-curve normalization and piecewise-linear approximation section 61, and then outputs the color-saturation conversion rate α. The gamma-curve normalization and piecewise-linear approximation section 61 calculates normalized-gamma-curve polygonal-line information as explained in Embodiment 4.

Figure 18:
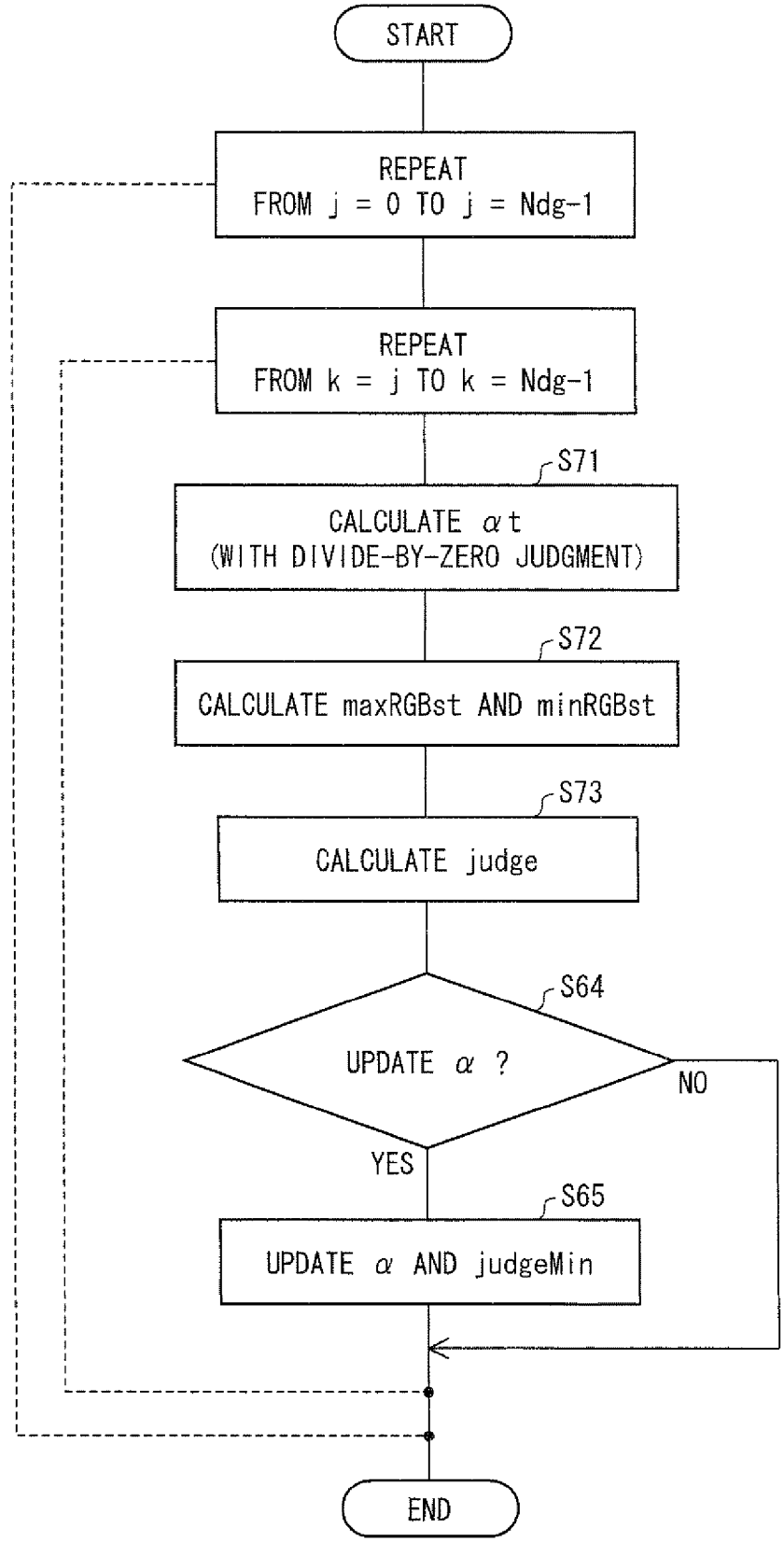
FIG. 18 is a flow chart showing a sequence of operations that are performed by the color-saturation conversion section of FIG. 17.

FIG. 18 is a flow chart that explains the operation of the fourth color-saturation conversion rate calculation section 63.

According to the flow chart, Steps S71 to S73, S64, and S65 are repeated from j=0 to j=Ndg−1, and further repeated from k=j to k Ndg−1.

Embodiment 4 repeats j from jMin to kMax, and further repeats k from j to kMax. Meanwhile, Embodiment 5 calculates α in such a direction as to cause an increase in color saturation; therefore, Formulae (131) and (132) do not always hold. That is, Embodiment 5 repeats a different range from Embodiment 4 because the ranges of j and k are defined by Formula (134), which is derived exclusively from Formula (128):

$$0 \leq j \leq k \leq Ndg-1. \quad (134)$$

First, in Step S71, the fourth color-saturation conversion rate calculation section 63 calculates an α candidate value (αt) according to Formula (13). However, when the denominator of Formula (13) is 0, the target pixel has a color saturation of 0. Therefore, αt may take on any value. In Embodiment 5, when the denominator of Formula (13) is 0, αt is set, for example, as αt=1.

Next, the fourth color-saturation conversion rate calculation section 63 calculates the maximum and minimum values (maxRGBst, minRGBst) of the input RGB signal after color-saturation conversion according to Formulae (17) and (18) (S72):

$$\max RGBst = \max(\alpha t \times \max RGB + (1-\alpha t) \times Y[i], 0) \quad (17)$$

$$\min RGBst = \min(\alpha t \times \max RGB + (1-\alpha t) \times Y[i], \text{MAX}). \quad (18)$$

Depending on the value of αt, the maximum value after the color-saturation conversion may exceeds the upper limit MAX of the signal, or the minimum value after the color-saturation conversion may fall short of the lower limit 0 of the signal. Therefore, Formulae (17) and (18) are subjected to a limiter process.

Next, the fourth color-saturation conversion rate calculation section 63 calculates an α calculation judgment value (judge) according to Formula (19) (S73):

$$judge = |fg(\max RGBst, \gamma) - fg(\min RGBst, \gamma) - \text{MAX}w|. \quad (19)$$

Next, the fourth color-saturation conversion rate calculation section 63 judges whether or not to update α. However, in cases where the fourth color-saturation conversion rate calculation section 63 judges for the first time whether or not to update α or in cases where judge<judgeMin, the fourth color-saturation conversion rate calculation section 63 proceeds to Step S65 (S64). Next, the fourth color-saturation conversion rate calculation section 63 updates α and the minimum a calculation judgment value (judgeMin) according to Formulae (15) and (16) (S65). Steps S64 and S65 are identical to Steps S64 and S65 of FIG. 16 explained in Embodiment 4.

The following shows a first example of calculation of a backlight value according to Embodiment 5. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255, γ=2, Ndg=16, and B1 Ratio=0.5.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner. First, normalized-gamma-curve polygonal-line information (j, x[j], y[j], a[j], b[j]) is calculated in the same manner as in Embodiment 4 to take on values shown above in Table 1.

The calculation of a backlight upper limit is performed in the same manner as in the example explained in Embodiment 1. That is, the backlight upper limit MAXw is set as MAXw=127.5.

Since Embodiment 5 does not judge whether or not it is necessary to reduce the color saturation, Embodiment 5 calculates a color-saturation conversion rate α for every pixel. In Embodiment 5, the color-saturation conversion rate α is calculated in the following manner. First, the luminance Y[1] corresponding to the input pixel values is calculated to take on the same value of 207 as in Embodiment 1.

Since Ndg=16, the present example of calculation repeats Steps S71 to S73, S64, an S65 of the flow chart of FIG. 18 from j=0 to j=15 and from k=j to k=15 for each value of j. The repetition of the steps yields such variations in value of j, k, αt, judge, α, and judgeMin as shown below in Tables 3(a) and 3(b).

TABLE 3(a)

| j | k | αt | judge | α | judgeMin |
|---|---|---|---|---|---|
| 0 | 0 | 10.625 | 127.5 | 10.625 | 127.5 |
| 0 | 1 | 5.75651 | 127.5 | 10.625 | 127.5 |
| 0 | 2 | 3.405273 | 127.5 | 10.625 | 127.5 |
| 0 | 3 | 2.060938 | 127.5 | 10.625 | 127.5 |
| 0 | 4 | 1.220052 | 123.6211 | 1.220052 | 123.6211 |
| 0 | 5 | 0.666853 | 48.1942 | 0.666853 | 48.1942 |
| 0 | 6 | 0.293457 | 42.36035 | 0.293457 | 42.36035 |
| 0 | 7 | 0.039931 | 115.3047 | 0.293457 | 42.36035 |
| 0 | 8 | −0.12969 | 169.0359 | 0.293457 | 42.36035 |
| 0 | 9 | −0.23828 | 205.8047 | 0.293457 | 42.36035 |
| 0 | 10 | −0.30111 | 228.0449 | 0.293457 | 42.36035 |
| 0 | 11 | −0.32873 | 237.8185 | 0.293457 | 42.36035 |
| 0 | 12 | −0.32868 | 237.8036 | 0.293457 | 42.36035 |
| 0 | 13 | −0.30651 | 229.9578 | 0.293457 | 42.36035 |
| 0 | 14 | −0.26636 | 215.7437 | 0.293457 | 42.36035 |
| 0 | 15 | −0.2114 | 196.4903 | 0.293457 | 42.36035 |
| 1 | 1 | 3.541667 | 127.5 | 0.293457 | 42.36035 |
| 1 | 2 | 2.514509 | 127.5 | 0.293457 | 42.36035 |
| 1 | 3 | 1.785645 | 127.5 | 0.293457 | 42.36035 |
| 1 | 4 | 1.255642 | 124.582 | 0.293457 | 42.36035 |
| 1 | 5 | 0.864844 | 88.12031 | 0.293457 | 42.36035 |
| 1 | 6 | 0.575284 | 27.93963 | 0.575284 | 27.93963 |
| 1 | 7 | 0.361654 | 24.34961 | 0.361654 | 24.34961 |
| 1 | 8 | 0.20643 | 66.10276 | 0.361654 | 24.34961 |
| 1 | 9 | 0.097098 | 97.81138 | 0.361654 | 24.34961 |
| 1 | 10 | 0.024479 | 120.0328 | 0.361654 | 24.34961 |
| 1 | 11 | −0.01831 | 133.2993 | 0.361654 | 24.34961 |
| 1 | 12 | −0.03654 | 139.0947 | 0.361654 | 24.34961 |
| 1 | 13 | −0.03429 | 138.3802 | 0.361654 | 24.34961 |
| 1 | 14 | −0.0148 | 132.1838 | 0.361654 | 24.34961 |
| 1 | 15 | 0.019336 | 121.6066 | 0.361654 | 24.34961 |
| 2 | 2 | 2.125 | 127.5 | 0.361654 | 24.34961 |
| 2 | 3 | 1.630327 | 127.5 | 0.361654 | 24.34961 |
| 2 | 4 | 1.245768 | 124.3154 | 0.361654 | 24.34961 |
| 2 | 5 | 0.945913 | 102.5733 | 0.361654 | 24.34961 |
| 2 | 6 | 0.712612 | 57.79688 | 0.361654 | 24.34961 |
| 2 | 7 | 0.532552 | 18.10156 | 0.532552 | 18.10156 |
| 2 | 8 | 0.395752 | 15.55225 | 0.395752 | 15.55225 |
| 2 | 9 | 0.294577 | 42.0579 | 0.395752 | 15.55225 |
| 2 | 10 | 0.22309 | 61.35938 | 0.395752 | 15.55225 |
| 2 | 11 | 0.176604 | 74.69285 | 0.395752 | 15.55225 |
| 2 | 12 | 0.151367 | 81.96094 | 0.395752 | 15.55225 |

TABLE 3(a)-continued

| j | k | αt | judge | α | judgeMin |
|---|---|---|---|---|---|
| 2 | 13 | 0.144345 | 83.98326 | 0.395752 | 15.55225 |
| 2 | 14 | 0.153054 | 81.47514 | 0.395752 | 15.55225 |
| 2 | 15 | 0.175442 | 75.02751 | 0.395752 | 15.55225 |
| 3 | 3 | 1.517857 | 127.5 | 0.395752 | 15.55225 |
| 3 | 4 | 1.217708 | 123.5678 | 0.395752 | 15.55225 |
| 3 | 5 | 0.97583 | 107.7788 | 0.395752 | 15.55225 |
| 3 | 6 | 0.781939 | 72.20267 | 0.395752 | 15.55225 |
| 3 | 7 | 0.628038 | 39.65104 | 0.395752 | 15.55225 |
| 3 | 8 | 0.507813 | 12.16406 | 0.507813 | 12.16406 |
| 3 | 9 | 0.416211 | 10.27383 | 0.416211 | 10.27383 |
| 3 | 10 | 0.349144 | 27.57701 | 0.416211 | 10.27383 |
| 3 | 11 | 0.303267 | 39.71165 | 0.416211 | 10.27383 |
| 3 | 12 | 0.275815 | 47.12364 | 0.416211 | 10.27383 |
| 3 | 13 | 0.264486 | 50.18262 | 0.416211 | 10.27383 |
| 3 | 14 | 0.267344 | 49.41094 | 0.416211 | 10.27383 |
| 3 | 15 | 0.282752 | 45.2506 | 0.416211 | 10.27383 |
| 4 | 4 | 1.180556 | 121.9141 | 0.416211 | 10.27383 |
| 4 | 5 | 0.978824 | 108.2998 | 0.416211 | 10.27383 |
| 4 | 6 | 0.813867 | 78.33281 | 0.416211 | 10.27383 |
| 4 | 7 | 0.680432 | 51.03906 | 0.416211 | 10.27383 |
| 4 | 8 | 0.574219 | 27.70313 | 0.416211 | 10.27383 |
| 4 | 9 | 0.491678 | 8.29178 | 0.491678 | 8.29178 |
| 4 | 10 | 0.42985 | 6.754883 | 0.42985 | 6.754883 |
| 4 | 11 | 0.38625 | 18.00375 | 0.42985 | 6.754883 |
| 4 | 12 | 0.358774 | 25.09255 | 0.42985 | 6.754883 |
| 4 | 13 | 0.345631 | 28.48351 | 0.42985 | 6.754883 |

TABLE 3(b)

| j | k | αt | judge | α | judgeMin |
|---|---|---|---|---|---|
| 4 | 14 | 0.345285 | 28.57282 | 0.42985 | 6.754883 |
| 4 | 15 | 0.356412 | 25.70205 | 0.42985 | 6.754883 |
| 5 | 5 | 0.965909 | 106.0526 | 0.42985 | 6.754883 |
| 5 | 6 | 0.82303 | 80.09205 | 0.42985 | 6.754883 |
| 5 | 7 | 0.705892 | 56.38574 | 0.42985 | 6.754883 |
| 5 | 8 | 0.611406 | 35.95875 | 0.42985 | 6.754883 |
| 5 | 9 | 0.536959 | 19.15926 | 0.42985 | 6.754883 |
| 5 | 10 | 0.480324 | 5.56684 | 0.480324 | 5.56684 |
| 5 | 11 | 0.439593 | 4.24135 | 0.439593 | 4.24135 |
| 5 | 12 | 0.41312 | 11.07139 | 0.439593 | 4.24135 |
| 5 | 13 | 0.399479 | 14.59063 | 0.439593 | 4.24135 |
| 5 | 14 | 0.397429 | 15.11946 | 0.439593 | 4.24135 |
| 5 | 15 | 0.405884 | 12.93823 | 0.439593 | 4.24135 |
| 6 | 6 | 0.817308 | 78.99339 | 0.439593 | 4.24135 |
| 6 | 7 | 0.713397 | 57.96181 | 0.439593 | 4.24135 |
| 6 | 8 | 0.628767 | 39.81278 | 0.439593 | 4.24135 |
| 6 | 9 | 0.561422 | 24.86234 | 0.439593 | 4.24135 |
| 6 | 10 | 0.509635 | 12.60156 | 0.439593 | 4.24135 |
| 6 | 11 | 0.4719 | 3.545111 | 0.4719 | 3.545111 |
| 6 | 12 | 0.446899 | 2.455078 | 0.446899 | 2.455078 |
| 6 | 13 | 0.433475 | 5.819602 | 0.446899 | 2.455078 |
| 6 | 14 | 0.430607 | 6.559743 | 0.446899 | 2.455078 |
| 6 | 15 | 0.437388 | 4.810045 | 0.446899 | 2.455078 |
| 7 | 7 | 0.708333 | 56.89844 | 0.446899 | 2.455078 |
| 7 | 8 | 0.632056 | 40.5431 | 0.446899 | 2.455078 |
| 7 | 9 | 0.570923 | 26.97144 | 0.446899 | 2.455078 |
| 7 | 10 | 0.523556 | 15.94247 | 0.446899 | 2.455078 |
| 7 | 11 | 0.488741 | 7.586857 | 0.446899 | 2.455078 |
| 7 | 12 | 0.465402 | 1.985491 | 0.465402 | 1.985491 |
| 7 | 13 | 0.452582 | 1.091146 | 0.452582 | 1.091146 |
| 7 | 14 | 0.44943 | 1.847762 | 0.452582 | 1.091146 |
| 7 | 15 | 0.455181 | 0.467516 | 0.455181 | 0.467516 |
| 8 | 8 | 0.625 | 38.97656 | 0.455181 | 0.467516 |
| 8 | 9 | 0.569308 | 26.61295 | 0.455181 | 0.467516 |
| 8 | 10 | 0.525933 | 16.51302 | 0.455181 | 0.467516 |
| 8 | 11 | 0.493877 | 8.819468 | 0.455181 | 0.467516 |
| 8 | 12 | 0.472245 | 3.627878 | 0.455181 | 0.467516 |
| 8 | 13 | 0.460236 | 0.745793 | 0.455181 | 0.467516 |
| 8 | 14 | 0.457129 | 0 | 0.457129 | 0 |
| 8 | 15 | 0.462271 | 1.234184 | 0.457129 | 0 |
| 9 | 9 | 0.559211 | 24.3713 | 0.457129 | 0 |
| 9 | 10 | 0.519431 | 14.95252 | 0.457129 | 0 |
| 9 | 11 | 0.489941 | 7.875 | 0.457129 | 0 |
| 9 | 12 | 0.469989 | 3.086319 | 0.457129 | 0 |

TABLE 3(b)-continued

| j | k | αt | judge | α | judgeMin |
|---|---|---|---|---|---|
| 9 | 13 | 0.458891 | 0.422991 | 0.457129 | 0 |
| 9 | 14 | 0.456032 | 0.263263 | 0.457129 | 0 |
| 9 | 15 | 0.460849 | 0.892756 | 0.457129 | 0 |
| 10 | 10 | 0.505952 | 11.71763 | 0.457129 | 0 |
| 10 | 11 | 0.478834 | 5.209121 | 0.457129 | 0 |
| 10 | 12 | 0.460494 | 0.807528 | 0.457129 | 0 |
| 10 | 13 | 0.450347 | 1.627604 | 0.457129 | 0 |
| 10 | 14 | 0.44786 | 2.224524 | 0.457129 | 0 |
| 10 | 15 | 0.452543 | 1.100565 | 0.457129 | 0 |
| 11 | 11 | 0.461957 | 1.158628 | 0.457129 | 0 |
| 11 | 12 | 0.445146 | 2.875831 | 0.457129 | 0 |
| 11 | 13 | 0.435954 | 5.180176 | 0.457129 | 0 |
| 11 | 14 | 0.433913 | 5.706792 | 0.457129 | 0 |
| 11 | 15 | 0.438594 | 4.499063 | 0.457129 | 0 |
| 12 | 12 | 0.425 | 8.00625 | 0.457129 | 0 |
| 12 | 13 | 0.416743 | 10.13649 | 0.457129 | 0 |
| 12 | 14 | 0.415189 | 10.53741 | 0.457129 | 0 |
| 12 | 15 | 0.419959 | 9.306899 | 0.457129 | 0 |
| 13 | 13 | 0.393519 | 16.12847 | 0.457129 | 0 |
| 13 | 14 | 0.392472 | 16.39858 | 0.457129 | 0 |
| 13 | 15 | 0.397391 | 15.12933 | 0.457129 | 0 |
| 14 | 14 | 0.366379 | 23.13039 | 0.457129 | 0 |
| 14 | 15 | 0.371491 | 21.81157 | 0.457129 | 0 |
| 15 | 15 | 0.342742 | 29.22883 | 0.457129 | 0 |

In Tables 3(a) and 3(b), the final value of α is calculated as:

α=0.457129.

Since the color-saturation conversion rate α thus calculated falls within a range of $0 \leqq \alpha \leqq 1$, α is set as α=0.457129 even after the limiter process.

Once the color-saturation conversion rate α is thus calculated, the RGBW transmission amounts and the backlight value are calculated according to the same procedure as in Embodiment 1.

That is, the saturation-converted input RGB signal is calculated according to Formulae (6) to (8) as follows:

$$Rs[1] = \alpha \times R[1] + (1 - \alpha) \times Y[1]$$
$$= 0.457129 \times 159 + (1 - 0.459129) \times 207$$
$$= 185$$

$$Gs[1] = \alpha \times G[1] + (1 - \alpha) \times Y[1]$$
$$= 0.457129 \times 255 + (1 - 0.459129) \times 207$$
$$= 229$$

$$Bs[1] = \alpha \times B[1] + (1 - \alpha) \times Y[1]$$
$$= 0.457129 \times 63 + (1 - 0.457129) \times 207$$
$$= 141.$$

Next, the gamma-corrected input RGB signal is calculated as follows:

$$Rsg[1] = (Rs[1]/MAX)\gamma \times MAX$$
$$= (185/255)^2 \times 255 = 134$$

$$Gsg[1] = (Gs[1]/MAX)\gamma \times MAX$$
$$= (229/255)^2 \times 255$$
$$= 206$$

-continued $$Bsg[1] = (Bs[1]/MAX)\gamma \times MAX$$
$$= (141/255)^2 \times 255$$
$$= 78.$$

Next, the W transmission amount is calculated according to Formula (55) as follows:

$$Wtsg[1] = \min(\max RGBsg/2, \min RGBsg)$$
$$= \min(206/2, 78)$$
$$= 78.$$

Next, the RGB transmission amounts are calculated according to Formulae (56) to (58) as follows:

$$Rtsg[1] = Rsg[1] - Wtsg[1] = 134 - 78 = 56$$

$$Gtsg[1] = Gsg[1] - Wtsg[1] = 206 - 78 = 128$$

$$Btsg[1] = Bsg[1] - Wtsg[1] = 78 - 78 = 0.$$

Finally, the backlight value is calculated according to Formula (59) as follows:

$$Wbsg = \max(Rtsg[1], Gtsg[1], Btsg[1], Wtsg[1])$$
$$= \max(56, 128, 0, 56) = 128.$$

That is, the backlight value obtained in cases where the color-saturation conversion process is performed is 128. Thus, the above example shows that the color-saturation conversion process can reduce the backlight value from 239 to 128 (reduction of approximately 46%).

The first example of calculation thus explained is an example where the fourth color-saturation conversion rate calculation section 63 calculates a color-saturation conversion rate $\alpha$ as $0 \leq \alpha \leq 1$. The following shows an example (second example of calculation) where the fourth color-saturation conversion rate calculation section 63 does not calculate a color-saturation conversion rate $\alpha$ as $0 \leq \alpha \leq 1$. For convenience of explanation, the following shows an example where an image constituted by a single pixel is inputted and the input image has pixel values (R[1], G[1], B[1])=(159, 187, 85). That is, the following shows an example where the same pixel values are used as in the second example of calculation of a backlight value according to Embodiment 2. It should be noted that the following explanation assumes that MAX=255, $\gamma$=2, Ndg=16, and B1 Ratio=0.5.

First, in cases where no color-saturation conversion process is performed, a backlight value is calculated in the same manner as in the second example of calculation explained in Embodiment 2. That is, the backlight value obtained in cases where no color-saturation conversion process is performed is 109.

On the other hand, in cases where a color-saturation conversion process is performed, a backlight value is calculated in the following manner. First, normalized-gamma-curve polygonal-line information j, x[j], y[j], a[j], b[j]) is calculated in the same manner as in Embodiment 4 to take on values shown above in Table 1.

The calculation of a backlight upper limit is performed in the same manner as in the example explained in Embodiment 1. That is, the backlight upper limit MAXw is set as MAXw=127.5.

Since Embodiment 5 does not judge whether or not it is necessary to reduce the color saturation, Embodiment 5 calculates a color-saturation conversion rate $\alpha$ for every pixel. In Embodiment 5, the color-saturation conversion rate $\alpha$ is calculated in the following manner. First, the luminance Y[1] corresponding to the input pixel values is calculated to take on the same value of 167.25 as in the second example of calculation of Embodiment 2.

Since Ndg=16, the present example of calculation repeats Steps S71 to S73, S64, and S65 of the flow chart of FIG. 18 from j=0 to j=15 and from k=j to k=15 for each value of j. The repetition of the steps yields such variations in value of j, k, $\alpha t$, judge, $\alpha$, and judgeMin as shown below in Tables 4(a) and 4(b).

TABLE 4(a)

| j | k | $\alpha t$ | judge | $\alpha$ | judgeMin |
|---|---|---|---|---|---|
| 0 | 0 | 20 | 127.5 | 20 | 127.5 |
| 0 | 1 | 12.27827 | 127.5 | 20 | 127.5 |
| 0 | 2 | 8.102901 | 127.5 | 20 | 127.5 |
| 0 | 3 | 5.568027 | 127.5 | 20 | 127.5 |
| 0 | 4 | 3.925962 | 107.7137 | 3.925962 | 107.7137 |
| 0 | 5 | 2.823456 | 67.5458 | 2.823456 | 67.5458 |
| 0 | 6 | 2.071903 | 42.49794 | 2.071903 | 42.49794 |
| 0 | 7 | 1.561427 | 20.46663 | 1.561427 | 20.46663 |
| 0 | 8 | 1.223684 | 1.342105 | 1.223684 | 1.342105 |
| 0 | 9 | 1.013934 | 17.54301 | 1.223684 | 1.342105 |
| 0 | 10 | 0.90166 | 27.07932 | 1.223684 | 1.342105 |
| 0 | 11 | 0.865331 | 30.22147 | 1.223684 | 1.342105 |
| 0 | 12 | 0.889323 | 28.1272 | 1.223684 | 1.342105 |
| 0 | 13 | 0.962023 | 21.95226 | 1.223684 | 1.342105 |
| 0 | 14 | 1.074618 | 12.49178 | 1.223684 | 1.342105 |
| 0 | 15 | 1.220302 | 1.602929 | 1.223684 | 1.342105 |
| 1 | 1 | 6.666667 | 127.5 | 1.223684 | 1.342105 |
| 1 | 2 | 5.120639 | 127.5 | 1.223684 | 1.342105 |
| 1 | 3 | 3.975 | 109.5902 | 1.223684 | 1.342105 |
| 1 | 4 | 3.117491 | 78.05738 | 1.223684 | 1.342105 |
| 1 | 5 | 2.474677 | 55.92165 | 1.223684 | 1.342105 |
| 1 | 6 | 1.996028 | 39.84138 | 1.223684 | 1.342105 |
| 1 | 7 | 1.645718 | 25.23438 | 1.223684 | 1.342105 |
| 1 | 8 | 1.397639 | 10.64221 | 1.223684 | 1.342105 |
| 1 | 9 | 1.232315 | 0.676447 | 1.232315 | 0.676447 |
| 1 | 10 | 1.134921 | 7.989831 | 1.232315 | 0.676447 |
| 1 | 11 | 1.093973 | 11.04684 | 1.232315 | 0.676447 |
| 1 | 12 | 1.100439 | 10.56411 | 1.232315 | 0.676447 |
| 1 | 13 | 1.147115 | 7.079417 | 1.232315 | 0.676447 |
| 1 | 14 | 1.228188 | 0.994757 | 1.232315 | 0.676447 |
| 1 | 15 | 1.338912 | 6.716617 | 1.232315 | 0.676447 |
| 2 | 2 | 4 | 110.5469 | 1.232315 | 0.676447 |
| 2 | 3 | 3.277753 | 83.79423 | 1.232315 | 0.676447 |
| 2 | 4 | 2.706494 | 63.64769 | 1.232315 | 0.676447 |
| 2 | 5 | 2.257757 | 48.69211 | 1.232315 | 0.676447 |
| 2 | 6 | 1.909805 | 36.73737 | 1.232315 | 0.676447 |
| 2 | 7 | 1.64576 | 25.23672 | 1.232315 | 0.676447 |
| 2 | 8 | 1.452309 | 14.29468 | 1.232315 | 0.676447 |
| 2 | 9 | 1.318818 | 5.37346 | 1.232315 | 0.676447 |
| 2 | 10 | 1.236683 | 0.339588 | 1.236683 | 0.339588 |
| 2 | 11 | 1.198873 | 3.215351 | 1.236683 | 0.339588 |
| 2 | 12 | 1.199586 | 3.162185 | 1.236683 | 0.339588 |
| 2 | 13 | 1.233986 | 0.547562 | 1.236683 | 0.339588 |
| 2 | 14 | 1.298018 | 3.98316 | 1.236683 | 0.339588 |
| 2 | 15 | 1.388251 | 10.01466 | 1.236683 | 0.339588 |
| 3 | 3 | 2.857143 | 68.73772 | 1.236683 | 0.339588 |
| 3 | 4 | 2.432648 | 54.5209 | 1.236683 | 0.339588 |
| 3 | 5 | 2.090637 | 43.12232 | 1.236683 | 0.339588 |
| 3 | 6 | 1.819369 | 33.273 | 1.236683 | 0.339588 |
| 3 | 7 | 1.609232 | 23.1706 | 1.236683 | 0.339588 |
| 3 | 8 | 1.452276 | 14.29283 | 1.236683 | 0.339588 |
| 3 | 9 | 1.341877 | 6.914839 | 1.236683 | 0.339588 |
| 3 | 10 | 1.272463 | 2.274976 | 1.236683 | 0.339588 |
| 3 | 11 | 1.23932 | 0.136165 | 1.23932 | 0.136165 |

TABLE 4(a)-continued

| j | k | αt | judge | α | judgeMin |
|---|---|----|-------|---|----------|
| 3 | 12 | 1.238429 | 0.2049 | 1.23932 | 0.136165 |
| 3 | 13 | 1.266344 | 1.865902 | 1.23932 | 0.136165 |
| 3 | 14 | 1.320091 | 5.458611 | 1.23932 | 0.136165 |
| 3 | 15 | 1.397096 | 10.60538 | 1.23932 | 0.136165 |
| 4 | 4 | 2.222222 | 47.60781 | 1.23932 | 0.136165 |
| 4 | 5 | 1.94765 | 38.09978 | 1.23932 | 0.136165 |
| 4 | 6 | 1.726805 | 28.98903 | 1.23932 | 0.136165 |
| 4 | 7 | 1.553546 | 20.02086 | 1.23932 | 0.136165 |
| 4 | 8 | 1.42263 | 12.31268 | 1.23932 | 0.136165 |
| 4 | 9 | 1.329561 | 6.091575 | 1.23932 | 0.136165 |
| 4 | 10 | 1.270455 | 2.140696 | 1.23932 | 0.136165 |
| 4 | 11 | 1.241942 | 0.066045 | 1.241942 | 0.066045 |
| 4 | 12 | 1.241086 | 0 | 1.241086 | 0 |
| 4 | 13 | 1.265312 | 1.796958 | 1.241086 | 0 |

TABLE 4(b)

| j | k | αt | judge | α | judgeMin |
|---|---|----|-------|---|----------|
| 4 | 14 | 1.312357 | 4.941626 | 1.241086 | 0 |
| 4 | 15 | 1.380222 | 9.477952 | 1.241086 | 0 |
| 5 | 5 | 1.818182 | 33.21804 | 1.241086 | 0 |
| 5 | 6 | 1.633018 | 24.516 | 1.241086 | 0 |
| 5 | 7 | 1.486574 | 16.23276 | 1.241086 | 0 |
| 5 | 8 | 1.375151 | 9.13901 | 1.241086 | 0 |
| 5 | 9 | 1.295508 | 3.81535 | 1.241086 | 0 |
| 5 | 10 | 1.24479 | 0.285655 | 1.241086 | 0 |
| 5 | 11 | 1.220475 | 1.589645 | 1.241086 | 0 |
| 5 | 12 | 1.220325 | 1.601157 | 1.241086 | 0 |
| 5 | 13 | 1.24235 | 0.097531 | 1.241086 | 0 |
| 5 | 14 | 1.284772 | 3.0977 | 1.241086 | 0 |
| 5 | 15 | 1.345995 | 7.190129 | 1.241086 | 0 |
| 6 | 6 | 1.538462 | 19.16767 | 1.241086 | 0 |
| 6 | 7 | 1.412395 | 11.62851 | 1.241086 | 0 |
| 6 | 8 | 1.316103 | 5.192023 | 1.241086 | 0 |
| 6 | 9 | 1.247144 | 0.467257 | 1.241086 | 0 |
| 6 | 10 | 1.203336 | 2.882228 | 1.241086 | 0 |
| 6 | 11 | 1.182721 | 4.421257 | 1.241086 | 0 |
| 6 | 12 | 1.183541 | 4.359997 | 1.241086 | 0 |
| 6 | 13 | 1.204212 | 2.816785 | 1.241086 | 0 |
| 6 | 14 | 1.243301 | 0.170828 | 1.241086 | 0 |
| 6 | 15 | 1.299509 | 4.082829 | 1.241086 | 0 |
| 7 | 7 | 1.333333 | 6.34375 | 1.241086 | 0 |
| 7 | 8 | 1.249124 | 0.619933 | 1.241086 | 0 |
| 7 | 9 | 1.18886 | 3.962955 | 1.241086 | 0 |
| 7 | 10 | 1.150819 | 6.802925 | 1.241086 | 0 |
| 7 | 11 | 1.133442 | 8.100225 | 1.241086 | 0 |
| 7 | 12 | 1.135311 | 7.960677 | 1.241086 | 0 |
| 7 | 13 | 1.155136 | 6.480641 | 1.241086 | 0 |
| 7 | 14 | 1.191738 | 3.748047 | 1.241086 | 0 |
| 7 | 15 | 1.244041 | 0.227925 | 1.241086 | 0 |
| 8 | 8 | 1.176471 | 4.887868 | 1.241086 | 0 |
| 8 | 9 | 1.123414 | 8.848862 | 1.241086 | 0 |
| 8 | 10 | 1.090251 | 11.3247 | 1.241086 | 0 |
| 8 | 11 | 1.075709 | 12.41039 | 1.241086 | 0 |
| 8 | 12 | 1.078621 | 12.19299 | 1.241086 | 0 |
| 8 | 13 | 1.097916 | 10.75245 | 1.241086 | 0 |
| 8 | 14 | 1.13261 | 8.162309 | 1.241086 | 0 |
| 8 | 15 | 1.181796 | 4.490324 | 1.241086 | 0 |
| 9 | 9 | 1.052632 | 14.25617 | 1.241086 | 0 |
| 9 | 10 | 1.023641 | 16.71856 | 1.241086 | 0 |
| 9 | 11 | 1.011589 | 17.74222 | 1.241086 | 0 |
| 9 | 12 | 1.0155 | 17.41006 | 1.241086 | 0 |
| 9 | 13 | 1.03447 | 15.79873 | 1.241086 | 0 |
| 9 | 14 | 1.067666 | 13.01084 | 1.241086 | 0 |
| 9 | 15 | 1.11431 | 9.528518 | 1.241086 | 0 |
| 10 | 10 | 0.952381 | 22.77121 | 1.241086 | 0 |
| 10 | 11 | 0.942526 | 23.60808 | 1.241086 | 0 |
| 10 | 12 | 0.947377 | 23.1962 | 1.241086 | 0 |
| 10 | 13 | 0.966158 | 21.60102 | 1.241086 | 0 |
| 10 | 14 | 0.998152 | 18.88351 | 1.241086 | 0 |
| 10 | 15 | 1.042691 | 15.10052 | 1.241086 | 0 |
| 11 | 11 | 0.869565 | 29.81827 | 1.241086 | 0 |
| 11 | 12 | 0.875288 | 29.31927 | 1.241086 | 0 |
| 11 | 13 | 0.893969 | 27.73256 | 1.241086 | 0 |

TABLE 4(b)-continued

| j | k | αt | judge | α | judgeMin |
|---|---|----|-------|---|----------|
| 11 | 14 | 0.924965 | 25.09817 | 1.241086 | 0 |
| 11 | 15 | 0.967752 | 21.46566 | 1.241086 | 0 |
| 12 | 12 | 0.8 | 36.44219 | 1.241086 | 0 |
| 12 | 13 | 0.818643 | 34.66706 | 1.241086 | 0 |
| 12 | 14 | 0.848049 | 31.79081 | 1.241086 | 0 |
| 12 | 15 | 0.890107 | 28.06062 | 1.241086 | 0 |
| 13 | 13 | 0.740741 | 42.08478 | 1.241086 | 0 |
| 13 | 14 | 0.77027 | 39.27302 | 1.241086 | 0 |
| 13 | 15 | 0.810228 | 35.46832 | 1.241086 | 0 |
| 14 | 14 | 0.689655 | 46.94908 | 1.241086 | 0 |
| 14 | 15 | 0.728482 | 43.25204 | 1.241086 | 0 |
| 15 | 15 | 0.645161 | 51.61361 | 1.241086 | 0 |

In Tables 4(a) and 4(b), the final value of $\alpha$ is calculated as:

$$\alpha = 1.241086.$$

In this example, $\alpha$ exceeds 1. Therefore, a limiter process is performed so that $\alpha=1$.

Thus, in cases where $\alpha=1$, there are no differences in RGB values between before and after color-saturation conversion according to Formulae (6) to (8), with the same result as in the case where no color-saturation conversion (color-saturation reduction) is performed.

That is, in cases where a backlight value obtained in cases where no color-saturation conversion is performed falls short of a backlight upper limit, no color-saturation conversion is needed. Also in the present example of calculation, no color-saturation conversion is performed. Accordingly, the backlight value is 109 as in the case where no color-saturation conversion is performed.

Embodiment 6

Embodiment 6 is a second example of means for approximately calculating a color-saturation conversion rate $\alpha$ in the first color-saturation conversion rate calculation section 23 of Embodiment 1, and makes such a change to Embodiment 4 as to speed up the color-saturation converting means. It should be noted that processing sections identical to those of Embodiments 1 to 3 are given the same reference numerals as those of Embodiments 1 to 3 and will not be described below in detail.

In Embodiment 4, all the $\alpha$ candidate values are calculated, and an $\alpha$ candidate value from which the smallest $\alpha$ calculation judgment value is calculated is selected as $\alpha$ from among the $\alpha$ candidate values. Meanwhile, Embodiment 6 performs a loop process, finishes the loop process at a point of time where the $\alpha$ calculation judgment value is not more than a threshold, and outputs a obtained at the point of time, thereby achieving speeding up.

Figure 19:
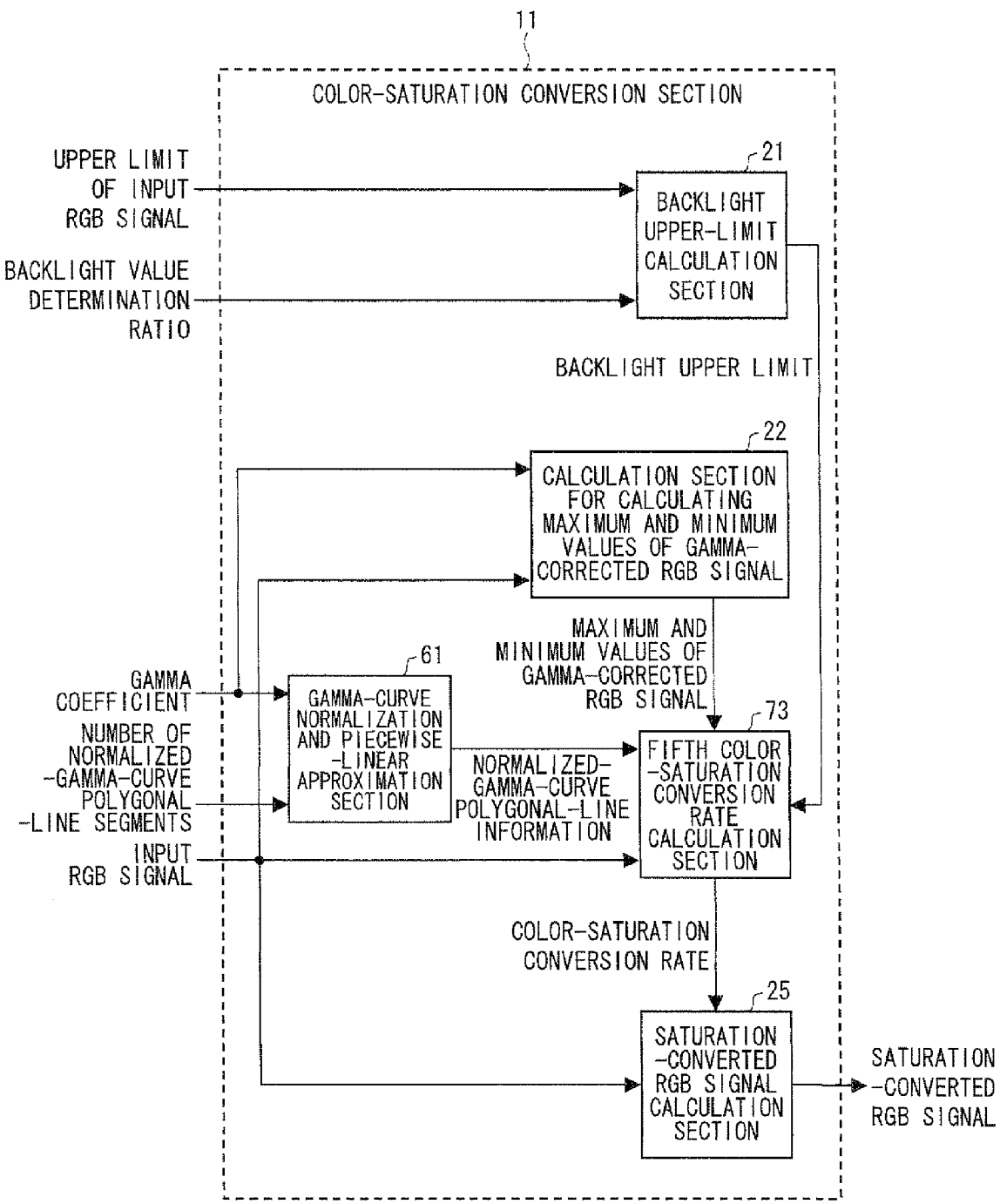
FIG. 19 is a block diagram showing an example arrangement of a color-saturation conversion section in Embodiment 6 of the liquid crystal display device.

FIG. 19 shows another arrangement of the color-saturation conversion section 11 of a liquid crystal display device according to Embodiment 6. The color-saturation conversion section 11 of FIG. 19 is obtained by replacing the third color-saturation conversion rate calculation section 53 of the color-saturation conversion section 11 (see FIG. 14) of Embodiment 4 with a fifth color-saturation conversion rate calculation section 73.

The fifth color-saturation conversion rate calculation section 73 calculates a color-saturation conversion rate $\alpha$ from an input RGB signal, a backlight upper limit, the maximum and minimum values of a gamma-corrected KGB signal, and normalized-gamma-curve polygonal-line information according to a different method from the third color-saturation conversion rate calculation section 53, and then outputs the color-saturation conversion rate $\alpha$.

Figure 20:
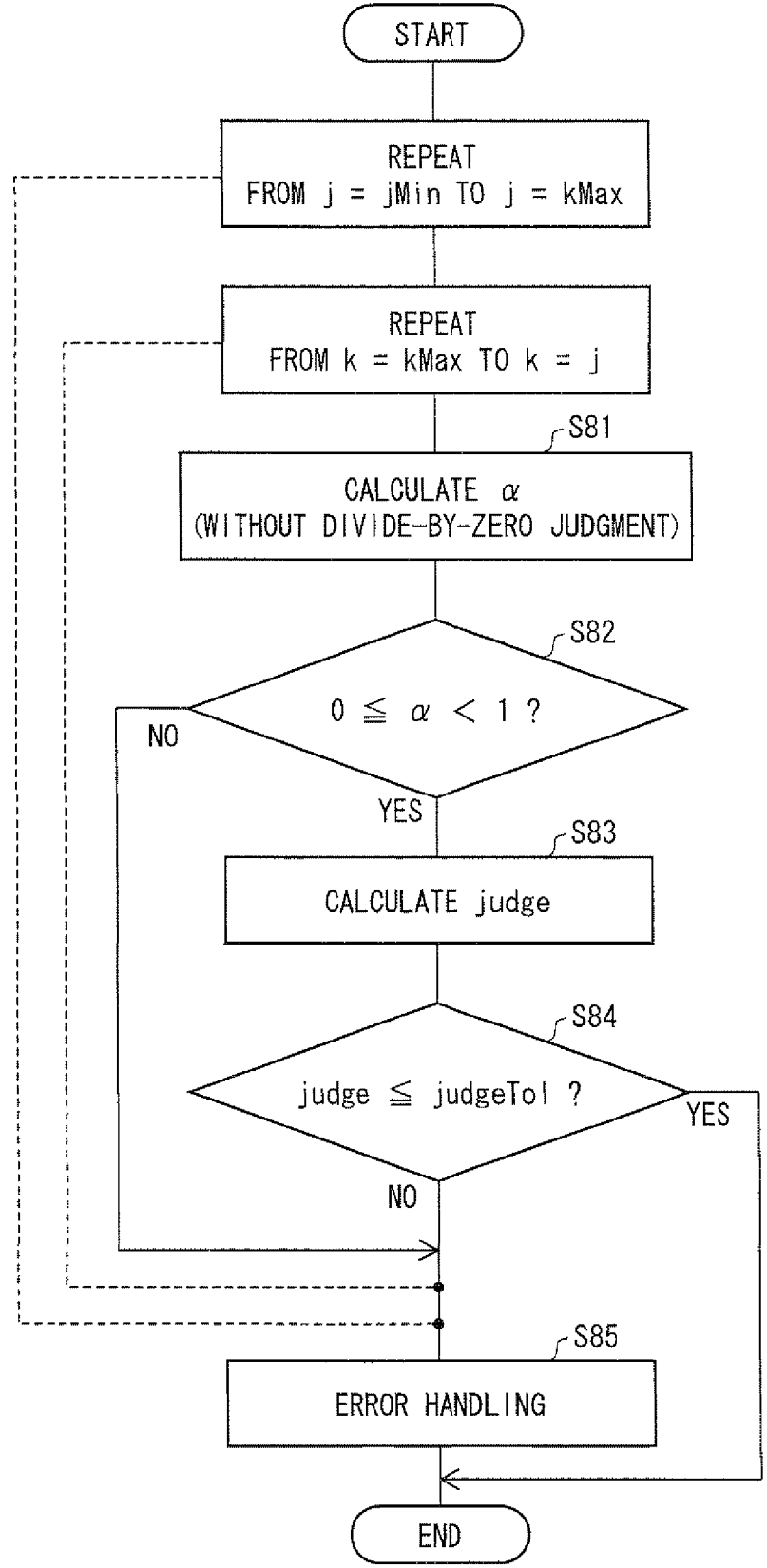
FIG. 20 is a flow chart showing a sequence of operations that are performed by the color-saturation conversion section of FIG. 19.

FIG. 20 is a flow chart that explains the operation of the fifth color-saturation conversion rate calculation section 73.

According to the flow chart, Steps S81 to S84 are repeated from j=jMin to j=kMax, and further repeated from k=kMax to k=j or repeated from k=j to k=kMax.

First, in Step S81, the fifth color-saturation conversion rate calculation section 73 calculates the current value of α according to Formula (20):

$$\alpha = \frac{\left\{\begin{array}{l} MAXw - (a[k] - a[j]) \times \\ Y[i] - (b[k] - b[j]) \times MAX \end{array}\right\}}{\left\{\begin{array}{l} a[k] \times (maxRGB - Y[i]) - \\ a[j] \times (minRGB - Y[i]) \end{array}\right\}}. \quad (20)$$

Next, the fifth color-saturation conversion rate calculation section 73 judges whether or not α falls within a range of $0 \leq \alpha < 1$ (S82). If α falls within the range, the fifth color-saturation conversion rate calculation section 73 proceeds to Step S83. If α is out of the range, the fifth color-saturation conversion rate calculation section 73 skips Steps S83 and S84.

In cases where the color-saturation conversion rate α falls within a range of $0 \leq \alpha < 1$, the fifth color-saturation conversion rate calculation section 73 calculates an α calculation judgment value (judge) according to Formula (21) (S83):

$$judge = \left| \begin{array}{l} fg\left(\begin{array}{l} \alpha \times maxRGB + \\ (1-\alpha) \times Y[i], \gamma \end{array}\right) - \\ fg\left(\begin{array}{l} \alpha \times minRGB + \\ (1-\alpha) \times Y[i], \gamma \end{array}\right) - MAXw \end{array} \right|. \quad (21)$$

Next, if the α calculation judgment value judge is not more than a predetermined threshold (judgeTol) for use in calculation judgment of α, the fifth color-saturation conversion rate calculation section 73 goes out of the loop to finish the process. If not, the fifth color-saturation conversion rate calculation section 73 proceeds with the loop process (S84). In cases where the fifth color-saturation conversion rate calculation section 73 finishes the loop process without satisfying the judgment condition of S84, the fifth color-saturation conversion rate calculation section 73 cannot calculate the desired value of α. Therefore, the fifth color-saturation conversion rate calculation section 73 performs some sort of error handling (S85).

The following shows an example of calculation of a backlight value according to Embodiment 6. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255, γ=2, Ndg=16, B1 Ratio=0.5, and judgeTol=1.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner. First, normalized-gamma-curve polygonal-line information (j, x[j], y[j], a[j], b[j]) is calculated according to Formulae (9) to (12) in the same manner as in Embodiment 4 to take on values shown above in Table 1.

The calculation of a backlight upper limit and the calculation of the maximum and minimum values of a gamma-corrected RGB signal are performed in the same manner as in the example explained in Embodiment 1. That is, the backlight upper limit MAXw is set as MAXw=127.5, and the maximum and minimum values maxRGBg and minRGBg of the gamma-corrected RGB signal are set as maxRGBg=255 and minRGBg=16, respectively.

Since the target pixel satisfies Formula (4), the target pixel is subjected to color-saturation conversion. At this time, a color-saturation conversion rate α is calculated in the following manner. First, the luminance Y[1], jMin, and kMax each corresponding to the input pixel values are calculated to take on the same values of 207, 3, and 15 as in Embodiment 4, respectively.

Thus, since jMin=3 and kMax=15, the present example of calculation repeats Steps S81 to S84 of the flow chart of FIG. 20 from j=3 to j=15 and from k=15 to k=j for each value of j. The repetition of the steps yields such variations in value of j, k, αt, judge, α, and judgeMin as shown below in Table 5.

TABLE 5

| j | k | α | judge |
|---|---|---|---|
| 3 | 15 | 0.282752 | 45.2506 |
| 3 | 14 | 0.267344 | 49.41094 |
| 3 | 13 | 0.264486 | 50.18262 |
| 3 | 12 | 0.275815 | 47.12364 |
| 3 | 11 | 0.303267 | 39.71165 |
| 3 | 10 | 0.349144 | 27.57701 |
| 3 | 9 | 0.416211 | 10.27383 |
| 3 | 8 | 0.507813 | 12.16406 |
| 3 | 7 | 0.628038 | 39.65104 |
| 3 | 6 | 0.781939 | 72.20267 |
| 3 | 5 | 0.97583 | 107.7788 |
| 3 | 4 | 1.217708 | — |
| 3 | 3 | 1.517867 | — |
| 4 | 15 | 0.356412 | 25.70205 |
| 4 | 14 | 0.345285 | 28.67282 |
| 4 | 13 | 0.345631 | 28.48351 |
| 4 | 12 | 0.358774 | 25.09255 |
| 4 | 11 | 0.38625 | 18.00375 |
| 4 | 10 | 0.42985 | 6.754883 |
| 4 | 9 | 0.491678 | 8.29178 |
| 4 | 8 | 0.574219 | 27.70313 |
| 4 | 7 | 0.680482 | 51.03906 |
| 4 | 6 | 0.813867 | 78.33281 |
| 4 | 5 | 0.978824 | 108.2998 |
| 4 | 4 | 1.180556 | — |
| 5 | 15 | 0.405884 | 12.93823 |
| 5 | 14 | 0.397429 | 15.11946 |
| 5 | 13 | 0.399479 | 14.59063 |
| 5 | 12 | 0.41312 | 11.07139 |
| 5 | 11 | 0.439593 | 4.24135 |
| 5 | 10 | 0.480324 | 5.56684 |
| 5 | 9 | 0.436959 | 19.15926 |
| 5 | 8 | 0.611406 | 35.95675 |
| 5 | 7 | 0.705892 | 56.38574 |
| 5 | 6 | 0.82303 | 80.09205 |
| 5 | 5 | 0.965909 | 106.0526 |
| 6 | 15 | 0.437388 | 4.810045 |
| 6 | 14 | 0.430607 | 6.559743 |
| 6 | 13 | 0.433475 | 5.819602 |
| 6 | 12 | 0.446899 | 2.455078 |
| 6 | 11 | 0.4719 | 3.545111 |
| 6 | 10 | 0.509635 | 12.60156 |
| 6 | 9 | 0.561422 | 24.86234 |
| 6 | 8 | 0.628797 | 39.81278 |
| 6 | 7 | 0.713397 | 57.96181 |
| 6 | 6 | 0.817308 | 78.99339 |
| 7 | 15 | 0.455181 | 0.467516 |

In Table 5, the final value of α is calculated as:

$$\alpha = 0.455181.$$

In Embodiment 4, the number of times the loop is repeated is 91. Meanwhile, in Embodiment 6, the number of times the loop is repeated is 47, which is only about half as many as in Embodiment 4.

Once the color-saturation conversion rate α is thus calculated, the RGBW transmission amounts and the backlight value are calculated according to the same procedure as in Embodiment 1.

That is, the saturation-converted input RGB signal is calculated according to Formulae (6) to (8) as follows:

$$Rs[1] = \alpha \times R[1] + (1 - \alpha) \times Y[1]$$
$$= 0.455181 \times 159 + (1 - 0.455181) \times 207$$
$$= 185$$
$$Gs[1] = \alpha \times G[1] + (1 - \alpha) \times Y[1]$$
$$= 0.455181 \times 255 + (1 - 0.455181) \times 207$$
$$= 229$$
$$Bs[1] = \alpha \times B[1] + (1 - \alpha) \times Y[1]$$
$$= 0.455181 \times 63 + (1 - 0.455181) \times 207$$
$$= 141.$$

Next, the gamma-corrected input RGB signal is calculated as follows:

$$Rsg[1] = (Rs[1]/\text{MAX})\gamma \times \text{MAX}$$
$$= (185/255)^2 \times 255$$
$$= 134$$
$$Gsg[1] = (Gs[1]/\text{MAX})\gamma \times \text{MAX}$$
$$= (229/255)^2 \times 255$$
$$= 206$$
$$Bsg[1] = (Bs[1]/\text{MAX})\gamma \times \text{MAX}$$
$$= (141/255)^2 \times 255$$
$$= 78.$$

Next, the W transmission amount is calculated according to Formula (55) as follows:

$$Wtsg[1] = \min(\max RGBsg/2, \min RGBsg)$$
$$= \min(206/2, 78)$$
$$= 78.$$

Next, the RGB transmission amounts are calculated according to Formulae (56) to (58) as follows:

$$Rtsg[1] = Rsg[1] - Wtsg[1] = 134 - 78 = 56$$

$$Gtsg[1] = Gsg[1] - Wtsg[1] = 206 - 78 = 128$$

$$Btsg[1] = Bsg[1] - Wtsg[1] = 78 - 78 = 0.$$

Finally, the backlight value is calculated according to Formula (59) as follows:

$$Wbsg = \max(Rtsg[1], Gtsg[1], Btsg[1], Wtsg[1])$$
$$= \max(56, 128, 0, 56)$$
$$= 128.$$

That is, the backlight value obtained in cases where the color-saturation conversion process is performed is 128. Thus, the above example shows that the color-saturation conversion process can reduce the backlight value from 239 to 128 (reduction of approximately 46%).

Embodiment 7

Embodiment 7 is a second example of means for approximately calculating a color-saturation conversion rate α in the second color-saturation conversion rate section 33 of Embodiment 2, makes such a change to Embodiment 5 as to speed up the color-saturation converting means, and makes such a change to Embodiment 6 as to perform a color-saturation conversion process on every pixel within the input image. It should be noted that processing sections identical to those of Embodiments 2 to 5 are given the same reference numerals as those of Embodiments 2 to 5 and will not be described below in detail.

Figure 21:
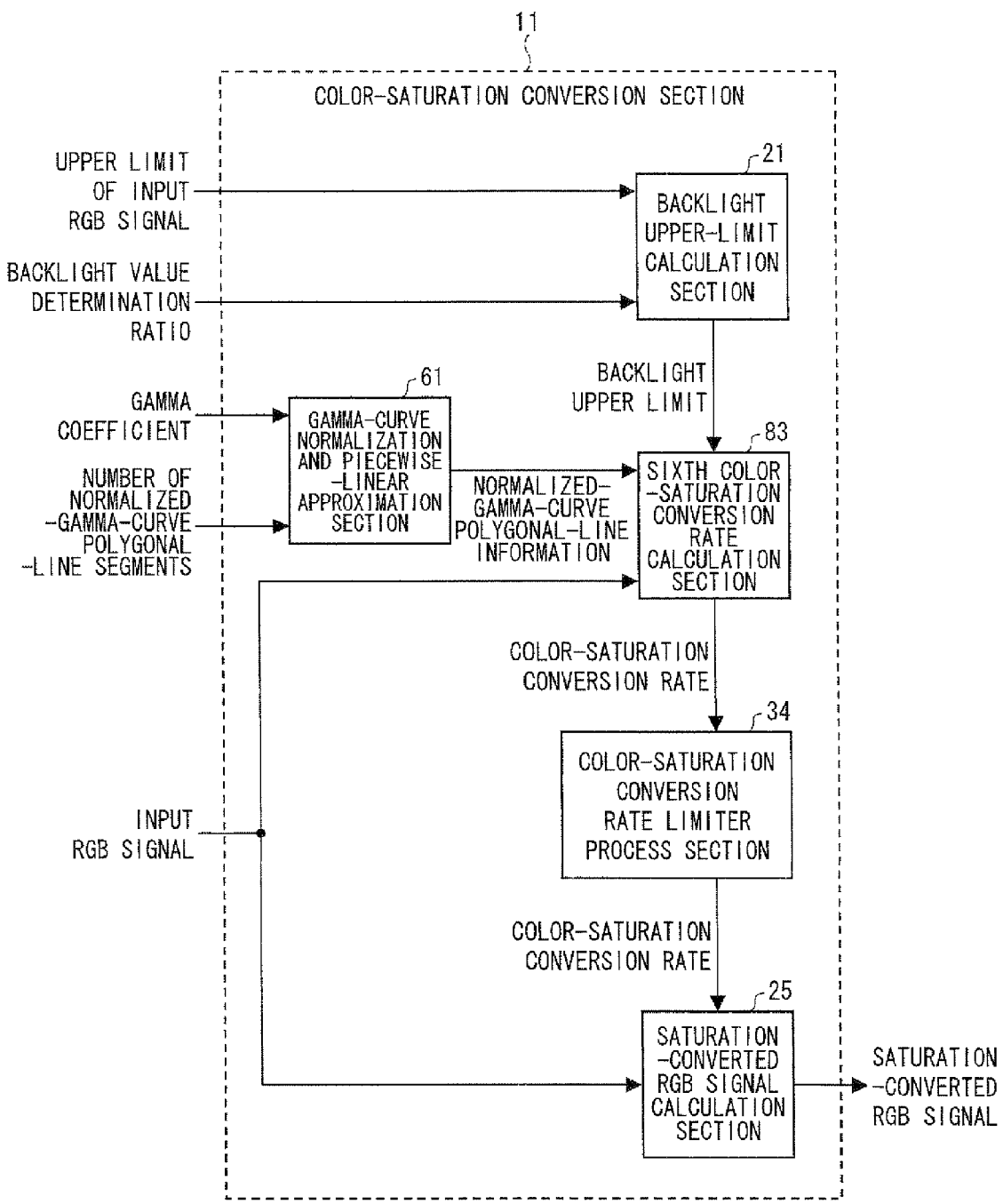
FIG. 21 is a block diagram showing an example arrangement of a color-saturation conversion section in Embodiment 7 of the liquid crystal display device.

FIG. 21 shows another arrangement of the color-saturation conversion section 11 of a liquid crystal display device according to Embodiment 7. The color-saturation conversion section 11 of FIG. 21 is obtained by replacing the fourth color-saturation conversion rate calculation section 63 of the color-saturation conversion section 11 (see FIG. 17) of Embodiment 5 with a sixth color-saturation conversion rate calculation section 83.

The sixth color-saturation conversion rate calculation section 83 calculates a color-saturation conversion rate α from an input RGB signal, a backlight upper limit, and normalized-gamma-curve polygonal-line information according to a different method from the fourth color-saturation conversion rate calculation section 63, and then outputs the color-saturation conversion rate α.

Figure 22:
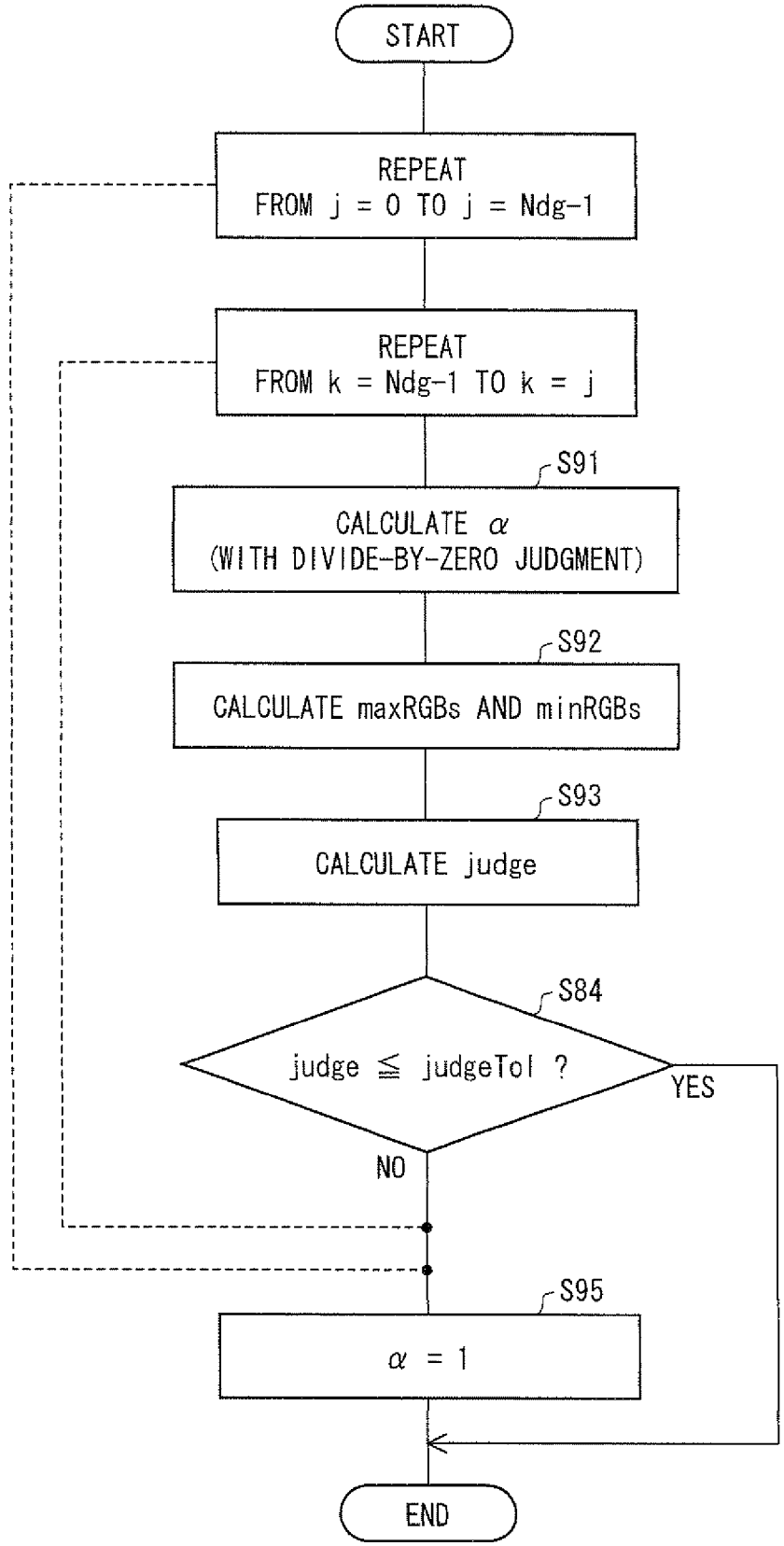
FIG. 22 is a flow chart showing a sequence of operations that are performed by the color-saturation conversion section of FIG. 21.

FIG. 22 is a flow chart that explains the operation of the sixth color-saturation conversion rate calculation section 83.

According to the flow chart, Steps S91 to S93 and S84 are repeated from j=0 to j=Ndg−1, and further repeated from k=Ndg−1 to k=j or repeated from k=j to k=Ndg−1.

First, the sixth color-saturation conversion rate calculation section 83 calculates the current value of α according to Formula (20) (S91). However, when the denominator of Formula (20) is 0, the target pixel has a color saturation of 0. Therefore, α may take on any value. In Embodiment 7, when the denominator of Formula (20) is 0, α is set, for example, as α=1.

Next, the sixth color-saturation conversion rate calculation section 83 calculates the maximum and minimum values (maxRGBs, minRGBs) of the input RGB signal after color-saturation conversion according to Formulae (22) and (23) (S92):

$$\max RGBs = \max(\alpha \times \max RGB + (1-\alpha) \times Y[i], 0) \quad (22)$$

$$\min RGBs = \min(\alpha \times \max RGB + (1-\alpha) \times Y[i], \text{MAX}). \quad (23)$$

Depending on the value of α, the maximum value after the color-saturation conversion may exceeds the upper limit MAX of the signal, or the minimum value after the color-saturation conversion may fall short of the lower limit 0 of the signal. Therefore, Formulae (22) and (23) are subjected to a limiter process.

Next, the sixth color-saturation conversion rate calculation section 83 calculates an α calculation judgment value (judge) according to Formula (24) (S93):

$$judge = |fg(\max RGBs, \gamma) - fg(\min RGBs, \gamma) - \text{MAX}w|. \quad (24)$$

Next, if the α calculation judgment value judge is not more than a predetermined threshold (judgeTol) for use in calculation judgment of α, the sixth color-saturation conversion rate calculation section 83 goes out of the loop to finish the process. If not, the sixth color-saturation conversion rate calculation section 83 proceeds with the loop process (S84). In cases where the sixth color-saturation conversion rate calculation section 83 finishes the loop process without satisfying the judgment condition of S84, the sixth color-saturation conversion rate calculation section 83 sets the color-saturation conversion rate α as α=1 (S95).

The following shows a first example of calculation of a backlight value according to Embodiment 7. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255, γ=2, Ndg=16, B1 Ratio=0.5, and judgeTol=1.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner. First, normalized-gamma-curve polygonal-line information (j, x[j], y[j], a[j], b[j]) is calculated in the same manner as in Embodiment 5 to take on values shown above in Table 1.

The calculation of a backlight upper limit is performed in the same manner as in the example explained in Embodiment 1. That is, the backlight upper limit MAXw is set as MAXw=127.5.

Since Embodiment 7 does not judge whether or not it is necessary to reduce the color saturation, Embodiment 7 calculates a color-saturation conversion rate α for every pixel. The calculation of a color-saturation conversion rate α in this example is performed in a way similar to the example explained in Embodiment 6 (differs only in range of repetition of j and k).

That is, since Ndg=16, the present example of calculation repeats Steps S91 to S93 and S84 of the flow chart of FIG. 22 from j=0 to j=15 and from k=15 to k=j for each value of j. The repetition of the steps yields such variations in value of j, k, α, and judge as shown below in Table 6.

TABLE 6

| j | k | α | judge |
|---|---|---|---|
| 0 | 15 | −0.2114 | 196.4903 |
| 0 | 14 | −0.26636 | 215.7437 |
| 0 | 13 | −0.30651 | 229.9678 |
| 0 | 12 | −0.32868 | 237.8036 |
| 0 | 11 | −0.32873 | 237.8185 |
| 0 | 10 | −0.30111 | 228.0449 |

TABLE 6-continued

| j | k | α | judge |
|---|---|---|---|
| 0 | 9 | −0.23828 | 205.8047 |
| 0 | 8 | −0.12969 | 169.0359 |
| 0 | 7 | 0.039931 | 115.3047 |
| 0 | 6 | 0.293457 | 42.36035 |
| 0 | 5 | 0.666853 | 48.1942 |
| 0 | 4 | 1.220052 | 123.6211 |
| 0 | 3 | 2.060938 | 127.5 |
| 0 | 2 | 3.405273 | 127.5 |
| 0 | 1 | 5.75651 | 127.5 |
| 0 | 0 | 10.625 | 127.5 |
| 1 | 15 | 0.019336 | 121.6066 |
| 1 | 14 | −0.0148 | 132.1838 |
| 1 | 13 | −0.03429 | 138.3802 |
| 1 | 12 | −0.03654 | 139.0947 |
| 1 | 11 | −0.01831 | 133.2993 |
| 1 | 10 | 0.024479 | 120.0328 |
| 1 | 9 | 0.097098 | 97.81133 |
| 1 | 8 | 0.20643 | 66.10276 |
| 1 | 7 | 0.361654 | 24.34961 |
| 1 | 6 | 0.575284 | 27.93963 |
| 1 | 5 | 0.864844 | 88.12031 |
| 1 | 4 | 1.255642 | 124.582 |
| 1 | 3 | 1.785645 | 127.5 |
| 1 | 2 | 2.514509 | 127.5 |
| 1 | 1 | 3.541667 | 127.5 |
| 2 | 15 | 0.175442 | 75.02751 |
| 2 | 14 | 0.153054 | 81.47514 |
| 2 | 13 | 0.144345 | 83.96326 |
| 2 | 12 | 0.151367 | 81.96094 |
| 2 | 11 | 0.176604 | 74.69285 |
| 2 | 10 | 0.22309 | 61.35938 |
| 2 | 9 | 0.294577 | 42.0579 |
| 2 | 8 | 0.395752 | 15.55225 |
| 2 | 7 | 0.532552 | 18.10156 |
| 2 | 6 | 0.712612 | 57.79688 |
| 2 | 5 | 0.945913 | 102.5733 |
| 2 | 4 | 1.245768 | 124.3154 |
| 2 | 3 | 1.630327 | 127.5 |
| 2 | 2 | 2.125 | 127.5 |
| 3 | 15 | 0.282752 | 45.2506 |
| 3 | 14 | 0.287344 | 49.41094 |
| 3 | 13 | 0.264486 | 50.18262 |
| 3 | 12 | 0.275815 | 47.12364 |
| 3 | 11 | 0.303267 | 39.71165 |
| 3 | 10 | 0.349144 | 27.57701 |
| 3 | 9 | 0.416211 | 10.27383 |
| 3 | 8 | 0.507813 | 12.16406 |
| 3 | 7 | 0.628038 | 39.65104 |
| 3 | 6 | 0.781939 | 72.20267 |
| 3 | 5 | 0.97583 | 107.7788 |
| 3 | 4 | 1.217708 | 123.5578 |
| 3 | 3 | 1.517867 | 127.5 |
| 4 | 15 | 0.356412 | 25.70205 |
| 4 | 14 | 0.345285 | 28.57282 |
| 4 | 13 | 0.345631 | 28.48351 |
| 4 | 12 | 0.358774 | 25.09255 |
| 4 | 11 | 0.38625 | 18.00375 |
| 4 | 10 | 0.42965 | 6.754883 |
| 4 | 9 | 0.491678 | 8.29178 |
| 4 | 8 | 0.574219 | 27.70313 |
| 4 | 7 | 0.680432 | 51.03906 |
| 4 | 6 | 0.813867 | 78.33281 |
| 4 | 5 | 0.978824 | 108.2998 |
| 4 | 4 | 1.180556 | 121.9141 |
| 5 | 15 | 0.405884 | 12.93823 |
| 5 | 14 | 0.397429 | 15.11946 |
| 5 | 13 | 0.399479 | 14.59063 |
| 5 | 12 | 0.41312 | 11.07139 |
| 5 | 11 | 0.439593 | 4.24135 |
| 5 | 10 | 0.480324 | 5.56684 |
| 5 | 9 | 0.536959 | 19.15926 |
| 5 | 8 | 0.611406 | 35.96875 |
| 5 | 7 | 0.705892 | 56.38574 |
| 5 | 6 | 0.82303 | 80.09205 |
| 5 | 5 | 0.965909 | 106.0526 |
| 6 | 15 | 0.437388 | 4.810045 |
| 6 | 14 | 0.430607 | 6.559743 |
| 6 | 13 | 0.433475 | 5.819602 |

TABLE 6-continued

| j | k | α | judge |
|---|---|---|---|
| 6 | 12 | 0.446699 | 2.455078 |
| 6 | 11 | 0.4719 | 3.545111 |
| 6 | 10 | 0.509635 | 12.60158 |
| 6 | 9 | 0.561422 | 24.86234 |
| 6 | 8 | 0.628767 | 39.81278 |
| 6 | 7 | 0.713397 | 57.96181 |
| 6 | 6 | 0.817308 | 78.99339 |
| 7 | 15 | 0.455181 | 0.467516 |

In Table 6, the final value of α is calculated as:

$\alpha = 0.455181.$

In Embodiment 5, the number of times the loop is repeated is 136. Meanwhile, in Embodiment 7, the number of times the loop is repeated is 92, which means a reduction in number of times the loop is repeated.

Since the color-saturation conversion rate α thus calculated falls within a range of $0 \leq \alpha \leq 1$, α is set as α=0.455181 even after the limiter process.

Once the color-saturation conversion rate α is thus calculated, the RGBW transmission amounts and the backlight value are calculated according to the same procedure as in Embodiment 1.

That is, the saturation-converted input RGB signal is calculated according to Formulae (6) to (8) as follows:

$$Rs[1] = \alpha \times R[1] + (1 - \alpha) \times Y[1]$$
$$= 0.455181 \times 159 + (1 - 0.455181) \times 207$$
$$= 185$$

$$Gs[1] = \alpha \times G[1] + (1 - \alpha) \times Y[1]$$
$$= 0.455181 \times 255 + (1 - 0.455181) \times 207$$
$$= 229$$

$$Bs[1] = \alpha \times B[1] + (1 - \alpha) \times Y[1]$$
$$= 0.455181 \times 63 + (1 - 0.455181) \times 207$$
$$= 141.$$

Next, the gamma-corrected input RGB signal is calculated as follows:

$$Rsg[1] = (Rs[1]/MAX)\gamma \times MAX$$
$$= (185/255)^2 \times 255$$
$$= 134$$

$$Gsg[1] = (Gs[1]/MAX)\gamma \times MAX$$
$$= (229/255)^2 \times 255$$
$$= 206$$

$$Bsg[1] = (Bs[1]/MAX)\gamma \times MAX$$
$$= (141/255)^2 \times 255$$
$$= 78.$$

Next, the W transmission amount is calculated according to Formula (55) as follows:

$$Wtsg[1] = \min(\max RGBsg/2, \min RGBsg)$$
$$= \min(206/2, 78)$$
$$= 78.$$

Next, the RGB transmission amounts are calculated according to Formulae (56) to (58) as follows:

$$Rtsg[1] = Rsg[1] - Wtsg[1] = 134 - 78 = 56$$

$$Gtsg[1] = Gsg[1] - Wtsg[1] = 206 - 78 = 128$$

$$Btsg[1] = Bsg[1] - Wtsg[1] = 78 - 78 = 0.$$

Finally, the backlight value is calculated according to Formula (59) as follows:

$$Wbsg = \max(Rtsg[1], Gtsg[1], Btsg[1], Wtsg[1])$$
$$= \max(56, 128, 0, 56)$$
$$= 128.$$

That is, the backlight value obtained in cases where the color-saturation conversion process is performed is 128. Thus, the above example shows that the color-saturation conversion process can reduce the backlight value from 239 to 128 (reduction of approximately 46%).

The first example of calculation thus explained is an example where the sixth color-saturation conversion rate calculation section 83 calculates a color-saturation conversion rate α as $0 \leq \alpha \leq 1$. The following shows an example (second example of calculation) where the sixth color-saturation conversion rate calculation section 83 does not calculate a color-saturation conversion rate α as $0 \leq \alpha \leq 1$. For convenience of explanation, the following shows an example where an image constituted by a single pixel is inputted and the input image has pixel values (R[1], G[1], B[1])=(159, 187, 85). That is, the following shows an example where the same pixel values are used as in the second example of calculation of a backlight value according to Embodiment 2. It should be noted that the following explanation assumes that MAX=255, γ=2, Ndg=16, B1 Ratio=0.5, and judgeTol=1.

First, in cases where no color-saturation conversion process is performed, a backlight value is calculated in the same manner as in the second example of calculation explained in Embodiment 2. That is, the backlight value obtained in cases where no color-saturation conversion process is performed is 109.

On the other hand, in cases where a color-saturation conversion process is performed, a backlight value is calculated in the following manner. First, normalized-gamma-curve polygonal-line information (j, x[j], y[j], a[j], b[j]) is calculated in the same manner as in Embodiment 5 to take on values shown above in Table 1.

The calculation of a backlight upper limit is performed in the same manner as in the example explained in Embodiment 1. That is, the backlight upper limit MAXw is set as MAXw=127.5.

Since Embodiment 7 does not judge whether or not it is necessary to reduce the color saturation, Embodiment 7 calculates a color-saturation conversion rate α for every pixel. In Embodiment 7, the color-saturation conversion rate α is calculated in the following manner. First, the luminance Y[1] corresponding to the input pixel values is calculated to take on the same value of 167.25 as in the second example of calculation of Embodiment 2.

Since Ndg=16, the present example of calculation repeats Steps S91 to S93 and S84 of the flow chart of FIG. 22 from j=0 to j=15 and from k=15 to k=j for each value of j. The repetition of the steps yields such variations in value of j, k, α, and judge as shown below in Table 7.

TABLE 7

| j | k | α | judge |
|---|---|---|---|
| 0 | 15 | 1.220302 | 1.602929 |
| 0 | 14 | 1.074618 | 12.49178 |
| 0 | 13 | 0.962023 | 21.95226 |
| 0 | 12 | 0.889323 | 28.1272 |
| 0 | 11 | 0.865331 | 30.22147 |
| 0 | 10 | 0.90166 | 27.07932 |
| 0 | 9 | 1.013934 | 17.54301 |
| 0 | 8 | 1.223684 | 1.342105 |
| 0 | 7 | 1.561427 | 20.46663 |
| 0 | 6 | 2.071903 | 42.49794 |
| 0 | 5 | 2.823456 | 67.5458 |
| 0 | 4 | 3.925962 | 107.7137 |
| 0 | 3 | 5.568027 | 127.5 |
| 0 | 2 | 8.102901 | 127.5 |
| 0 | 1 | 12.27827 | 127.5 |
| 0 | 0 | 20 | 127.5 |
| 1 | 15 | 1.338912 | 6.716617 |
| 1 | 14 | 1.228188 | 0.994757 |

In Table 7, the final value of α is calculated as:

$$\alpha = 1.228188.$$

In Embodiment 5, the number of times the loop is repeated is 116. Meanwhile, in Embodiment 7, the number of times the loop is repeated is 18, which means a reduction in number of times the loop is repeated. In this example, since α exceeds 1, a limiter process is performed so that α=1.

Thus, in cases where α=1, there are no differences in RGB values between before and after color-saturation conversion according to Formulae (6) to (8), with the same result as in the case where no color-saturation conversion (color-saturation reduction) is performed.

That is, in cases where a backlight value obtained in cases where no color-saturation conversion is performed falls short of a backlight upper limit, no color-saturation conversion is needed. Also in the present example of calculation, no color-saturation conversion is performed. Accordingly, the backlight value is 109 as in the case where no color-saturation conversion is performed.

Embodiment 8

Embodiment 8 is a third example of means for approximately calculating a color-saturation conversion rate α in the first color-saturation conversion rate calculation section 23 of Embodiment 1. Embodiment 8 calculates a color-saturation conversion rate α by using a dichotomizing search. It should be noted that processing sections identical to those of Embodiment 1 are given the same reference numerals as those of Embodiment 1 and will not be described below in detail.

Figure 23:
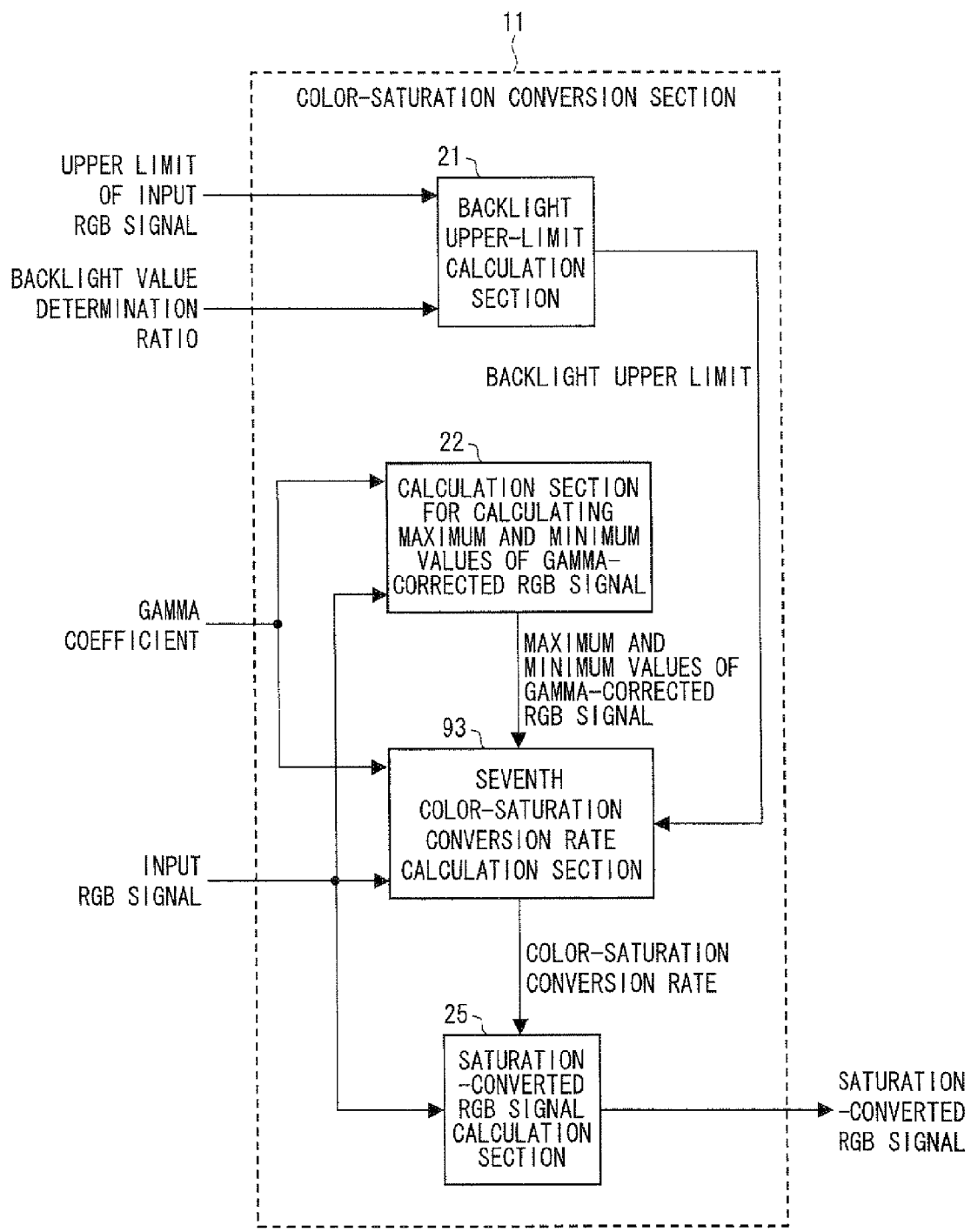
FIG. 23 is a block diagram showing an example arrangement of a color-saturation conversion section in Embodiment 8 of the liquid crystal display device.

FIG. 23 shows another arrangement of the color-saturation conversion section 11 of a liquid crystal display device according to Embodiment 8. The color-saturation conversion section 11 of FIG. 23 is obtained by replacing the first color-saturation conversion rate calculation section 23 of the color-saturation conversion section 11 (see FIG. 6) of Embodiment 1 with a seventh color-saturation conversion rate calculation section 93.

The seventh color-saturation conversion rate calculation section 93 calculates a color-saturation conversion rate α from an input RGB signal, a gamma coefficient, a backlight upper limit, and the maximum and minimum values of a gamma-corrected RGB signal according to a dichotomizing search, and then outputs the color-saturation conversion rate α.

Figure 24:
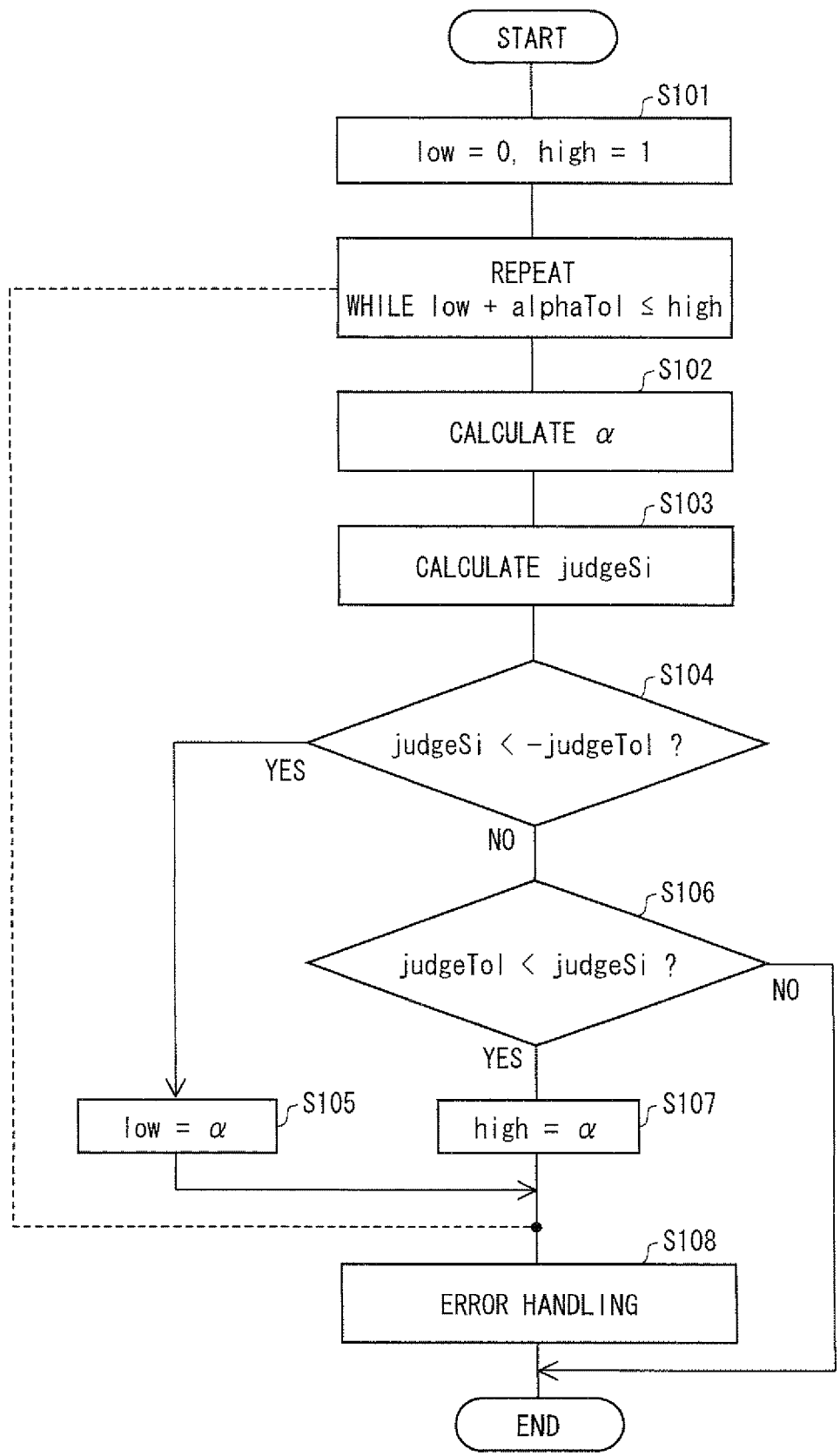
FIG. 24 is a flow chart showing a sequence of operations that are performed by the color-saturation conversion section of FIG. 23.

FIG. 24 is a flow chart that explains the operation of the seventh color-saturation conversion rate calculation section 93.

First, in Step S101, the seventh color-saturation conversion rate calculation section 93 sets the lower and upper limits low and high of a color-saturation conversion rate α for use in a dichotomizing search as low=0 and high=1, respectively.

Next, the seventh color-saturation conversion rate calculation section 93 repeats Steps S102 to S107 while low+alphaTol≦high, where alphaTol is a threshold for use in calculation loop judgment of a color-saturation conversion rate α. Further, Steps S102 to S107 may be repeated a predetermined number of times.

In Step S102, the seventh color-saturation conversion rate calculation section 93 calculates the current value of a according to Formula (25).

$$\alpha = (low+high)/2. \tag{25}$$

Next, in Step S103, the seventh color-saturation conversion rate calculation section 93 calculates an α calculation judgment value (judgeSi) according to Formula (26):

$$judgeSi = fg\left(\frac{\alpha \times maxRGB + }{(1-\alpha) \times Y[i], \gamma}\right) - fg\left(\frac{\alpha \times minRGB + }{(1-\alpha) \times Y[i], \gamma}\right) - MAXw. \tag{26}$$

The closer to 0 judgeSi is, the closer to the desired value of α the current value of α is. Further, the current value of α is smaller than the desired value in cases where judgeSi takes on a negative value, and the current value of α is larger than the desired value in cases where judgeSi takes on a positive value.

Next, if judgeSi is smaller than –judgeTol in Step S104, the current value of α is smaller than the desired value. Therefore, the seventh color-saturation conversion rate calculation section 93 updates low so that low takes on the current value of α (S105). Alternatively, if judgeSi is not smaller than –judgeTol in Step S104, the seventh color-saturation conversion rate calculation section 93 proceeds to Step S106. It should be noted here that judgeTol is a threshold for use in calculation judgment of a color-saturation conversion rate.

Next, if judgeSi is larger than judgeTol in Step S106, the current value of α is larger than the desired value. Therefore, the seventh color-saturation conversion rate calculation section 93 updates high so that high takes on the current value of α (S107). Alternatively, if judgeSi is not larger than judgeTol in Step S106, the seventh color-saturation conversion rate calculation section 93 judges that the current value of α is the desired value of α, and goes out of the loop to finish the process.

Alternatively, in cases where the seventh color-saturation conversion rate calculation section 93 finishes the loop process without saying No to the judgment condition of S106, the seventh color-saturation conversion rate calculation section 93 cannot calculate the desired value of α. Therefore, the seventh color-saturation conversion rate calculation section 93 performs some sort of error handling (S108).

The following shows an example of calculation of a backlight value according to Embodiment 8. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255, γ=2, B1 Ratio=0.5, judgeTol=1, and alphaTol=10$^{-7}$.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner.

The calculation of a backlight upper limit and the calculation of the maximum and minimum values of a gamma-corrected RGB signal are performed in the same manner as in the example explained in Embodiment 1. That is, the backlight upper limit MAXw is set as MAXw=127.5, and the maximum and minimum values maxRGBg and minRGBg of the gamma-corrected RGB signal are set as maxRGBg=255 and minRGBg=16, respectively.

Since the target pixel satisfies Formula (4), the target pixel is subjected to color-saturation conversion. At this time, a color-saturation conversion rate α is calculated in the following manner. First, the luminance Y[1] corresponding to the input pixel values is calculated in the same manner as in Embodiment 1 to take on a value of 207.

In the present example of calculation, the seventh color-saturation conversion rate calculation section 93 repeats Steps S101 to S107 of the flow chart of FIG. 24 while low+alphatol≦high, until the seventh color-saturation conversion rate calculation section 93 goes out of the loop by satisfying the judgment condition of S106. The values of low, high, α, and judgeSi that are calculated based on the flow chart vary as shown below in Table 8.

TABLE 8

| low | high | α | judgeSi |
|---|---|---|---|
| 0 | 1 | 0.5 | 10.28824 |
| 0 | 0.5 | 0.25 | −54.0882 |
| 0.25 | 0.5 | 0.375 | −20.7706 |
| 0.375 | 0.5 | 0.4375 | −4.95882 |
| 0.4375 | 0.5 | 0.46875 | 2.735294 |
| 0.4375 | 0.46875 | 0.453125 | −1.09412 |
| 0.453125 | 0.46875 | 0.460938 | 0.825 |

In Table 8, the final value of α is calculated as:

α=0.460938.

In Embodiments 4 and 6, the numbers of times the loops are repeated is 91 and 47, respectively. Meanwhile, in the present embodiment, the number of times the loop is repeated is only 7.

Once the color-saturation conversion rate α is thus calculated, the RGBW transmission amounts and the backlight value are calculated according to the same procedure as in Embodiment 1.

That is, the saturation-converted input RGB signal is calculated according to Formulae (6) to (8) as follows:

$$Rs[1] = \alpha \times R[1] + (1-\alpha) \times Y[1]$$
$$= 0.460938 \times 159 + (1-0.460938) \times 207$$
$$= 185$$

$$Gs[1] = \alpha \times G[1] + (1-\alpha) \times Y[1]$$
$$= 0.40938 \times 255 + (1-0.460938) \times 207$$
$$= 229$$

$$Bs[1] = \alpha \times B[1] + (1-\alpha) \times Y[1]$$
$$= 0.460938 \times 63 + (1-0.460938) \times 207$$
$$= 141.$$

Next, the gamma-corrected input RGB signal is calculated as follows:

$$Rsg[1] = (Rs[1]/MAX)\gamma \times MAX$$
$$= (185/255)^2 \times 255$$
$$= 134$$

$$Gsg[1] = (Gs[1]/MAX)\gamma \times MAX$$
$$= (229/255)^2 \times 255$$
$$= 206$$

$$Bsg[1] = (Bs[1]/MAX)\gamma \times MAX$$
$$= (141/255)^2 \times 255$$
$$= 78.$$

Next, the W transmission amount is calculated according to Formula (55) as follows:

$$Wrsg[1] = \min(\max RGBsg/2, \min RGBsg)$$
$$= \min(206/2, 78)$$
$$= 78.$$

Next, the RGB transmission amounts are calculated according to Formulae (56) to (58) as follows:

$$Rtsg[1]=Rsg[1]-Wtsg[1]=134-78=56$$

$$Gtsg[1]=Gsg[1]-Wtsg[1]=206-78=128$$

$$Btsg[1]=Bsg[1]-Wtsg[1]=78-78=0.$$

Finally, the backlight value is calculated according to Formula (59) as follows:

$$Wbsg = \max(Rtsg[1], Gtsg[1], Btsg[1], Wtsg[1])$$
$$= \max(56, 128, 0, 56)$$
$$= 128.$$

That is, the backlight value obtained in eases where the color-saturation conversion process is performed is 128. Thus, the above example shows that the color-saturation conversion process can reduce the backlight value from 239 to 128 (reduction of approximately 46%).

Embodiment 9

Embodiment 9 is a third example of means for approximately calculating a color-saturation conversion rate α in the second color-saturation conversion rate section 33 of Embodiment 2, and makes such a change to Embodiment 8 as to perform a color-saturation conversion process on every pixel within the input image. It should be noted that processing sections identical to those of Embodiments 2 and 7 are given the same reference numerals as those of Embodiments 2 and 7 and will not be described below in detail.

Figure 25:
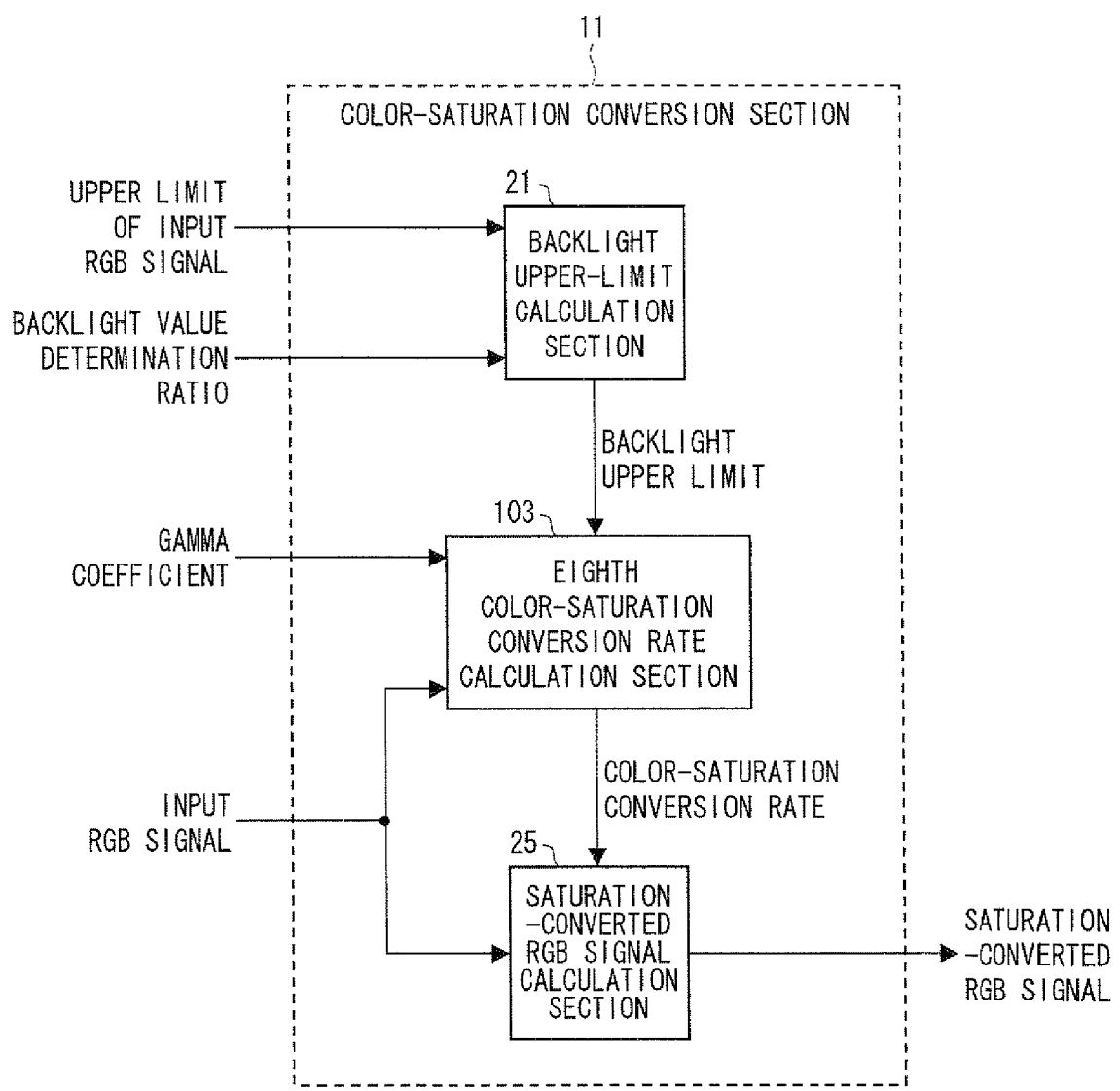
FIG. 25 is a block diagram showing an example arrangement of a color-saturation conversion section in Embodiment 9 of the liquid crystal display device.

FIG. 25 shows another arrangement of the color-saturation conversion section 11 of a liquid crystal display device according to Embodiment 9. The color-saturation conversion section 11 of FIG. 25 is obtained by replacing the calculation section 22 and the seventh color-saturation conversion rate calculation section 93 of the color-saturation conversion section 11 (see FIG. 23) of Embodiment 8 with an eighth color-saturation conversion rate calculation section 103. It should be noted, in the present embodiment, that since the color-saturation conversion rate α does not deviate from a range of 0 to 1, no color-saturation conversion rate limiter process section 34 is mounted.

The eighth color-saturation conversion rate calculation section 103 calculates a color-saturation conversion rate α from an input RGB signal, a gamma coefficient, and a backlight upper limit according to a dichotomizing search, and then outputs the color-saturation conversion rate α.

Figure 26:
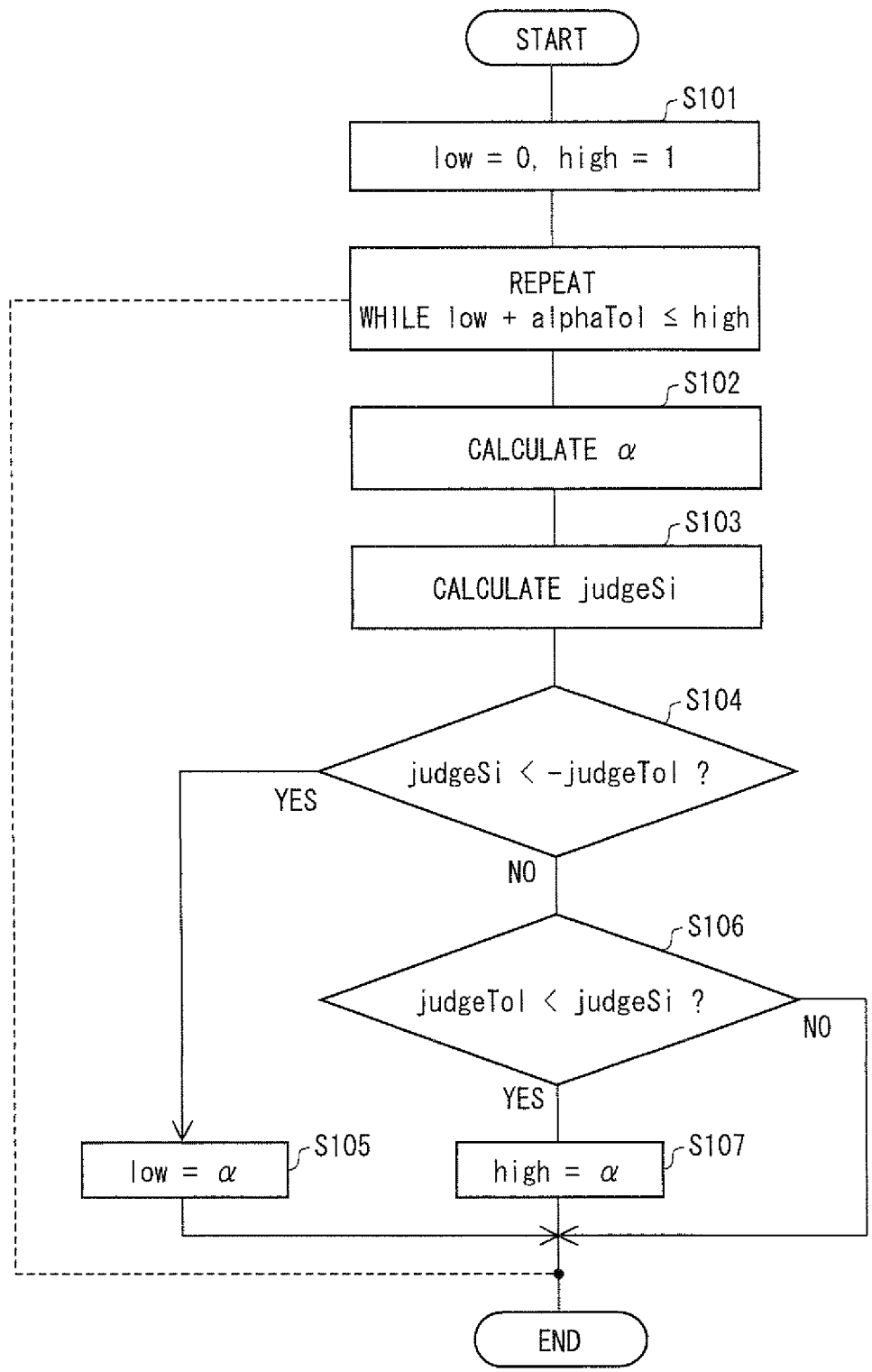
FIG. 26 is a flow chart showing a sequence of operations that are performed by the color-saturation conversion section of FIG. 25.

FIG. 26 is a flow char that explains the operation of the eighth color-saturation conversion rate calculation section 103.

First, in Step S101, the eighth color-saturation conversion rate calculation section 103 sets the lower and upper limits low and high of a color-saturation conversion rate α for use in a dichotomizing search as low=0 and high=1, respectively. Step S101 of FIG. 26 is identical to Step S101 of FIG. 24.

Next, the eighth color-saturation conversion rate calculation section 103 repeats Steps S102 to S107 while low+alphaTol≦high. Steps S102 to S107 of FIG. 26 are also identical to Steps S102 to S107 of FIG. 24.

Further, in cases where the eighth color-saturation conversion rate calculation section 103 finishes the loop process without saying No to the judgment condition of S106, the eighth color-saturation conversion rate calculation section 103 performs such a process that the current value of α is the desired value of α.

The following shows a first example of calculation of a backlight value according to Embodiment 9. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255, γ=62, B1 Ratio=0.5, judgeTol=1, and alphaTol=$10^{-7}$.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner.

The calculation of a backlight upper limit is performed in the same manner as in the example explained in Embodiment 1. That is, the backlight upper limit MAXw is set as MAXw 127.5.

Since Embodiment 9 does not judge whether or not it is necessary to reduce the color saturation, Embodiment 9 calculates a color-saturation conversion rate α for every pixel. In Embodiment 9, the color-saturation conversion rate α is calculated in the following manner. First, the luminance Y[1] corresponding to the input pixel values is calculated to take on the same value of 207 as in Embodiment 1.

In the present example of calculation, the eighth color-saturation conversion rate calculation section 103 repeats Steps S101 to S107 of the flow chart of FIG. 26 until the eighth color-saturation conversion rate calculation section 103 goes out of the loop by satisfying the judgment condition of S106. The values of low, high, α, and judgeSi that are calculated based on the flow chart vary as shown below in Table 8, as with Embodiment 8.

In Table 8, the final value of α is calculated as:

$$\alpha = 0.460938.$$

In Embodiments 5 and 7, the numbers of times the loops are repeated is 136 and 92, respectively. Meanwhile, in the present embodiment, the number of times the loop is repeated is only 7.

Once the color-saturation conversion rate α is thus calculated, the RGBW amounts and the backlight value are calculated according to the same procedure as in Embodiment 1. The subsequent procedure is the same as in the example of calculation of a backlight value according to Embodiment 8. That is, the backlight value obtained in cases where the color-saturation conversion process is performed is 128. Thus, the above example shows that the color-saturation conversion process can reduce the backlight value from 239 to 128 (reduction of approximately 46%).

The following shows a second example of calculation of a backlight value according to Embodiment 9. For convenience of explanation. The following shows an example where an image constituted by a single pixel is inputted and the input image has pixel values (R[1], G[1], B[1])=(159, 187, 85). That is, the following shows an example where the same pixel values are used as in the second example of calculation of a backlight value according to Embodiment 2. It should be noted that the following explanation assumes that MAX=255, γ=2, B1 Ratio=0.5, judgeTol=1, and alphaTol=$10^{-7}$.

First, in cases where no color-saturation conversion process is performed, a backlight value is calculated in the same manner as in the second example of calculation explained in Embodiment 2. That is, the backlight value obtained in cases where no color-saturation conversion process is performed is 109.

On the other hand, in cases where a color-saturation conversion process is performed, a backlight value is calculated in the following manner.

The calculation of a backlight upper limit is performed in the same manner as in the example explained in Embodiment 1. That is, the backlight upper limit MAXw is set as MAXw=127.5. Further, the luminance Y[1] corresponding to the input pixel values is calculated in the same manner as in the second example of calculation of Embodiment 2 to take on a value of 167.25.

In the present example of calculation, the seventh color-saturation conversion rate calculation section 93 repeats Steps S101 to S107 of the flow chart of FIG. 26 while low+ alphaTol≦high. The values of low, high, α, and judgeSi that are calculated based on the flow chart vary as shown below in Table 9.

TABLE 9

| low | high | α | judgeSi |
|---|---|---|---|
| 0.00000000 | 1.00000000 | 0.50000000 | −66.85000000 |
| 0.50000000 | 1.00000000 | 0.75000000 | −41.21250000 |
| 0.75000000 | 1.00000000 | 0.87500000 | −29.56562500 |
| 0.87500000 | 1.00000000 | 0.93750000 | −24.03515625 |
| 0.93750000 | 1.00000000 | 0.96875000 | −21.34316406 |
| 0.96875000 | 1.00000000 | 0.98437500 | −20.01547852 |
| 0.98437500 | 1.00000000 | 0.99218750 | −19.35621338 |
| 0.99218750 | 1.00000000 | 0.99609375 | −19.02772522 |
| 0.99609375 | 1.00000000 | 0.99804688 | −18.86376724 |
| 0.99804688 | 1.00000000 | 0.99902344 | −18.78185978 |
| 0.99902344 | 1.00000000 | 0.99951172 | −18.74092393 |
| 0.99951172 | 1.00000000 | 0.99975586 | −18.72046047 |
| 0.99975586 | 1.00000000 | 0.99987793 | −18.71022986 |
| 0.99987793 | 1.00000000 | 0.99993896 | −18.70511484 |
| 0.99993896 | 1.00000000 | 0.99996948 | −18.70255740 |
| 0.99996948 | 1.00000000 | 0.99998474 | −18.70127869 |
| 0.99998474 | 1.00000000 | 0.99999237 | −18.70063934 |
| 0.99999237 | 1.00000000 | 0.99999619 | −18.70031967 |
| 0.99999619 | 1.00000000 | 0.99999809 | −18.70015984 |
| 0.99999809 | 1.00000000 | 0.99999905 | −18.70007992 |
| 0.99999905 | 1.00000000 | 0.99999952 | −18.70003996 |
| 0.99999952 | 1.00000000 | 0.99999976 | −18.70001998 |
| 0.99999976 | 1.00000000 | 0.99999988 | −18.70000999 |
| 0.99999988 | 1.00000000 | 0.99999994 | −18.70000499 |

In Table 9, the final value of α is calculated as:

α=0.99999994≈1.

In the second examples of calculation of Embodiments 5 and 7, the numbers of times the loops are repeated is 136 and 18, respectively. Meanwhile, in the present embodiment, the number of times the loop is repeated is 24.

Thus, in cases where α=1, there are no differences in RGB values between before and after color-saturation conversion according to Formulae (6) to (8), with the same result as in the case where no color-saturation conversion (color-saturation reduction) is performed.

That is, in cases where a backlight value obtained in cases where no color-saturation conversion is performed falls short of a backlight upper limit, no color-saturation conversion is needed. Also in the present example of calculation, no color-saturation conversion is performed. Accordingly, the backlight value is 109 as in the case where no color-saturation conversion is performed.

Embodiment 10

Embodiment 10 is a fourth example of means for approximately calculating a color-saturation conversion rate α in the color-saturation conversion rate calculation section 23 of Embodiment 1. Embodiment 10 calculates a color-saturation conversion rate α by using Newton's method. It should be noted that processing sections identical to those of Embodiment 1 are given the same reference numerals as those of Embodiment 1 and will not be described below in detail.

Figure 27:
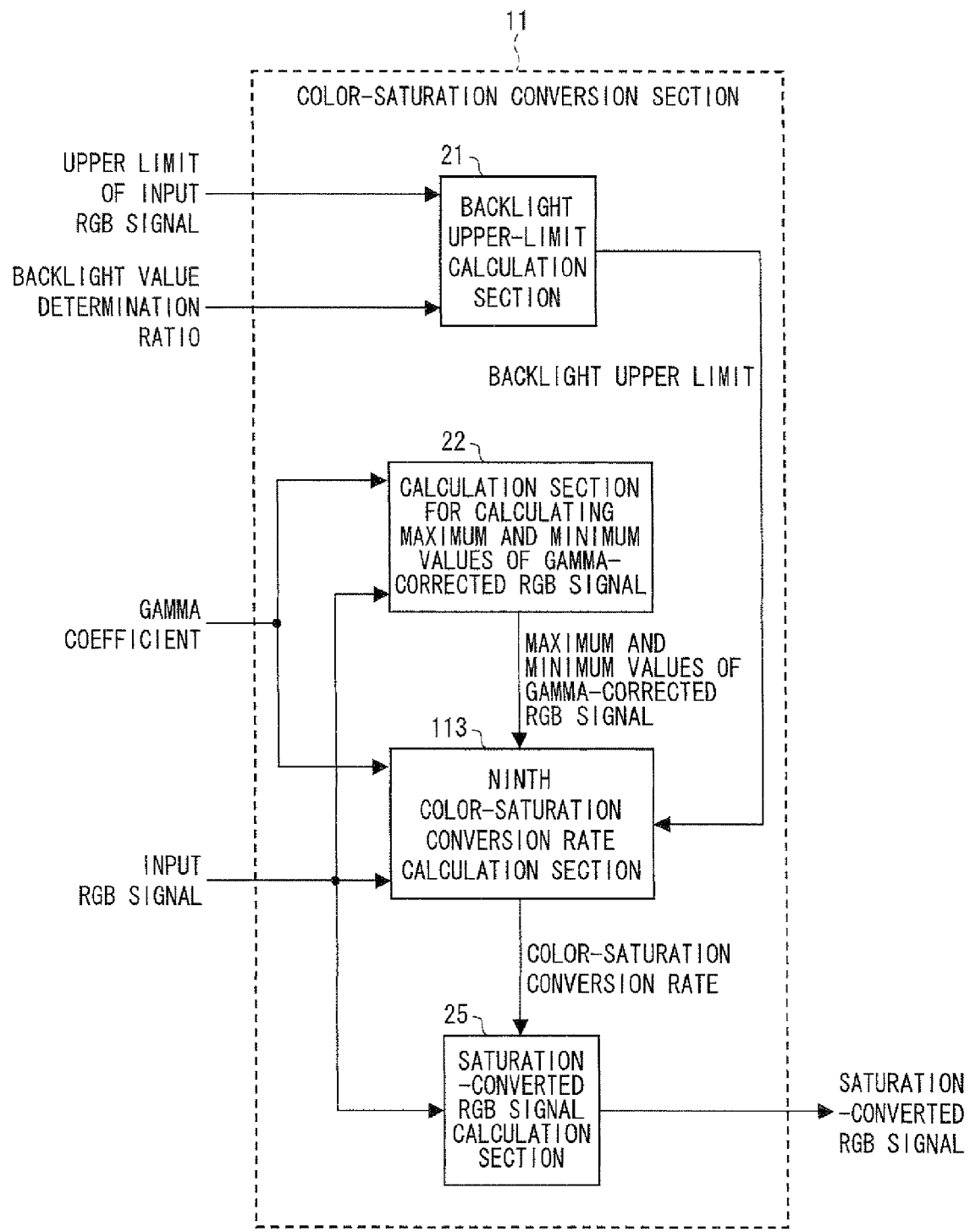
FIG. 27 is a block diagram showing an example arrangement of a color-saturation conversion section in Embodiment 10 of the liquid crystal display device.

FIG. 27 shows another example of a color-saturation conversion section 11 of a liquid crystal display device according to Embodiment 10. The color-saturation conversion section 11 of FIG. 27 is obtained by replacing the first color-saturation conversion section 23 (see FIG. 6) of Embodiment 1 with a ninth color-saturation conversion rate calculation section 113.

The ninth color-saturation conversion rate calculation section 113 calculates a color-saturation conversion rate α from an input RGB signal, a gamma coefficient, a backlight upper limit, and the maximum and minimum values of a gamma-corrected RGB signal according to Newton's method, and then outputs the color-saturation conversion rate α.

Figure 28:
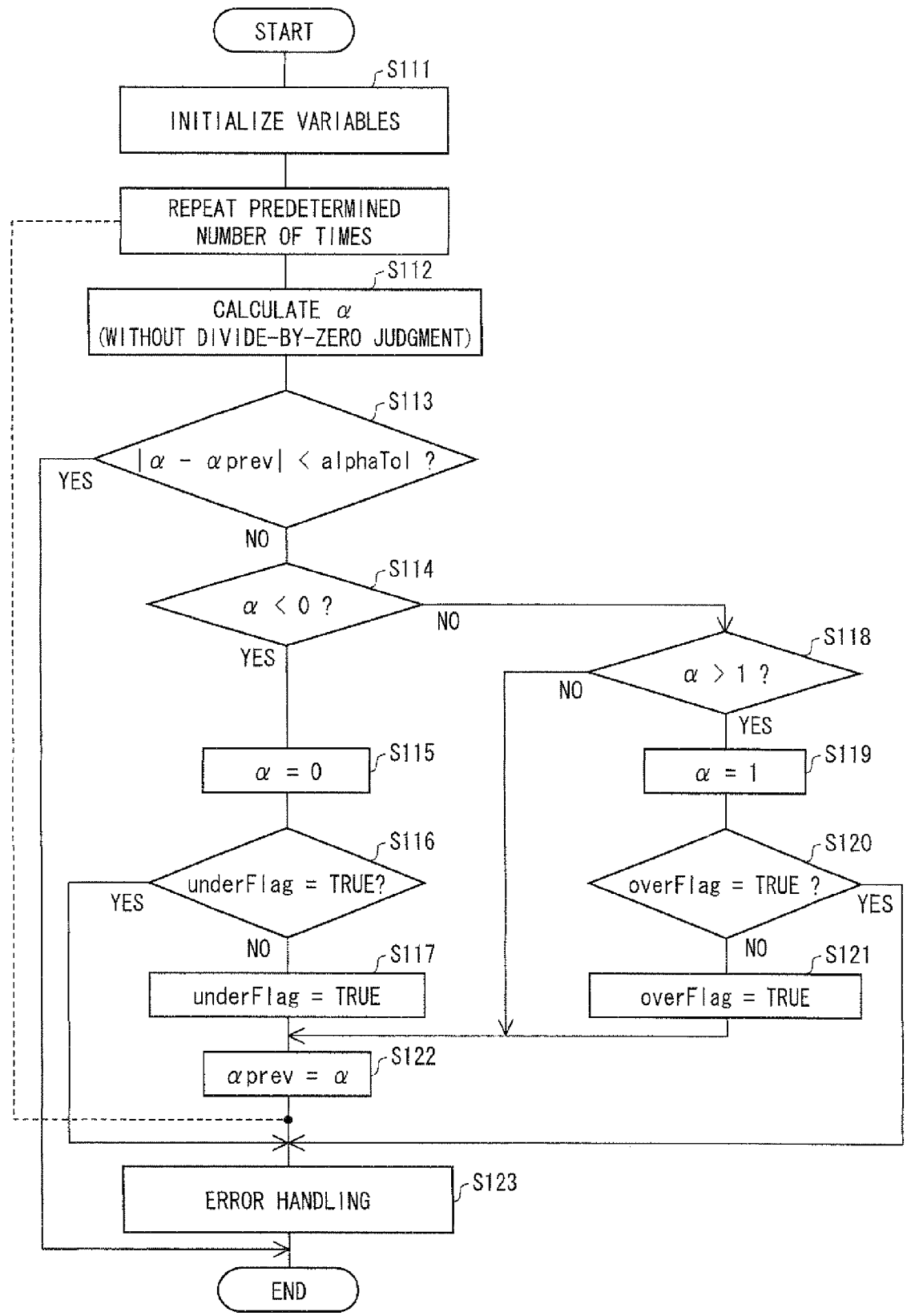
FIG. 28 is a flow chart showing a sequence of operations that are performed by the color-saturation conversion section of FIG. 27.

FIG. 28 is a flow chart that explains the operation of the ninth color-saturation conversion rate calculation section 113.

First, in Step S111, the ninth color-saturation conversion rate calculation section 113 initializes variables for use in processing. Specifically, the ninth color-saturation conversion rate calculation section 113 initializes variables as follows:

αprev=a predetermined constant (e.g., 0.5)

maxRGBn=maxRGB/MAX minRGBn=minRGB/MAX

Yn=Y[i]/MAX

MAXwn=MAXw/MAX overFlag=FALSE underFlag=FALSE, where

αprev=a previous color-saturation conversion rate, maxRGBn=the maximum value of a normalized KGB signal, minRGBn=the minimum value of the normalized RGB signal, Yn=a normalized luminance signal, overFlag=an indicator of whether or not an out-of-range correction for α>1 has been made, underflag=an indicator of whether or not an out-of-range correction for α<0 has been made, and FALSE=a logic value "FALSE".

Next, the ninth color-saturation conversion rate calculation section 113 repeats Steps S112 to S122 a predetermined number of times. It should be noted that it is in order to avoid an endless loop that the ninth color-saturation conversion rate calculation section 113 repeats the steps a predetermined number of times.

In Step S112, the ninth color-saturation conversion rate calculation section 113 calculates the current value of α according to Formula (27):

$$\alpha = \alpha prev - g(\alpha prev)/g'(\alpha prev) \tag{27}$$

where $$g(x) = \left(\frac{x \times maxRGBn +}{(1-x) \times Yn}\right)^{\gamma} - \left(\frac{x \times minRGBn +}{(1-x) \times Yn}\right)^{\gamma} - MAXwn,$$

and $$g'(w) = \gamma \times (maxRGBn - Yn) \times \left(\frac{x \times maxRGBn +}{(1-x) \times Yn}\right)^{(\gamma-1)} - \gamma \times (minRGBn - Yn) \times \left(\frac{x \times minRGBn +}{(1-x) \times Yn}\right)^{(\gamma-1)}.$$

It should be noted here that g(x) in Formula (27) is a normal function obtained by transforming Formula (5) so that the right-hand side is 0, and that g'(x) is the first differential of g(x). That is, Formula (27) serves as a formula for calculating the next solution according to Newton's method.

Next, in Step S113, the ninth color-saturation conversion rate calculation section 113 judges whether or not Formula (28) below is satisfied as follows:

$$|\alpha - \alpha prev| < alphaTol \qquad (28)$$

where alphaTol=a threshold for calculating a (alphaTol>0). That is, the ninth color-saturation conversion rate calculation section 113 judges whether or not the current value of α is the desired value of α. If Formula (28) is satisfied, the ninth color-saturation conversion rate calculation section 113 finishes the process of calculating α.

If Formula (28) is not satisfied, the ninth color-saturation conversion rate calculation section 113 shifts to Step S114, and then judges whether or not α is negative. If α is negative, the ninth color-saturation conversion rate calculation section 113 proceeds to Step S115. If not, the ninth color-saturation conversion rate calculation section 113 proceeds to Step S118.

In cases where α is negative in Step S114, the ninth color-saturation conversion rate calculation section 113 makes an out-of-range correction for α<0 by setting α to 0 in Step S115, and further judges whether or not underFlag is TRUE, i.e., whether or not an out-of-range correction for α<0 has been made (S116). If an out-of-range correction for α<0 has already been made, the ninth color-saturation conversion rate calculation section 113 proceeds to Step S123. If not, the ninth color-saturation conversion rate calculation section 113 sets underFlag to TRUE (S117).

Further, in cases where α is not negative in Step S114, the ninth color-saturation conversion rate calculation section 113 judges whether or not a exceeds 1. If a exceeds 1, the ninth color-saturation conversion rate calculation section 113 proceeds to Step S119. If not so, the ninth color-saturation conversion rate calculation section 113 proceeds to Step S122.

In cases where a exceeds 1 in Step S118, the ninth color-saturation conversion rate calculation section 113 makes an out-of-range correction for α>1 by setting α to 1 in Step S119, and further judges whether or not overflag is TRUE, i.e., whether or not an out-of-range correction for α>1 has been made (S120). If an out-of-range correction for α>1 has already been made, the ninth color-saturation conversion rate calculation section 113 proceeds to Step S123. If not, the ninth color-saturation conversion rate calculation section 113 sets overFlag to TRUE (S121).

In cases where the ninth color-saturation conversion rate calculation section 113 has proceeded to Step S117 or S121, i.e., in cases where an out-of-range correction for α<0 or an out-of-range correction for α>1 has been made, or in cases where the ninth color-saturation conversion rate calculation section 113 says No in both Steps S114 and S118, i.e., in cases where 0≦α≦1, the ninth color-saturation conversion rate calculation section 113 updates the previous color-saturation conversion rate αprev according to Formula (29)

$$\alpha prev = \alpha \qquad (29)$$

so that the previous color-saturation conversion rate αprev takes on the current value of α(0 or 1) (S122).

In cases where the ninth color-saturation conversion rate calculation section 113 says Yes to the judgment condition of S116 or S120 or finishes the loop process, the ninth color-saturation conversion rate calculation section 113 cannot calculate the desired value of α. Therefore, the ninth color-saturation conversion rate calculation section 113 performs some sort of error handling (S123).

In comparison with Embodiment 8, which uses a dichotomizing search, Embodiment 10, which uses Newton's method, has a larger amount of calculation per loop, but can be expected to have a smaller number of loops.

The following shows an example of calculation of a backlight value according to Embodiment 10. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255, γ=2, B1 Ratio=0.5, and alphaTol=$10^{-7}$.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner.

The calculation of a backlight upper limit and the calculation of the maximum and minimum values of a gamma-corrected RGB signal are performed in the same manner as in the example explained in Embodiment 1. That is, the backlight upper limit MAXw is set as MAXw=127.5, and the maximum and minimum values maxRGBg and minRGBg of the gamma-corrected RGB signal are set as maxRGBg=255 and minRGBg=16, respectively.

Since the target pixel satisfies Formula (4), the target pixel is subjected to color-saturation conversion. At this time, a color-saturation conversion rate α is calculated in the following manner. First, the luminance Y[1] corresponding to the input pixel values is calculated in the same manner as in Embodiment 1 to take on a value of 207.

In the present example of calculation, the ninth color-saturation conversion rate calculation section 113 repeats Steps S112 to S122 of the flow chart of FIG. 28 until the ninth color-saturation conversion rate calculation section 113 goes out of the loop by satisfying the judgment condition of S113. The values of αprev, g(αprev), g'(αprev), and α that are calculated based on the flow chart vary as shown below in Table 10.

TABLE 10

| αprev | g(αprev) | g'(αprev) | α |
|---|---|---|---|
| 0.5 | 0.040346 | 0.938962 | 0.457031 |
| 0.457031 | −0.00052 | 0.963322 | 0.457575 |
| 0.457575 | 0 | 0.963014 | 0.457575 |

In Table 10, the final value of α is calculated as:

α=0.457575.

In Embodiments 4, 6, and 8, the numbers of times the loops are repeated is 91, 47, and 7, respectively. Meanwhile, in the present embodiment, the number of times the loop is repeated is only 3.

Once the color-saturation conversion rate α is thus calculated, the RGBW transmission amounts and the backlight value are calculated according to the same procedure as in Embodiment 1.

That is, the saturation-converted input RGB signal is calculated according to Formulae (6) to (8) as follows:

$$Rs[1] = \alpha \times R[1] + (1-\alpha) \times Y[1]$$
$$= 0.457575 \times 159 + (1 - 0.457575) \times 207$$
$$= 185$$

$$Gs[1] = \alpha \times G[1] + (1-\alpha) \times Y[1]$$
$$= 0.457575 \times 255 + (1 - 0.457575) \times 207$$
$$= 229$$

$$Bs[1] = \alpha \times B[1] + (1-\alpha) \times Y[1]$$
$$= 0.457575 \times 63 + (1 - 0.457575) \times 207$$
$$= 141.$$

Next, the gamma-corrected input RGB signal is calculated as follows:

$$Rsg[1] = (Rs[1]/\text{MAX})\gamma \times \text{MAX}$$
$$= (185/255)^2 \times 255$$
$$= 134$$

$$Gsg[1] = (Gs[1]/\text{MAX})\gamma \times \text{MAX}$$
$$= (229/255)^2 \times 255$$
$$= 206$$

$$Bsg[1] = (Bs[1]/\text{MAX})\gamma \times \text{MAX}$$
$$= (141/255)^2 \times 255$$
$$= 78.$$

Next, the W transmission amount is calculated according to Formula (55) as follows:

$$Wtsg[1] = \min(\max RGBsg/2, \min RGBsg)$$
$$= \min(206/2, 78)$$
$$= 78.$$

Next, the RGB transmission amounts are calculated according to Formulae (56) to (58) as follows:

$Rtsg[1] = Rsg[1] - Wtsg[1] = 134 - 78 = 56$ $Gtsg[1] = Gsg[1] - Wtsg[1] = 206 - 78 = 128$ $Btsg[1] = Bsg[1] - Wtsg[1] = 78 - 78 = 0.$ Finally, the backlight value is calculated according to Formula (59) as follows;

$$Wbsg = \max(Rtsg[1], Gtsg[1], Btsg[1], Wtsg[1])$$
$$= \max(56, 128, 0, 56)$$
$$= 128.$$

That is, the backlight value obtained in cases where the color-saturation conversion process is performed is 128. Thus, the above example shows that the color-saturation conversion process can reduce the backlight value from 239 to 128 (reduction of approximately 46%).

Embodiment 11

Embodiment 11 is a fourth example of means for approximately calculating a color-saturation conversion rate α in the second color-saturation conversion rate section 33 of Embodiment 2, and makes such a change to Embodiment 10 as to perform a color-saturation conversion process on every pixel within the input image. It should be noted that processing sections identical to those of Embodiments 2 and 9 are given the same reference numerals as those of Embodiments 2 and 9 and will not be described below in detail.

Figure 29:
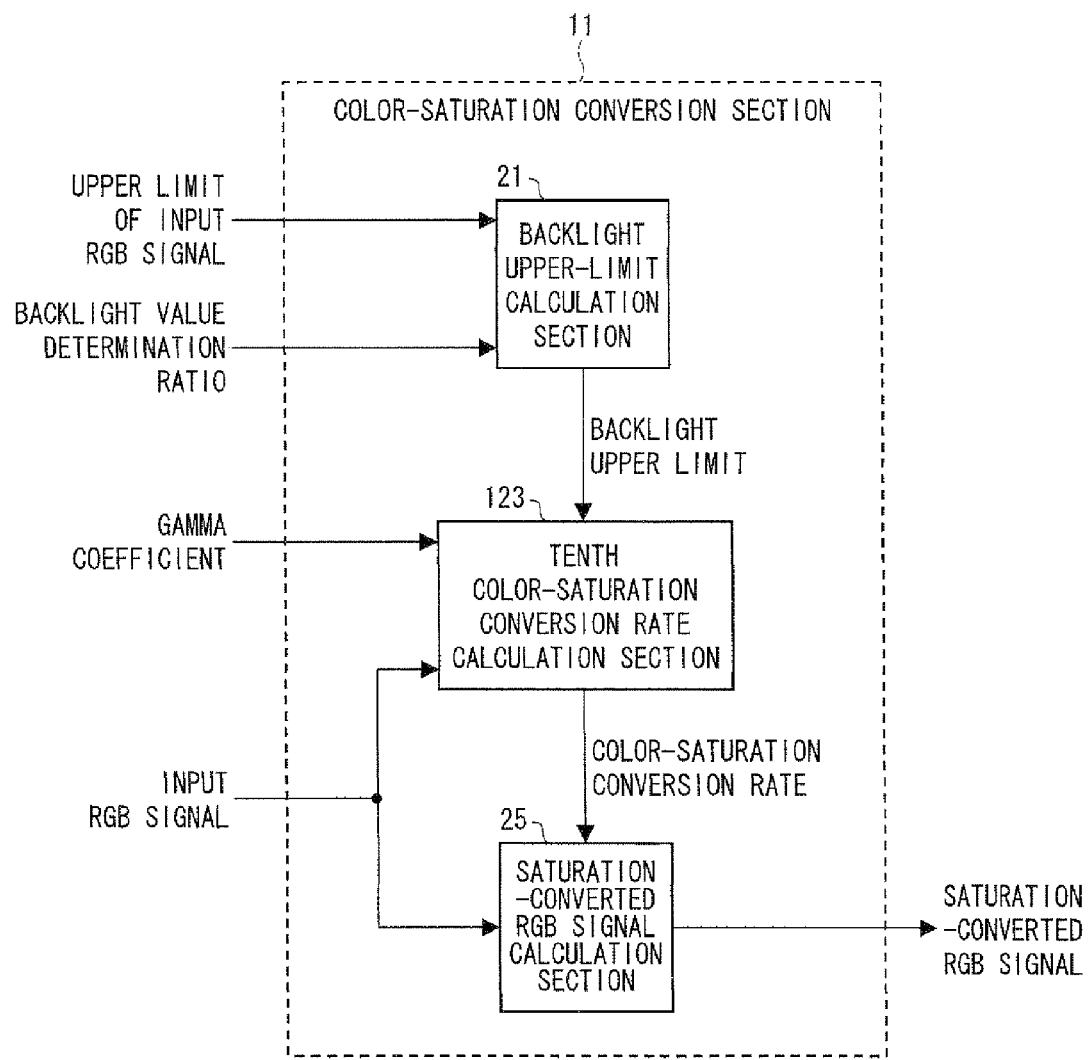
FIG. 29 is a block diagram showing an example arrangement of a color-saturation conversion section in Embodiment 11 of the liquid crystal display device.

FIG. 29 shows another arrangement of the color-saturation conversion section 11 of Embodiment 11. The color-saturation conversion section 11 of FIG. 29 is obtained by replacing the second color-saturation conversion rate calculation section 33 of the color-saturation conversion section 11 (see FIG. 10) of Embodiment 2 with a tenth color-saturation conversion rate calculation section 123. It should be noted, in the present embodiment, that since the color-saturation conversion rate α does not deviate from a range of 0 to 1, no color-saturation conversion rate limiter process section 34 is mounted.

The tenth color-saturation conversion rate calculation section 123 calculates a color-saturation conversion rate α from an input RGB signal, a gamma coefficient, and a backlight upper limit according to Newton's method, and then outputs the color-saturation conversion rate α.

Figure 30:
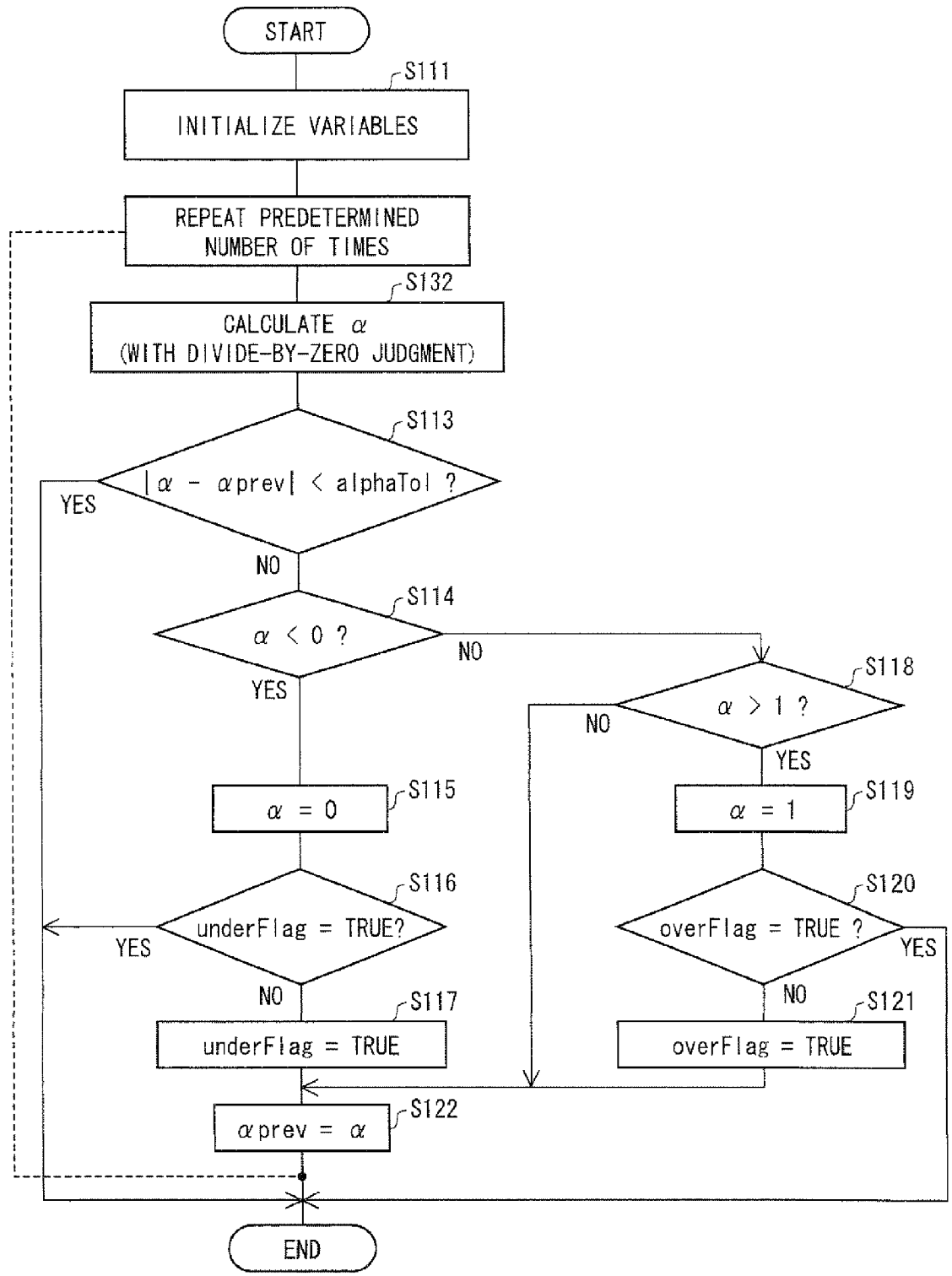
FIG. 30 is a flow chart showing a sequence of operations that are performed by the color-saturation conversion section of FIG. 29.

FIG. 30 is a flow chart for explaining the operation of the tenth color-saturation conversion rate calculation section 123.

First, in Step S111, the tenth color-saturation conversion rate calculation section 123 initializes variables for use in processing. Step S111 of FIG. 30 is identical to Step S111 of FIG. 28.

Next, the tenth color-saturation conversion rate calculation section 123 repeats Steps S132 and S113 to S122 a predetermined number of times.

In Step S132, the tenth color-saturation conversion rate calculation section 123 calculates the current value of α according to Formula (27). However, it is meant in this step that when g'(αprev) is 0, the target pixel has a color saturation of 0. Therefore, α may take on any value. In the present embodiment, when g'(αprev) is 0, α is set, for example, as α=1. Steps S113 to S122 that are repeated thereafter are identical to the steps of the flow chart of FIG. 28. However, in cases where the tenth color-saturation conversion rate calculation section 123 finishes the loop process without saying No in Step S116 or S120, the tenth color-saturation conversion rate calculation section 123 performs such a process that the current value of α is the desired value of α.

The following shows a first example of calculation of a backlight value according to Embodiment 11. For convenience of explanation, the following shows an example where an image constituted by a single pixel is inputted and the input image has pixel values (K[1], G[1], B[1])=(159, 255, 63). That is, the following shows an example where the same pixel values are used as in the example of calculation of a backlight value is calculated according to Embodiment 1. It should be noted that the following explanation assumes that MAX=255, γ=2, B1 Ratio=0.5, and alphaTol=$10^{-7}$.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner.

The calculation of a backlight upper limit is performed in the same manner as in the example explained in Embodiment 1. That is, the backlight upper limit MAXw is set as MAXw=127.5.

Since Embodiment 11 does not judge whether or not it is necessary to reduce the color saturation, Embodiment 11 calculates a color-saturation conversion rate α for every pixel. In Embodiment 11, the color-saturation conversion rate α is calculated in the following manner. First, the luminance Y[1] corresponding to the input pixel values is calculated to take on the same value of 207 as in Embodiment 1.

In the present example of calculation, the tenth color-saturation conversion rate calculation section 123 repeats Steps S132 and S113 to S122 of the flow chart of FIG. 30 until the tenth color-saturation conversion rate calculation section 123 goes out of the loop by satisfying the judgment condition of S113. The values of αprev, g(αprev), g'(αprev), and a that are calculated based on the flow chart vary as shown below in Table 10, as with Embodiment 10.

In Table 10, the final value of α is calculated as:

$$\alpha = 0.457575.$$

In Embodiments 5, 7, and 9, the numbers of times the loops are repeated is 136, 92, and 7, respectively. Meanwhile, in the present embodiment, the number of times the loop is repeated is only 3.

Once the color-saturation conversion rate α is thus calculated, the RGBW transmission amounts and the backlight value are calculated according to the same procedure as in Embodiment 1. The subsequent procedure is the same as in the example of calculation of a backlight value according to Embodiment 10. That is, the backlight value obtained in cases where the color-saturation conversion process is performed is 128. Thus, the above example shows that the color-saturation conversion process can reduce the backlight value from 239 to 128 (reduction of approximately 46%).

The following shows a second example of calculation of a backlight value according to Embodiment 11. For convenience of explanation, the following shows an example where an image constituted by a single pixel is inputted and the input image has pixel values (R[1], G[1], B[1])=(159, 187, 85). That is, the following shows an example where the same pixel values are used as in the second example of calculation of a backlight value according to Embodiment 2. It should be noted that the following explanation assumes that MAX=255, γ=2, B1 Ratio=0.5, and alphaTol=$10^{-7}$.

First, in cases where no color-saturation conversion process is performed, a backlight value is calculated in the same manner as in the second example of calculation explained in Embodiment 2. That is, the backlight value obtained in cases where no color-saturation conversion process is performed is 109.

On the other hand, in cases where a color-saturation conversion process is performed, a backlight value is calculated in the following manner.

The calculation of a backlight upper limit is performed in the same manner as in the example explained in Embodiment 1. That is, the backlight upper limit MAXw is set as MAXw=127.5. Further, the luminance Y[1] corresponding to the input pixel values is calculated in the same manner as in the second example of calculation of Embodiment 2 to take on a value of 167.25.

In the present example of calculation, the tenth color-saturation conversion rate calculation section 123 goes out of the loop by saying Yes in Step S120 of the flow chart of FIG. 30. The values of αprev, g(αprev), g'(αprev), and a that are calculated based on the flow chart vary as shown below in Table 11.

TABLE 11

| αprev | g(αprev) | g'(αprev) | α |
|---|---|---|---|
| 0.5 | −0.26216 | 0.426667 | 1.11443 |
| 1 | −0.07333 | 0.328627 | 1.22315 |

Further, although the final value of α in Table 11 is α=1.22315, α is set as α=1 by Step S119 in this case. Therefore, the final value of α is calculated as:

$$\alpha = 1.$$

The numbers of times the loops are repeated in the second examples of calculation of Embodiments 5, 7, and 9 are 136, 18, and 24, respectively. Meanwhile, the number of times the loop is repeated in the present embodiment is only 2.

Thus, in cases where α=1, there are no differences in RGB values between before and after color-saturation conversion according to Formulae (6) to (8), with the same result as in the case where no color-saturation conversion (color-saturation reduction) is performed.

That is, in cases where a backlight value obtained in cases where no color-saturation conversion is performed falls short of a backlight upper limit, no color-saturation conversion is needed. Also in the present example of calculation, no color-saturation conversion is performed. Accordingly, the backlight value is 109 as in the case where no color-saturation conversion is performed.

Embodiment 12

Embodiment 12 is a fifth example of means for approximately calculating a color-saturation conversion rate α in the first color-saturation conversion section 23 of Embodiment 1. Embodiment 12 directly calculates a according to Formula (5) by fixing the gamma coefficient to 2.

Therefore, Embodiment 12 always gives a gamma coefficient of 2 to the calculation section 22 for calculating the maximum and minimum values of a gamma-corrected RGB signal. The fixation of the gamma coefficient eliminates the degree of freedom of the gamma coefficient. However, since the gamma coefficient usually takes on a value of approximately 1.8 to 2.3, it does not matter if the gamma coefficient is fixed to 2.

It should be noted that processing sections identical to those of Embodiment 1 are given the same reference numerals as those of Embodiment 1 and will not be described below in detail.

Figure 31:
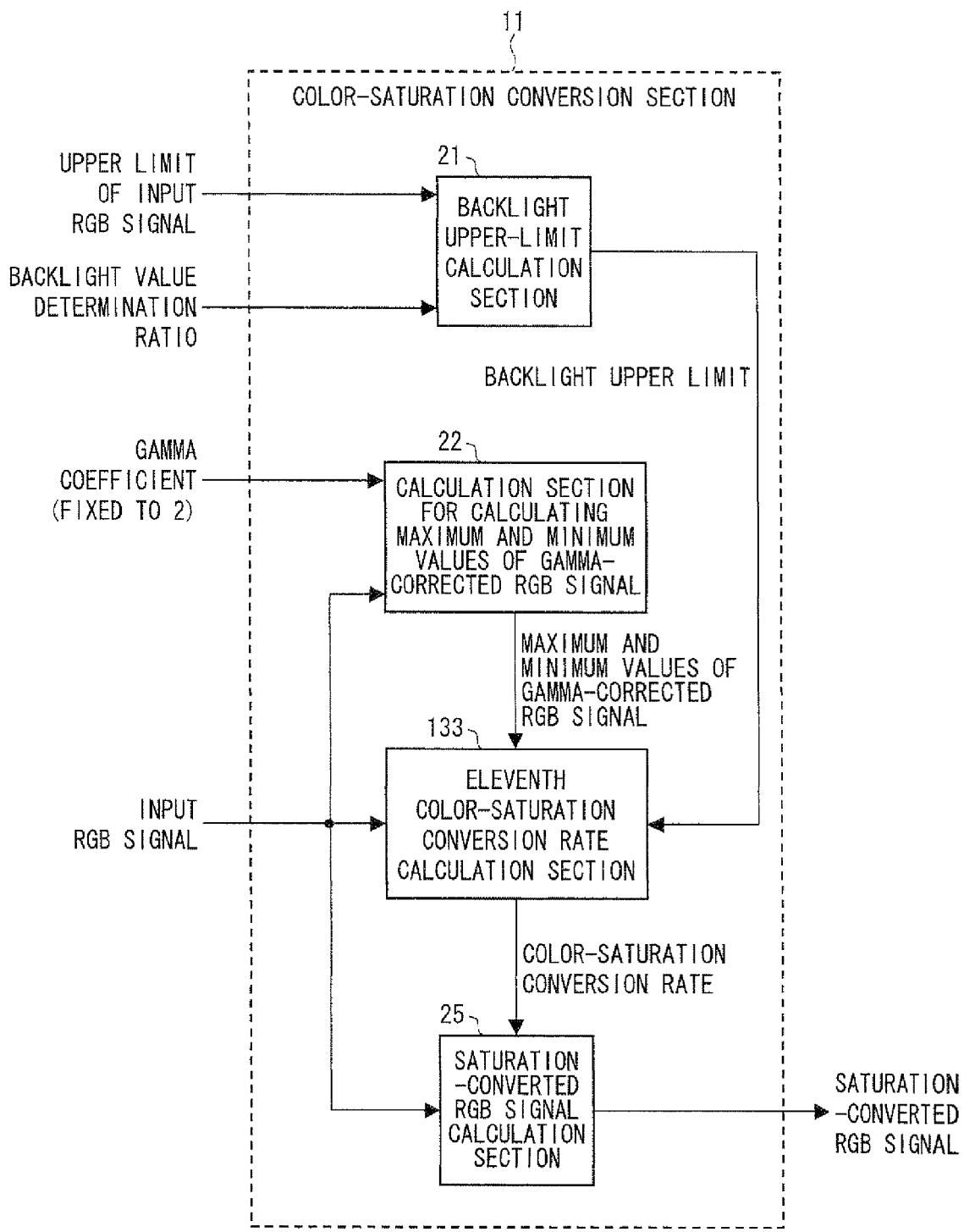
FIG. 31 is a block diagram showing an example arrangement of a color-saturation conversion section in Embodiment 12 of the liquid crystal display device.

FIG. 31 shows another arrangement of the color-saturation conversion section 11 of a liquid crystal display device according to Embodiment 12. The color-saturation conversion section 11 of FIG. 31 is obtained by replacing the first color-saturation conversion rate calculation section 23 of the color-saturation conversion section 11 (see FIG. 6) of Embodiment 1 with an eleventh color-saturation conversion rate calculation section 133.

The eleventh color-saturation conversion rate calculation section 133 calculates a color-saturation conversion rate α from an input RGB signal, a backlight upper limit, and the maximum and minimum values of a gamma-corrected RGB signal according to a direct solving method, and then outputs the color-saturation conversion rate α.

Figure 32:
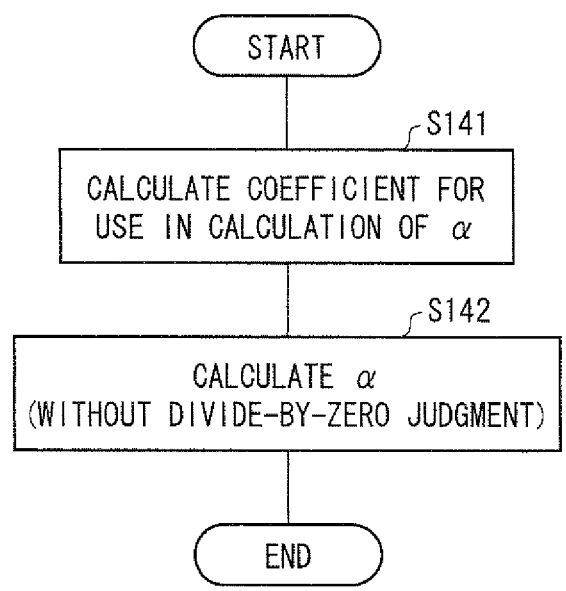
FIG. 32 is a flow chart showing a sequence of operations that are performed by the color-saturation conversion section of FIG. 31.

FIG. 32 is a flow chart for explaining the operation of the eleventh color-saturation conversion rate calculation section 133.

First, in Step S141, the eleventh color-saturation conversion rate calculation section 133 calculates a coefficient for use in calculation of α according to Formulae (30) to (32):

$$a = (\mathrm{max}RGB - \mathrm{min}RGB) \times (\mathrm{max}RGB + \mathrm{min}RGB - 2 \times Y[i]) \quad (30)$$

$$b = Y[i] \times (\mathrm{max}RGB - \mathrm{min}RGB) \quad (31)$$

$$c = -\mathrm{MAX}w \times \mathrm{MAX}. \quad (32)$$

Next, if the coefficient a for use in calculation of α is 0, the eleventh color-saturation conversion rate calculation section 133 calculates α according to Formula (33). If not so, the eleventh color-saturation conversion rate calculation section 133 calculates α according to Formula (34) (S142):

$$\alpha = -c/(2 \times b) \quad (33)$$

$$\alpha = (-b + \sqrt{d})/a \quad (34)$$

where $d = b^2 - a \times c$.

The following explains how to derive the above calculating formulae.

First, substituting γ=2 in Formula (5) transforms Formula (5) as follows:

$$fg\left(\frac{\alpha \times \mathrm{max}RGB + (1-\alpha) \times Y[i]}{}, 2\right) - fg\left(\frac{\alpha \times \mathrm{min}RGB + (1-\alpha) \times Y[i]}{}, 2\right) = \mathrm{MAX}w$$

$$\left\{\left(\frac{\alpha \times \mathrm{max}RGB + (1-\alpha) \times Y[i]}{\mathrm{MAX}}\right)^2\right\} \times \mathrm{MAX} - \left\{\left(\frac{\alpha \times \mathrm{min}RGB + (1-\alpha) \times Y[i]}{\mathrm{MAX}}\right)^2\right\} \times \mathrm{MAX} = \mathrm{MAX}w$$

$$\left\{(\alpha \times \mathrm{max}RGB + (1-\alpha) \times Y[i])\right\}^2 - \left\{(\alpha \times \mathrm{min}RGB + (1-\alpha) \times Y[i])\right\}^2 = \mathrm{MAX}w \times \mathrm{MAX}$$

$$\alpha^2 \times \mathrm{max}RGB^2 + 2 \times \alpha \times (1-\alpha) \times \mathrm{max}RGB \times Y[i] - \alpha^2 \times \mathrm{min}RGB^2 -$$
$$2 \times \alpha \times (1-\alpha) \times \mathrm{min}RGB \times Y[i] - MAWw \times \mathrm{MAX} = 0$$

$$\alpha^2 \times \mathrm{max}RGB^2 + 2 \times \alpha \times \mathrm{max}RGB \times Y[i] - 2 \times \alpha^2 \times \mathrm{max}RGB \times Y[i] -$$
$$\alpha^2 \times \mathrm{min}RGB^2 - 2 \times \alpha \times \mathrm{min}RGB \times Y[i] +$$
$$2 \times \alpha^2 \times \mathrm{min}RGB \times Y[i] - MAWw \times \mathrm{MAX} = 0$$

$$(\mathrm{max}RGB^2 - \mathrm{min}RGB^2 - 2 \times \mathrm{max}RGB \times Y[i] + 2 \times \mathrm{min}RGB \times Y[i]) \times \alpha^2 +$$
$$2 \times (\mathrm{max}RGB - \mathrm{min}RGB) \times Y[i] \times \alpha -$$
$$MAWw \times \mathrm{MAX} = 0$$

$$(\mathrm{max}RGB - \mathrm{min}RGB) \times (\mathrm{max}RGB + \mathrm{min}RGB - 2 \times Y[i]) \times \alpha^2 + 2 \times$$
$$(\mathrm{max}RGB - \mathrm{min}RGB) \times Y[i]) \times \alpha - MAWw \times \mathrm{MAX} = 0$$

It should be noted, however, that $fg(x,g) = (x/\mathrm{MAX})^g \times \mathrm{MAX}$.

Denoting the second term by a, the first term by 2×b, and the constant term by c in the final formula of the transformation yields Formulae (30) to (32), which are expressed by Formula (135):

$$a \times \alpha^2 + 2 \times b \times \alpha + c = 0. \quad (135)$$

First, in cases where a=0, Formula (33) is obtained from Formula (135).

On the other hand, in cases where a≠0, the formula for the solution of a quadratic equation yields:

$$a = \{--b \pm \sqrt{b^2 - a \times c}\}/a.$$

Denoting the square-root term by d yields:

$$\alpha = (-b \pm \sqrt{d})/a.$$

Although the above formula indicates that there two solutions of α, it is judged which one of the solutions is the right solution.

First, denoting the left-hand side of Formula (135) by f(α) yields:

$$f(\alpha) = a \times \alpha^2 + 2 \times b \times \alpha + c, \quad (136)$$

in which case $$f(0) = c < 0, \text{ and}$$

$$f(1) = a + 2 \times b + c$$
$$= (\mathrm{max}RGB - \mathrm{min}RGB) \times (\mathrm{max}RGB + \mathrm{min}RGB - 2 \times Y[i]) +$$
$$2 \times Y[i] \times (\mathrm{max}RGB - \mathrm{min}RGB) - \mathrm{MAX}w \times \mathrm{MAX}$$
$$= \mathrm{max}RGB^2 - \mathrm{min}RGB^2 - MAWw \times \mathrm{MAX}$$
$$= (\mathrm{max}RGB/\mathrm{MAX})^2 \times \mathrm{MAX}^2 - (\mathrm{min}RGB/\mathrm{MAX})^2 \times$$
$$\mathrm{MAX}^2 - \mathrm{MAX}w \times \mathrm{MAX}$$
$$= \{(\mathrm{max}RGB/\mathrm{MAX})^2 \times \mathrm{MAX} - (\mathrm{min}RGB/\mathrm{MAX})^2 \times$$
$$\mathrm{MAX} - \mathrm{MAX}w\} \times \mathrm{MAX}$$
$$= (\mathrm{max}RGBg - \mathrm{min}RGB - \mathrm{MAX}w) \times \mathrm{MAX}.$$

Since it is found from Formula (4) that f(1)>0 and f(α) is a quadratic equation, there surely exists a solution between 0 and 1 according to f(0)<0 and f(1)>0.

When a>0, Formula (136) gives a downwardly convex parabola. Therefore, according to f(0)<0 and f(1)>0, the bigger one of the solutions of α=(−b±√d)/a is a solution between 0 and 1. Accordingly, the bigger solution obtained when a>0 is expressed as α=(−b+√d)/a, i.e., Formula (34).

On the other hand, when a<0, Formula (136) gives an upwardly convex parabola. Therefore, according to f(0)<0 and f(1)>0, the smaller one of the solutions of α=(—b±·d)/a is a solution between 0 and 1. Accordingly, the smaller solution obtained when a<0 is similarly expressed as α=(−b+√d)/a, i.e., Formula (34).

That is, when a≠0, α is expressed by Formula (34).

The following shows an example of calculation of a backlight value according to Embodiment 12. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255 and B1 Ratio=0.5.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner.

The calculation of a backlight upper limit and the calculation of the maximum and minimum values of a gamma-corrected RGB signal are performed in the same manner as in the example explained in Embodiment 1. That is, the backlight upper limit MAXw is set as MAXw=127.5, and the maximum and minimum values maxRGBg and minRGBg of the gamma-corrected RGB signal are set as maxRGBg=255 and minRGBg=16, respectively.

Since the target pixel satisfies Formula (4), the target pixel is subjected to color-saturation conversion. At this time, a color-saturation conversion rate α is calculated in the following manner. First, the luminance Y[1] corresponding to the input pixel values is calculated in the same manner as in Embodiment 1 to take on a value of 207.

Substituting MAX=255, maxRGB=255, minRGB=63, Y[i]=207, and MAXw=127.5 in Formulae (30) to (32) yields coefficients (a, b, c) for use in calculation of α as follows:

$$a = (\text{max}RGB - \text{min}RGB) \times (\text{max}RGB + \text{min}RGB - 2 \times Y[i])$$
$$= (255 - 63) \times (255 + 63 - 2 \times 207)$$
$$= -18432$$

$$b = Y[i] \times (\text{max}RGB - \text{min}RGB)$$
$$= 207 \times (255 - 63)$$
$$= 39744$$

$$c = -\text{MAX}w \times \text{MAX}$$
$$= -127.5 \times 255$$
$$= -32512.5.$$

Since a≠0, it is found from Formula (34) that:

$$\alpha = (-b \pm \sqrt{d})/a$$
$$= (-39744 + \sqrt{980315136})/(-18432)$$
$$= 0.457575.$$

Thus, the present embodiment can calculate α without a loop process.

Once the color-saturation conversion rate α is thus calculated, the RGBW transmission amounts and the backlight value are calculated according to the same procedure as in Embodiment 1.

That is, the saturation-converted input RGB signal is calculated according to Formulae (6) to (8) as follows:

$$Rs[1] = \alpha \times R[1] + (1 - \alpha) \times Y[1]$$
$$= 0.457575 \times 159 + (1 - 0.457575) \times 207$$
$$= 185$$

$$Gs[1] = \alpha \times G[1] + (1 - \alpha) \times Y[1]$$
$$= 0.457575 \times 255 + (1 - 0.457575) \times 207$$
$$= 229$$

$$Bs[1] = \alpha \times B[1] + (1 - \alpha) \times Y[1]$$
$$= 0.457575 \times 63 + (1 - 0.457575) \times 207$$
$$= 141.$$

Next, the gamma-corrected input RGB signal is calculated as follows:

$$Rsg[1] = (Rs[1]/\text{Max})^\gamma \times \text{MAX}$$
$$= (185/255)^2 \times 255$$
$$= 134$$

$$Gsg[1] = (Gs[1]/\text{Max})^\gamma \times \text{MAX}$$
$$= (299/255)^2 \times 255$$
$$= 206$$

-continued
$$Bsg[1] = (Bs[1]/\text{Max})^\gamma \times \text{MAX}$$
$$= (141/255)^2 \times 255$$
$$= 78.$$

Next, the W transmission amount is calculated according to Formula (55) as follows:

$$Wtsg[1] = \min(\text{max}RGBsg/2, \text{min}RGBsg)$$
$$= \min(206/2, 78)$$
$$= 78.$$

Next, the RGB transmission amounts are calculated according to Formulae (56) to (58) as follows:

$$Rtsg[1]=Rsg[1]-Wtsg[1]=134-78=56$$

$$Gtsg[1]=Gsg[1]-Wtsg[1]=206-78=128$$

$$Btsg[1]=Bsg[1]-Wtsg[1]=78-78=0.$$

Finally, the backlight value is calculated according to Formula (59) as follows:

$$Wbsg = \max(Rtsg[1], Gtsg[1], Btsg[1], Wtsg[1])$$
$$= \max(56, 128, 0, 56)$$
$$= 128.$$

That is, the backlight value obtained in cases where the color-saturation conversion process is performed is 128. Thus, the above example shows that the color-saturation conversion process can reduce the backlight value from 239 to 128 (reduction of approximately 46%).

Embodiment 13

Embodiment 13 is a fifth example of means for approximately calculating a color-saturation conversion rate α in the second color-saturation conversion section 33 of Embodiment 2, and makes such a change to Embodiment 12 as to perform a color-saturation conversion process on every pixel within the input image. It should be noted that processing sections identical to those of Embodiments 2 and 11 are given the same reference numerals as those of Embodiments 2 and 11 and will not be described below in detail.

Figure 33:
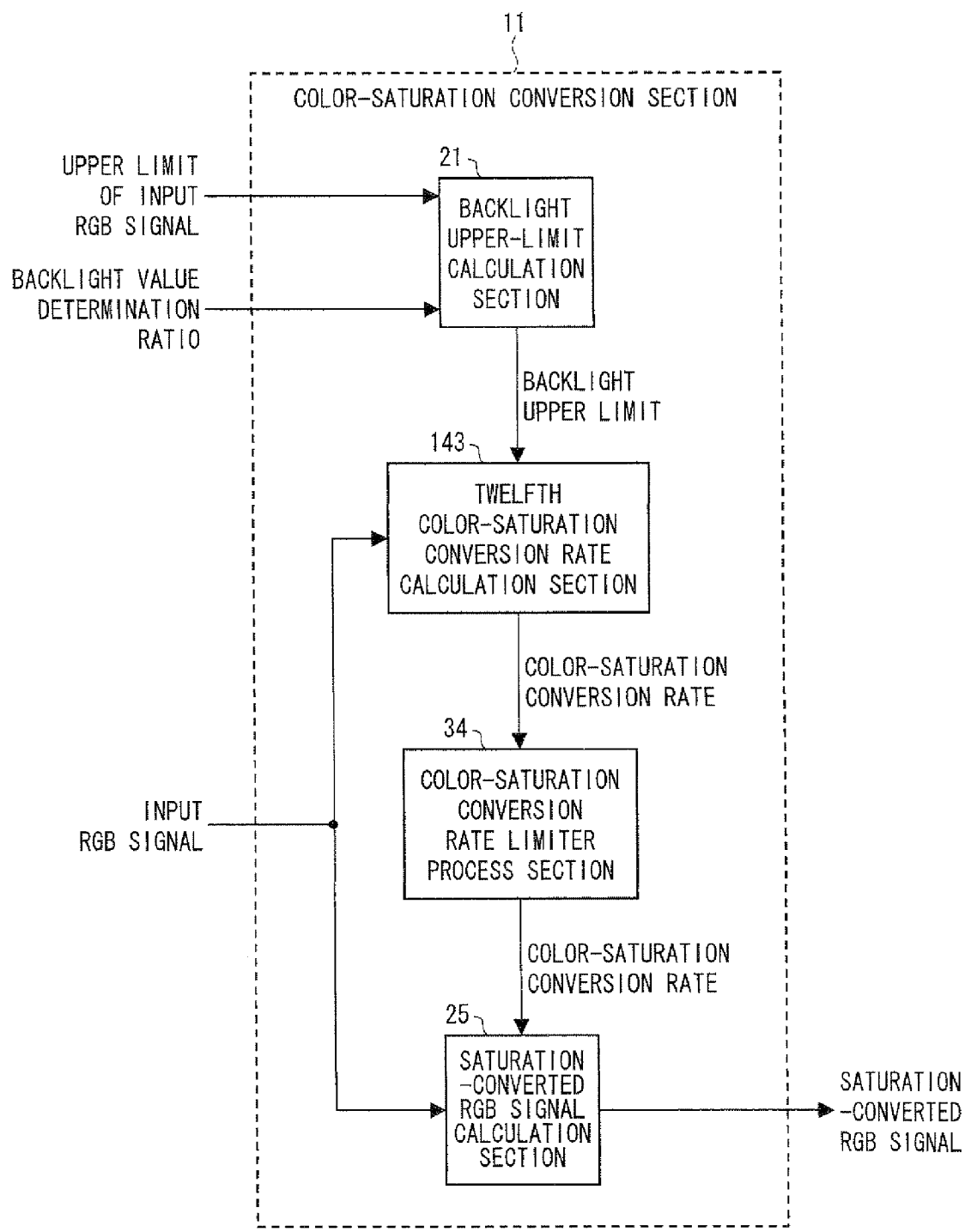
FIG. 33 is a block diagram showing an example arrangement of a color-saturation conversion section in Embodiment 13 of the liquid crystal display device.

FIG. 33 shows another arrangement of the color-saturation conversion section 11 of Embodiment 13. The color-saturation conversion section 11 of FIG. 33 is obtained by replacing the second color-saturation conversion rate calculation section 33 of the color-saturation conversion section 11 (see FIG. 12) of Embodiment 2 with a twelfth color-saturation conversion rate calculation section 143.

The twelfth color-saturation conversion rate calculation section 143 calculates a color-saturation conversion rate α from an input RGB signal and a backlight upper limit according a direct solving method, and then outputs the color-saturation conversion rate α.

Figure 34:
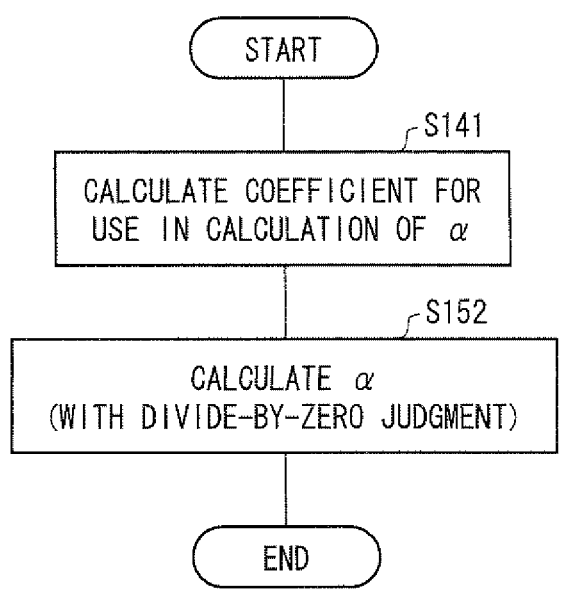
FIG. 34 is a flow chart showing a sequence of operations that are performed by the color-saturation conversion section of FIG. 33.

FIG. 34 is a flow chart for explaining the operation of the twelfth color-saturation conversion rate calculation section 143.

First, in Step S141, the twelfth color-saturation conversion rate calculation section 143 calculates a coefficient for use in calculation of α according to Formulae (30) to (32). Step S141 of FIG. 34 is identical to Step S141 of FIG. 32.

Next, if the coefficient a for use in calculation of α is 0, the twelfth color-saturation conversion rate calculation section 143 calculates a according to Formula (33). If not so, the twelfth color-saturation conversion rate calculation section 143 calculates a according to Formula (34) (S152). However, it is meant in the case of use of Formula (33) that when b is 0, the target pixel has a color saturation of 0. Therefore, a may take on any value. In the present embodiment, when b is 0, α is set, for example, as α=1.

The following explains how to derive the above calculating formulae.

First, transforming Formula in the same manner as in Embodiment 12 by substituting γ=2 in Formula (5) yields Formulae (30) to (32) and Formula (135). Further, in cases where a=0, Formula (33) is obtained from Formula (135). On the other hand, in cases where a≠0, the formula for the solution of a quadratic equation yields:

$$\alpha=(-b\pm\sqrt{d})/a.$$

The calculating formulae have been derived so far in the same manner as in Embodiment 12.

At this point of time, it is indicated that there are two solutions of α. Either of the solutions is chosen according to the following way of thinking.

First, denoting the left-hand side of Formula (135) by f(α) yields Formula (136), in which case the following relationship always holds:

$$f(0)=c<0.$$

On the other hand, f(1) is expressed as:

$$f(1)=(\text{max}RGBg-\text{min}RGBg-\text{MAX}w)\times\text{MAX}.$$

In cases where MAXw<maxRGBg−minRGBg, f(1)>0. This is the same case as in Formula (4), and the twelfth color-saturation conversion rate calculation section 143 performs a process in such a direction as to cause a reduction in color saturation. Therefore, the desired value of α falls within a range of 0<α<1.

Meanwhile, since f(α) is a quadratic equation, there surely exists a solution between 0 and 1 according to f(0)=c<0 and f(1)>0.

When a>0, Formula (136) gives a downwardly convex parabola. Therefore, according to f(0)<0 and f(1)>0, the bigger one of the solutions of α=(−b±√d)/a is a solution between 0 and 1. Accordingly, the bigger solution obtained when a>0 is expressed as α=(−b+√d)/a, i.e., Formula (34).

On the other hand, when a<0, Formula (136) gives an upwardly convex parabola. Therefore, according to f(0)<0 and f(1)>0, the smaller one of the solutions of α=(−b±√d)/a is a solution between 0 and 1. Accordingly, the smaller solution obtained when a<0 is similarly expressed as α=(−b+√d)/a, i.e., Formula (34).

That is, in cases where MAXw<maxRGBg−minRGBg, α is expressed by Formula (34) when a≠0.

On the other hand, in cases where maxRGBg−minRGBg≦MAXw, f(1)≦0. This is a case opposite to Formula (4), and the twelfth color-saturation conversion rate calculation section 143 performs a process in such a direction as to cause no change or an increase in color saturation. Therefore, the desired value of α falls within a range of 1≦α. Furthermore, in this case, f(0)<f(1).

When a>0, Formula (136) gives a downwardly convex parabola. Therefore, according to f(0)<0 and f(0)<f(1), one of the solutions of α=(−b±√d)/a is negative and the other is a value of not less than 1. In this case, the value of not less than 1, i.e., the bigger solution is the desired value of α. Accordingly, the bigger solution obtained when a>0 is expressed by Formula (34).

On the other hand, when a<0, Formula (136) gives an upwardly convex parabola. Therefore, according to f(0)<0 and f(0)<f(1), both the solutions of α=(−b±√d)/a are solutions of not less than 1. In this case, the solution closer to 1, i.e., the smaller solution is adopted. Accordingly, the smaller solution obtained when a<0 is similarly expressed by Formula (34).

That is, also in cases where maxRGBg−minRGBg≦MAXw, α is expressed by Formula (34) when a≠0.

The following shows a first example of calculation of a backlight value according to Embodiment 13. For convenience of explanation, the following shows an example where an image constituted by a single pixel is inputted and the input image has pixel values (R[1], G[1], B[1])=(159, 255, 63). That is, the following shows an example where the same pixel values are used as in the example of calculation of a backlight value according to Embodiment 1. It should be noted that the following explanation assumes that MAX=255 and B1 Ratio=0.5.

First, in cases where no color-saturation conversion process is performed, a backlight value is calculated in the same manner as in the example explained in Embodiment 1. That is, the backlight value obtained in cases where no color-saturation conversion process is performed is 239.

On the other hand, in cases where a color-saturation conversion process is performed, a backlight value is calculated in the following manner.

First, the calculation of a backlight upper limit is performed in the same manner as in the example explained in Embodiment 1. That is, the backlight upper limit MAXw is set as MAXw=127.5.

Since Embodiment 13 does not judge whether or not it is necessary to reduce the color saturation, Embodiment 13 calculates a color-saturation conversion rate α for every pixel. In Embodiment 13, the color-saturation conversion rate α is calculated in the same manner as in Embodiment 12. In this case, since 0≦α≦1, α after the limiter process is also calculated as α=0.457575 as in Embodiment 12.

Subsequently, the backlight value is calculated under the same procedure as in Embodiment 12. That is, the backlight value obtained in cases where the color-saturation process is performed is 128. Thus, the above example shows that the color-saturation conversion process can reduce the backlight value from 239 to 128 (reduction of approximately 46%).

The following shows a second example of calculation of a backlight value according to Embodiment 13. For convenience of explanation, the following shows an example where an image constituted by a single pixel is inputted and the input image has pixel values (R[1], G[1], B[1])=(159, 187, 85). That is, the following shows an example where the same pixel values are used as in the second example of calculation of a backlight value according to Embodiment 2. It should be noted that the following explanation assumes that MAX=255 and B1 Ratio=0.5.

First, in cases where no color-saturation conversion process is performed, a backlight value is calculated in the same manner as in the second example of calculation explained in Embodiment 2. That is, the backlight value obtained in cases where no color-saturation conversion process is performed is 109.

On the other hand, in cases where a color-saturation conversion process is performed, a backlight value is calculated in the following manner.

The calculation of a backlight upper limit is performed in the same manner as in the example explained in Embodiment 1. That is, the backlight upper limit MAXw is set as MAXw=127.5. Further, the luminance Y[1] corresponding to the input pixel values is calculated in the same manner as in the second example of calculation of Embodiment 2 to take on a value of 167.25.

Substituting MAX=255, maxRGB=187, minRGB=85, Y[i]=167.25, and MAXw=127.5 in Formulae (30) to (32) yields coefficients (a, b, c) for use in calculation of α as follows:

$$a = (\text{maxRGB} - \text{minRGB}) \times (\text{maxRGB} + \text{minRGB} - 2 \times Y[i])$$
$$= (187 - 85) \times (187 + 85 - 2 \times 167.25)$$
$$= -6375$$

$$b = Y[i] \times (\text{maxRGB} - \text{minRGB})$$
$$= 167.25 \times (187 - 85)$$
$$= 17059.5$$

$$c = -\text{MAX}w \times \text{MAX}$$
$$= -127.5 \times 255$$
$$= -32512.5.$$

Since a≠0, it is found from Formula (34) that:

$$\alpha = \frac{(-b \pm \sqrt{d})}{a}$$
$$= \frac{(-17059.5 + \sqrt{83759352.75})}{(-6375)}$$
$$= 1.24039.$$

Thus, the present embodiment can calculate a without a loop process.

In the present example of calculation, since a exceeds 1, a limiter process is performed so that α=1.

Thus, in cases where α=1, there are no differences in RGB values between before and after color-saturation conversion according to Formulae (6) to (8), with the same result as in the case where no color-saturation conversion (color-saturation reduction) is performed.

That is, in cases where a backlight value obtained in cases where no color-saturation conversion is performed falls short of a backlight upper limit, no color-saturation conversion is needed. Also in the present example of calculation, no color-saturation conversion is performed. Accordingly, the backlight value is 109 as in the case where no color-saturation conversion is performed.

Basically, the present liquid crystal display device has a single backlight 17 provided for a plurality of pixels. For this reason, for example, the liquid crystal display device of FIG. 1 is arranged such that a single white backlight 17 corresponds to the entire display screen of the liquid crystal panel 15. However, the present invention is not limited to this. The display screen of the liquid crystal panel 15 may be divided into a plurality of areas, and a plurality of backlights may be provided so that it becomes possible to adjust the luminance of the backlight of each area.

Figure 35:
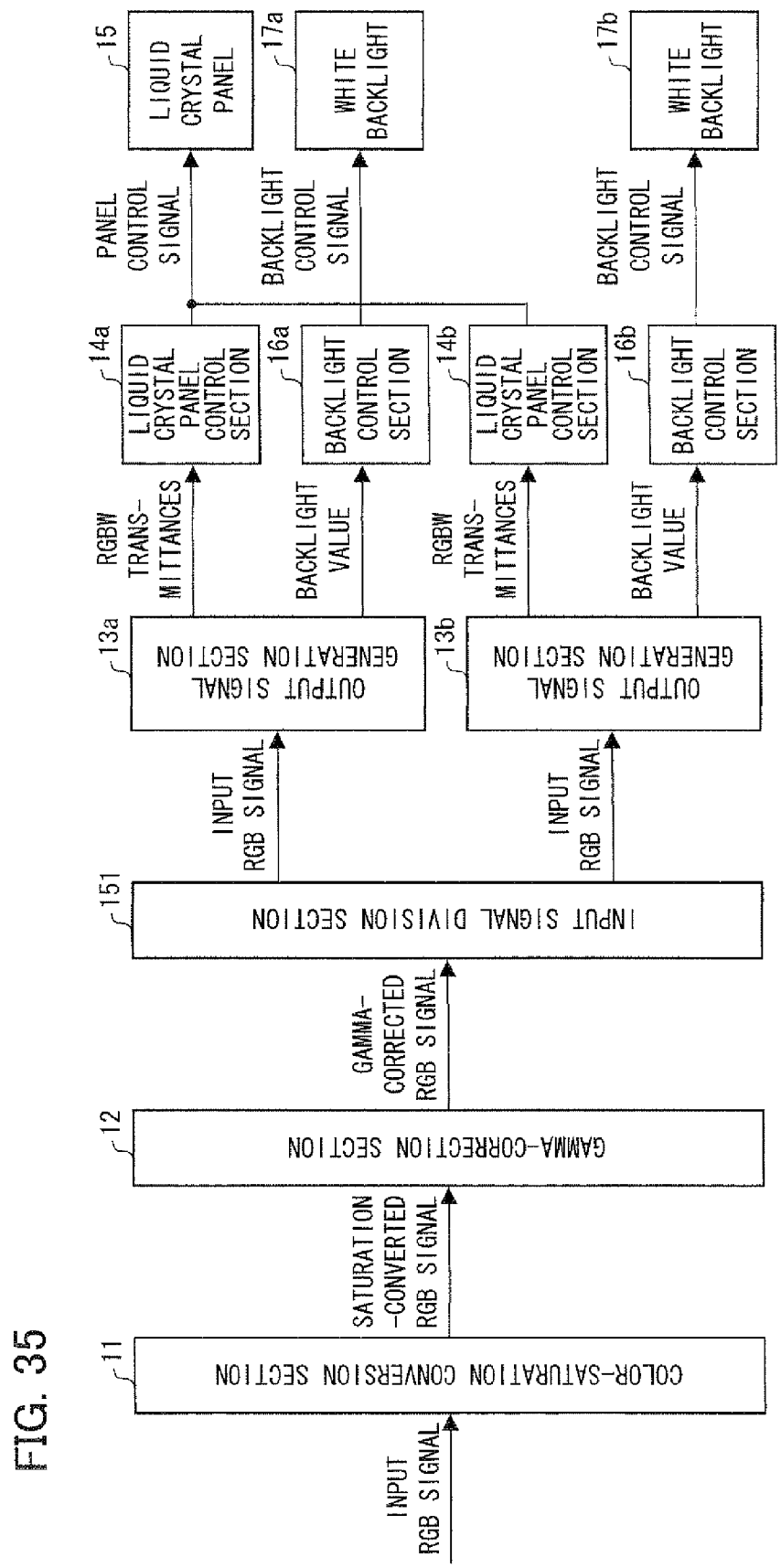
FIG. 35 is a block diagram showing an arrangement of a main part of a transmissive liquid crystal display device according to another embodiment of the present invention.

FIG. 35 shows an example where a single display area has two white backlights. It should be noted, however, that the number of backlights is not limited.

The liquid crystal display device of FIG. 35 includes a color-saturation conversion section 11, a gamma-correction section 12, an input signal division section 151, output signal generation sections 13a and 13b, liquid crystal panel control sections 14a and 14b, a liquid crystal panel 15, backlight control sections 16a and 16b, and white backlights 17a and 17b.

The input signal division section 151 splits, into signals corresponding to two areas, a gamma-corrected input RGB signal, inputted from the gamma-correction section 12, which corresponds to a single screen, and inputs the RGB input signals to the output signal generation sections 13a and 13b for the respective areas. Each of the output signal generation sections 13a and 13b performs, on a corresponding one of the areas, a process equivalent to the process performed by the output signal generation section 13 of FIG. 1.

Each of the liquid crystal panel control sections 14a and 14b performs, on a corresponding one of the areas, a process equivalent to the process performed by the liquid crystal panel control section 14 of FIG. 1. Each of the control sections controls the transmittance of a pixel positioned so as to correspond to that area of the liquid crystal panel 15 which corresponds to the control section.

Each of the backlight control sections 16a and 16b performs, on a corresponding one of the areas, a process equivalent to the process performed by the backlight control section 16 of FIG. 1. Each of the white backlights 17a and 17b is identical in structure to the backlight 17. Each of the backlights illuminates a corresponding one of the areas.

By thus dividing a single screen into a plurality of areas and controlling each area, the backlight value can be further reduced. It should be noted that although the present embodiment divides a single screen into two areas, it is also possible to divide a single screen into three or more areas and control each area.

In a general image, similar colors tend to be contiguous in a neighborhood area. Thus, dividing the backlight area as shown in FIG. 35 makes it possible to further darken the backlight for an area where dark pixels gather. Accordingly, the amount of electricity that is used by the entire backlight is better reduced when the backlight is divided than when the backlight is not divided.

The processes that are performed by the color-saturation conversion section 11, the gamma-correction section 12, and the output signal generation section 13 can be realized by software operable on personal computers. The following describes a procedure for realizing the processes by software.

Figure 36:
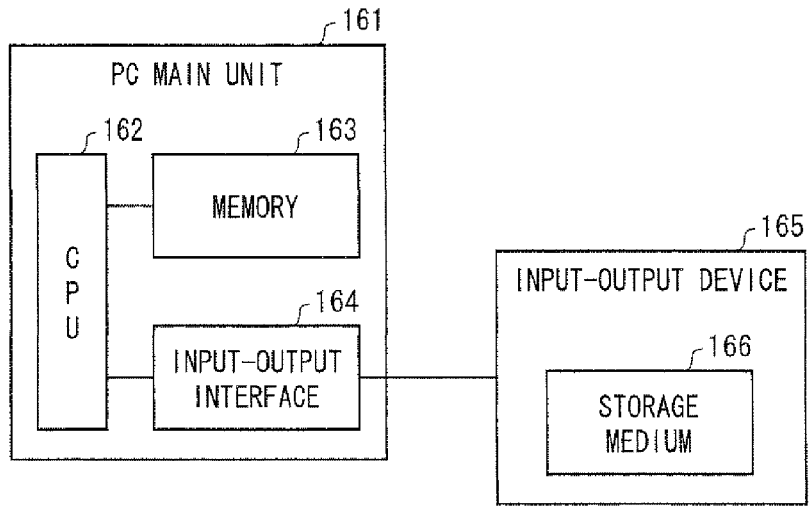
FIG. 36 shows a system configuration in which a display control process of the present invention is realized by software.

FIG. 36 is a system configuration in which the processes are realized by software. The system is constituted by a PC main unit 161 and an input-output device 165. Further, the PC main unit 161 includes a CPU 162, a memory 163, and an input-output interface 164. The input-output device 165 includes a storage medium 166.

The CPU 162 controls the input-output device 165 via the input-output interface 164. The CPU 162 reads out, from the storage medium 166, programs for color-saturation reduction, gamma correction, and output signal generation, parameter files (e.g., the upper limit of an input RGB signal, the backlight value determination ratio, area information for use in division of a single screen into a plurality of areas), and input image data, and stores them in the memory 163.

Further, the CPU 162 reads out, from the memory 163, the programs for color-saturation reduction, gamma correction, and output signal generation, the parameter files, and the input image data. In accordance with each command of the programs for color-saturation reduction, gamma correction, and output signal generation, the CPU 162 performs color-saturation reduction, gamma correction, and output signal generation on the input image data thus inputted, and then controls, via the input-output interface 164, the input-output device 165 to output, to the storage medium 166, the backlight value and the RGBW transmittances obtained after the generation of the output signal.

Figure 37:
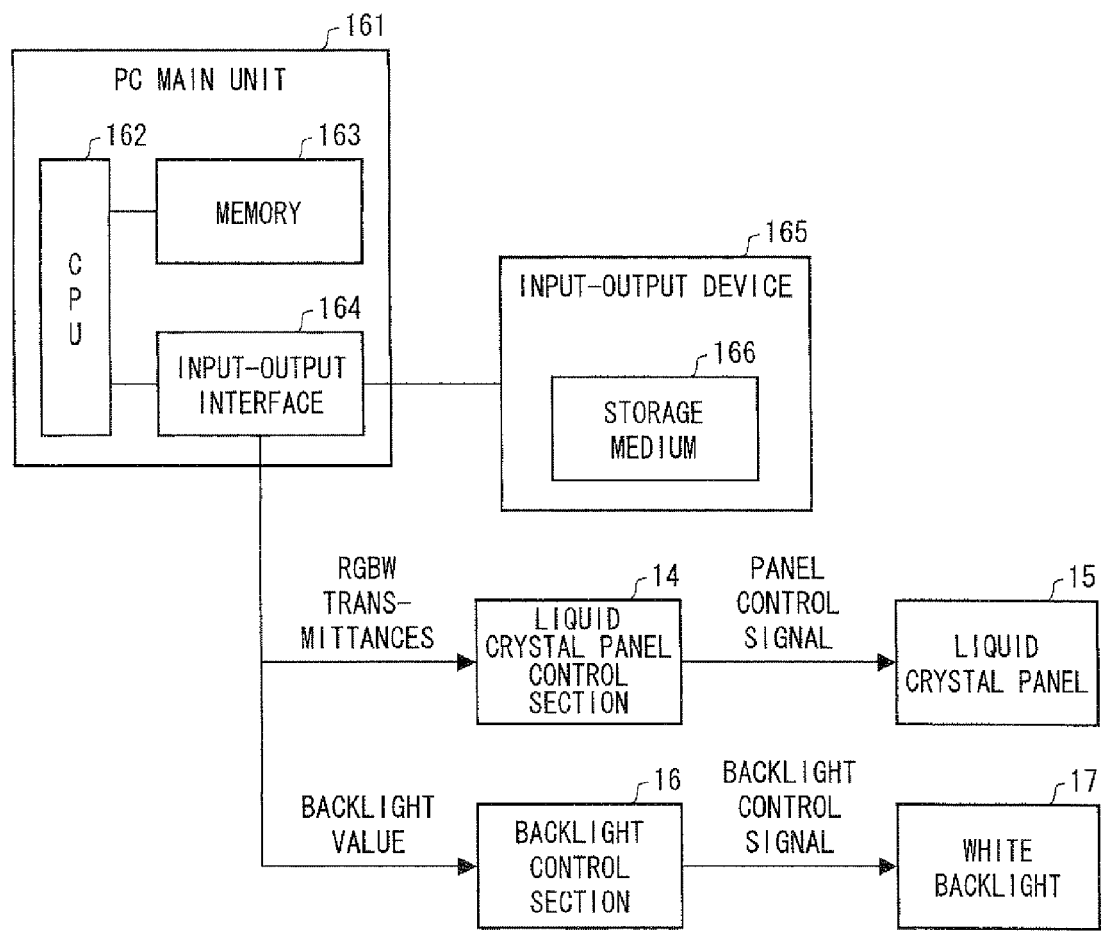
FIG. 37 shows a modified example of the system configuration in which the display control process of the present invention is realized by software.

Alternatively, as shown in FIG. 37, the CPU 162 outputs the backlight value obtained after the generation of the output signal to the backlight control section 16 and the RGBW transmittances to the liquid crystal panel control section 14 via the input-output interface 164, thereby controlling the white backlight 17 and the liquid crystal panel 15 so that an image is actually displayed.

Thus, the system makes it possible to perform the aforementioned color-saturation reduction, the aforementioned gamma correction, and the aforementioned output signal generation on a personal computer. This makes it possible to confirm the validity of a method for reducing color saturation and a method for generating an output signal and the effect of reduction in backlight value before actually manufacturing a color-saturation conversion section and an output signal generation section by way of trial.

In order to solve the foregoing problems, a transmissive liquid crystal device according to the present invention includes: a liquid crystal panel whose pixels are each divided into four subpixels, namely red (K), green (G), blue (B), and white (W) subpixels; a white active backlight whose light emission luminance is controllable; a color-saturation conversion section that performs a color-saturation reduction process on pixel data high in luminance and color saturation, from among pixel data contained in a first input RGB signal serving as an input image, and thereby converts the first input RGB signal into a second input RGB signal; a gamma-correction section that converts the second input RGB signal into a third input RGB signal by performing a gamma-correction process on the second input RGB signal; an output signal generation section that generates, from the third input RGB signal, respective transmittance signals of the R, G, B, and W subpixels of each pixel of the liquid crystal panel and calculates a backlight value of the active backlight; a liquid crystal panel control section that drives and controls the liquid crystal panel in accordance with the transmittance signals generated by the output signal generation section; and a backlight control section that controls the light emission luminance of the backlight in accordance with the backlight value calculated by the output signal generation section.

Alternatively, in order to solve the foregoing problems, another transmissive liquid crystal device according to the present invention includes: a liquid crystal panel whose pixels are each divided into four subpixels, namely red (R), green (G), blue (B), and white (W) sub pixels; a white active backlight whose light emission luminance is controllable; a color-saturation conversion and gamma-correction section that performs a color-saturation reduction process and a gamma-correction section in this order on pixel data high in luminance and color saturation, from among pixel data contained in a first input RGB signal serving as an input image, and converts the first input RGB signal into a third input RGB signal by performing a gamma-correction process on pixel data low in at least either luminance or color saturation; an output signal generation section that generates, from the third input RGB signal, respective transmittance signals of the R, G, B, and W subpixels of each pixel of the liquid crystal panel and calculates a backlight value of the active backlight; a liquid crystal panel control section that drives and controls the liquid crystal panel in accordance with the transmittance signals generated by the output signal generation section; and a backlight control section that controls the light emission luminance of the backlight in accordance with the backlight value calculated by the output signal generation section.

According to the foregoing arrangement, the use of a liquid crystal panel whose pixels are each divided into four subpixels, namely R, G, B, and W subpixels, makes it possible to transfer a part of each of the R, G, and B components to the subpixel W, which suffers no loss (or little loss) of light due to absorption by a filter. This makes it possible to reduce the amount of light that is absorbed by the color filter and to reduce the backlight value accordingly, thereby enabling a reduction in the amount of electricity that is used by the transmissive liquid crystal display device.

Furthermore, the backlight value can be more surely reduced by calculating the backlight value and the RGBW transmittances after performing the color-saturation reduction process on the first input RGB signal, which is an original input.

Further, as for the color-saturation reduction process and the gamma-correction process, the gamma-correction process is performed after the color-saturation reduction process. In cases where the color-saturation reduction process and the gamma-correction process are performed in an inverse order, there is a difference in luminance between before the processes and after the processes. However, since the gamma-correction process is performed after the color-saturation reduction process, the luminance after the processes stays the same as the luminance before the processes.

Further, the transmissive liquid crystal display device is preferably arranged such that the color-saturation conversion section reduces only the color saturation of the pixel data on which the color-saturation reduction process is performed, without causing a difference in luminance and hue between before and after the color-saturation reduction process.

The foregoing arrangement does not cause a change in luminance and hue, both of which exert a great influence on the visual property of a human, but causes a reduction only in saturation, which exerts only a minor influence on the visual property, thereby enabling the suppression of deterioration in image quality due to the color-saturation reduction process.

Further, the transmissive liquid crystal display device is preferably arranged such that the color-saturation conversion section is able to change a degree of the color-saturation reduction process.

The foregoing arrangement allows a user to selectively set a balance between a power consumption reduction effect that is brought about by the color-saturation reduction process and deterioration in image quality due to the color-saturation reduction process.

Further, the transmissive liquid crystal display device may be arranged so as to include a plurality of active backlights with respect to the liquid crystal panel, wherein the transmissive liquid crystal display device controls a transmittance of the liquid crystal panel and a backlight value of a backlight for each of those areas respectively corresponding to the active backlights.

According to the foregoing arrangement, the backlight is divided into areas so that the backlight value can be suitably set for each of the areas of the backlight thus divided, and that the entire amount of electricity that is used by the backlight can be reduced.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A transmissive liquid crystal display device comprising:
a liquid crystal panel whose pixels are each divided into four subpixels, namely red (R), green (G), blue (B), and white (W) subpixels;
a white active backlight whose light emission luminance is controllable;
a color-saturation conversion section that performs a color-saturation reduction process using a formula including a gamma coefficient on pixel data high in luminance and color saturation, from among pixel data contained in a first input RGB signal serving as an input image, and thereby converts the first input RGB signal into a second input RGB signal;
a gamma-correction section that converts the second input RGB signal into a third input RGB signal by performing a gamma-correction process using the gamma coefficient on the second input RGB signal;
wherein, before the color saturation reduction process is performed, no gamma correction is performed on the pixel data on which the color-saturation reduction process is to be performed;
an output signal generation section that generates, from the third input RGB signal, respective transmittance signals of the R, G, B, and W subpixels in each pixel of the liquid crystal panel and calculates a backlight value of the active backlight;
a liquid crystal panel control section that drives and controls the liquid crystal panel in accordance with the transmittance signals generated by the output signal generation section; and
a backlight control section that controls the light emission luminance of the backlight in accordance with the backlight value calculated by the output signal generation section.

2. A transmissive liquid crystal display device comprising:
a liquid crystal panel whose pixels are each divided into four subpixels, namely red (R), green (G), blue (B), and white (W) subpixels;
a white active backlight whose light emission luminance is controllable;
a color-saturation conversion and gamma-correction section that performs a color-saturation reduction process using a formula including a gamma coefficient and a gamma-correction process using the gamma coefficient in this order on pixel data high in luminance and color saturation, from among pixel data contained in a first input RGB signal serving as an input image, performs a gamma-correction process using the gamma coefficient on pixel data low in at least either luminance or color saturation, and thereby converts the first input RGB signal into a third input RGB signal;
wherein, before the color saturation reduction process is performed, no gamma correction is performed on the pixel data on which the color-saturation reduction process is to be performed;
an output signal generation section that generates, from the third input RGB signal, respective transmittance signals of the R, G, B, and W subpixels in each pixel of the liquid crystal panel and calculates a backlight value of the active backlight;
a liquid crystal panel control section that drives and controls the liquid crystal panel in accordance with the transmittance signals generated by the output signal generation section; and
a backlight control section that controls the light emission luminance of the backlight in accordance with the backlight value calculated by the output signal generation section.

3. The transmissive liquid crystal display device as set forth in claim 1, wherein the color-saturation conversion section reduces only the color saturation of the pixel data on which the color-saturation reduction process is performed, without causing a difference in luminance and hue between before and after the color-saturation reduction process.

4. The transmissive liquid crystal display device as set forth in claim 2, wherein the color-saturation conversion and gamma-correction section reduces only the color saturation of the pixel data on which the color-saturation reduction process is performed, without causing a difference in luminance and hue between before and after the color-saturation reduction process.

5. The transmissive liquid crystal display device as set forth in claim 1, wherein the color-saturation conversion section is able to change a degree of the color-saturation reduction process.

6. The transmissive liquid crystal display device as set forth in claim 2, wherein the color-saturation conversion and gamma-correction section is able to change a degree of the color-saturation reduction process.

7. The transmissive liquid crystal display device as set forth in claim 1, wherein the color-saturation conversion section performs the color-saturation conversion process according to the steps (A) to (D) of:

(A) calculating a backlight upper limit MAXw according to Formula (1)

$$MAXw = MAX \times B1\ Ratio \qquad (1)$$

where
MAX=an upper limit of a backlight value that is obtained when no color-saturation conversion process is performed ($\geq$ a maximum value of all RGB values of the input RGB signal), and
B1 Ratio=a backlight value determination ratio ($0.5 \leq B1\ Ratio \leq 1.0$);

(B) calculating maximum and minimum values (maxRGBg, minRGBg) of a gamma-corrected RGB signal according to Formulae (2) and (3)

$$maxRGBg = fg(maxRGB, \gamma) \qquad (2)$$

$$minRGBg = fg(minRGB, \gamma) \qquad (3)$$

where
maxRGB=max (R[i], G[i], B[i]),
minRGB=min (R[i], G[i], B[i]),
R[i], G[i], B[i] (i=1, 2, . . . , Np)=RGB values of a target pixel in the first input RGB signal,
Np=the number of pixels of the input image,
max (A, B, . . . )=a maximum value of A, B, . . . ,
min (A, B, . . . )=a minimum value of A, B, . . . ,
$\gamma$=a gamma coefficient (>0), and
fg(x,g)=a gamma correction function;

(C) calculating a color-saturation conversion rate $\alpha$ according to the step (a) or (b) of:

(a) if Formula (4) is satisfied, calculating a that satisfies Formula (5)

$$MAXw \leq maxRGBg - minRGBg \quad (4)$$

$$fg\left(\begin{array}{c}\alpha \times maxRGB + \\ (1-\alpha) \times Y[i], \gamma\end{array}\right) - fg\left(\begin{array}{c}\alpha \times minRGB + \\ (1-\alpha) \times Y[i], \gamma\end{array}\right) = MAXw \quad (5)$$

where Y[i]=the luminance of the input RGB signal (R[i], G[i], B[i]); or
(b) if Formula (4) is not satisfied, setting a as a=1; and
(D) calculating a saturation-converted RGB signal (Rs[i], Gs[i], Bs[i]) according to Formulae (6) to (8)

$$Rs[i]=\alpha \times R[i]+(1-\alpha) \times Y[i] \quad (6)$$

$$Gs[i]=\alpha \times G[i]+(1-\alpha) \times Y[i] \quad (7)$$

$$Bs[i]=\alpha \times B[i]+(1-\alpha) \times Y[i] \quad (8).$$

8. The transmissive liquid crystal display device as set forth in claim 1, wherein the color-saturation conversion section performs the color-saturation conversion process according to the steps (A) to (C) of:
(A) calculating a backlight upper limit MAXw according to Formula (1)

$$MAXw = MAX \times B1\ Ratio \quad (1)$$

where
MAX=an upper limit of a backlight value that is obtained when no color-saturation conversion process is performed ($\geq$ a maximum value of all RGB values of the input RGB signal), and
B1 Ratio=a backlight value determination ratio (0.5$\leq$B1 Ratio$\leq$1.0);
(B) calculating a that satisfies Formula (5)

$$fg\left(\begin{array}{c}\alpha \times maxRGB + \\ (1-\alpha) \times Y[i], \gamma\end{array}\right) - fg\left(\begin{array}{c}\alpha \times minRGB + \\ (1-\alpha) \times Y[i], \gamma\end{array}\right) = MAXw \quad (5)$$

where
maxRGB=max (R[i], G[i], B[i]),
minRGB=min (R[i], G[i], B[i]),
R[i], G[i], B[i] (i=1, 2, ..., Np)=RGB values of a target pixel in the first input RGB signal,
Np=the number of pixels of the input image,
max (A, B, ...)=a maximum value of A, B, ...,
min (A, B, ...)=a minimum value of A, B, ...,
$\gamma$=a gamma coefficient (>0),
fg(x,g)=a gamma correction function, and
Y[i]=the luminance of the input RGB signal (R[i], G[i], B[i]); and
(C) calculating a saturation-converted RGB signal (Rs[i], Gs[i], Bs[i]) according to Formulae (6) to (8)

$$Rs[i]=\alpha \times R[i]+(1-\alpha) \times Y[i] \quad (6)$$

$$Gs[i]=\alpha \times G[i]+(1-\alpha) \times Y[i] \quad (7)$$

$$Bs[i]=\alpha \times B[i]+(1-\alpha) \times Y[i], \quad (8)$$

the steps (B) and (C) being repeated as many times as the number of pixels within the input image.

9. The transmissive liquid crystal display device as set forth in claim 1, wherein the color-saturation conversion section performs the color-saturation conversion process according to the steps (A) to (D) of:
(A) calculating a backlight upper limit MAXw according to Formula (1)

$$MAXw = MAX \times B1\ Ratio \quad (1)$$

where
MAX=an upper limit of a backlight value that is obtained when no color-saturation conversion process is performed ($\geq$ a maximum value of all RGB values of the input RGB signal), and
B1 Ratio=a backlight value determination ratio (0.5$\leq$B1 Ratio$\leq$1.0);
(B) calculating a that satisfies Formula (5)

$$fg\left(\begin{array}{c}\alpha \times maxRGB + \\ (1-\alpha) \times Y[i], \gamma\end{array}\right) - fg\left(\begin{array}{c}\alpha \times minRGB + \\ (1-\alpha) \times Y[i], \gamma\end{array}\right) = MAXw \quad (5)$$

where
maxRGB=max (R[i], G[i], B[i]),
minRGB=min (R[i], G[i], B[i]),
R[i], G[i], B[i] (i=1, 2, ..., Np)=RGB values of a target pixel in the first input RGB signal,
Np=the number of pixels of the input image,
max (A, B, ...)=a maximum value of A, B, ...,
min (A, B, ...)=a minimum value of A, B, ...,
$\gamma$=a gamma coefficient (>0),
fg(x,g)=a gamma correction function, and
Y[i]=the luminance of the input RGB signal (R[i], G[i], B[i]);
(C) setting $\alpha$ as $\alpha$=0 if $\alpha$ is calculated as $\alpha$<0 according to the step (B) or setting $\alpha$ as $\alpha$=1 if $\alpha$ is calculated as 1<$\alpha$ according to the step (B); and
(D) calculating a saturation-converted RGB signal (Rs[i], Gs[i], Bs[i]) according to Formulae (6) to (8)

$$Rs[i]=\alpha \times R[i]+(1-\alpha) \times Y[i] \quad (6)$$

$$Gs[i]=\alpha \times G[i]+(1-\alpha) \times Y[i] \quad (7)$$

$$Bs[i]=\alpha \times B[i]+(1-\alpha) \times Y[i], \quad (8)$$

the steps (B) to (D) being repeated as many times as the number of pixels within the input image.

10. The transmissive liquid crystal display device as set forth in claim 2, wherein the color-saturation conversion and gamma-correction section performs the color-saturation conversion process and the gamma-correction process according to the steps (A) to (C) of:
(A) calculating a backlight upper limit MAXw according to Formula (1)

$$MAXw = MAX \times B1\ Ratio \quad (1)$$

where
MAX=an upper limit of a backlight value that is obtained when no color-saturation conversion process is performed ($\geq$ a maximum value of all RGB values of the input RGB signal), and
B1 Ratio=a backlight value determination ratio (0.5$\leq$B1 Ratio$\leq$1.0);
(B) calculating a gamma-corrected RGB signal (Rg[i], Gg[i], Bg[i]) according to Formulae (101) to (103)

$$Rg[i]=fg(R[i],\gamma) \quad (101)$$

$$Gg[i]=fg(G[i],\gamma) \quad (102)$$

$$Bg[i]=fg(B[i],\gamma). \quad (103)$$

where
R[i], G[i], B[i] (i=1, 2, ..., Np)=RGB values of a target pixel in the first input RGB signal,
Np=the number of pixels of the input image,
γ=a gamma coefficient (>0), and
fg(x,g)=a gamma correction function; and
(C) calculating the third input RGB signal (Rsg[i], Gsg[i], Bsg[i]) according to the step (a) or (b) of:
(a) if Formula (4) is satisfied, calculating a that satisfies Formula (5)

$$\text{MAX}w < \max RGBg - \min RGBg. \quad (4)$$

$$fg\left(\begin{array}{l}\alpha \times \max RGB + \\ (1-\alpha) \times Y[i], \gamma\end{array}\right) - fg\left(\begin{array}{l}\alpha \times \min RGB + \\ (1-\alpha) \times Y[i], \gamma\end{array}\right) = \text{MAX}w \quad (5)$$

where
maxRGBg=max (Rg[i], Gg[i], Bg[i]),
minRGBg=min (Rg[i], Gg[i], Bg[i]), and
Y[i]=the luminance of the input RGB signal (R[i], G[i], B[i]),
calculating, with use of a thus calculated, the second input RGB signal obtained by performing the color-saturation conversion process on the first input RGB signal, and then calculating the third input RGB signal obtained by performing the gamma-correction process on the second input RGB signal; or
(b) if Formula (4) is not satisfied, calculating the third RGB signal (Rsg[i], Gsg[i], Bsg[i]) according to the following formulae $$Rsg[i]=Rg[i]$$

$$Gsg[i]=Gg[i]$$

$$Bsg[i]=Bg[i]$$

so that the third RGB signal becomes identical to the gamma-corrected RGB signal calculated according to the step (B).

11. The transmissive liquid crystal display device as set forth in claim 7, wherein the color-saturation conversion section calculates a color-saturation conversion rate α according to the steps (A) and (B) of:
(A) in order to perform piecewise linear approximation of a normalized gamma curve, calculating the coordinates of an endpoint of each polygonal-line segment according to Formulae (9) and (10)

$$x[j]=j/Ndg \quad (9)$$

$$y[j]=x[j]^\gamma \quad (10)$$

where
Ndg=the number of normalized-gamma-curve polygonal-line segments (>0),
x[j]=the x coordinate of an endpoint of a normalized-gamma-curve polygonal-line segment (0≦j≦Ndg), and
y[j]=the y coordinate of an endpoint of a normalized-gamma-curve polygonal-line segment (0≦j≦Ndg),
and calculating the slope and intercept of each normalized polygonal-line segment according to Formulae (11) and (12)

$$a[j]=(y[j+1]-y[j])/(x[j+1]-x[j]) \quad (11)$$

$$b[j]=(x[j+1]\times y[j]-x[j]\times y[j+1])/(x[j+1]-x[j]) \quad (12)$$

where
a[j]=the slope of a normalized-gamma-curve polygonal-line segment j (0≦j<Ndg), and
b[j]=the intercept of a normalized-gamma-curve polygonal-line segment j (0≦j<Ndg),
the step (A) being repeated from j=0 to j=Ndg for Formulae (9) and (10) and from j=0 to j=Ndg−1 for Formulae (11) and (12); and
(B) for a pixel that satisfies Formula (4), calculating a according to the steps (a) to (c) of:
(a) calculating an α candidate value αt according to Formula (13)

$$\alpha t = \frac{\left\{\begin{array}{l}\text{MAX}w - (a[k]-a[j])\times \\ Y[i]-(b[k]-b[j])\times \text{MAX}\end{array}\right\}}{\left\{\begin{array}{l}a[k]\times (\max RGB - Y[i]) - \\ a[j]\times (\min RGB - Y[i])\end{array}\right\}}; \quad (13)$$

(b) calculating an α calculation judgment value (judge) according to Formula (14)

$$\text{judge} = \left|\begin{array}{l}fg\left(\begin{array}{l}\alpha t \times \max RGB + \\ (1-\alpha t)\times Y[i], y\end{array}\right) - \\ fg\left(\begin{array}{l}\alpha t \times \min RGB + \\ (1-\alpha t)\times Y[i], y\end{array}\right) - \text{MAX}w\end{array}\right| \quad (14)$$

if the candidate value αt falls within a range of 0≦αt≦1; and then
(c) when it is judged for the first time whether or not to update α or when judge<judgeMin, updating α and a minimum a calculation judgment value (judgeMin) according to Formulae (15) and (16)

$$\alpha=\alpha t \quad (15)$$

$$\text{judgeMin}=\text{judge} \quad (16)$$

where
judgeMin=the minimum a calculation judgment value,
jMin=a normalized-gamma-curve polygonal-line segment index corresponding to minRGB (x[jMin]≦minRGB/MAX<x[jMin+1]), and
kMax=a normalized-gamma-curve polygonal-line segment index corresponding to maxRGB (x[kMax]<maxRGB/MAX≦x[kMax+1])
(0≦jMin≦kMax<Ndg),
the steps (a) to (c) being repeated from j=jMin to j=kMax in j and from k=j to k=kMax.

12. The transmissive liquid crystal display device as set forth in claim 10, wherein the color-saturation conversion and gamma-correction section calculates a color-saturation conversion rate α according to the steps (A) and (B) of:
(A) in order to perform piecewise linear approximation of a normalized gamma curve, calculating the coordinates of an endpoint of each polygonal-line segment according to Formulae (9) and (10)

$$x[j]=j/Ndg \quad (9)$$

$$y[j]=x[j]^\gamma \quad (10)$$

where
Ndg=the number of normalized-gamma-curve polygonal-line segments (>0),
x[j]=the x coordinate of an endpoint of a normalized-gamma-curve polygonal-line segment (0≦j≦Ndg), and y[j]=the y coordinate of an endpoint of a normalized-gamma-curve polygonal-line segment (0≦j≦Ndg), and calculating the slope and intercept of each normalized polygonal-line segment according to Formulae (11) and (12)

$$a[j]=(y[i+1]-y[i])/(x[i+1]-x[j]) \qquad (11)$$

$$b[j]=(x[j+1] \times y[j]-x[j] \times y[j+1])/(x[j+1]-x[j]) \qquad (12)$$

where a[j]=the slope of a normalized-gamma-curve polygonal-line segment j (0≦j<Ndg), and b[j]=the intercept of a normalized-gamma-curve polygonal-line segment j (0≦j<Ndg), the step (A) being repeated from j=0 to j=Ndg for Formulae (9) and (10) and from j=0 to j=Ndg−1 for Formulae (11) and (12); and (B) for a pixel that satisfies Formula (4), calculating α according to the steps (a) to (c) of:

(a) calculating an α candidate value αt according to Formula (13)

$$\alpha t = \frac{\left\{ \begin{array}{c} \text{MAX}w - (a[k]-a[j]) \times \\ Y[i]-(b[k]-b[j]) \times \text{MAX} \end{array} \right\}}{\left\{ \begin{array}{c} a[k] \times (\text{maxRGB}-Y[i])- \\ a[j] \times (\text{minRGB}-Y[i]) \end{array} \right\}}; \qquad (13)$$

(b) calculating an α calculation judgment value (judge) according to Formula (14)

$$\text{judge} = \left| \begin{array}{c} fg\left( \begin{array}{c} \alpha t \times \text{maxRGB} + \\ (1-\alpha t) \times Y[i], y \end{array} \right) - \\ fg\left( \begin{array}{c} \alpha t \times \text{minRGB} + \\ (1-\alpha t) \times Y[i], y \end{array} \right) - \text{MAX}w \end{array} \right| \qquad (14)$$

if the candidate value αt falls within a range of 0≦αt≦1; and then (c) when it is judged for the first time whether or not to update α or when judge<judgeMin, updating α and a minimum α calculation judgment value (judgeMin) according to Formulae (15) and (16)

$$\alpha = \alpha t \qquad (15)$$

$$\text{judgeMin} = \text{judge} \qquad (16)$$

where judgeMin=the minimum α calculation judgment value, jMin=a normalized-gamma-curve polygonal-line segment index corresponding to minRGB (x[jMin]≦minRGB/MAX<x[jMin+1]), and kMax=a normalized-gamma-curve polygonal-line segment index corresponding to maxRGB (x[kMax]<maxRGB/MAX≦x[kMax+1]) (0≦jMin kMax<Ndg), the steps (a) to (c) being repeated from j=jMin to j=kMax in j and from k=j to k=kMax.

13. The transmissive liquid crystal display device as set forth in claim 8, wherein the color-saturation conversion section calculates a color-saturation conversion rate α according to the steps (A) and (B) of:

(A) in order to perform piecewise linear approximation of a normalized gamma curve, calculating the coordinates of an endpoint of each polygonal-line segment according to Formulae (9) and (10)

$$x[j]=j/\text{Ndg} \qquad (9)$$

$$y[j]=x[j]^{\gamma} \qquad (10)$$

where

Ndg=the number of normalized-gamma-curve polygonal-line segments (>0), x[j]=the x coordinate of an endpoint of a normalized-gamma-curve polygonal-line segment (0≦j≦Ndg), and y[j]=the y coordinate of an endpoint of a normalized-gamma-curve polygonal-line segment (0≦j≦Ndg), and calculating the slope and intercept of each normalized polygonal-line segment according to Formulae (11) and (12)

$$a[j]=(y[i+1]-y[i])/(x[i+1]-x[j]) \qquad (11)$$

$$b[j]=(x[j+1] \times y[j]-x[j] \times y[j+1])/(x[j+1]-x[j]) \qquad (12)$$

where a[j]=the slope of a normalized-gamma-curve polygonal-line segment j (0≦j<Ndg), and b[j]=the intercept of a normalized-gamma-curve polygonal-line segment j (0≦j<Ndg), the step (A) being repeated from j=0 to j=Ndg for Formulae (9) and (10) and from j=0 to j=Ndg−1 for Formulae (11) and (12); and (B) calculating α for each pixel of the input image according to the steps (a) to (d) of:

(a) calculating an α candidate value αt according to Formula (13)

$$\alpha t = \frac{\left\{ \begin{array}{c} \text{MAX}w - (a[k]-a[j]) \times Y[i] - \\ (b[k]-b[j]) \times \text{MAX} \end{array} \right\}}{\left\{ \begin{array}{c} a[k] \times (\text{maxRGB}-Y[i])- \\ a[j] \times (\text{minRGB}-Y[i]) \end{array} \right\}}; \qquad (13)$$

αt being an arbitrary value if the denominator is 0;

(b) calculating maximum and minimum values (maxRGBst, minRGBst) of the saturation-converted RGB signal according to Formulae (17) and (18)

$$\text{maxRGBst}=\max(\alpha t \times \text{maxRGB}+(1-\alpha t) \times Y[i],0) \qquad (17)$$

$$\text{minRGBst}=\min(\alpha t \times \text{maxRGB}+(1-\alpha t) \times Y[i],\text{MAX}); \qquad (18)$$

(c) calculating an α calculation judgment value (judge) according to Formula (19)

$$\text{judge} = |fg(\text{maxRGBst}, \gamma) - fg(\text{minRGBst}, \gamma) - \text{MAX}w|; \qquad (19)$$

and then (d) when it is judged for the first time whether or not to update α or when judge<judgeMin, updating α and a minimum α calculation judgment value (judgeMin) according to Formulae (15) and (16)

$$\alpha = \alpha t \qquad (15)$$

$$\text{judgeMin} = \text{judge} \qquad (16)$$

where
judgeMin=the minimum a calculation judgment value,
jMin=a normalized-gamma-curve polygonal-line segment index corresponding to minRGB (x[jMin]≦minRGB/MAX<x[jMin+1]), and
kMax=a normalized-gamma-curve polygonal-line segment index corresponding to maxRGB (x[kMax]<maxRGB/MAX≦x[kMax+1]) (0≦jMin kMax<Ndg),
the steps (a) to (d) being repeated from j=0 to j=Ndg−1 and from k=j to k=Ndg−1.

14. The transmissive liquid crystal display device as set forth in claim 9, wherein the color-saturation conversion section calculates a color-saturation conversion rate α according to the steps (A) and (B) of:
(A) in order to perform piecewise linear approximation of a normalized gamma curve, calculating the coordinates of an endpoint of each polygonal-line segment according to Formulae (9) and (10)

$$x[j]=j/Ndg \qquad (9)$$

$$y[j]=x[j]^\gamma \qquad (10)$$

where
Ndg=the number of normalized-gamma-curve polygonal-line segments (>0),
x[j]=the x coordinate of an endpoint of a normalized-gamma-curve polygonal-line segment (0≦j≦Ndg), and
y[j]=the y coordinate of an endpoint of a normalized-gamma-curve polygonal-line segment (0≦j≦Ndg),
and calculating the slope and intercept of each normalized polygonal-line segment according to Formulae (11) and (12)

$$a[j]=(y[j+1]-y[j])/(x[j+1]-x[j]) \qquad (11)$$

$$b[j]=(x[j+1]\times y[j]-x[j]\times y[j+1])/(x[j+1]-x[j]) \qquad (12)$$

where
a[j]=the slope of a normalized-gamma-curve polygonal-line segment j (0≦j<Ndg), and
b[j]=the intercept of a normalized-gamma-curve polygonal-line segment j (0≦j<Ndg),
the step (A) being repeated from j=0 to j=Ndg for Formulae (9) and (10) and from j=0 to j=Ndg−1 for Formulae (11) and (12); and
(B) calculating a for each pixel of the input image according to the steps (a) to (d) of:
(a) calculating an α candidate value αt according to Formula (13)

$$\alpha t = \frac{\left\{ \begin{array}{l} MAXw - (a[k] - a[j]) \times Y[i] - \\ (b[k] - b[j]) \times MAX \end{array} \right\}}{\left\{ \begin{array}{l} a[k] \times (maxRGB - Y[i]) - \\ a[j] \times (minRGB - Y[i]) \end{array} \right\}} \qquad (13)$$

αt being an arbitrary value if the denominator is 0;
(b) calculating maximum and minimum values (maxRGBst, minRGBst) of the saturation-converted RGB signal according to Formulae (17) and (18)

$$\max RGBst=\max(\alpha t \times \max RGB+(1-\alpha t)\times Y[i],0) \qquad (17)$$

$$\min RGBst=\min(\alpha t \times \max RGB+(1-\alpha t)\times Y[i], MAX); \qquad (18)$$

(c) calculating an α calculation judgment value (judge) according to Formula (19)

$$judge = |fg(\max RGBst, \gamma) - fg(\min RGBst, \gamma) - MAXw|; \qquad (19)$$

and then
(d) when it is judged for the first time whether or not to update α or when judge<judgeMin, updating α and a minimum a calculation judgment value (judgeMin) according to Formulae (15) and (16)

$$\alpha=\alpha t \qquad (15)$$

$$judgeMin=judge \qquad (16)$$

where
judgeMin=the minimum a calculation judgment value,
jMin=a normalized-gamma-curve polygonal-line segment index corresponding to minRGB (x[jMin]≦minRGB/MAX<x[jMin+1]), and
kMax=a normalized-gamma-curve polygonal-line segment index corresponding to maxRGB (x[kMax]<maxRGB/MAX≦x[kMax+1]) (0≦jMin≦kMax<Ndg),
the steps (a) to (d) being repeated from j=0 to j=Ndg−1 and from k=j to k=Ndg−1.

15. The transmissive liquid crystal display device as set forth in claim 7, wherein the color-saturation conversion section calculates a color-saturation conversion rate α according to the steps (A) and (B) of:
(A) in order to perform piecewise linear approximation of a normalized gamma curve, calculating the coordinates of an endpoint of each polygonal-line segment according to Formulae (9) and (10)

$$x[j]=j/Ndg \qquad (9)$$

$$y[j]=x[j]^\gamma \qquad (10)$$

where
Ndg=the number of normalized-gamma-curve polygonal-line segments (>0),
x[j]=the x coordinate of an endpoint of a normalized-gamma-curve polygonal-line segment (0≦j≦Ndg), and
y[j]=the y coordinate of an endpoint of a normalized-gamma-curve polygonal-line segment (0≦j≦Ndg),
and calculating the slope and intercept of each normalized polygonal-line segment according to Formulae (11) and (12)

$$a[j]=(y[j+1]-y[j])/(x[j+1]-x[j]) \qquad (11)$$

$$b[j]=(x[j+1]\times y[j]-x[j]\times y[j+1])/(x[j+1]-x[j]) \qquad (12)$$

where
a[j]=the slope of a normalized-gamma-curve polygonal-line segment j (0≦j<Ndg), and
b[j]=the intercept of a normalized-gamma-curve polygonal-line segment j (0≦j<Ndg),
the step (A) being repeated from j=0 to j=Ndg for Formulae (9) and (10) and from j=0 to j=Ndg−1 for Formulae (11) and (12); and
(B) for a pixel that satisfies Formula (4), calculating a according to the steps (a) to (c) of:

(a) calculating the current value of α according to Formula (20)

$$\alpha = \frac{\left\{\begin{array}{l} \text{MAX}w - (a[k] - a[j]) \times \\ Y[i] - (b[k] - b[j]) \times \text{MAX} \end{array}\right\}}{\left\{\begin{array}{l} a[k] \times (\text{max}RGB - Y[i]) - \\ a[j] \times (\text{min}RGB - Y[i]) \end{array}\right\}}; \quad (20)$$

(b) calculating an α calculation judgment value (judge) according to Formula (21)

$$\text{judge} = \left| fg\left(\begin{array}{c} \alpha \times \text{max}RGB + \\ (1-\alpha) \times Y[i], \gamma \end{array}\right) - fg\left(\begin{array}{c} \alpha \times \text{min}RGB + \\ (1-\alpha) \times Y[i], \gamma \end{array}\right) - \text{MAX}w \right| \quad (21)$$

if α calculated according to Formula (20) falls within a range of 0≦α<1; and then
(c) judging whether or not judge≦judgeTol where judgeTol=a threshold (>0) for use in calculation judgment of the color-saturation conversion rate,
the steps (a) to (c) being repeated from j=jMin to j=kMax and from either k=kMax to k=j or k=j to k=kMax,
the color-saturation conversion section finishing the calculation of α if judge≦judgeTol,
the color-saturation conversion section performing error handling if the color-saturation conversion section finishes a predetermined loop without satisfying judge≦judgeTol.

16. The transmissive liquid crystal display device as set forth in claim 10, wherein the color-saturation conversion and gamma-correction section calculates a color-saturation conversion rate α according to the steps (A) and (B) of:
(A) in order to perform piecewise linear approximation of a normalized gamma curve, calculating the coordinates of an endpoint of each polygonal-line segment according to Formulae (9) and (10)

$$x[j] = j/Ndg \quad (9)$$

$$y[j] = x[j]^\gamma \quad (10)$$

where
Ndg=the number of normalized-gamma-curve polygonal-line segments (>0),
x[j]=the x coordinate of an endpoint of a normalized-gamma-curve polygonal-line segment (0≦j≦Ndg), and
y[j]=the y coordinate of an endpoint of a normalized-gamma-curve polygonal-line segment (0≦j≦Ndg),
and calculating the slope and intercept of each normalized polygonal-line segment according to Formulae (11) and (12)

$$a[j] = (y[j+1] - y[j])/(x[j+1] - x[j]) \quad (11)$$

$$b[j] = (x[j+1] \times y[j] - x[j] \times y[j+1])/(x[j+1] - x[j]) \quad (12)$$

where
a[j]=the slope of a normalized-gamma-curve polygonal-line segment j (0≦j<Ndg), and
b[j]=the intercept of a normalized-gamma-curve polygonal-line segment j (0≦j<Ndg),
the step (A) being repeated from j=0 to j=Ndg for Formulae (9) and (10) and from j=0 to j=Ndg−1 for Formulae (11) and (12); and
(B) for a pixel that satisfies Formula (4), calculating α according to the steps (a) to (c) of:
(a) calculating the current value of α according to Formula (20)

$$\alpha = \frac{\left\{\begin{array}{l} \text{MAX}w - (a[k] - a[j]) \times \\ Y[i] - (b[k] - b[j]) \times \text{MAX} \end{array}\right\}}{\left\{\begin{array}{l} a[k] \times (\text{max}RGB - Y[i]) - \\ a[j] \times (\text{min}RGB - Y[i]) \end{array}\right\}}; \quad (20)$$

(b) calculating an α calculation judgment value (judge) according to Formula (21)

$$\text{judge} = \left| fg\left(\begin{array}{c} \alpha \times \text{max}RGB + \\ (1-\alpha) \times Y[i], \gamma \end{array}\right) - fg\left(\begin{array}{c} \alpha \times \text{min}RGB + \\ (1-\alpha) \times Y[i], \gamma \end{array}\right) - \text{MAX}w \right| \quad (21)$$

if α calculated according to Formula (20) falls within a range of 0≦α<1; and then
(c) judging whether or not judge≦judgeTol where judgeTol=a threshold (>0) for use in calculation judgment of the color-saturation conversion rate,
the steps (a) to (c) being repeated from j=jMin to j=kMax and from either k=kMax to k=j or k=j to k=kMax,
the color-saturation conversion section finishing the calculation of α if judge≦judgeTol,
the color-saturation conversion section performing error handling if the color-saturation conversion section finishes a predetermined loop without satisfying judge≦judgeTol.

17. The transmissive liquid crystal display device as set forth in claim 8, wherein the color-saturation conversion section calculates a color-saturation conversion rate α according to the steps (A) and (B) of:
(A) in order to perform piecewise linear approximation of a normalized gamma curve, calculating the coordinates of an endpoint of each polygonal-line segment according to Formulae (9) and (10)

$$x[j] = j/Ndg \quad (9)$$

$$y[j] = x[j]^\gamma \quad (10)$$

where
Ndg=the number of normalized-gamma-curve polygonal-line segments (>0),
x[j]=the x coordinate of an endpoint of a normalized-gamma-curve polygonal-line segment (0≦j≦Ndg), and
y[j]=the y coordinate of an endpoint of a normalized-gamma-curve polygonal-line segment (0≦j≦Ndg),
and calculating the slope and intercept of each normalized polygonal-line segment according to Formulae (11) and (12)

$$a[j] = (y[j+1] - y[j])/(x[j+1] - x[j]) \quad (11)$$

$$b[j] = (x[j+1] \times y[j] - x[j] \times y[j+1])/(x[j+1] - x[j]) \quad (12)$$

where
a[j]=the slope of a normalized-gamma-curve polygonal-line segment j (0≦j<Ndg), and b[j]=the intercept of a normalized-gamma-curve polygonal-line segment j ($0 \leq j < Ndg$), the step (A) being repeated from j=0 to j=Ndg for Formulae (9) and (10) and from j=0 to j=Ndg−1 for Formulae (11) and (12); and (B) calculating α for each pixel of the input image according to the steps (a) to (d) of:

(a) calculating the current value of α according to Formula (20)

$$\alpha = \frac{\left\{\begin{array}{l} MAXw - (a[k] - a[j]) \times \\ Y[i] - (b[k] - b[j]) \times MAX \end{array}\right\}}{\left\{\begin{array}{l} a[k] \times (maxRGB - Y[i]) - \\ a[j] \times (minRGB - Y[i]) \end{array}\right\}} \qquad (20)$$

α being an arbitrary value if the denominator is 0;

(b) calculating maximum and minimum values (maxRGBst, minRGBst) of the saturation-converted RGB signal according to Formulae (22) and (23)

$$maxRGBs = \max(\alpha \times maxRGB + (1-\alpha) \times Y[i], 0) \qquad (22)$$

$$minRGBs = \min(\alpha \times maxRGB + (1-\alpha) \times Y[i], MAX); \qquad (23)$$

(c) calculating an α calculation judgment value (judge) according to Formula (24)

$$judge = |fg(maxRGBs, \gamma) - fg(minRGBs, \gamma) - MAXw|; \qquad (24)$$

and then (d) judging whether or not $$judge \leq judgeTol$$

where judgeTol=a threshold (>0) for use in calculation judgment of the color-saturation conversion rate, the steps (a) to (d) being repeated from j=0 to j=Ndg−1 and from either k=Ndg−1 to k=j or k=j to k=Ndg−1, the color-saturation conversion section finishing the calculation of α if judge≤judgeTol, the color-saturation conversion section setting α as α=1 if the color-saturation conversion section finishes a predetermined loop without satisfying judge≤judgeTol.

18. The transmissive liquid crystal display device as set forth in claim 9, wherein the color-saturation conversion section calculates a color-saturation conversion rate α according to the steps (A) and (B) of:

(A) in order to perform piecewise linear approximation of a normalized gamma curve, calculating the coordinates of an endpoint of each polygonal-line segment according to Formulae (9) and (10)

$$x[j] = j/Ndg \qquad (9)$$

$$y[j] = x[j]^\gamma \qquad (10)$$

where

Ndg=the number of normalized-gamma-curve polygonal-line segments (>0), x[j]=the x coordinate of an endpoint of a normalized-gamma-curve polygonal-line segment ($0 \leq j \leq Ndg$), and y[j]=the y coordinate of an endpoint of a normalized-gamma-curve polygonal-line segment ($0 \leq j \leq Ndg$), and calculating the slope and intercept of each normalized polygonal-line segment according to Formulae (11) and (12)

$$a[j] = (y[j+1] - y[j])/(x[j+1] - x[j]) \qquad (11)$$

$$b[j] = (x[j+1] \times y[j] - x[j] \times y[j+1])/(x[j+1] - x[j]) \qquad (12)$$

where a[j]=the slope of a normalized-gamma-curve polygonal-line segment j ($0 \leq j < Ndg$), and b[j]=the intercept of a normalized-gamma-curve polygonal-line segment j ($0 \leq j < Ndg$), the step (A) being repeated from j=0 to j=Ndg for Formulae (9) and (10) and from j=0 to j=Ndg−1 for Formulae (11) and (12); and (B) calculating a for each pixel of the input image according to the steps (a) to (d) of:

(a) calculating the current value of α according to Formula (20)

$$\alpha = \frac{\left\{\begin{array}{l} MAXw - (a[k] - a[j]) \times Y[i] - \\ (b[k] - b[j]) \times MAX \end{array}\right\}}{\left\{\begin{array}{l} a[k] \times (maxRGB - Y[i]) - \\ a[j] \times (minRGB - Y[i]) \end{array}\right\}} \qquad (20)$$

α being an arbitrary value if the denominator is 0;

(b) calculating maximum and minimum values (maxRGBst, minRGBst) of the saturation-converted RGB signal according to Formulae (22) and (23)

$$maxRGBs = \max(\alpha \times maxRGB + (1-\alpha) \times Y[i], 0) \qquad (22)$$

$$minRGBs = \min(\alpha \times maxRGB + (1-\alpha) \times Y[i], MAX); \qquad (23)$$

(c) calculating an α calculation judgment value (judge) according to Formula (24)

$$judge = |fg(maxRGBs, \gamma) - fg(minRGBs, \gamma) - MAXw|; \qquad (24)$$

and then (d) judging whether or not $$judge \leq judgeTol$$

where judgeTol=a threshold (>0) for use in calculation judgment of the color-saturation conversion rate, the steps (a) to (d) being repeated by from j=0 to j=Ndg−1 and from either k=Ndg−1 to k=j or k=j to k=Ndg−1, the color-saturation conversion section finishing the calculation of α if judge≤judgeTol, the color-saturation conversion section setting α as α=1 if the color-saturation conversion section finishes a predetermined loop without satisfying judge≤judgeTol.

19. The transmissive liquid crystal display device as set forth in claim 7, wherein the color-saturation conversion section calculates, for a pixel that satisfies Formula (4), a color-saturation conversion rate α according to the steps (A) to (D) of:

(A) initializing lower and upper limits low and high of the color-saturation conversion rate for use in a dichotomizing search so that low=0 and high=1;

(B) calculating the current value of α according to Formula (25)

$$\alpha = (low + high)/2; \qquad (25)$$

(C) calculating an α calculation judgment value (judgeSi) according to Formula (26)

$$judgeSi = fg\left(\begin{array}{l} \alpha \times maxRGB + \\ (1-\alpha) \times Y[i], \gamma \end{array}\right) - fg\left(\begin{array}{l} \alpha \times minRGB + \\ (1-\alpha) \times Y[i], \gamma \end{array}\right) - MAXw; \qquad (26)$$

and then (D) if judgeSi<−judgeTol, updating low so that low takes on the current value of α, or if judgeTol<judgeSi, updating high so that high takes on the current value of α, the steps (B) to (D) being repeated either while low+alphaTol≦high where alphaTol=a threshold (>0) for use in calculation loop judgment of the color-saturation conversion rate α or a predetermined number of times, the color-saturation conversion section finishing the calculation of α if −judgeTol≦judgeSi≦judgeTol, the color-saturation conversion section performing error handling if the color-saturation conversion section finishes a predetermined loop without satisfying −judgeTol≦judgeSi≦judgeTol.

20. The transmissive liquid crystal display device as set forth in claim 10, wherein the color-saturation conversion and gamma-correction section calculates, for a pixel that satisfies Formula (4), a color-saturation conversion rate α according to the following steps (A) to (D) of:

(A) initializing lower and upper limits low and high of the color-saturation conversion rate for use in a dichotomizing search so that low=0 and high=1;

(B) calculating the current value of α according to Formula (25)

$$\alpha = (low+high)/2; \quad (25)$$

(C) calculating an α calculation judgment value (judgeSi) according to Formula (26)

$$judgeSi = fg\left(\frac{\alpha \times maxRGB +}{(1-\alpha) \times Y[i], \gamma}\right) - fg\left(\frac{\alpha \times minRGB +}{(1-\alpha) \times Y[i], \gamma}\right) - MAXw; \quad (26)$$

and then (D) if judgeSi<−judgeTol, updating low so that low takes on the current value of α, or if judgeTol<judgeSi, updating high so that high takes on the current value of α, the steps (B) to (D) being repeated either while low+alphaTol≦high where alphaTol=a threshold (>0) for use in calculation loop judgment of the color-saturation conversion rate α or a predetermined number of times, the color-saturation conversion section finishing the calculation of α if −judgeTol≦judgeSi≦judgeTol, the color-saturation conversion section performing error handling if the color-saturation conversion section finishes a predetermined loop without satisfying −judgeTol≦judgeSi≦judgeTol.

21. The transmissive liquid crystal display device as set forth in claim 8, wherein the color-saturation conversion section calculates, for each pixel of the input image, a color-saturation conversion rate α according to the steps (A) to (E) of:

(A) initializing lower and upper limits low and high of the color-saturation conversion rate for use in a dichotomizing search so that low=0 and high=1;

(B) calculating the current value of α according to Formula (25)

$$\alpha = (low+high)/2; \quad (25)$$

(C) calculating an α calculation judgment value (judgeSi) according to Formula (26)

$$judgeSi = fg\left(\frac{\alpha \times maxRGB +}{(1-\alpha) \times Y[i], \gamma}\right) - fg\left(\frac{\alpha \times minRGB +}{(1-\alpha) \times Y[i], \gamma}\right) - MAXw; \quad (26)$$

and then (D) if judgeSi<−judgeTol, updating low so that low takes on the current value of α, or if judgeTol<judgeSi, updating high so that high takes on the current value of α, or finishing the calculation of α if −judgeTol≦judgeSi≦judgeTol, the steps (B) to (D) being repeated either while low+alphaTol≦high where alphaTol=a threshold (>0) for use in calculation loop judgment of the color-saturation conversion rate α or a predetermined number of times; and (E) finishing the calculation of α at a point of time where the color-saturation conversion section finishes a predetermined loop without satisfying −judgeTol≦judgeSi≦judgeTol.

22. The transmissive liquid crystal display device as set forth in claim 9, wherein the color-saturation conversion section calculates, for each pixel of the input image, a color-saturation conversion rate α according to the steps (A) to (E) of:

(A) initializing lower and upper limits low and high of the color-saturation conversion rate for use in a dichotomizing search so that low=0 and high=1;

(B) calculating the current value of α according to Formula (25)

$$\alpha = (low+high)/2; \quad (25)$$

(C) calculating an α calculation judgment value (judgeSi) according to Formula (26)

$$judgeSi = fg\left(\frac{\alpha \times maxRGB +}{(1-\alpha) \times Y[i], \gamma}\right) - fg\left(\frac{\alpha \times minRGB +}{(1-\alpha) \times Y[i], \gamma}\right) - MAXw; \quad (26)$$

and then (D) if judgeSi<−judgeTol, updating low so that low takes on the current value of α, or if judgeTol<judgeSi, updating high so that high takes on the current value of α, or finishing the calculation of α if −judgeTol≦judgeSi≦judgeTol, the steps (B) to (D) being repeated either while low+alphaTol≦high where alphaTol=a threshold (>0) for use in calculation loop judgment of the color-saturation conversion rate α or a predetermined number of times; and (E) finishing the calculation of α at a point of time where the color-saturation conversion section finishes a predetermined loop without satisfying −judgeTol≦judgeSi≦judgeTol.

23. The transmissive liquid crystal display device as set forth in claim 7, wherein the color-saturation conversion section calculates, for a pixel that satisfies Formula (4), a color-saturation conversion rate α according to the steps (A) to (E) of:

(A) initializing variables for use in processing as follows:
αprev=(an arbitrary constant that satisfies 0≦αprev≦1)
maxRGBn=maxRGB/MAX
minRGBn=minRGB/MAX
Yn=Y[i]/MAX MAXwn=MAXw/MAX
overFlag=FALSE
underFlag=FALSE,
where
αprev=a previous color-saturation conversion rate,
maxRGBn=the maximum value of a normalized RGB signal,
minRGB=the minimum value of the normalized RGB signal,
Yn=a normalized luminance signal,
overFlag=an indicator of whether or not an out-of-range correction for α>1 has been made,
underFlag=an indicator of whether or not an out-of-range correction for α<0 has been made, and
FALSE=a logic value "FALSE";
(B) calculating the current value of α according to Formula (27)

$$\alpha = \alpha prev - g(\alpha prev)/g'(\alpha prev) \qquad (27)$$

where $$g(x) = \left(\frac{x \times \text{max}RGBn +}{(1-x) \times Yn}\right)^{\gamma} - \left(\frac{x \times \text{min}RGBn +}{(1-x) \times Yn}\right)^{\gamma} - \text{Max}wn,$$

and $$g'(x) = \gamma \times (\text{max}RGBn - Yn) \times \left(\frac{x \times \text{max}RGBn +}{(1-x) \times Yn}\right)^{(\gamma-1)} -$$

$$\gamma \times (\text{min}RGBn - Yn) \times \left(\frac{x \times \text{min}RGBn +}{(1-x) \times Yn}\right)^{(\gamma-1)};$$

(C) finishing the calculation of α if Formula (28) is satisfied as follows:

$$|\alpha - \alpha prev| < \text{alphaTol} \qquad (28)$$

where alphaTol=a threshold (>0) for calculating α;
(D) setting α=0 if Formula (28) is not satisfied and α<0 and either shifting to the step (E) after setting underFlag=TRUE if underFlag=FALSE or performing error handling if underFlag=TRUE,
or setting α=1 if Formula (28) is not satisfied and α>1 and either shifting to the step (E) after setting overFlag=TRUE if overFlag=FALSE or performing error handling if overFlag=TRUE,
where TRUE=a logic value "TRUE";
(E) updating αprev according to Formula (29)

$$\alpha prev = \alpha \qquad (29)$$

so that αprev takes on the current value of α,
the steps (B) to (E) being repeated a predetermined number of times.

24. The transmissive liquid crystal display device as set forth in claim 10, wherein the color-saturation conversion and gamma-correction section calculates, for a pixel that satisfies Formula (4), a color-saturation conversion rate α according to the steps (A) to (E) of:
(A) initializing variables for use in processing as follows:
αprev=(an arbitrary constant that satisfies 0≦αprev≦1)
maxRGBn=maxRGB/MAX
minRGBn=minRGB/MAX
Yn=Y[i]/MAX
MAXwn=MAXw/MAX
overFlag=FALSE
underFlag=FALSE,
where
αprev=a previous color-saturation conversion rate,
maxRGBn=the maximum value of a normalized RGB signal,
minRGB=the minimum value of the normalized RGB signal,
Yn=a normalized luminance signal,
overFlag=an indicator of whether or not an out-of-range correction for α>1 has been made,
underFlag=an indicator of whether or not an out-of-range correction for α<0 has been made, and
FALSE=a logic value "FALSE";
(B) calculating the current value of α according to Formula (27)

$$\alpha = \alpha prev - g(\alpha prev)/g'(\alpha prev) \qquad (27)$$

where $$g(x) = \left(\frac{x \times \text{max}RGBn +}{(1-x) \times Yn}\right)^{\gamma} - \left(\frac{x \times \text{min}RGBn +}{(1-x) \times Yn}\right)^{\gamma} - \text{Max}wn,$$

and $$g'(x) = \gamma \times (\text{max}RGBn - Yn) \times \left(\frac{x \times \text{max}RGBn +}{(1-x) \times Yn}\right)^{(\gamma-1)} -$$

$$\gamma \times (\text{min}RGBn - Yn) \times \left(\frac{x \times \text{min}RGBn +}{(1-x) \times Yn}\right)^{(\gamma-1)};$$

(C) finishing the calculation of α if Formula (28) is satisfied as follows:

$$|\alpha - \alpha prev| < \text{alphaTol} \qquad (28)$$

where alphaTol=a threshold (>0) for calculating α;
(D) setting α=0 if Formula (28) is not satisfied and α<0 and either shifting to the step (E) after setting underFlag=TRUE if underFlag=FALSE or performing error handling if underFlag=TRUE,
or setting α=1 if Formula (28) is not satisfied and α>1 and either shifting to the step (E) after setting overFlag=TRUE if overFlag=FALSE or performing error handling if overFlag=TRUE,
where TRUE=a logic value "TRUE";
(E) updating αprev according to Formula (29)

$$\alpha prev = \alpha \qquad (29)$$

so that αprev takes on the current value of α,
the steps (B) to (E) being repeated a predetermined number of times.

25. The transmissive liquid crystal display device as set forth in claim 8, wherein the color-saturation conversion section calculates, for each pixel of the input image, a color-saturation conversion rate α according to the steps (A) to (E) of:
(A) initializing variables for use in processing as follows:
αprev=an arbitrary constant
maxRGBn=maxRGB/MAX
minRGBn=minRGB/MAX
Yn=Y[i]/MAX
MAXwn=MAXw/MAX
overFlag=FALSE
underFlag=FALSE,
where
αprev=a previous color-saturation conversion rate,
maxRGBn=the maximum value of a normalized RGB signal, minRGB=the minimum value of the normalized RGB signal,
Yn=a normalized luminance signal,
overFlag=an indicator of whether or not an out-of-range correction for $\alpha>1$ has been made,
underFlag=an indicator of whether or not an out-of-range correction for $\alpha<0$ has been made, and
FALSE=a logic value "FALSE";
(B) calculating the current value of $\alpha$ according to Formula (27)

$$\alpha = \alpha prev - g(\alpha prev)/g'(\alpha prev) \quad (27)$$
where
$$g(x) = \left(\frac{x \times \max RGBn +}{(1-x) \times Yn}\right)^{\gamma} - \left(\frac{x \times \min RGBn +}{(1-x) \times Yn}\right)^{\gamma} - \text{Max}wn,$$
and
$$g'(x) = \gamma \times (\max RGBn - Yn) \times \left(\frac{x \times \max RGBn +}{(1-x) \times Yn}\right)^{(\gamma-1)} -$$
$$\gamma \times (\min RGBn - Yn) \times \left(\frac{x \times \min RGBn +}{(1-x) \times Yn}\right)^{(\gamma-1)};$$

$\alpha$ being an arbitrary value if $g'(\alpha prev) = 0$;

(C) finishing the calculation of $\alpha$ if Formula (28) is satisfied as follows:

$$|\alpha - \alpha prev| < \text{alphaTol} \quad (28)$$

where alphaTol=a threshold ($>0$) for calculating $\alpha$;
(D) setting $\alpha=0$ if Formula (28) is not satisfied and $\alpha<0$ and either shifting to the step (E) after setting underFlag=TRUE if underFlag=FALSE or finishing the calculation of $\alpha$ if underFlag=TRUE,
or setting $\alpha=1$ if Formula (28) is not satisfied and $\alpha>1$ and either shifting to the step (E) after setting overFlag=TRUE if overFlag=FALSE or finishing the calculation of $\alpha$ if overFlag=TRUE,
where TRUE=a logic value "TRUE";
(E) updating $\alpha prev$ according to Formula (29)

$$\alpha prev = \alpha \quad (29)$$

so that $\alpha prev$ takes on the current value of $\alpha$,
the steps (B) to (E) being repeated a predetermined number of times.

26. The transmissive liquid crystal display device as set forth in claim 9, wherein the color-saturation conversion section calculates, for each pixel of the input image, a color-saturation conversion rate $\alpha$ according to the steps (A) to (E) of:
(A) initializing variables for use in processing as follows:
$\alpha prev$=an arbitrary constant
maxRGBn=maxRGB/MAX
minRGBn=minRGB/MAX
Yn=Y[i]/MAX
MAXwn=MAXw/MAX
overFlag=FALSE
underFlag=FALSE,
where
$\alpha prev$=a previous color-saturation conversion rate,
maxRGBn=the maximum value of a normalized RGB signal,
minRGB=the minimum value of the normalized RGB signal,
Yn=a normalized luminance signal,
overFlag=an indicator of whether or not an out-of-range correction for $\alpha>1$ has been made,
underFlag=an indicator of whether or not an out-of-range correction for $\alpha<0$ has been made, and
FALSE=a logic value "FALSE";
(B) calculating the current value of $\alpha$ according to Formula (27)

$$\alpha = \alpha prev - g(\alpha prev)/g'(\alpha prev) \quad (27)$$
where
$$g(x) = \left(\frac{x \times \max RGBn +}{(1-x) \times Yn}\right)^{\gamma} - \left(\frac{x \times \min RGBn +}{(1-x) \times Yn}\right)^{\gamma} - \text{Max}wn,$$
and
$$g'(x) = \gamma \times (\max RGBn - Yn) \times \left(\frac{x \times \max RGBn +}{(1-x) \times Yn}\right)^{(\gamma-1)} -$$
$$\gamma \times (\min RGBn - Yn) \times \left(\frac{x \times \min RGBn +}{(1-x) \times Yn}\right)^{(\gamma-1)};$$

$\alpha$ being an arbitrary value if $g'(\alpha prev) = 0$;

(C) finishing the calculation of $\alpha$ if Formula (28) is satisfied as follows:

$$|\alpha - \alpha prev| < \text{alphaTol} \quad (28)$$

where alphaTol=a threshold ($>0$) for calculating $\alpha$;
(D) setting $\alpha=0$ if Formula (28) is not satisfied and $\alpha<0$ and either shifting to the step (E) after setting underFlag=TRUE if underFlag=FALSE or finishing the calculation of $\alpha$ if underFlag=TRUE,
or setting $\alpha=1$ if Formula (28) is not satisfied and $\alpha>1$ and either shifting to the step (E) after setting overFlag=TRUE if overFlag=FALSE or finishing the calculation of $\alpha$ if overFlag=TRUE,
where TRUE=a logic value "TRUE";
(E) updating $\alpha prev$ according to Formula (29)

$$\alpha prev = \alpha \quad (29)$$

so that $\alpha prev$ takes on the current value of $\alpha$,
the steps (B) to (E) being repeated a predetermined number of times.

27. The transmissive liquid crystal display device as set forth in claim 7, wherein the color-saturation conversion section calculates, for a pixel that satisfies Formula (4), a color-saturation conversion rate $\alpha$ according to the steps (A) and (B) of:
(A) calculating coefficients (a, b, c) for use in calculation of $\alpha$ according to Formulae (30) to (32)

$$a=(\max RGB-\min RGB)\times(\max RGB+\min RGB-2\times Y[i]) \quad (30)$$

$$b=Y[i]\times(\max RGB-\min RGB) \quad (31)$$

$$c=-\text{MAX}w\times\text{MAX}; \quad (32)$$

and
(B) if a=0, calculating $\alpha$ according to Formula (33), or if a≠0, calculating $\alpha$ according to Formula (34)

$$\alpha=-c/(2\times b) \quad (33)$$

$$\alpha=(-b+\sqrt{d})/a \quad (34)$$

where $d=b^2-a\times c$.

28. The transmissive liquid crystal display device as set forth in claim 10, wherein the color-saturation conversion and gamma-correction section calculates, for a pixel that satisfies Formula (4), a color-saturation conversion rate $\alpha$ according to the steps (A) and (B) of:

(A) calculating coefficients (a, b, c) for use in calculation of α according to Formulae (30) to (32)

$$\alpha=(\max RGB-\min RGB)\times(\max RGB+\min RGB-2\times Y[i]) \quad (30)$$

$$b=Y[i]\times(\max RGB-\min RGB) \quad (31)$$

$$c=-\mathrm{MAX}w\times\mathrm{MAX}; \quad (32)$$

and (B) if a=0, calculating α according to Formula (33), or if a≠0, calculating α according to Formula (34)

$$\alpha=-c/(2\times b) \quad (33)$$

$$\alpha=(-b+\sqrt{d})/a \quad (34)$$

where $d=b^2-a\times c$.

29. The transmissive liquid crystal display device as set forth in claim 8, wherein the color-saturation conversion section calculates, for each pixel of the input image, a color-saturation conversion rate α according to the steps (A) and (B) of:

(A) calculating coefficients (a, b, c) for use in calculation of α according to Formulae (30) to (32)

$$\alpha=(\max RGB-\min RGB)\times(\max RGB+\min RGB-2\times Y[i]) \quad (30)$$

$$b=Y[i]\times(\max RGB-\min RGB) \quad (31)$$

$$c=-\mathrm{MAX}w\times\mathrm{MAX}; \quad (32)$$

and (B) if a=0 and b≠0, calculating α according to Formula (33), or if a≠0, calculating α according to Formula (34)

$$\alpha=-c/(2\times b) \quad (33)$$

$$\alpha=(-b+\sqrt{d})/a \quad (34)$$

where $d=b^2-a\times c$, a being an arbitrary value if a=0 and b=0.

30. The transmissive liquid crystal display device as set forth in claim 9, wherein the color-saturation conversion section calculates, for each pixel of the input image, a color-saturation conversion rate α according to the steps (A) and (B) of:

(A) calculating coefficients (a, b, c) for use in calculation of a according to Formulae (30) to (32)

$$a=(\max RGB-\min RGB)\times(\max RGB+\min RGB-2\times Y[i]) \quad (30)$$

$$b=Y[i]\times(\max RGB-\min RGB) \quad (31)$$

$$c=-\mathrm{MAX}w\times\mathrm{MAX}; \quad (32)$$

(B) if a=0 and b≠0, calculating α according to Formula (33), or if a≠0, calculating α according to Formula (34)

$$\alpha=-c/(2\times b) \quad (33)$$

$$\alpha=(-b+\sqrt{d})/a \quad (34)$$

where $d=b^2-a\times c$, a being an arbitrary value if a=0 and b=0.

31. The transmissive liquid crystal display device as set forth in claim 1, wherein the output signal generation section includes:

a W transmission amount calculation section for calculating a transmission amount (Wtsg[i]) of each W subpixel according to the step of calculating a W transmission amount (Wtsg[i]) according to the following formula $$Wtsg[i]=\min(\max RGBsg/2,\min RGBsg)$$

where maxRGBsg=max(Rgs[i], Gsg[i], Bsg[i]), and
minRGBsg=min(Rgs[i], Gsg[i], Bsg[i]);

an RGB transmission amount calculation section for calculating respective transmission amounts (Rtsg[i], Gtsg[i], Btsg[i]) of each R subpixel, each G subpixel, and each B subpixel according to the step of calculating RGB transmission amounts (Rtsg[i], Gtsg[i], Btsg[i]) according to the following formulae $$Rtsg[i]=Rsg[i]-Wtsg[i]$$

$$Gtsg[i]=Gsg[i]-Wtsg[i]$$

$$Btsg[i]=Bsg[i]-Wtsg[i];$$

a backlight value calculation section for calculating a backlight value (Wbsg) according to the step of calculating a backlight value (Wbsg) according to the following formula $$Wbsg=\max(Rtsg[1], Gtsg[1], Btsg[1], Wtsg[1], \ldots \\ Rtsg[Np] Gtsg[Np], Btsg[Np], Wtsg[Np]);$$

and transmittance calculation section for calculating respective transmittances (rsg[i], gsg[i], bsg[i], wsg[i]) of the R, G, B, and W subpixels according to the step of calculating RGBW transmittances according to the following formulae $$rsg[i]=Rtsg[i]/Wbsg$$

$$gsg[i]=Gtsg[i]/Wbsg$$

$$bsg[i]=Btsg[i]/Wbsg$$

$$wsg[i]=Wtsg[i]/Wbsg$$

where rsg[i]=gsg[i]=bsg[i]=wsg[i]=0 if Wbsg=0.

32. The transmissive liquid crystal display device as set forth in claim 2, wherein the output signal generation section includes:

a W transmission amount calculation section for calculating a transmission amount (Wtsg[i]) of each W subpixel according to the step of calculating a W transmission amount (Wtsg[i]) according to the following formula $$Wtsg[i]=\min(\max RGBsg/2,\min RGBsg)$$

where maxRGBsg=max(Rgs[i], Gsg[i], Bsg[i]), and
minRGBsg=min(Rgs[i], Gsg[i], Bsg[i]);

an RGB transmission amount calculation section for calculating respective transmission amounts (Rtsg[i], Gtsg[i], Btsg[i]) of each R subpixel, each G subpixel, and each B subpixel according to the step of calculating RGB transmission amounts (Rtsg[i], Gtsg[i], Btsg[i]) according to the following formulae $$Rtsg[i]=Rsg[i]-Wtsg[i]$$

$$Gtsg[i]=Gsg[i]-Wtsg[i]$$

$$Btsg[i]=Bsg[i]-Wtsg[i];$$

a backlight value calculation section for calculating a backlight value (Wbsg) according to the step of calculating a backlight value (Wbsg) according to the following formula $$Wbsg=\max(Rtsg[1], Gtsg[1], Btsg[1], Wtsg[1], \ldots \\ Rtsg[Np] Gtsg[Np], Btsg[Np], Wtsg[Np]);$$

and transmittance calculation section for calculating respective transmittances (rsg[i], gsg[i], bsg[i], wsg[i]) of the R, G, B, and W subpixels according to the step of calculating RGBW transmittances according to the following formulae $$rsg[i]=Rtsg[i]/Wbsg$$

$$gsg[i]=Gtsg[i]/Wbsg$$

$$bsg[i]=Btsg[i]/Wbsg$$

$$wsg[i]=Wtsg[i]/Wbsg$$

where rsg[i]=gsg[i]=bsg[i]=wsg[i]=0 if Wbsg=0.

33. The transmissive liquid crystal display device as set forth in claim 1, further comprising a plurality of active backlights with respect to the liquid crystal panel, wherein the transmissive liquid crystal display device controls a transmittance of the liquid crystal panel and a backlight value of a backlight for each of those areas respectively corresponding to the active backlights.

34. The transmissive liquid crystal display device as set forth in claim 2, further comprising a plurality of active backlights with respect to the liquid crystal panel, wherein the transmissive liquid crystal display device controls a transmittance of the liquid crystal panel and a backlight value of a backlight for each of those areas respectively corresponding to the active backlights.

35. A non-transitory recording medium containing a control program that causes a computer to execute a process of each functional section as set forth in claim 5.

36. A non-transitory recording medium containing a control program that causes a computer to execute a process of each functional section as set forth in claim 6.

37. A non-transitory recording medium containing a control program that causes a computer to execute a process of each functional section as set forth in claim 7.

38. A non-transitory recording medium containing a control program that causes a computer to execute a process of each functional section as set forth in claim 8.

* * * * *